US011226466B2

(12) United States Patent
Wang et al.

(10) Patent No.: US 11,226,466 B2
(45) Date of Patent: Jan. 18, 2022

(54) OPTICAL ELEMENT DRIVING MECHANISM

(71) Applicant: TDK TAIWAN CORP., Taoyuan (TW)

(72) Inventors: Chao-Hsi Wang, Taoyuan (TW); Chao-Chang Hu, Taoyuan (TW); Chih-Wei Weng, Taoyuan (TW); He-Ling Chang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 21 days.

(21) Appl. No.: 16/778,544

(22) Filed: Jan. 31, 2020

(65) Prior Publication Data

US 2020/0249415 A1 Aug. 6, 2020

Related U.S. Application Data

(60) Provisional application No. 62/799,886, filed on Feb. 1, 2019, provisional application No. 62/809,891, filed on Feb. 25, 2019, provisional application No. 62/849,317, filed on May 17, 2019, provisional application No. 62/861,440, filed on Jun. 14, 2019, (Continued)

(51) Int. Cl.
*G02B 7/02* (2021.01)
*G03B 5/00* (2021.01)

(52) U.S. Cl.
CPC .............. *G02B 7/023* (2013.01); *G03B 5/00* (2013.01)

(58) Field of Classification Search
CPC .... G02B 7/023; G02B 27/0006; G02B 26/02; G02B 7/09; G02B 7/04; G03B 5/00; G03B 9/36; G03B 30/00; G03B 11/043; G03B 13/36; G03B 9/00; G03B 9/10;
(Continued)

(56) References Cited

U.S. PATENT DOCUMENTS

2011/1223111 5/2011 Han
2016/0258425 A1* 9/2016 Ladwig .................. G02B 7/023
(Continued)

FOREIGN PATENT DOCUMENTS

JP H11271833 A 10/1999
JP 2007163999 * 6/2007 ............... G03B 5/00
(Continued)

OTHER PUBLICATIONS

Machine Translation of JP2015125430 (Year: 2015).*
(Continued)

*Primary Examiner* — Darryl J Collins
*Assistant Examiner* — Matthew Y Lee
(74) *Attorney, Agent, or Firm* — Muncy, Geissler, Olds and Lowe, P.C.

(57) ABSTRACT

A driving mechanism for an optical element is provided, including a fixed portion, a movable portion, a first driving assembly, and a positioning assembly. The movable portion is movably disposed on the fixed portion, and includes an optical element. The first driving assembly is at least partially disposed on the fixed portion, and drives the optical element to move in a first direction. The positioning assembly is disposed on the fixed portion or the movable portion, wherein the positioning assembly limits the movable part to a first terminal position or a second terminal position relative to the fixed portion.

20 Claims, 112 Drawing Sheets

Related U.S. Application Data provisional application No. 62/879,190, filed on Jul. 26, 2019, provisional application No. 62/882,165, filed on Aug. 2, 2019, provisional application No. 62/899,423, filed on Sep. 12, 2019.

(58) Field of Classification Search
CPC . G03B 9/26; G03B 7/095; G03B 7/10; H04N 5/2254; H02K 1/17
See application file for complete search history.

(56) References Cited

U.S. PATENT DOCUMENTS

| | | | |
|---|---|---|---|
| 2018/0069995 A1* | 3/2018 | Lim | G02B 5/20 |
| 2018/0284569 A1* | 10/2018 | Minamisawa | H04N 5/23287 |
| 2018/0348596 A1 | 12/2018 | Reed et al. | |

FOREIGN PATENT DOCUMENTS

| | | | | |
|---|---|---|---|---|
| JP | 2007163999 | A | 6/2007 | |
| JP | 2008192362 | A | 8/2008 | |
| JP | 2015125430 | * | 7/2015 | G03B 9/10 |
| JP | 2015125430 | A | 7/2015 | |
| KR | 20100088444 | * | 8/2010 | G03B 11/043 |
| KR | 20100088444 | A | 8/2010 | |
| KR | 20180009969 | A | 1/2018 | |
| WO | WO-2010058947 | A2 | 5/2010 | |
| WO | WO2014086490 | A2 | 6/2014 | |
| WO | WO-2016123927 | A1 * | 8/2016 | G02B 7/14 |
| WO | WO2016123927 | A1 | 8/2016 | |

OTHER PUBLICATIONS

Machine Translation of KR20100088444 (Year: 2010).*
Machine Translation of WO-2016123927-A1 (Year: 2016).*
Machine Translation of JP2007163999 (Year: 2007).*
European Search Report dated Jul. 2, 2020 in EP Application No. 20154918.5.
Extended Search Report issued in corresponding EP Application No. 20154918.5 dated Oct. 12, 2020.

* cited by examiner

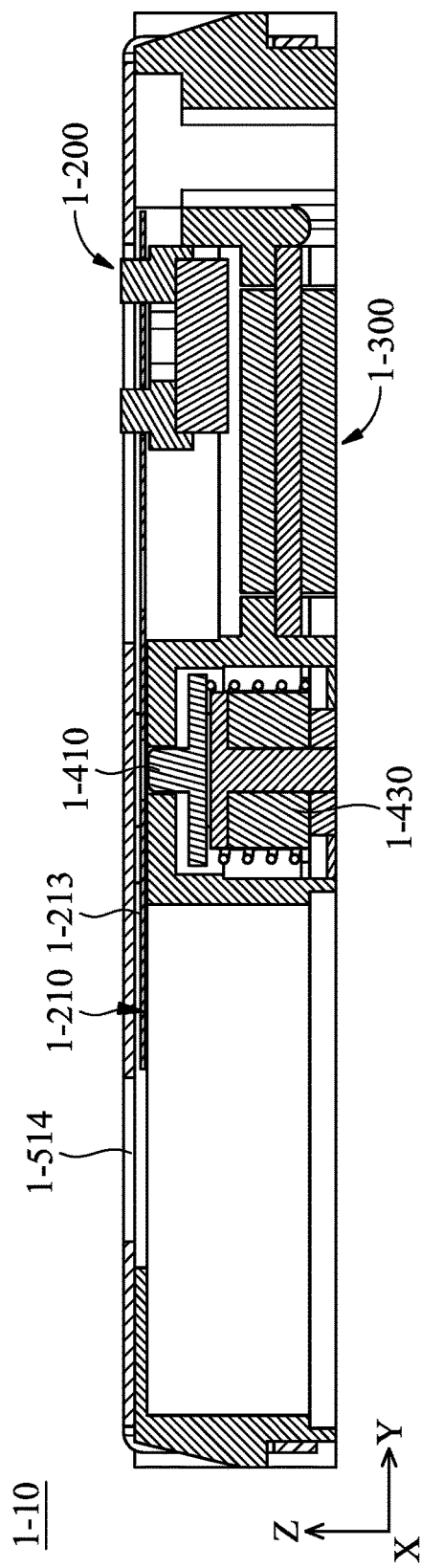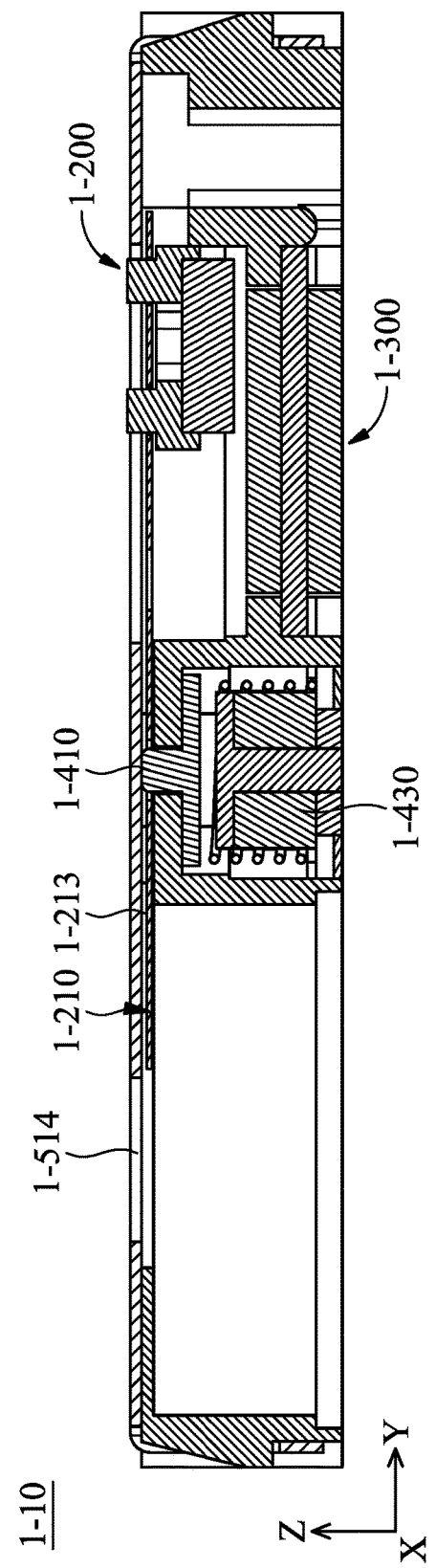
FIG. 9C
FIG. 9D

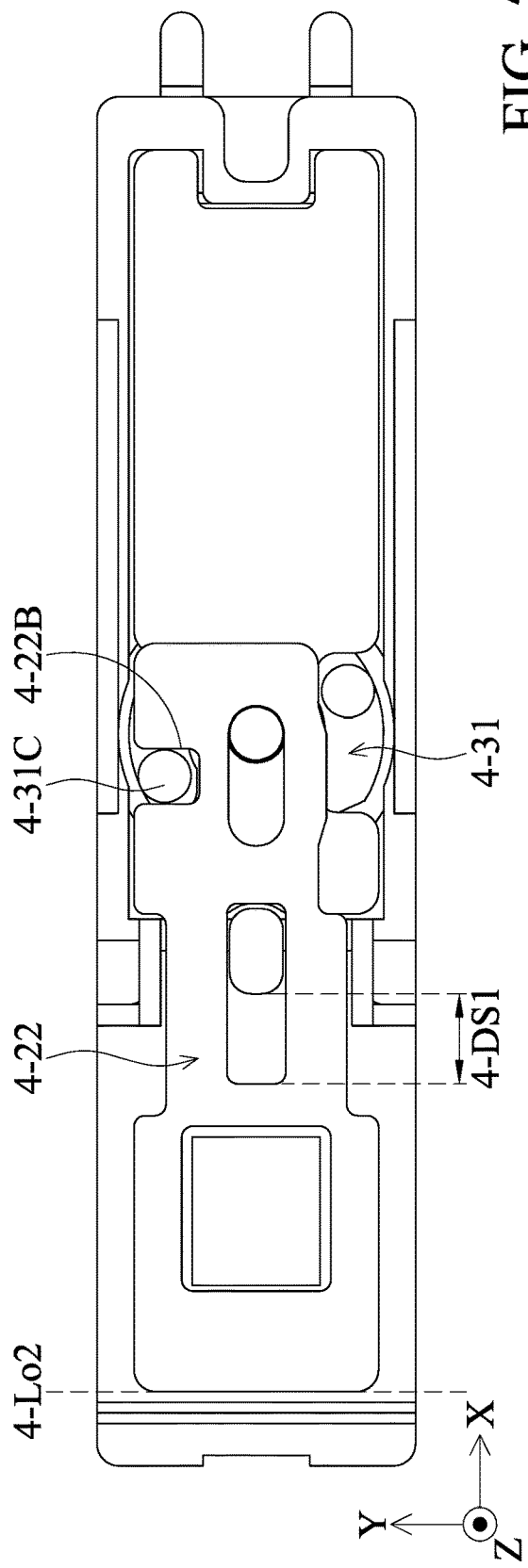
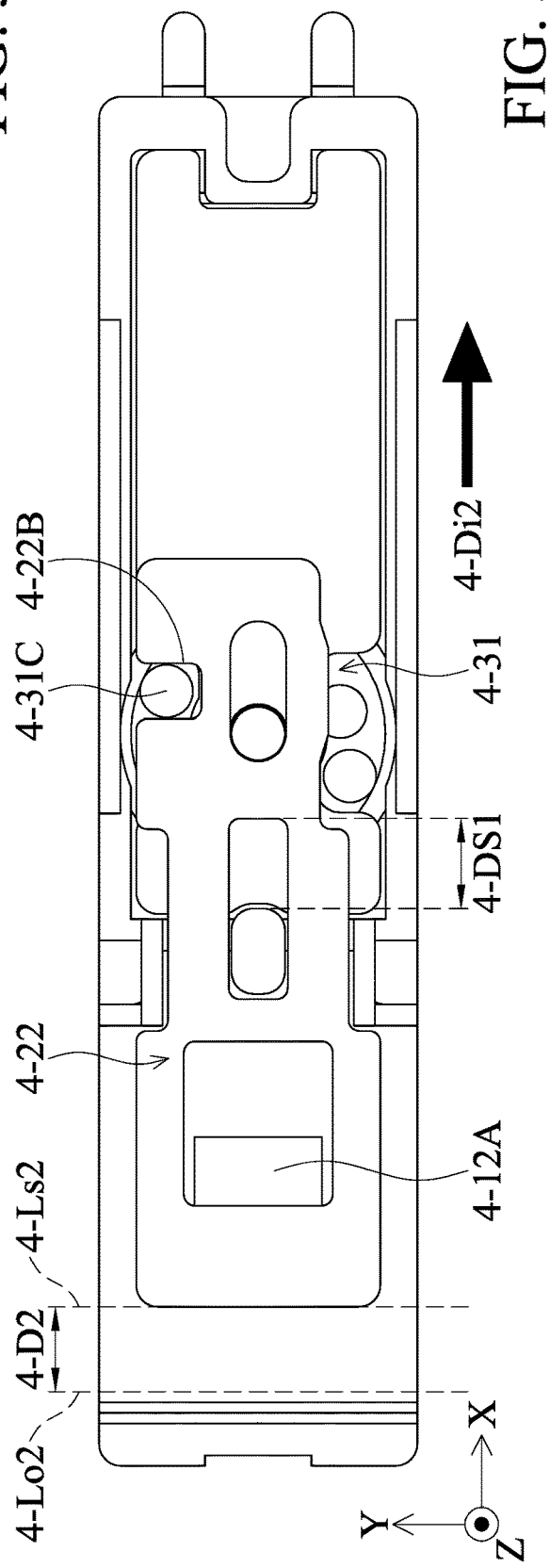
FIG. 52A
FIG. 52B

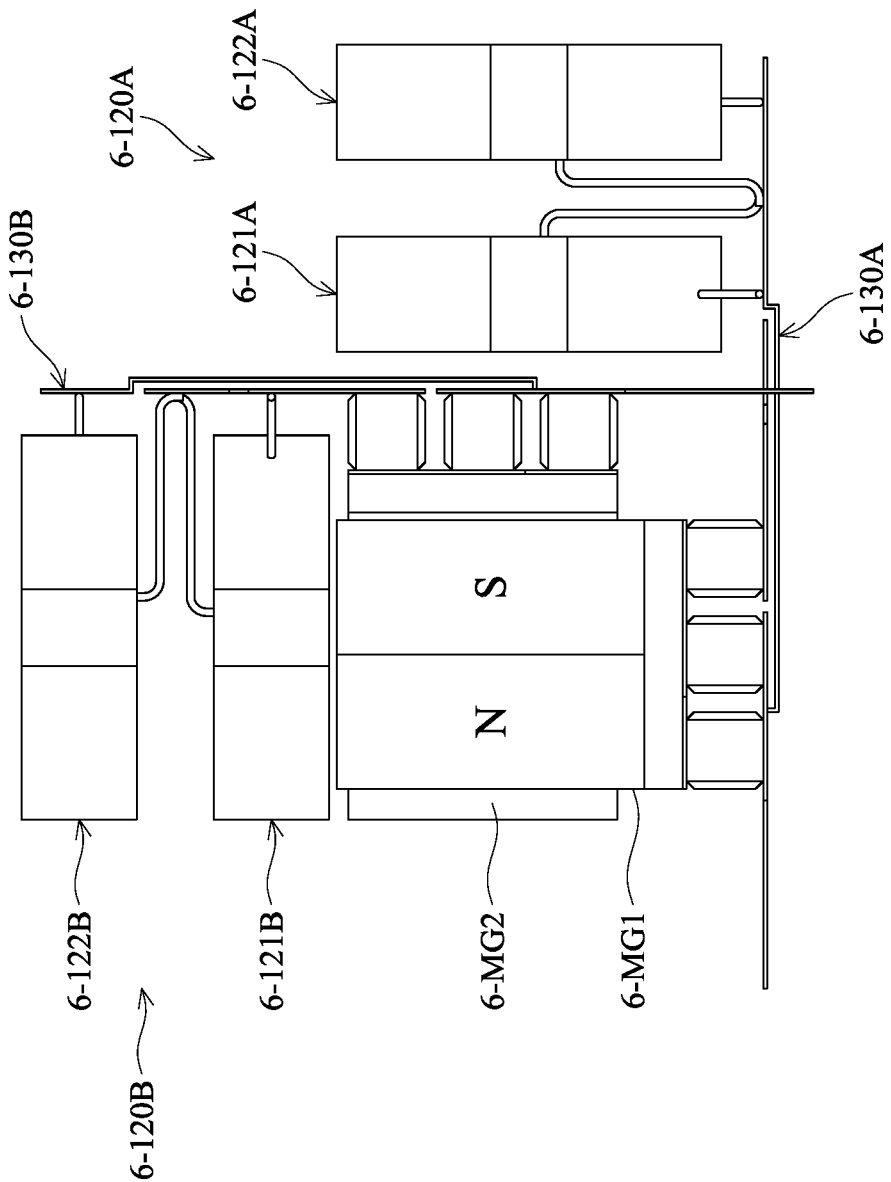
FIG. 84B
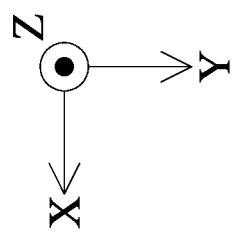

OPTICAL ELEMENT DRIVING MECHANISM

CROSS REFERENCE TO RELATED APPLICATIONS

The present application claims priority to U.S. Provisional Patent Application No. 62/799,866, filed on Feb. 1, 2019, No. 62/809,891, filed on Feb. 25, 2019, No. 62/849,317, filed on May 17, 2019, No. 62/861,440, filed on Jun. 14, 2019, No. 62/879,190, filed on Jul. 26, 2019, No. 62/882,165, filed on Aug. 2, 2019, No. 62/899,423, filed on Sep. 12, 2019, and China Patent Application No. XXXXXXX, filed on M D, 2020, which are incorporated by reference herein in their entirety.

BACKGROUND OF THE INVENTION

Field of the Invention

The present disclosure relates to a driving mechanism, and more particularly to an optical element driving mechanism.

Description of the Related Art

As technology has developed, it has become more common to include image-capturing and video-recording functions into many types of modern electronic devices, such as notebooks, smartphones or digital cameras. These electronic devices are used more and more often, and new models have been developed that are convenient, thin, and lightweight, offering more choices for consumers.

Electronic devices that have image-capturing or video-recording functions normally include a driving mechanism to drive an optical element to move. Light may pass through the optical element and may form an image on an optical sensor. However, the trend in modern mobile devices is to have a higher durability and a higher privacy. As a result, the present disclosure provides a driving mechanism different from the prior ones, to increase its stability and also improve information security.

BRIEF SUMMARY OF THE INVENTION

In one embodiment of the present disclosure, an optical element driving mechanism is provided, including a fixed portion, a movable portion, a first driving assembly, and a positioning assembly. The movable portion is movably disposed on the fixed portion, and includes an optical element. The first driving assembly is at least partially disposed on the fixed portion, and drives the optical element to move in a first direction. The positioning assembly is disposed on the fixed portion or the movable portion, wherein the positioning assembly limits the movable part to a first terminal position or a second terminal position relative to the fixed portion.

In some embodiments of the present disclosure, the fixed portion includes a cap and a base connected to the cap. The movable portion, the first driving assembly, and the positioning assembly are located between the cap and the base. In some embodiments, the cap is made of metal and is electrically connected to the positioning assembly, and the cap has a surface and an insulated component disposed on the surface. In some embodiments, the optical element driving mechanism further includes a metal wire embedded within the cap, and the metal wire is electrically connected to the positioning assembly. In some embodiments, the fixed portion further includes a first stopper structure located on a side of the fixed portion that is closer to the positioning assembly, and a second stopper structure located on a side of the fixed portion that is further away from the positioning assembly. When the movable portion comes into contact with the first stopper structure, the movable portion is located in the first terminal position relative to the fixed portion; and when the movable portion comes into contact with the second stopper structure, the movable portion is located in the second terminal position relative to the fixed portion.

In some embodiments of the present disclosure, the movable portion includes a sliding part, and the fixed portion includes a rail corresponding to the sliding part.

In some embodiments of the present disclosure, the first driving assembly includes a first driving coil disposed on the fixed portion, a positioning pin located in the first driving coil, and a first driving magnet connected to the movable portion, moving relative to the first driving coil in the first direction. A range of motion of the first driving magnet is greater than a length of the first driving coil. The optical element driving mechanism further includes an adhesive component, and the movable portion further includes a holder with a through slot extending to the first driving assembly, the adhesive component is located between the through slot and the first driving assembly, and the holder is integrated with the first driving assembly by the adhesive component. The holder has a protrusion and the optical element has a hole, the protrusion passes through the hole to connect the holder to the optical element.

In some embodiments of the present disclosure, the positioning assembly includes a positioning element that corresponds to the movable portion, and a second driving assembly driving the positioning element to move relative to the fixed portion in a second direction, which is perpendicular to the first direction. The optical element driving mechanism further includes a first electric conductive part electrically connected to the first driving assembly, and a second electric conductive part electrically connected to the second driving assembly. The first electric conductive part and the second electric conductive part are separate from each other. The second driving assembly includes a second driving coil disposed on the fixed portion, and a center pin at least partially located in the second driving coil. When the second driving coil is electrified, the positioning element is attracted by a magnetic force exerted by the center pin and thereby moves relative to the movable portion. The center pin includes a coil winding shaft disposed in the second driving coil, and a top surface connected to the coil winding shaft. A diameter of the top surface is greater than a diameter of the coil winding shaft. The positioning element includes a raised part, and a bottom part connected to the raised part and closer to the second driving assembly than the raised part. The optical element has two perforations. When the movable portion is located in the first terminal position, the raised part is inserted into one of the perforations. When the movable portion is located in the second terminal position, the raised part is inserted into another one of the perforations. When viewed in the second direction, a top of the raised part is circular, or a rounded rectangular. The positioning assembly further includes a resilient element contacting the bottom part of the positioning element, and the second driving assembly is at least partially disposed inside of the resilient element.

In some embodiments of the present disclosure, the optical element driving mechanism further includes a controller, controlling the positioning assembly to move into an unlocked position, then to move the movable portion that was originally in the first terminal position into the second terminal position, and then to move the positioning assembly into a locked position.

In some embodiments of the present disclosure, the optical element driving mechanism further includes a controller, controlling the positioning assembly to move into an unlocked position, move the movable portion that was originally in the first terminal position into the second terminal position, then move the movable portion back to the first terminal position, and move the positioning assembly to a locked position.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIG. 9C is a schematic view of an optical element driving mechanism, wherein the movable portion is in a second terminal position and the positioning element is in an unlocked position, according to some embodiments of the present disclosure.

FIG. 9D is a schematic view of an optical element driving mechanism, wherein the movable portion is in a second terminal position and the positioning element is in a locked position, according to some embodiments of the present disclosure.

FIG. 52A is a schematic diagram of a partial structure of an optical element driving mechanism according to an embodiment of the present invention.

FIG. 52B is a schematic diagram of a partial structure of an optical element driving mechanism according to an embodiment of the present invention.

FIG. 84B is a front view of FIG. 84A according to another embodiment of the present disclosure.

FIG. 115A to FIG. 115D are schematic diagrams illustrating that operation of the magnetic element 9-MG relative to the fixed assembly 9-101 according to another embodiment of the present disclosure.

DETAILED DESCRIPTION OF THE INVENTION

Figure 1:
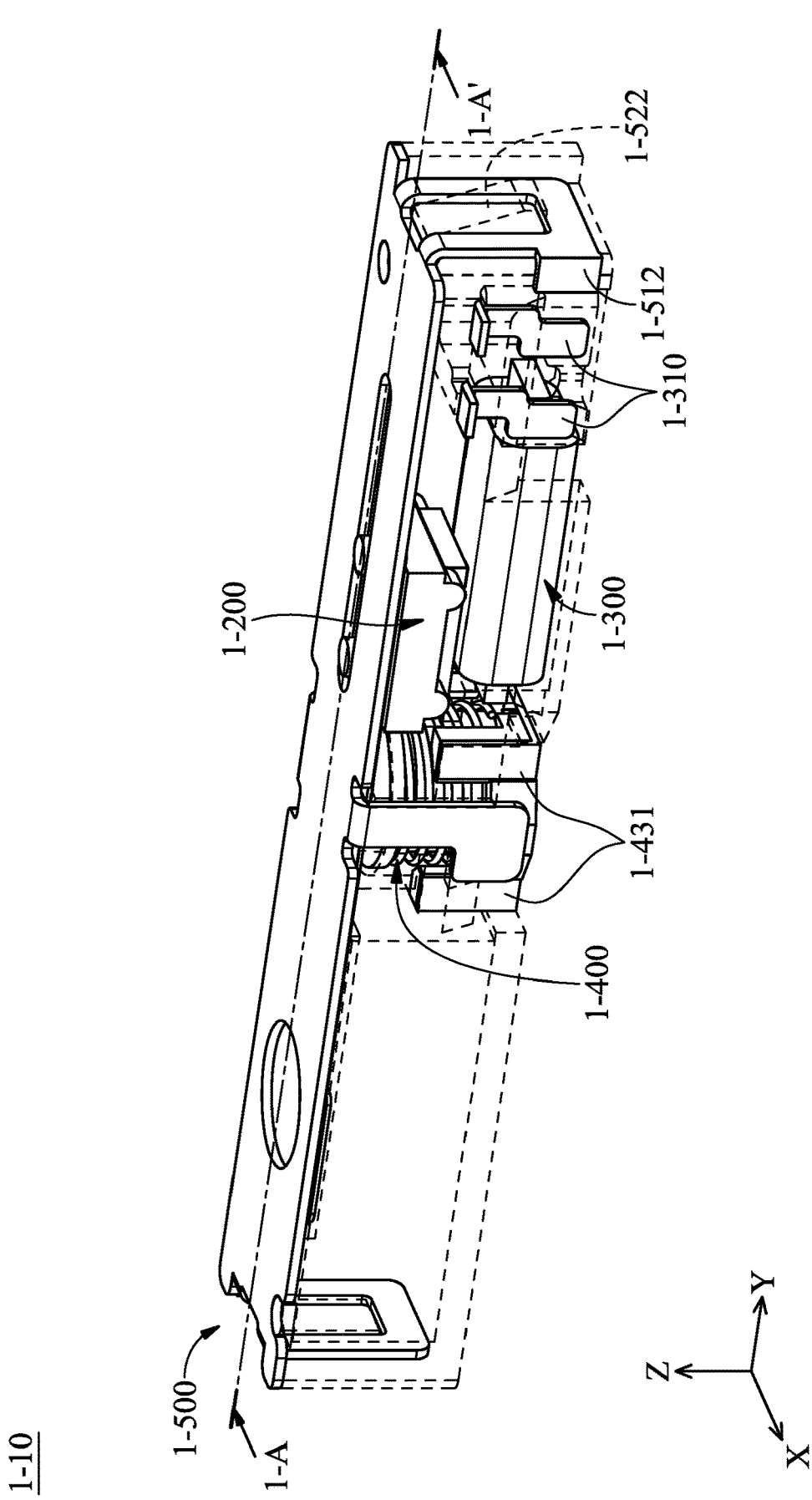
FIG. 1 is a perspective view of an optical element driving mechanism, according to some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact.

In addition, the present disclosure may repeat reference numerals and/or letters in the various embodiments. This repetition is for the purpose of simplicity and clarity and does not in itself dictate a relationship between the various embodiments and/or configurations discussed. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact. In addition, spatially relative terms, for example, "vertical," "above," "over," "below,", "bottom," etc. as well as derivatives thereof (e.g., "downwardly," "upwardly," etc.) are used for ease of the present disclosure of one features relationship to another feature. The spatially relative terms are intended to cover different orientations of the device including the features.

The First Embodiment Group

Firstly, referring to FIG. 1, FIG. 1 is a perspective view of an optical element driving mechanism 1-10, according to some embodiments of the present disclosure. As shown in FIG. 1, in some embodiments, the optical element driving mechanism 1-10 mainly includes a movable portion 1-200, a first driving assembly 1-300, a positioning assembly 1-400, and a fixed portion 1-500. In embodiments shown in FIG. 1, the positioning assembly 1-400 is disposed on the fixed portion 1-500, but it is not intended to be limiting, for example, the positioning assembly 1-400 may be disposed on the movable portion 1-200 in other embodiments.

Figure 2:
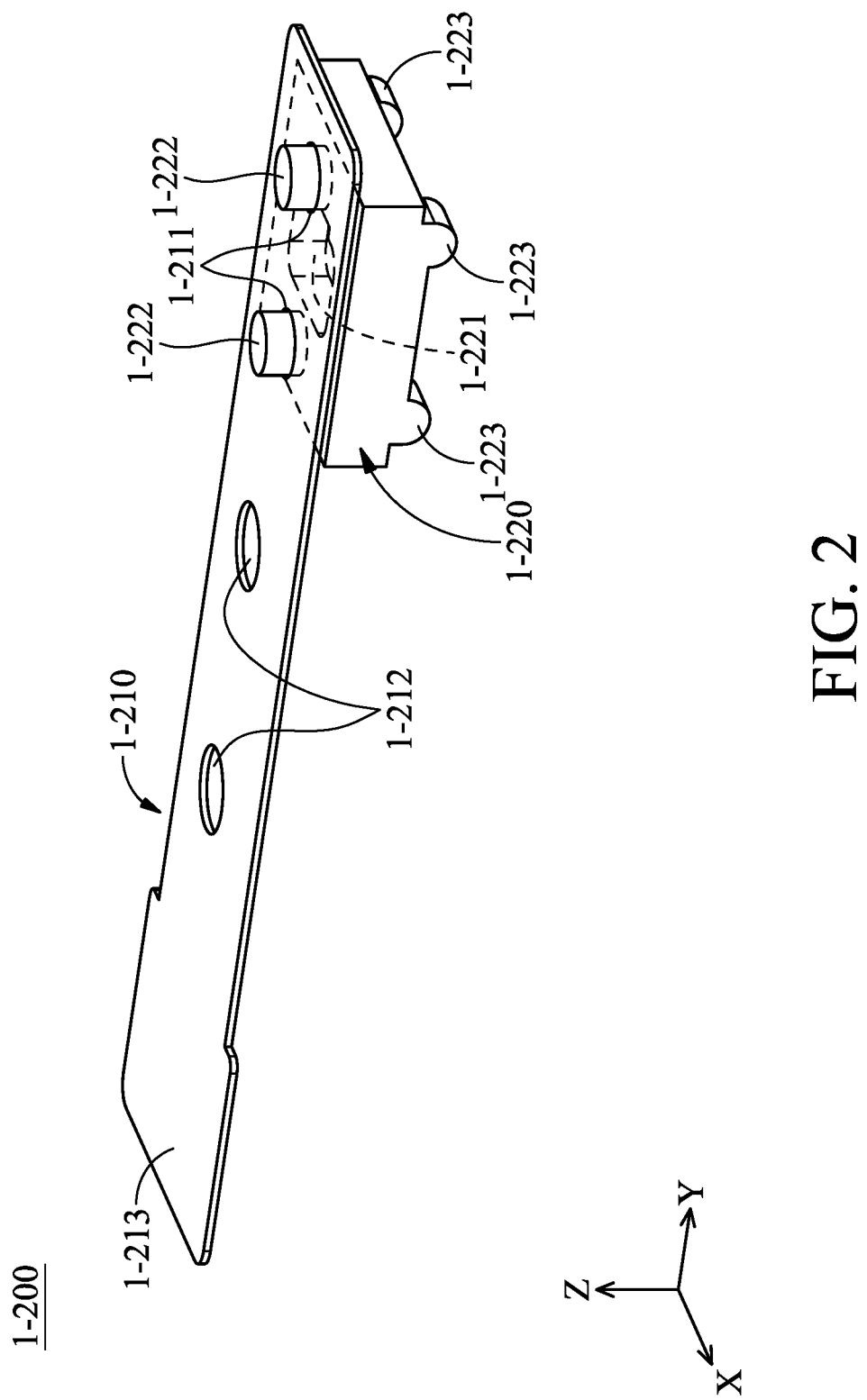
FIG. 2 is a perspective view of a movable portion, according to some embodiments of the present disclosure.

Referring to FIG. 2, FIG. 2 is a perspective view of a movable portion 1-200, according to some embodiments of the present disclosure. As shown in FIG. 2, the movable portion 1-200 includes an optical element 1-210, and a holder 1-220. The optical element 1-210 includes two holes 1-211, two perforations 1-212, and a blocking part 1-213. The holder 1-220 includes a through slot 1-221, two protrusions 1-222, and four sliding parts 1-223. In some embodiments, the two protrusions 1-222 of the holder 1-220 are arranged along a Y direction, corresponding to the two holes 1-211 of the optical element 1-210. The protrusions 1-222 connects the holder 1-220 and the optical element 1-210 together by passing through the holes 1-211. It should be understood that the number of protrusions 1-222 and the holes 1-211 is not limited to two, it may be one or more. The arrangements are not limited to be along the Y direction either, any suitable arrangement may be used. In some embodiments, no adhesive is between the protrusions 1-222 and the holes 1-211, preventing debris from becoming attached during the manufacturing process and thereby affecting the driving of the optical element 1-210. The perforations 1-212 correspond to the positioning assembly 1-400 for securing the position of the movable portion 1-200 relative to the fixed portion 1-500, which will be described in detail below. The blocking part 1-213 is used for blocking a lens or other optical sensing elements of the optical element driving mechanism 1-10. In addition to functioning to block and thereby enhance the security of electronic devices, the blocking part 1-213 may also function as a shutter.

Figure 7A:
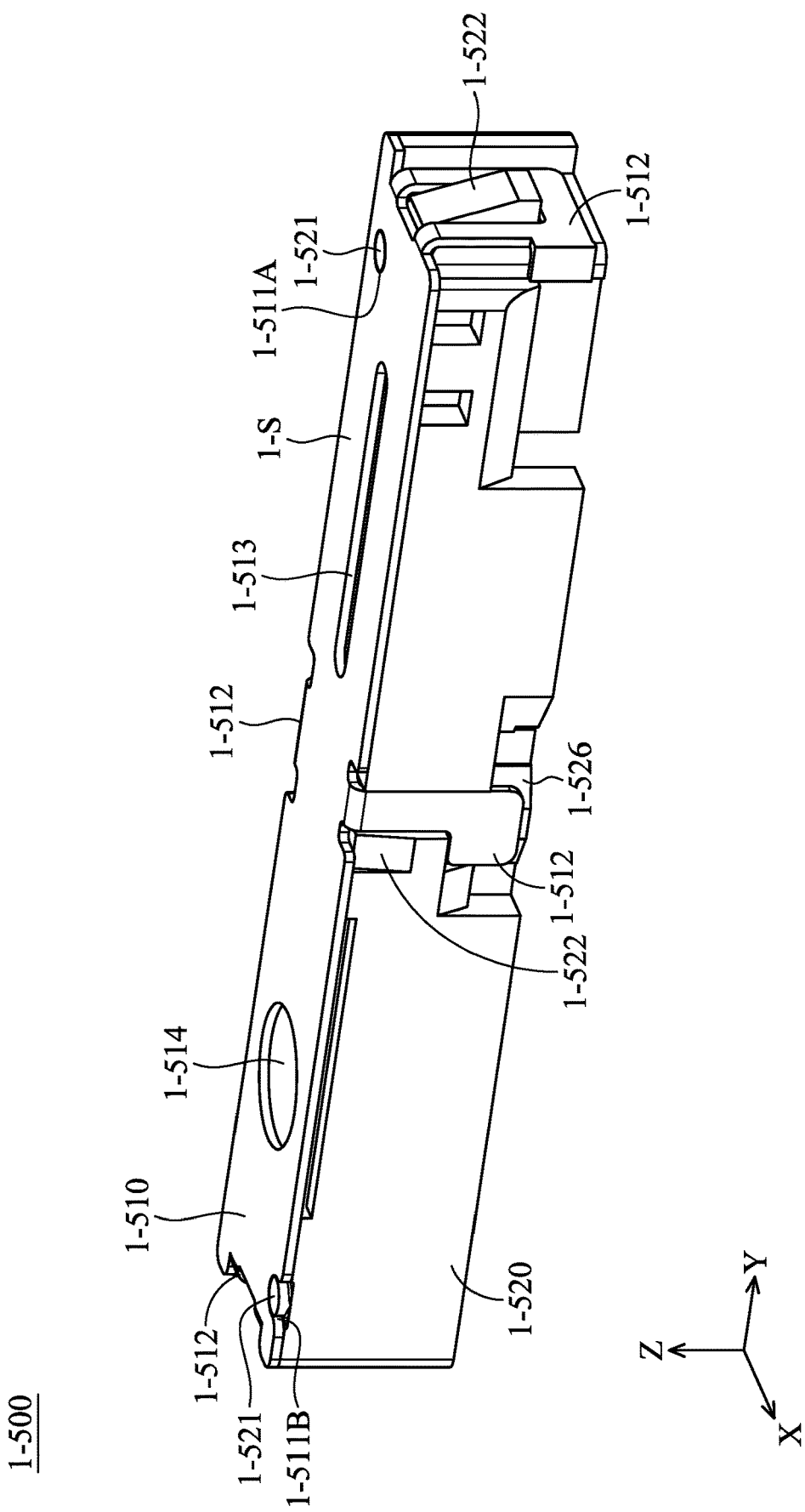
FIG. 7A is a perspective view of a fixed portion, according to some embodiments of the present disclosure.
Figure 7B:
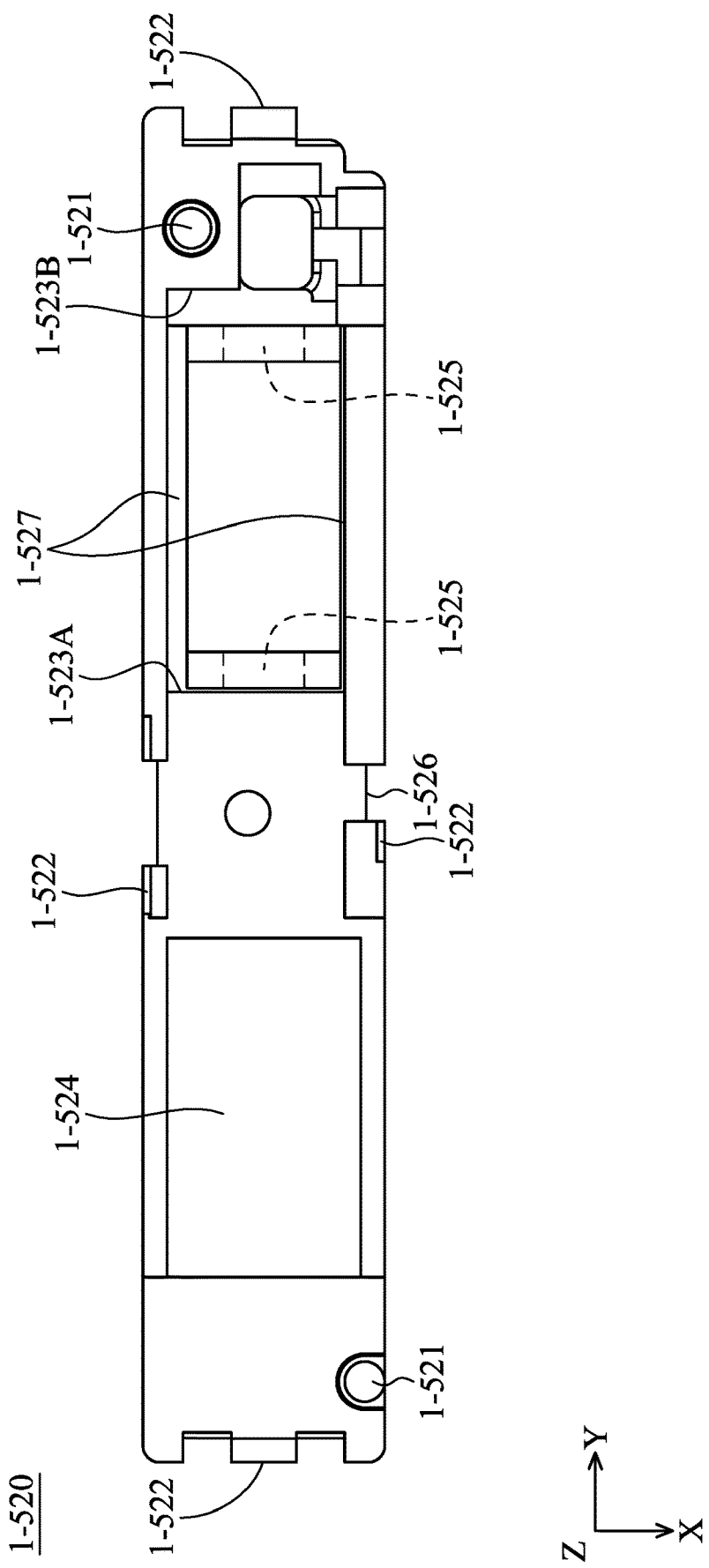
FIG. 7B is a top view of a base of a fixed portion, according to some embodiments of the present disclosure.

In some embodiments, the four sliding parts 1-223 of the holder 1-220 corresponds to a rail 1-527 of the fixed portion 1-500 (See FIG. 7B). The smaller the contacting area between the sliding parts 1-223 and the rail 1-527 is, the less the elements would be worn due to frictions therebetween. For example, in FIG. 2, the sliding parts 1-223 have arc shapes, so that the contact between the sliding part 1-223 and the rail 1-527 would be a point contact. It should be understood that the number of sliding parts 1-223 is not limited to four, and may be any suitable number. In some embodiments, the holder 1-220 and the fixed portion 1-500 are both made of plastic, or both made of metal. Using the same material may further reduce the abrasion wear between each other. In some preferred embodiments, the holder 1-220 is made of plastic. In addition to reducing the overall weight of the mechanism, it may also avoid the influences between the electromagnetic forces of the first driving assembly 1-300 and the second driving assembly 1-430 of the positioning assembly 1-400. The operating principles with respect to the first driving assembly 1-300 and the second driving assembly 1-430 will be described in detail below.

Figure 3:
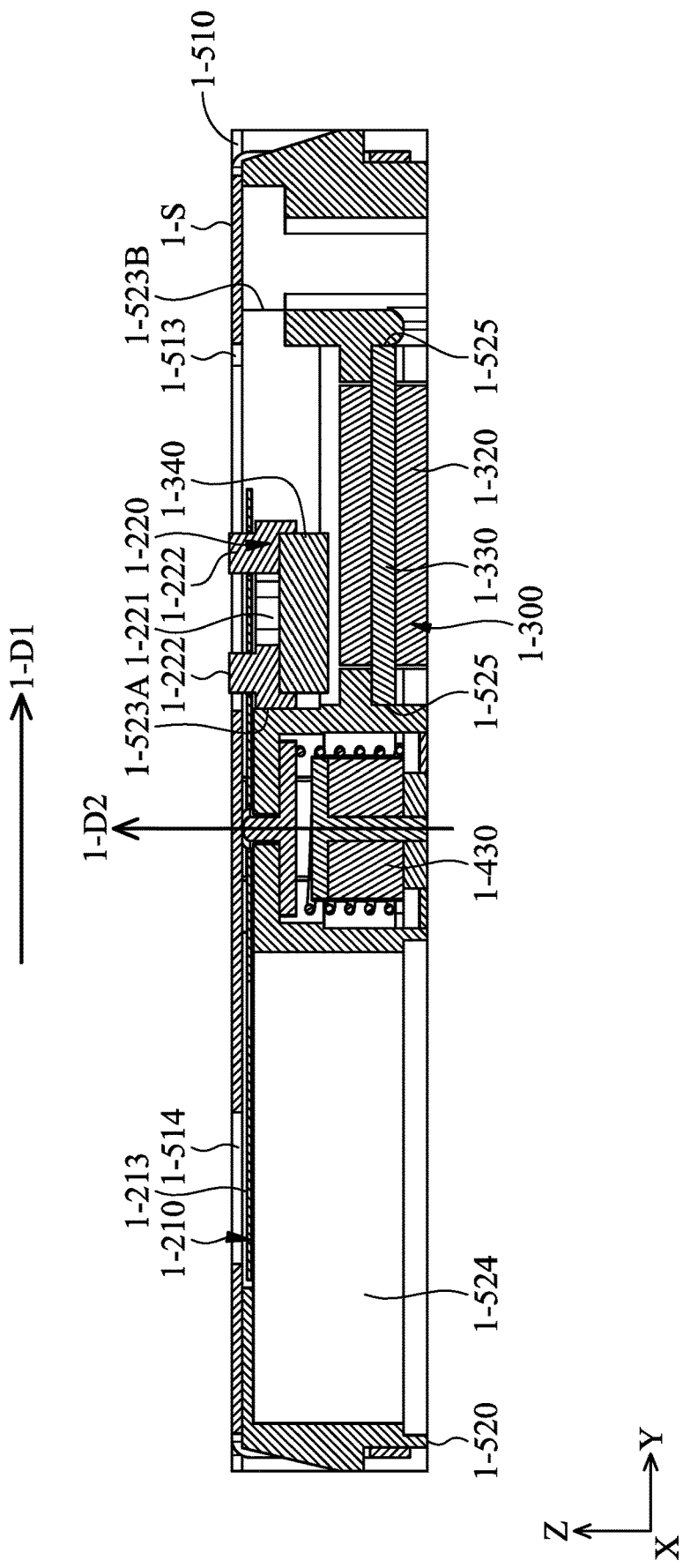
FIG. 3 is a cross-sectional view of an optical element driving mechanism along a line 1-A-1-A' in FIG. 1, according to some embodiments of the present disclosure.

Referring to FIG. 3, FIG. 3 is a cross-sectional view of an optical element driving mechanism 1-10 along a line 1-A-1-A' in FIG. 1, according to some embodiments of the present disclosure. As shown in FIG. 3, the first driving assembly 1-300 includes a first electric conductive part 1-310 (shown in FIG. 1), a first driving coil 1-320, a positioning pin 1-330, and a first driving magnet 1-340. The first driving assembly 1-300 is provided to drive the movable portion 1-200 to move in a first direction 1-D1 (i.e. the positive Y direction). The movable portion 1-200 and the first driving assembly 1-300 are connected by the holder 1-220 and the first driving magnet 1-340. In some embodiments, the through slot 1-221 of the holder 1-220 extends to the first driving magnet 1-340, when viewed along the –Z direction, the first driving magnet 1-340 would be exposed. During the manufacturing process, glue or any suitable adhesive may be inserted through the through slot 1-221 to glue the holder 1-220 and the first driving magnet 1-340 together. The first electric conductive part 1-310, which is electrically connected to the first driving coil 1-320, provides an electric current to the first driving coil 1-320. By an interaction with a magnetic field of the first driving magnet 1-340, the first driving coil 1-320 generates an electromagnetic force, allowing the first driving magnet 1-340 to move in the first direction 1-D1 with the holder 1-220. Specifically, the first driving magnet 1-340 may be a magnet including a north magnetic pole and a south magnetic pole. In some embodiments, the north magnetic pole is configured to be under the south magnetic pole, which makes the direction of the magnetic force is in the negative Z direction. By interacting with the electric current of the first driving coil 1-320, which is in the ±X direction, an electromagnetic force in the ±Y direction is generated. By controlling different directions of the electric current, the movable portion 1-200 may be driven to move in the first direction 1-D1 or in the opposite direction (i.e. the negative Y direction).

Moreover, in some embodiments, the positioning pin 1-330 located in the first driving coil 1-320 may be made of iron, or any suitable magnetic conductive material. The positioning pin 1-330 will be magnified when the first driving coil 1-320 is electrified, which may be used for concentrating the magnetic force and strengthening the magnetic field. Furthermore, in some embodiments, the length of the positioning pin 1-330 may be greater than the length of the first driving coil 1-320. And both ends of the positioning pin 1-330 may respectively extend into the fixed portion 1-500 (e.g. into the recesses 1-525) to fix the first driving assembly 1-300 to the fixed portion 1-500. In such embodiments, the range of motion of the first driving magnet 1-340 may exceed the length of the first driving coil 1-320, so that the volume of the first driving coil 1-320 relatively reduces, therefore achieving miniaturization of the overall optical element driving mechanism 1-10. In other embodiments, the positioning pin 1-330 may not be fixed to the fixed portion 1-500. In such cases, the first driving coil 1-320 may be directly fixed to the fixed portion 1-500 by any suitable adhesive.

Figure 4:
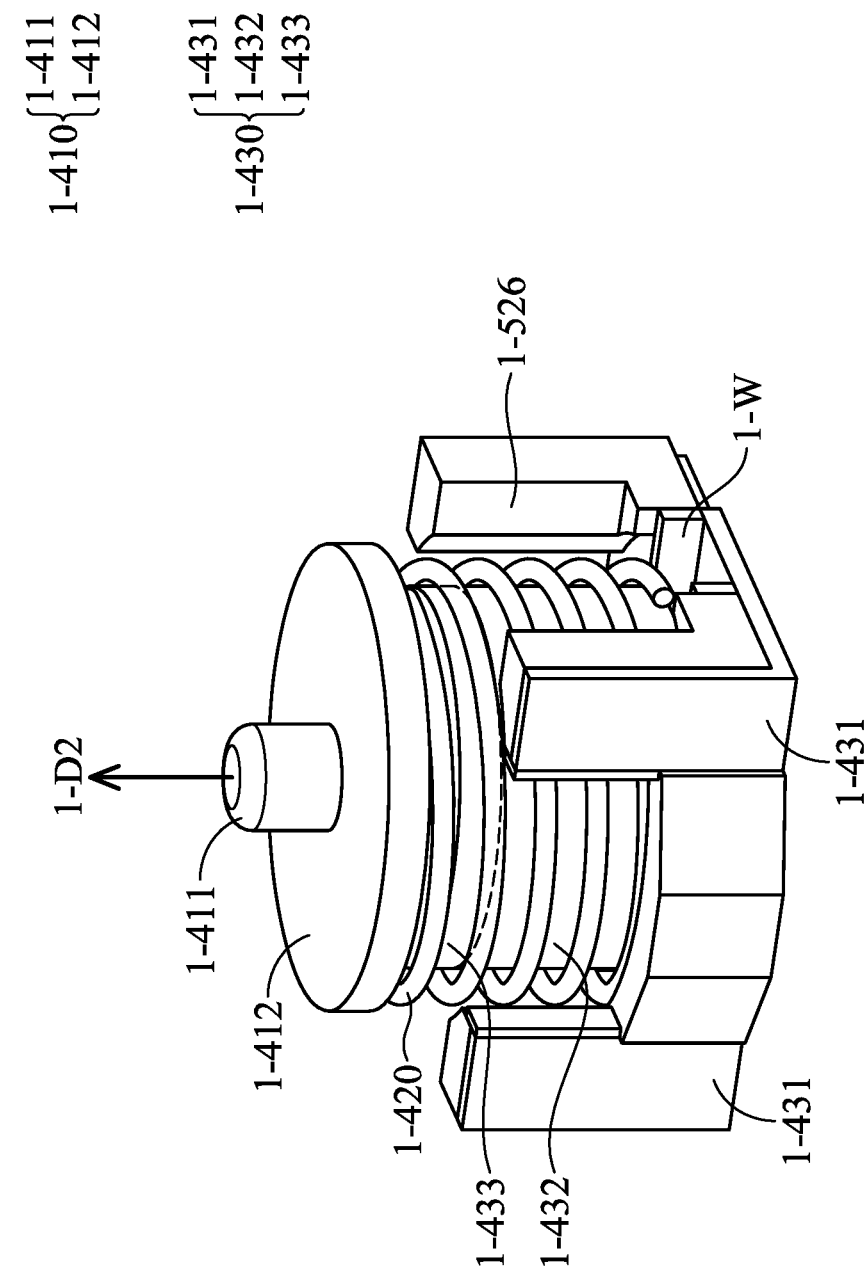
FIG. 4 is a perspective view of a positioning assembly, according to some embodiments of the present disclosure.
Figure 5A:
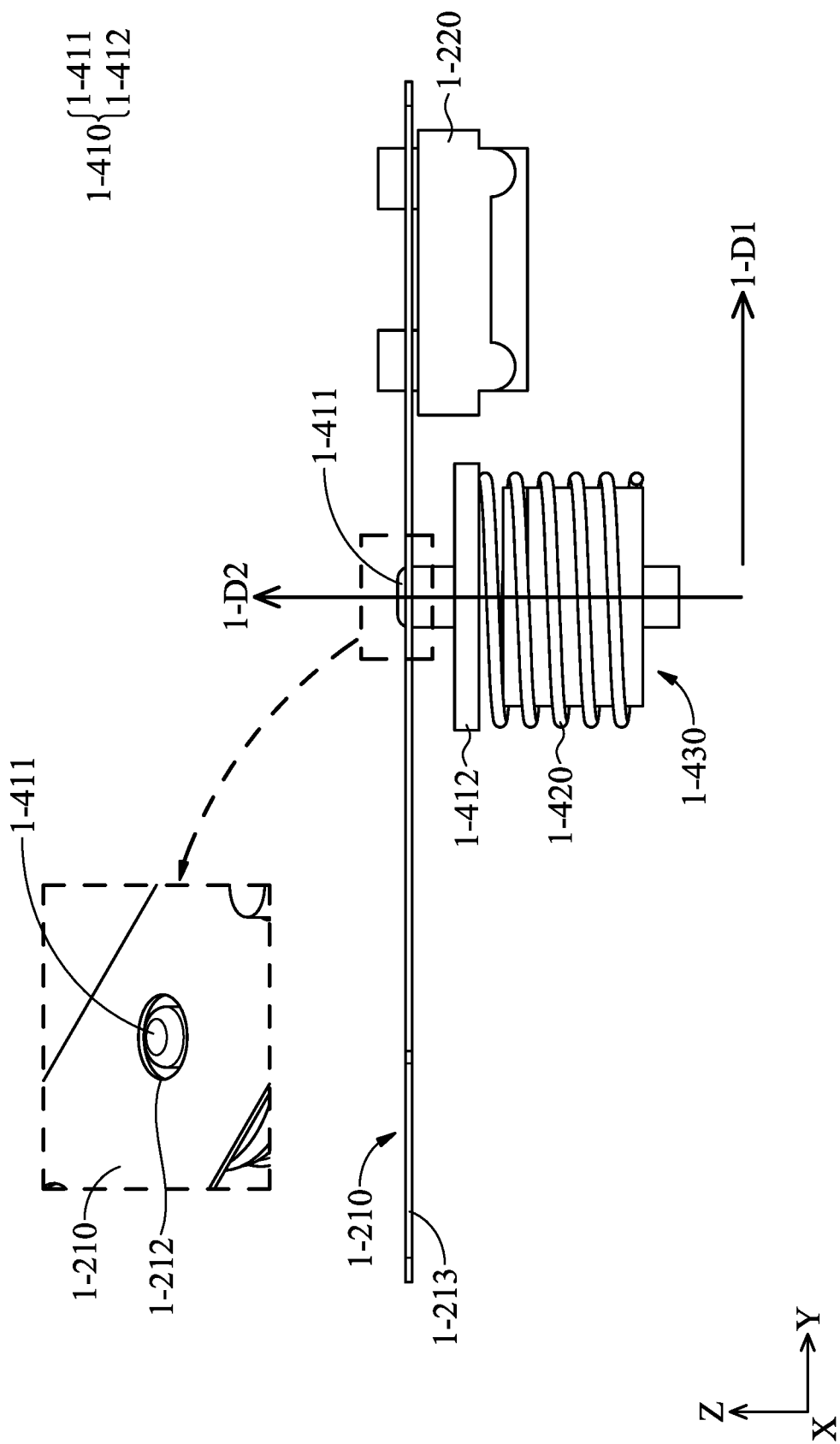
FIG. 5A is a schematic view of a positioning element in a locked position, according to some embodiments of the present disclosure.

Referring now to FIG. 4, FIG. 4 is a perspective view of a positioning assembly 1-400, according to some embodiments of the present disclosure. As shown in FIG. 4, the positioning assembly 1-400 includes a positioning element 1-410, a resilient element 1-420, and a second driving assembly 1-430. The second driving assembly 1-430 includes a second electric conductive part 1-431, a second driving coil 1-432, and a center pin 1-433. The second electric conductive part 1-431, which is electrically connected to the second driving coil 1-432, provides an electric current to the second driving coil 1-432. With the magnetic conductive center pin 1-433, the second driving coil 1-432 has an effect similar to an electromagnet, and a magnetic force is generated to drive the magnetic conductive positioning element 1-410 to move in an opposite direction of a second direction 1-D2 (i.e. the negative Z direction). The resilient element 1-420 is located at the periphery of the second driving coil 1-432, applying a predetermined pressure to the positioning element 1-410, so that when the second driving coil 1-432 is not electrified (i.e. when the positioning element 1-410 is not affected by the magnetic force), the positioning element 1-410 may move along the second direction 1-D2 (the positive Z direction), and therefore be held at a locked position, as shown in FIG. 5A. The resilient element 1-420 may be a spring, a spring sheet, or any suitable element for providing a predetermined pressure.

Figure 5B:
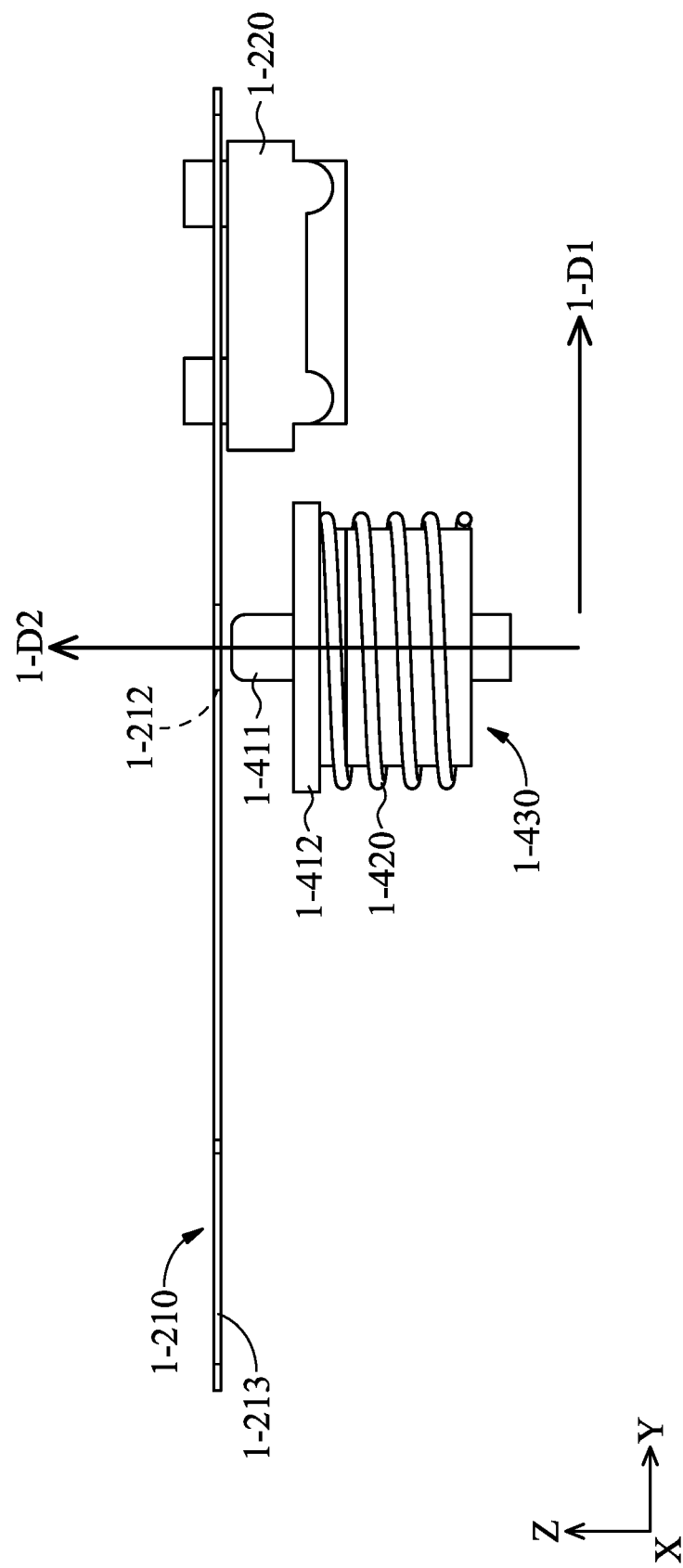
FIG. 5B is a schematic view of a positioning element in an unlocked position, according to some embodiments of the present disclosure.

As shown in FIG. 4, the positioning element 1-410 has a raised part 1-411 and a bottom part 1-412. The raised part 1-411 and the bottom part 1-412 are connected to each other. The bottom part 1-412 is closer to the second driving assembly 1-430, and also contacts the resilient element 1-420. Specifically, when an electric current passes through the second driving coil 1-432 and the bottom part 1-412 of the positioning element 1-410 is therefore attracted by a magnetic force of the second driving assembly 1-430, the positioning element 1-410 moves into an unlocked position, as shown in FIG. 5B. When the second driving coil 1-432 is not electrified, the bottom part 1-412 of the positioning element 1-410 is subjected to the predetermined pressure from the resilient element 1-420, and thereby moves into the locked position, as shown in FIG. 5A. In some embodiments, the positioning element 1-410 is made of magnetic conductive materials, e.g. metal. In some embodiments, the positioning element 1-410 may be a magnet. In such cases, the inside of the second driving coil 1-432 of the second driving assembly 1-430 does not have any magnetic conductive material (e.g. iron, etc.). Otherwise, the positioning element 1-410 would continuously be attracted by the second driving assembly 1-430, and not able to move in the second direction 1-D2. In other embodiments where the positioning element 1-410 is a magnet, the second driving assembly 1-430 includes magnetic conductive materials, but it is necessary for the second driving assembly 1-430 to be constantly electrified. In such cases, the positioning element 1-410 may be driven to move into the locked position or the unlocked position by altering the passing directions of the electric current.

Referring now to FIG. 5A and FIG. 5B, FIG. 5A is a schematic view of a positioning element 1-410 at a locked position, and FIG. 5B is a schematic view of a positioning element 1-410 at an unlocked position, according to some embodiments of the present disclosure. As shown in FIG. 5A, when the raised part 1-411 of the positioning element 1-410 passes through any one of the perforations 1-212 of the optical element 1-210, the positioning element 1-410 is located at the locked position and it may limit the movement of the optical element 1-210 in the first direction 1-D1. As shown in FIG. 5B, when the raised part 1-411 of the positioning element 1-410 does not pass through any one of the perforations 1-212, the positioning element 1-410 is located at the unlocked position, while the optical element 1-210 may move freely in the first direction 1-D1. In some embodiments, the locked position is the initial position of the positioning element 1-410, so that when the optical element driving mechanism 1-10 is dropped, being impacted in the first direction 1-D1, the positioning element 1-410 may stop the optical element 1-210 from shifting.

Figure 5C:
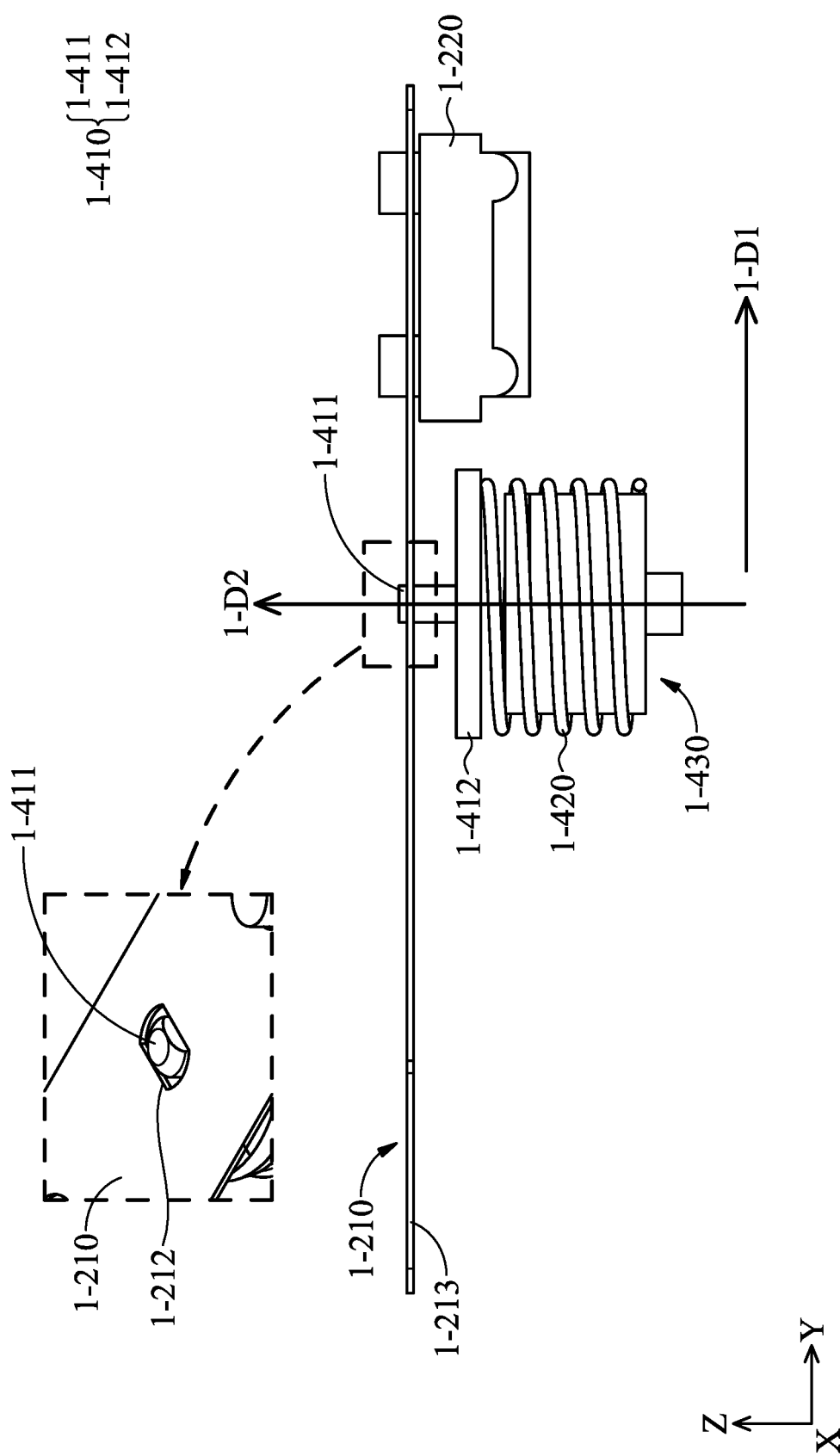
FIG. 5C is a schematic view of a positioning element in a locked position, according to other embodiments of the present disclosure.

Referring now to FIG. 5A and FIG. 5C, FIG. 5A and FIG. 5C are schematic views of a positioning element 1-410 at a locked position, according to different embodiments of the present disclosure. In some embodiments, a gap may be formed between the raised part 1-411 and the perforation 1-212, to reduce the wear caused by the friction therebetween. It should be understood that the size of the gap would not allow the optical element 1-210 to shift excessively, the blocking part 1-213 of the optical element 1-210 therefore still be able to block the lights from going into the lens or other optical sensing elements. In some embodiments, the raised part 1-411 has a tapered structure at an end in the second direction 1-D2, as shown in FIG. 5A, for reducing the collision and friction when passing through the perforations 1-212, avoiding interference, and reducing scratches. In some embodiments, the raised part 1-411 may be cylindrical, as shown in FIG. 5A. In other embodiments, the raised part 1-411 may be rounded rectangular, as shown in FIG. 5C. In such cases, the contact area between the raised part 1-411 and the perforation 1-212 increases, which strengthens the stability of the structures when the optical element driving mechanism 1-10 endures a dropping impact, and the raised part 1-411 becomes more unbreakable. It should be understood that the shapes of the raised part 1-411 shown in the present disclosure are merely examples, any suitable shapes or structures may be used as a blocking member for passing through the perforations 1-212, while the shapes of the perforations 1-212 depend on the shape of the raised part 1-411.

Figure 6:
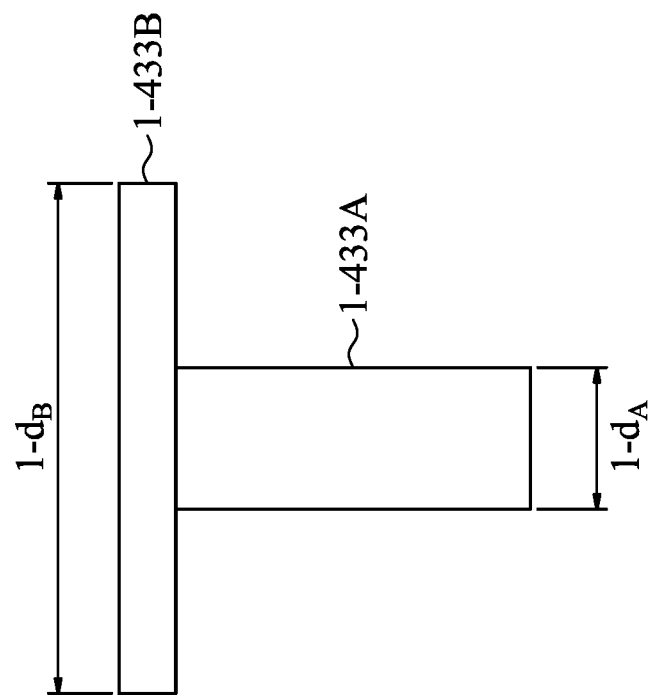
FIG. 6 is a side view of a center pin, according to some embodiments of the present disclosure.

Referring to FIG. 6, FIG. 6 is a side view of a center pin 1-433, according to some embodiments of the present disclosure. As shown in FIG. 6, the center pin 1-433 has a coil winding shaft 1-433A and a top surface 1-433B. The coil winding shaft 1-433A, which is magnetic conductive, is disposed inside the second driving coil 1-432 (See FIG. 4). When the second driving coil 1-432 is electrified, the coil winding shaft 1-433A would be magnified, having an effect similar to a magnet. The top surface 1-433B is connected onto the coil winding shaft 1-433A. In some embodiments, a diameter 1-dB of the top surface 1-433B is greater than a diameter 1-dA of the coil winding shaft 1-433A, which makes the cross-section of the center pin 1-433 to be a T-shape. In some embodiments, the top surface 1-433B is magnetic conductive and thereby provides an electromagnetic force to the positioning element 1-410. In other embodiments, the top surface 1-433B is only partially magnetic conductive, for example, the top surface 1-433B is made of a plastic member with a metal sheet embedded inside. In such cases, the non-magnetic conductive material (e.g. the plastic member) may prevent the magnetic force of the second driving coil 1-432 to influence other magnetic elements.

Referring to FIG. 7A and FIG. 7B, FIG. 7A is a perspective view of a fixed portion 1-500, according to some embodiments of the present disclosure. As shown in FIG. 7A, the fixed portion 1-500 includes a cap 1-510, and a base 1-520 connected to the cap 1-510. The cap 1-510 includes a limiting bore 1-511A, a limiting bore 1-511B, four snap-fit joints 1-512, a slot 1-513, an aperture 1-514, and a surface 1-S. FIG. 7B is a top view of a base 1-520 of a fixed portion 1-500, according to some embodiments of the present disclosure. The base 1-520 includes two limiting members 1-521, four protruding inclines 1-522, a first stopper structure 1-523A, a second stopper structure 1-523B, a groove 1-524, two recesses 1-525, a supporting frame 1-526, and two rails 1-527.

The limiting bore 1-511A and the limiting bore 1-511B of the cap 1-510 are located diagonally at different sides of the cap 1-510, for fitting the two limiting members 1-512 of the base 1-520 at corresponding locations, and thereby connects the cap 1-510 and the base 1-520. The diagonally disposed limiting bores 1-511A, 1-511B are used for determining the relative positions of the cap 1-510 and the base 1-520, which may improve the precision of the assembly process. It should be noted that, in some embodiments, the limiting bore 1-511B may be an open bore, so that the limiting member 1-521 inside is exposed. In such cases, an error during the assembly process of the cap 1-510 and the base 1-520 may be allowed. It should be understood that the amount and the configuration of the limiting bores and the limiting members herein are not intended to be limited, any suitable amount and configuration may be employed.

As shown in FIG. 7A, the snap-fit joints 1-512 of the cap 1-510 and the corresponding protruding inclines 1-522 of the base 1-520 are located respectively at four different side walls of the fixed portion 1-500. The inclines of the protruding inclines 1-522 protrude more and more along the negative Z direction. During the assembly process, the cap 1-510 approaches the base 1-520 in the negative Z direction, and the snap-fit joints 1-512 move downward from the less protruding end of the protruding inclines 1-522. Finally, the protruding inclines 1-522 passes through the snap-fit joints 1-512 and thereby connect the cap 1-510 and the base 1-520. In some embodiments, glue may be filled between the snap-fit joints 1-512 and the protruding inclines 1-522, to improve the adhesion and further secure the cap 1-510 and the base 1-520.

Referring now to FIG. 3 and FIG. 7B, the first stopper structure 1-523A of the base 1-520 is located at a side of the fixed portion 1-500 closer to the aperture 1-514, and the second stopper structure 1-523B of the base 1-520 is located at a side of the fixed portion 1-500 away from the aperture 1-514. When the movable portion 1-200 comes into contact with the first stopper structure 1-523A, the movable portion 1-200 is located in the first terminal position relative to the fixed portion 1-500; and when the movable portion 1-200 comes into contact with the second stopper structure 1-523B, the movable portion 1-200 is located in the second terminal position relative to the fixed portion 1-500. In some embodiments, the holder 1-220 may come into contact with the first stopper structure 1-523A or the second stopper structure 1-523B. In other embodiments, the optical element 1-210 may come into contact with the first stopper structure 1-523A or the second stopper structure 1-523B. In some embodiments, the slot 1-513 of the cap 1-510 (see FIG. 7A) may also function as a stopper structure. The protrusions 1-222 of the holder 1-220 collide with the internal surfaces of the slot 1-513, and thereby limit the movable portion 1-200 to the first or second terminal position relative to the fixed portion 1-500. Furthermore, the various methods mentioned above for limiting the first or second terminal position may be performed in any combination, to improve the strength of the overall structure.

The position of the aperture 1-514 of the cap 1-510 corresponds to the groove 1-524 of the base 1-520, allowing light to pass through and enter a lens or an optical sensing element located within the groove 1-524. When the movable portion 1-200 is located in the first terminal position, the blocking part 1-213 of the optical element 1-210 will block the aperture 1-514; and when the movable portion 1-200 is located in the second terminal position, the blocking part 1-213 is away from the aperture 1-514, so that the light enters the lens or the optical sensing element. In some embodiments, the first terminal position is the initial position of the movable portion 1-200, for blocking the lens or the optical sensing element, to prevent any manipulation by others when the lens or the optical sensing elements are not in use, compromising the user's privacy and security.

In some embodiments, the cap 1-510 of the fixed portion 1-500 is made of metal or any electric conductive materials, and electrically connecting the second electric conductive part 1-431 of the second driving assembly 1-430 (e.g. by one of the snap-fit joints 1-512, see FIG. 1). The second driving assembly 1-430 is connected to an external controller by the cap 1-510, and thereby controls the positioning assembly 1-400 to move into the locked position or the unlocked position. In such cases, an insulated component is disposed on a surface 1-S of the cap 1-510 (e.g. an insulated coating or any suitable electrically insulated method) to prevent the cap 1-510 from contacting other elements and thereby causing short-circuit problems. In other embodiments, the cap 1-510 is made of non-electric conductive materials (e.g. plastic). The second electric conductive part 1-431 is connected to the external controller by the metal wires embedded within the cap 1-510, and controls the positioning assembly 1-400 to move into the locked position or the unlocked position. In some embodiments, the cap 1-510 may be two electrically separated structures, respectively connected to the two electrodes of the second electric conductive part 1-431, so that the power supplies of the second electric conductive part 1-431 are located at different ends of the optical element driving mechanism 1-10, to achieve miniaturization.

Still referring to FIG. 3 and FIG. 7B, in some embodiments, the base 1-520 of the fixed portion 1-500 has two recesses 1-525, respectively located at the two ends of the first driving coil 1-320 in the Y direction, for accommodating the positioning pin 1-330. By placing the positioning pin 1-330 into the recesses 1-525, a function of securing the first driving assembly 1-300 is provided. The sizes of the recesses 1-525 depend on the size of the positioning pin 1-330, and not limited to any specific size.

Referring to FIG. 4 and FIG. 7A, the supporting frame 1-526 of the base 1-520 of the fixed portion 1-500 is located at where the positioning assembly 1-400 is, for holding the positioning assembly 1-400. In some embodiments, the second electric conductive part 1-431 of the second driving assembly 1-430 is adhered onto the supporting frame 1-526 by some glue 1-W, for the second electric conductive part 1-431 to easily be electrically connected to the cap 1-510. In some embodiments, the optical element driving mechanism 1-10 may be electrically connected to other external assemblies by other electric conductive parts (not shown) on the supporting frame 1-526, so that the optical element driving mechanism 1-10 may receive signals from different sources.

It should be noted that the first electric conductive part 1-310 is separate from the second electric conductive part 1-431, as shown clearly in FIG. 1. In some preferred embodiments, the first electric conductive part 1-310 and the second electric conductive part 1-431 are located at the same side of the fixed portion 1-500. In such cases, the production cost for turning over the optical element driving mechanism 1-10 during the manufacturing process may be reduced. In other embodiments, the first electric conductive part 1-310 and the second electric conductive part 1-431 may be located at anywhere suitable for connecting the external controllers. It should be noted that the direction of the current introduced by the first electric conductive part 1-310 into the first driving coil 1-320 would define the direction of motion of the first driving magnet 1-340, and thereby define the direction of motion of the movable portion 1-200. In addition, in some embodiments, if the positioning element 1-410 of the positioning assembly 1-400 is not a magnet, the direction of the current introduced by the second electric conductive part 1-431 into the second driving coil 1-432 would not affect the motion of the positioning element 1-410. In other embodiments where the positioning element 1-410 of the positioning assembly 1-400 is a magnet, as described above, the second driving assembly 1-430 does not have a magnetic conductive material, or has a magnetic conductive material while remaining electrified.

Referring to FIG. 7B, the two rails 1-527 of the base 1-520 are parallel to the Y direction, provided for the sliding parts 1-223 of the holder 1-220 of the movable portion 1-200 to fit and slide inside, as shown in FIG. 7B. The depth (in the Z direction) and the width (in the X direction) of the rails 1-527 depend on the sliding parts 1-223. The length (in the Y direction) of the rails 1-527 depend on the range of motion of the movable portion 1-200. It should be understood that the amount and the appearance of the rails 1-527 are not limited to the embodiments of the present disclosure, any suitable formation may be used.

Figure 8A:
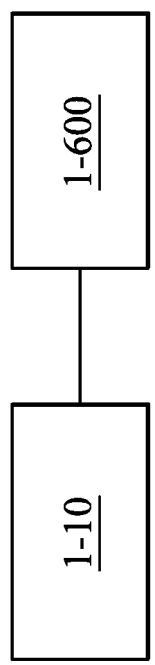
FIG. 8A is a schematic view of the optical element driving mechanism 1-10 electrically connected to a controller 1-600, according to some embodiments of the present disclosure.

Referring to FIG. 8A, FIG. 8A is a schematic view of the optical element driving mechanism 1-10 electrically connected to a controller 1-600, according to some embodiments of the present disclosure. The operations mentioned below may all be achieved by one or more controller 1-600, which is electrically connected to the optical element driving mechanism 1-10, and it may be an integrated circuit controlling chip or any suitable controlling device.

Figure 8B:
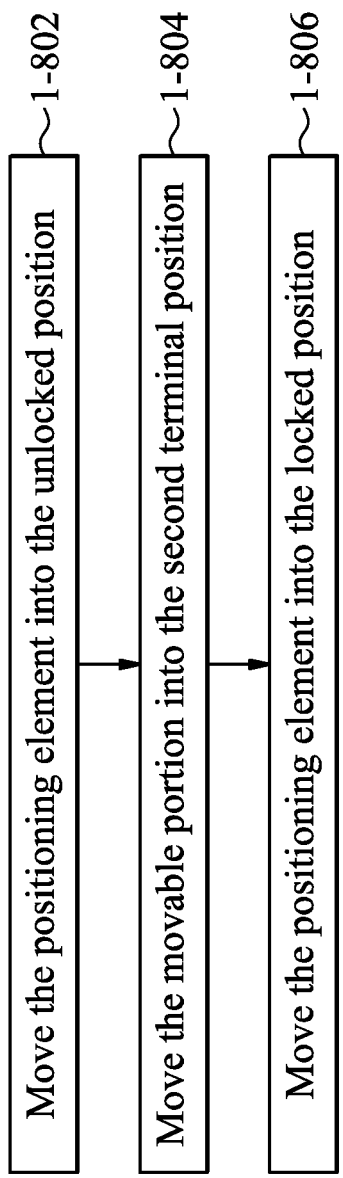
FIG. 8B is a flow diagram of an operating process, according to some embodiments of the present disclosure.
Figure 9A:
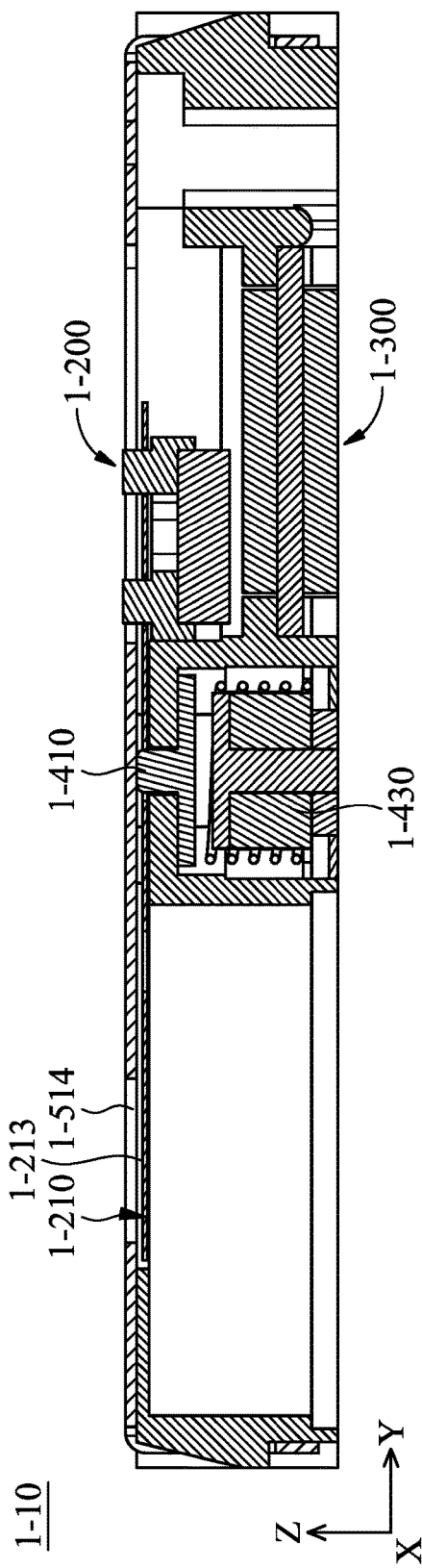
FIG. 9A is a schematic view of an optical element driving mechanism, wherein the movable portion is in a first terminal position and the positioning element is in a locked position, according to some embodiments of the present disclosure.
Figure 9B:
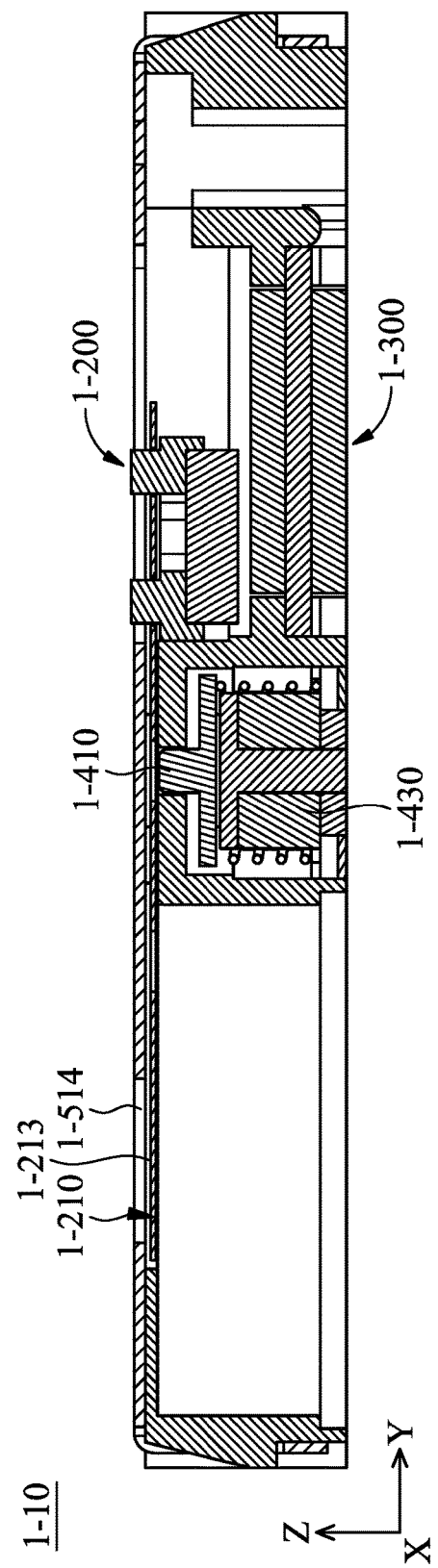
FIG. 9B is a schematic view of an optical element driving mechanism, wherein the movable portion is in a first terminal position and the positioning element is in an unlocked position, according to some embodiments of the present disclosure.

Referring to FIG. 8B, FIG. 8B is a flow diagram of an operating process, according to some embodiments of the present disclosure. In such embodiments, the first terminal position is the initial position of the movable portion 1-200, and the locked position is the initial position of the positioning element 1-410, as shown in FIG. 9A. In operation 1-802, the positioning element 1-410 is driven by the second driving assembly 1-430 to move into the unlocked position in the negative Z direction, as shown in FIG. 9B. In operation 1-804, the movable portion 1-200 is driven by the first driving assembly 1-300 to move into the second terminal position in the positive Y direction, as shown in FIG. 9C. In operation 1-806, the positioning element 1-410 is driven by the second driving assembly 1-430 to move into the locked position in the positive Z direction, as shown in FIG. 9D. For example, in such embodiments, the optical element driving mechanism 1-10 may be disposed on a webcam of a notebook computer. The movable portion 1-200 initially being in the first terminal position indicates that the blocking part 1-213 of the optical element 1-210 will be initially blocking the aperture 1-514, stopping people with bad intentions (e.g. hackers) from manipulating the device and invading the user's personal privacy. When the video function of a computer is needed, the above operations may be performed to expose to aperture 1-514. Furthermore, the positioning element 1-410 is in the locked position in the beginning, so that when a heavier device (e.g. a notebook computer) endures the force of an external impact (e.g. when the device is dropped), the optical element 1-210 would not move other than to collide with the positioning element 1-410. Therefore, the function of blocking or exposing the aperture 1-514 would not be affected.

Figure 10:
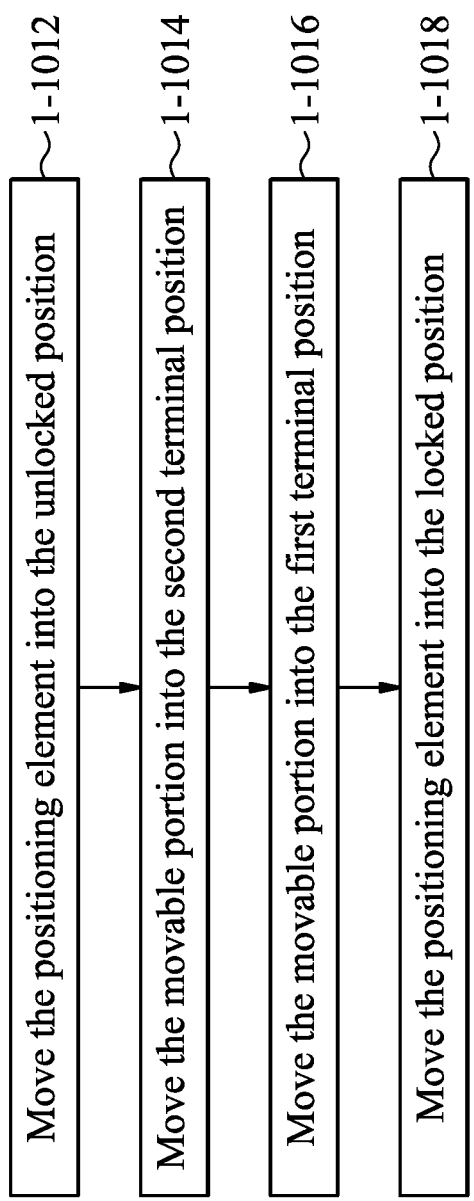
FIG. 10 is a flow diagram of an operating process, according to other embodiments of the present disclosure.

Referring to FIG. 10, FIG. 10 is a flow diagram of an operating process, according to other embodiments of the present disclosure. In such embodiments, the first terminal position is the initial position of the movable portion 1-200, and the locked position is the initial position of the positioning element 1-410, as shown in FIG. 9A. In operation 1-1012, the positioning element 1-410 is driven by the second driving assembly 1-430 to move into the unlocked position in the negative Z direction, as shown in FIG. 9B. In operation 1-1014, the movable portion 1-200 is driven by the first driving assembly 1-300 to move into the second terminal position in the positive Y direction, as shown in FIG. 9C. In operation 1-1016, the movable portion 1-200 is driven by the first driving assembly 1-300 to move into the first terminal position in the negative Y direction, as shown in FIG. 9B. In operation 1-1018, the positioning element 1-410 is driven by the second driving assembly 1-430 to move into the locked position in the positive Z direction, as shown in FIG. 9A. For example, in such embodiments, the optical element driving mechanism 1-10 may be disposed on any device with a lens or an optical sensing element. Between the operation 1-1014 and the operation 1-1016, the positioning element 1-410 does not move into the locked position, the optical element driving mechanism 1-10 may therefore function as a shutter. The time interval between the operation 1-1014 and the operation 1-1016 is equivalent to the shutter speed. Also, the advantages of the initial positions of the movable portion 1-200 and the positioning element 1-410 are the same as those mentioned above and thus are not repeated here.

In addition, in some embodiments, the initial position of the movable portion 1-200 may be the second terminal position. In other words, the "first" and "second" are used herein for ease of description and are not intended to imply an ordering or to be limited.

In summary, an optical element driving mechanism with a positioning assembly is provided in the present disclosure. A positioning element therein is driven by a second driving assembly to be in a locked position or an unlocked position, to enhance the latching effect on the movable portion, especially on the optical element. Thus, the displacement of the optical element caused by an impact force, which may break the optical element driving mechanism or may lead to diminished privacy, may be avoided. Therefore, the stability and the information security of the optical element driving mechanism may be improved.

The Second Embodiment Group

Figure 11:
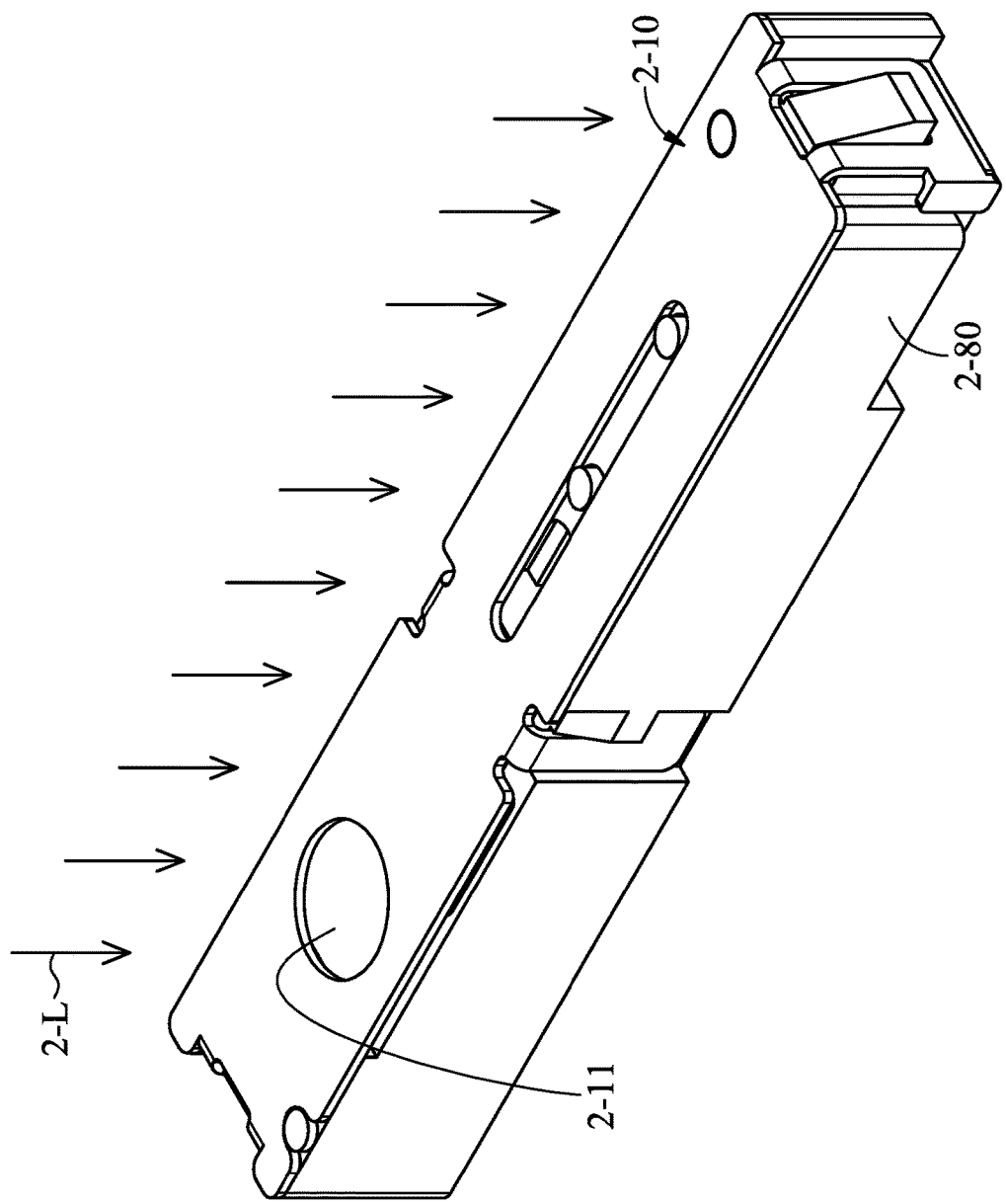
FIG. 11 is a perspective view of an optical element driving mechanism.
Figure 12:
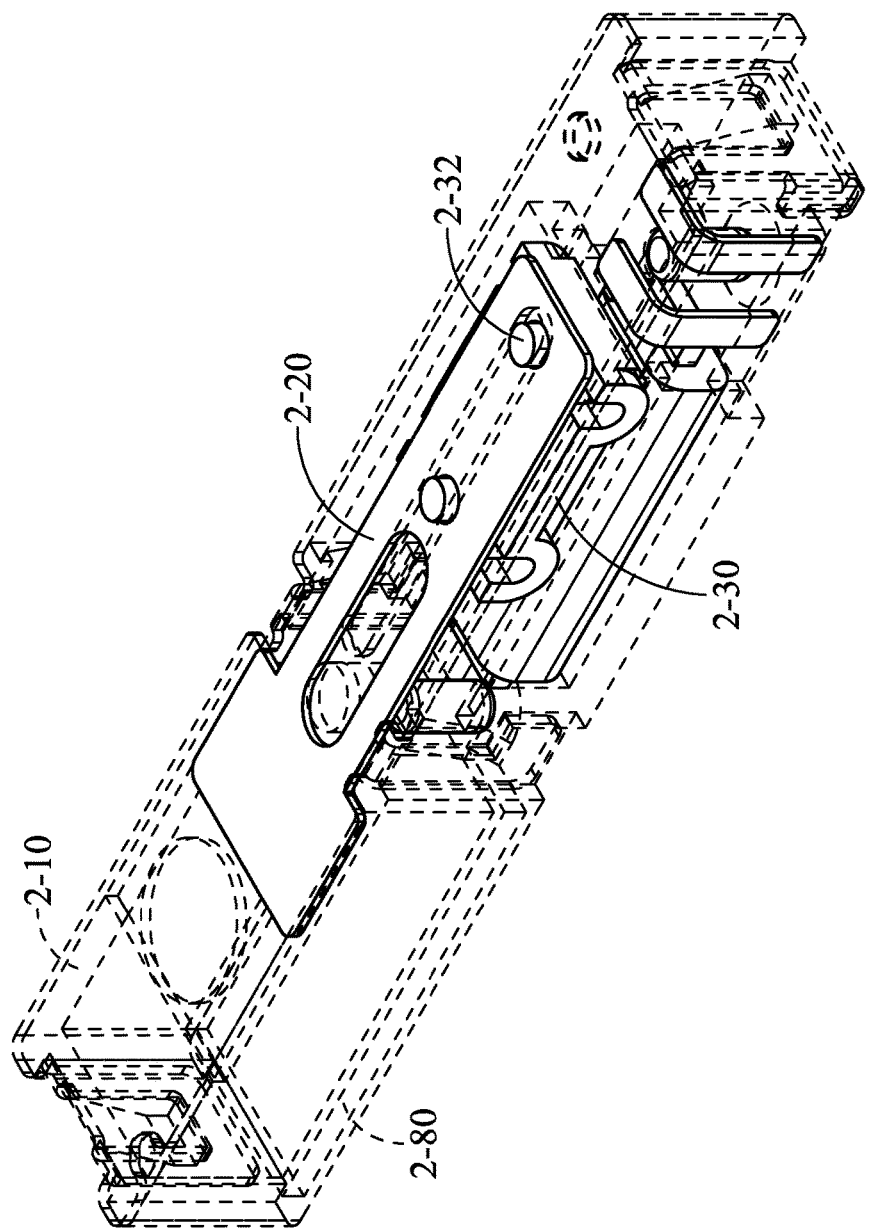
FIG. 12 is a perspective view of the optical element driving mechanism, and some elements are illustrated in dotted lines.
Figure 13:
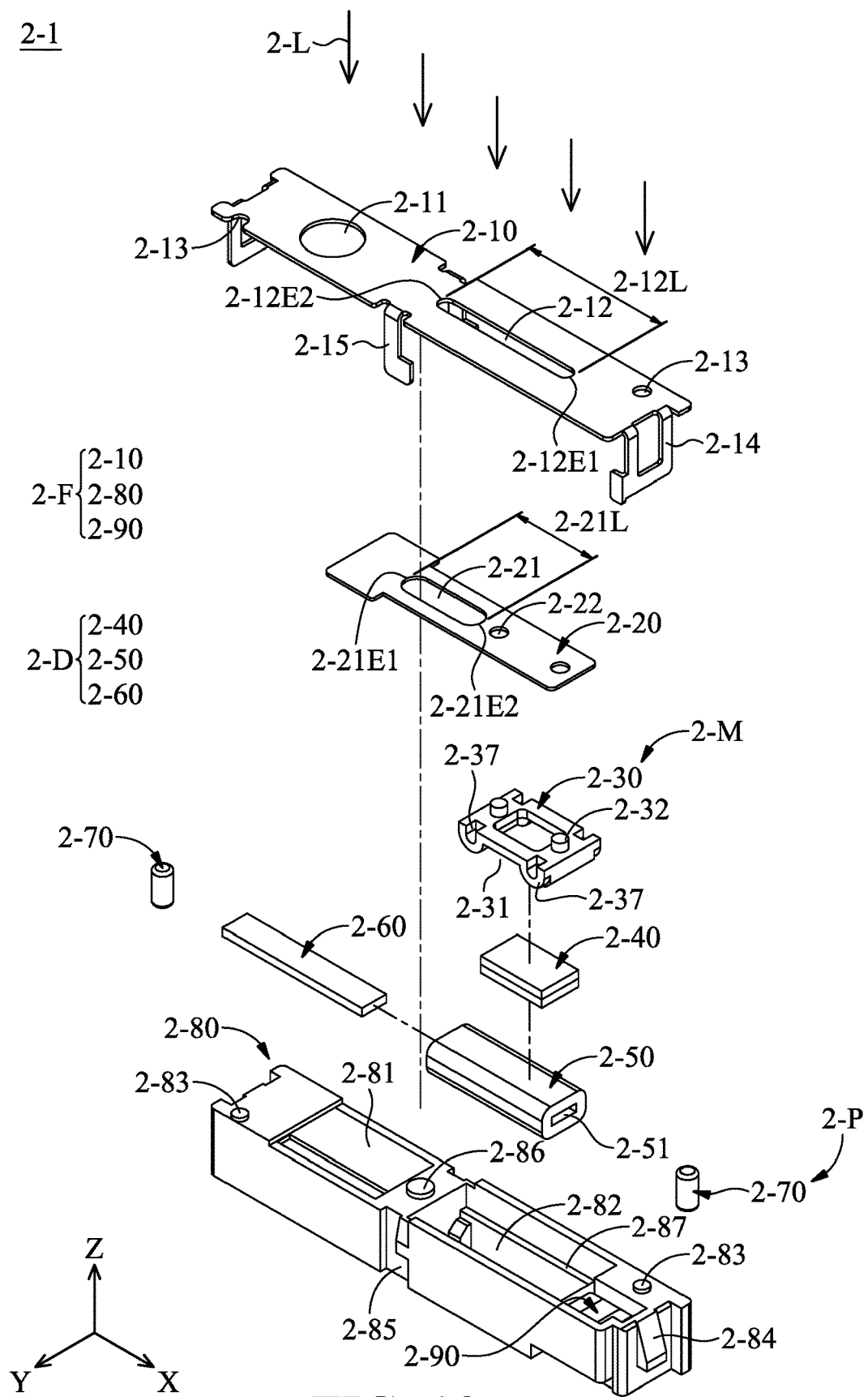
FIG. 13 is an exploded view of the optical element driving mechanism.

Please refer to FIG. 11 to FIG. 13 first. FIG. 11 is a perspective view of an optical element driving mechanism 2-1. FIG. 12 is a perspective view of the optical element driving mechanism 2-1, and some elements are illustrated in dotted lines. FIG. 13 is an exploded view of the optical element driving mechanism 2-1.

The optical element driving mechanism 2-1 includes a fixed part 2-F, a movable part 2-M, a driving assembly 2-D, and a positioning assembly 2-P. The fixed part 2-F, the movable part 2-M, and the driving assembly 2-D are arranged along the third direction (Z-axis). When viewed along the third direction (Z-axis), the fixed part 2-F, the movable part 2-M, and the driving assembly 2-D at least partially overlap.

The optical element driving mechanism 2-1 is used for driving an optical element 2-20 to move along a first direction (X-axis). The optical element 2-20 may be a light-shielding sheet, a blade, a filter, a light-reduction mirror, a polarizer, etc., for example, a SOMA light-shielding sheet. The optical element 2-20 includes a through hole 2-21 and at least one hole 2-22. The through hole 2-21 includes two edges 2-21E1, 2-21E2. The optical element 2-20 connects to the movable part 2-M via the hole 2-22. Specifically, the movable part 2-M is driven by the driving assembly 2-D, and thus the optical element 2-20 connected to the movable part 2-M is also driven, so that the optical element 2-20 may move along the first direction (X-axis) relative to the fixed part 2-F.

The fixed part 2-F includes a cap 2-10, a body 2-80, and an electrical connection portion 2-90. The cap 2-10 and the body 2-80 are arranged along the third direction (Z-axis). The cap 2-10 may be connected to the body 2-80 to form a cuboid or a cube. The electrical connection portion 2-90 may be made of any conductive material, such as copper. The electrical connection portion 2-90 is used for electrically connected to other devices.

The cap 2-10 includes an opening 2-11, a groove 2-12, at least one fixing structure 2-13, at least one connecting structure 2-14, and at least one protrusion 2-15. The body 2-80 includes a light-transmitting portion 2-81, a receiving portion 2-82, at least one fixing element 2-83, at least one connecting element 2-84, at least one concave portion 2-85, a stopping element 2-86 and at least one track 2-87.

The opening 2-11 of the cap 2-10 corresponds to the light-transmitting portion 2-81 of the body 2-80. The opening 2-11 allows a light 2-L to pass through. In this embodiment, the shape of the openings 2-11 is circular. However, the openings 2-11 may have other shapes. The groove 2-12 of the cap 2-10 is used for providing the space for the movable part 2-M and the optical element 2-20 connected to the movable part 2-M to move.

The groove 2-12 includes two edges 2-12E1, 2-12E2. The movement of the movable part 2-M and the optical element 2-20 may be stopped by the contact between the movable part 2-M and the edges 2-12E1, 2-12E2 of the groove 2-12. In addition, the movement of the movable part 2-M and the optical element 2-20 may be stopped by the contact between the stopping element 2-86 of the body 2-80 and the edges 2-21E1, 2-21E2 of the through hole 2-21 of the optical element 2-20. In some embodiments, the through hole 2-21 and the stopping element 2-86 may be omitted, and only the contact between the movable part 2-M and the edges 2-12E1, 2-12E2 of the groove 2-12 may be used to stop the movement of the movable part 2-M and the optical element 2-20.

That is, a length 2-12L of the groove 2-12 of the cap 2-10 (i.e. the distance between the edge 2-12E1 and the edge 2-12E2) provides the space for the movable part 2-M and the optical element 2-20 to move in the groove 2-12. Additionally, a length 2-21L of the through hole 2-21 of the optical element 2-20 (i.e. the distance between the edge 2-21E1 and the edge 2-21E2) is the maximum distance that the movable part 2-M and the optical element 2-20 may move. The length 2-12L of the groove 2-12 is greater than the length 2-21 L of the through hole 2-21.

Figure 19:
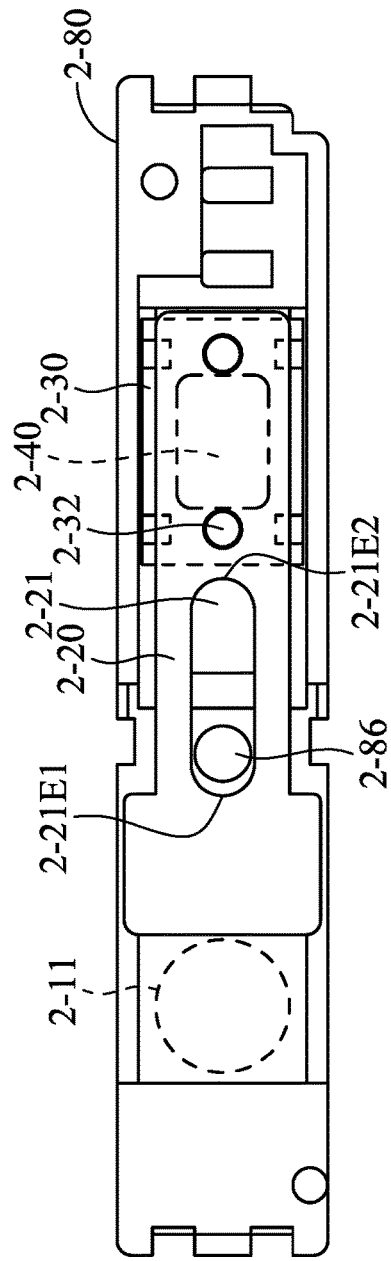
FIG. 19 and FIG. 20 are top views of the optical element driving mechanism.
Figure 20:
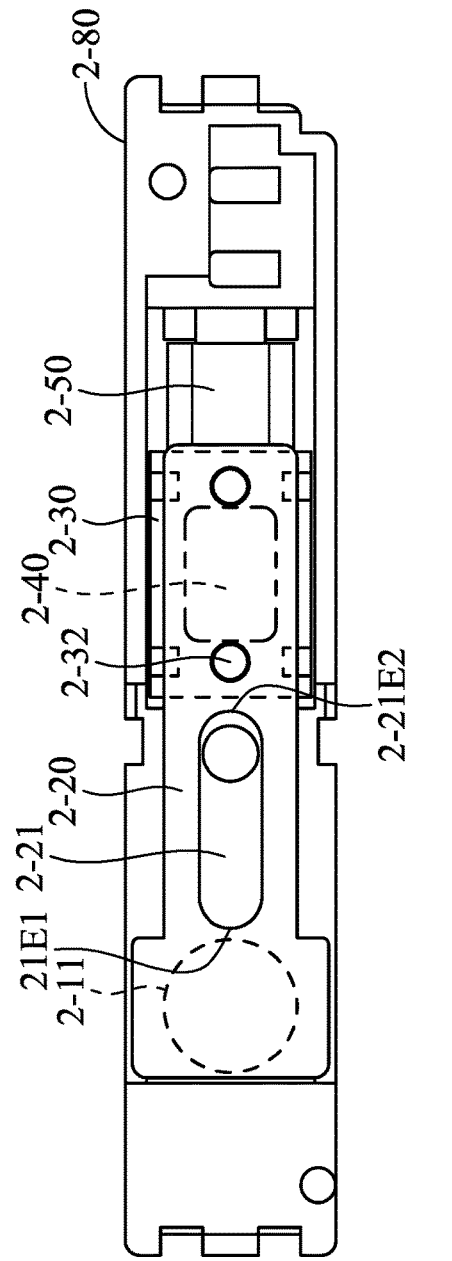

For clarity of illustration, in the present disclosure, the position where the movable part 2-M contacts the edge 2-12E1 of the groove 2-12 is referred to as a "first extreme position", and the position where the movable part 2-M contacts the edges 2-12E2 of the groove 2-12 is referred to as a "second extreme position". When the movable part 2-M is located at the first extreme position, the stopping element 2-86 of the body 2-80 contacts the edge 2-21E1 of the through hole 2-21 of the optical element 2-20. When the movable part 2-M is at the second extreme position, the stopping element 2-86 of the body 2-80 contacts the edge 21-E2 of the through hole 2-21 of the optical element 2-20 (as shown in FIG. 19 and FIG. 20).

The movement of the optical element 2-20 may control whether the light 2-L passes through the light-transmitting portion 2-81 or not. When the light 2-L passes through the opening 2-11 and is not blocked by the optical element 2-20 (for example, when the movable part 2-M is located at the first extreme position), the light 2-L may smoothly pass through the light-transmitting portion 2-81. When the light 2-L passes through the opening 2-11 and is blocked by the optical element 2-20 (for example, when the movable part 2-M is located at the second extreme position), i.e. the opening 2-11 and the light-transmitting portion 2-81 correspond to the optical element 2-20, the light 2-L cannot pass through the light-transmitting portion 2-81. Therefore, the movement of the optical element 2-20 may control the passage time of the light 2-L.

The fixing structure 2-13 of the cap 2-10 and the fixing element 2-83 of the body 2-80, the connecting structure 2-14 of the cap 2-10 and the connecting element 2-84 of the body 2-80, and the protrusion 2-15 of the cap 2-10 and the concave portion 2-85 of the body 2-80 may all have corresponding shapes to contribute to the connection between the cap 2-10 and the body 2-80.

In this embodiment, the fixing structure 2-13 is perforated. When viewed along the third direction (Z-axis), the two fixing structures 2-13 are respectively disposed on the diagonal of the top surface of the cap 2-10. The fixing element 2-83 is protuberant. The two fixing elements 2-83 are located on the diagonal of the top surface of the body 2-80. The fixing structures 2-13 may be engaged with the fixing elements 2-83. When viewed along the first direction (X-axis), the connecting structure 2-14 is a U-shaped hook extending from the edge of the top surface of the cap 2-10, the connecting element 2-84 is protuberant, and the connecting structure 2-14 may tightly surround the connecting element 2-84. Furthermore, the protrusion 2-15 is a L-shaped hook extending from the edge of the top surface of the cap 2-10, the concave portion 2-85 is L-shaped, and the protrusion 2-15 may be engaged with the concave portion 2-85.

The movable part 2-M includes a holder 2-30. In some embodiments, the movable part 2-M additionally includes an elastic element that facilitates the movement of the holder 2-30. The holder 2-30 is movably disposed on the receiving portion 2-82 of the body 2-80, that is, the movable part 2-M may move relative to the fixed part 2-F. The holder 2-30 includes a holding portion 2-31, at least one projection 2-32, and at least one sliding portion 2-37. The holding portion 2-31 is located on the bottom surface of the holder 2-30. The projection 2-32 is located on the top surface of the holder 2-30. The projection 2-32 may pass through the hole 2-22 of the optical element 2-20, so as to connect the optical element 2-20. That is, the movable part 2-M may connect the optical element 2-20. The connection methods of the optical element 2-20 and the movable part 2-M is not limited to this embodiment. The sliding portion 2-37 is disposed on the track 2-87 of the body 2-80 to facilitate the movement of the holder 2-30 inside the receiving portion 2-82. It should be noted that the sliding portion 2-37 may be wheel-shaped or have any shape that facilitates the movement of the holder 2-30. In some embodiments, the sliding portion 2-37 includes a plurality of balls.

The driving assembly 2-D includes a magnetic element 2-40, a coil 2-50, and a magnetically permeable element 2-60. The magnetic element 2-40, the coil 2-50, and the magnetically permeable element 2-60 are disposed in the receiving portion 2-82 of the body 2-80. The width of the upper portion of the receiving portion 2-82 is greater than the width of the lower portion of the receiving portion 2-82 to facilitate the arrangement of magnetically permeable element 2-60 inside the receiving portion 2-82. When viewed along the third direction (Z-axis), the magnetic element 2-40, the coil 2-50, and the magnetically permeable element 2-60 at least partially overlap the receiving portion 2-82. Specifically, the magnetic element 2-40 is disposed in the holding portion 2-31 of the holder 2-30, and the magnetically permeable element 2-60 is connected to the body 2-80 That is, at least a portion of the driving assembly 2-D is disposed on the fixed part 2-F.

The magnetic element 2-40 may be a permanent magnet, and the pair of magnetic poles (N-pole, S-pole) of the magnetic element 2-40 is arranged along the third direction (Z-axis). The coil 2-50 includes a winding space 2-51. The winding space 2-51 is formed by the coil 2-50 wound around the magnetic element 2-60 along the first direction (X-axis). The magnetic element 2-40 and the coil 2-50 are arranged along the third direction (Z-axis). The magnetically permeable element 2-60 is made of a magnetically permeable material, for example, a material having a high magnetic permeability such as a ferromagnetic material. The magnetically permeable element 2-60 is used for concentrating the magnetic force generated between the magnetic element 2-40 and the coil 2-50.

The positioning assembly 2-P and the coil 2-50 are arranged along the first direction (X-axis). The positioning assembly 2-P includes a plurality of positioning elements 2-70. The positioning element 2-70 may be disposed on the fixed part 2-F or the movable part 2-M. In this embodiment, there are two positioning elements 2-70, and the positioning elements 2-70 are disposed on the body 2-80. Additionally, the two positioning elements 2-70 are disposed on different sides of the coil 2-50 in the first direction (X-axis). The positioning element 2-70 is made of a magnetically permeable material. When the movable part 2-M moves to the first extreme position or the second extreme position, the magnetic element 2-40 disposed on the movable part 2-M gets closer to one of the positioning elements 2-70. The positioning element 2-70 made of magnetically permeable material may attract the magnetic element 2-40 so that the magnetic element 2-40 tends to locate at a position that is close to the positioning element 2-70. That is, the positioning assembly 2-P may limit the movable part 2-M to locate at the first extreme position or the second extreme position relative to the fixed part 2-F to achieve the positioning effects.

Figure 14:
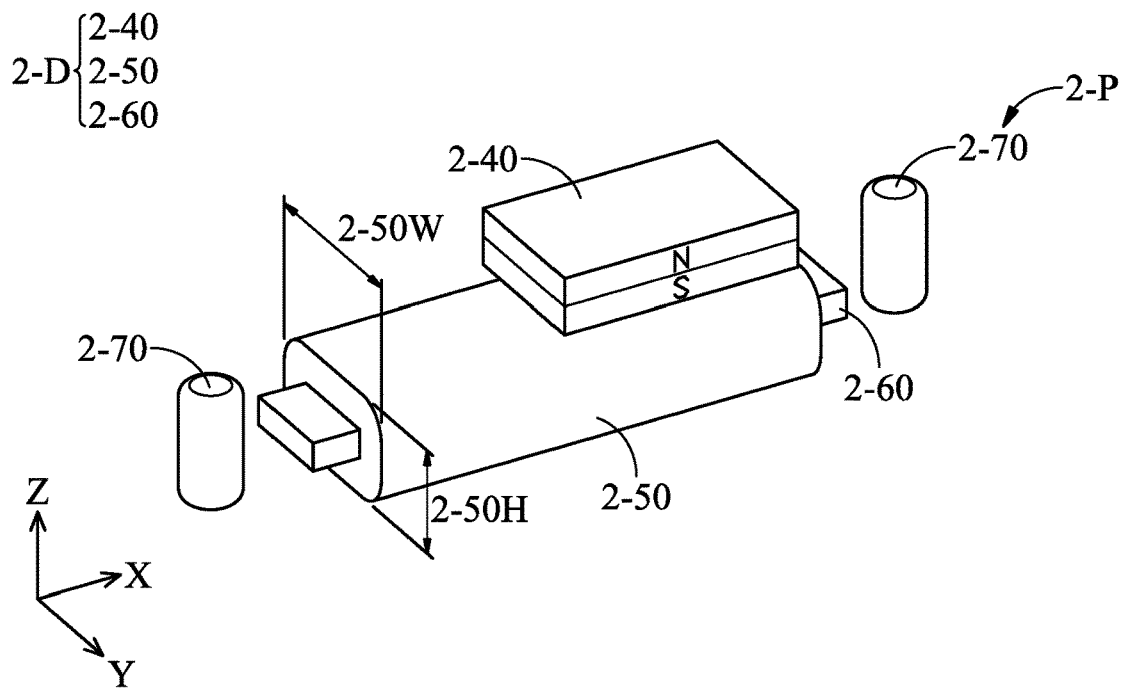
FIG. 14 is a schematic view of a driving assembly and a positioning assembly.
Figure 15:
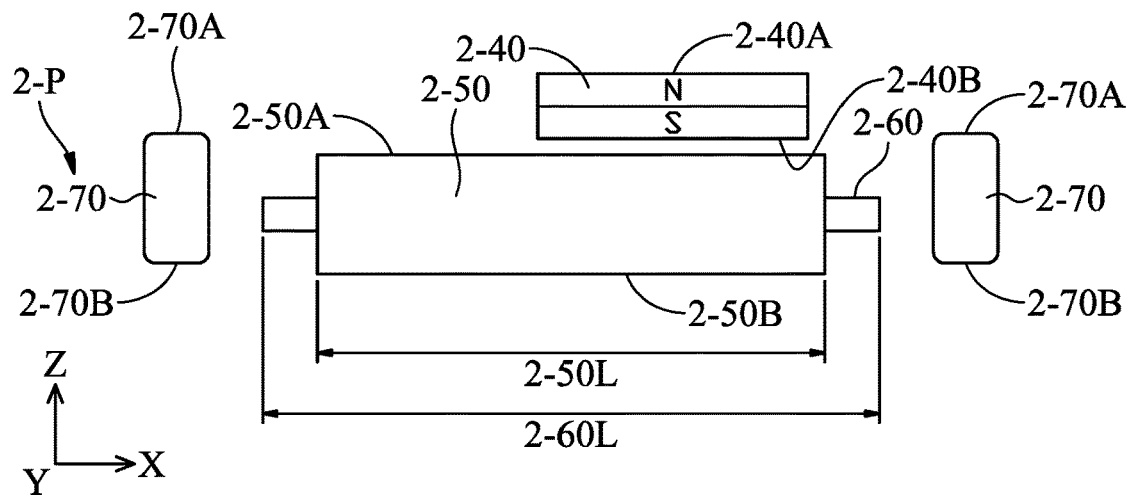
FIG. 15 is a side view of the driving assembly and the positioning assembly.

Next, please refer to FIG. 14 and FIG. 15 together to further understand the driving assembly 2-D and the positioning assembly 2-P. FIG. 14 is a schematic view of the driving assembly 2-D and the positioning assembly 2-P. FIG. 15 is a side view of the driving assembly 2-D and the positioning assembly 2-P.

Since the coil 2-50 is wound around the magnetic element 2-60 in the first direction (X-axis), a maximum size 2-50L of the coil 2-50 is less than a maximum size 2-60L of the magnetically permeable element 2-60 in the first direction (X-axis) to ensure that the coil 2-50 is tightly wound around the magnetic element 2-60.

The magnetic element 2-40 has a top surface 2-40 facing away from the coil 2-50 and a bottom surface 2-40B facing the coil 2-50. The coil 2-50 has a top surface 2-50A facing the magnetic element 2-40 and a bottom surface 2-50B facing away from the magnetic element 2-40.

When viewed along the first direction (X-axis), the coil 2-50 is polygonal, including a long side 2-50W and a short side 2-50H. The long side 2-50W is parallel with the second direction (Y-axis) and the short side 2-50H is parallel with the third direction (Z-axis). When the long side 2-50W faces the magnetic element 2-40, the top surface 2-50A of the coil 2-50 that faces the magnetic element 2-40 is larger and generates a greater magnetic force than when the short side 2-50H faces the magnetic element 2-40. Also, since the short side 2-50H is parallel with the height (Z-axis) of the optical element driving mechanism 2-1, the height of the coil 2-50 is shorter (i.e. the short side 2-50H is shorter than the long side 2-50W) than when the long side 2-50W is parallel with the height (Z-axis) of the optical element driving mechanism 2-1. Therefore, the overall height of the optical element driving mechanism 2-1 may be reduced to achieve miniaturization.

The driving assembly 2-D is actuated by supplying a current to the coil 2-50. When viewed along the first direction (X-axis), the current flows into the coil 2-50 clockwise or counterclockwise. Taking the top surface 2-50A of the coil 2-50 as an example, when viewed along the second direction (Y-axis), the current flowing through the top surface 2-50A is flowing into or out of the paper, and the direction of the magnetic field that the magnetic element 2-40 provides to the top surface 2-50A is in the third direction (Z-axis). According to the right-hand rule, which describes the relationship of current, magnetic field, and magnetic force, one may know that the generated magnetic force between the magnetic element 2-40 and the coil 2-50 is in the first direction (X-axis) and thus the magnetic element 2-40 may move along the first direction (X-axis). In some embodiments, a slider (not shown) may be additionally provided between the magnetic element 2-40 and the coil 2-50 to facilitate the movement of the magnetic element 2-40.

The movement of the magnetic element 2-40 along the first direction (X-axis) may make the holder 2-30 as well as the optical element 2-20 connected to the holder 2-30 move along the first direction (X-axis). That is, the driving assembly 2-D may drive the holder 2-30 and the optical element 2-20 connected to the holder 2-30 to move along the first direction (X-axis).

As described above, the magnetic force generated by the driving assembly 2-D is generated between the bottom surface 2-40B of the magnetic element 2-40 and the top surface 2-50A of the coil 2-50. In order to make the positioning element 2-70 effectively attract the magnetic element 2-40, an end surface (the top surface) 2-70A of the positioning element 2-70 is generally higher than the bottom surface 2-40B of the magnetic element 2-40 in the third direction (Z-axis), and the other end surface 2-70B (the bottom surface) is usually lower than the top surface 2-50A of the coil 2-50 in the third direction (Z-axis).

In some embodiments, when viewed along the first direction (X-axis), the end surface 2-70A of the positioning element 2-70 is located between the top surface 2-40A of the magnetic element 2-40 and the bottom surface 2-50B of the coil 2-50. In some embodiments, when viewed along the first direction (X-axis), the end surface 2-70A of the positioning element 2-70 is located between the top surface 2-40A of the magnetic element 2-40 and the bottom surface 2-40B of the magnetic element 2-40.

In some embodiments, when viewed along the first direction (X-axis), the end surface 2-70B of the positioning element 2-70 is located between the top surface 2-50A of the coil 2-50 and the bottom surface 2-50B of the coil 2-50. In some other embodiments, when viewed along the first direction (X-axis), the end surface 2-70B of the positioning element 2-70 exceeds the bottom surface 2-50B of the coil 2-50 and thus is closer to the bottom surface 2-80B of the body 2-80 that faces away from the movable part 2-M.

Figure 16:
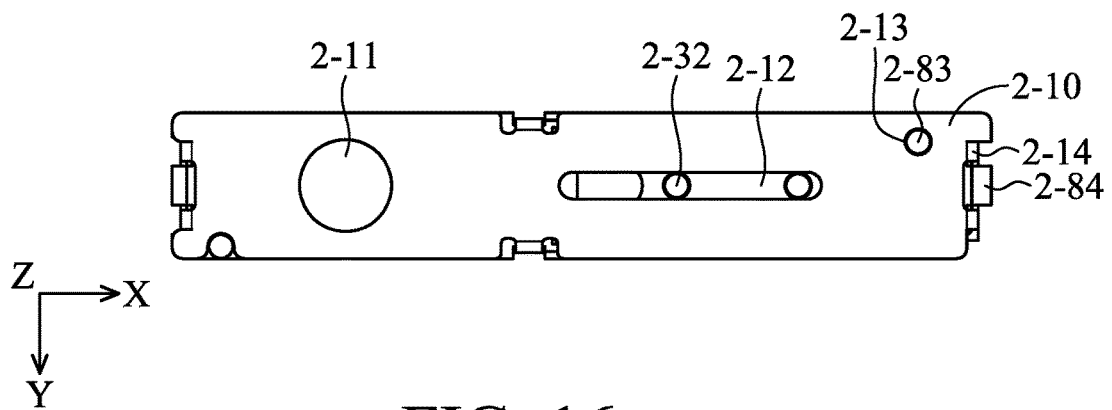
FIG. 16 is a top view of the optical element driving mechanism.
Figure 17:
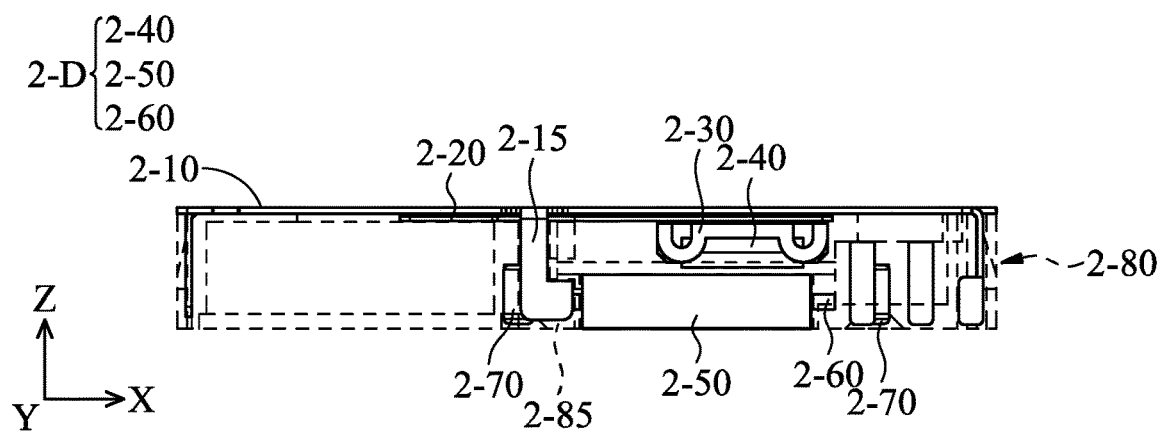
FIG. 17 is a side view of the optical element driving mechanism.
Figure 18:
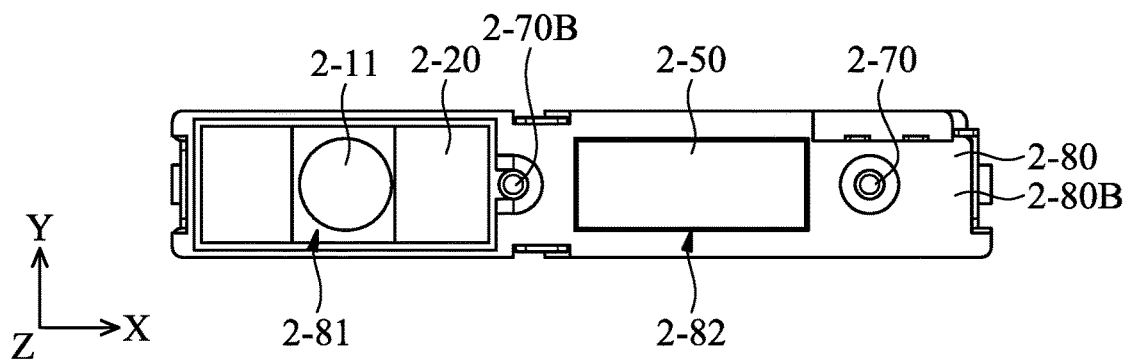
FIG. 18 is a bottom view of the optical element driving mechanism.

Next, how the optical element driving mechanism 2-1 is manufactured and assembled will be described with reference to FIG. 16 to FIG. 18. FIG. 16 is a top view of the optical element driving mechanism 2-1. FIG. 17 is a side view of the optical element driving mechanism 2-1. FIG. 18 is a bottom view of the optical element driving mechanism 2-1.

When manufacturing the optical element driving mechanism 2-1, the body 2-80 may be manufactured by plastic injection molding. Additionally, the positioning element 2-70 may be formed in the body 2-80 by insert molding so that the end surface 2-70B of the positioning element 2-70 is revealed from the bottom surface 2-80B of the body 2-80. Alternatively, a space for placing the positioning element 2-70 may be reserved when the body 2-80 is formed, and then the positioning element 2-70 may be placed manually or mechanically.

When assembling the optical element driving mechanism 2-1, the coil 2-50 is wound around the magnetically permeable element 2-60 and the magnetically permeable element 2-60 is mounted to the receiving portion 2-82 of the body 2-80, and the coil 2-50 is revealed from the side of the receiving portion 2-82 that faces away from the movable part 2-M. Next, the magnetic element 2-40 is affixed to the holding portion 2-31 of the holder 2-30, and the optical element 2-20 is mounted to the projection 2-32 of the holder 2-30. Next, the optical element 2-20, the holder 2-30, and the magnetic element 2-40 connected to one another are mounted to the receiving portion 2-82 of the body 2-80. As shown in FIG. 17, when viewed along the second direction (Y-axis), a portion of the optical element 2-20 is revealed between the cap 2-10 and the body 2-80.

Finally, the cap 2-10 is covered, and the projection 2-32 of the holder 2-30 may smoothly slide inside the groove 2-12 of the cap 2-10. When viewed along the second direction (Y-axis), the protrusion 2-15 is located between the light-transmitting portion 2-81 and the driving assembly 2-D.

It should be noted that an adhesion element may be provided depends on the situation. The adhesion element may be an adhesive material, such as glue. For example, to strengthen the connection between the cap 2-10 and the body 2-80, the adhesion element may be applied between the fixing structure 2-13 and the fixing element 2-83, between the connecting structure 2-14 and the connecting element 2-84, or between the protrusion 2-15 and the concave portion 2-85. Alternatively, to strengthen the connection between the elements to each other, the adhesion element may be applied between the holder 2-30 and the magnetic element 2-40, between the magnetic element 2-60 and body 2-80, and the like. Alternatively, to prevent dust and particles from entering the optical element driving mechanism 2-1, the adhesion element may be applied between the coil 2-50 revealed from the receiving portion 2-82 and the body 2-80.

As described above, when the holder 2-30 moves to and from in the first direction (X-axis), the magnetic element 2-40 on the holder 2-30 is attracted by the two positioning elements 2-70. As a result, the holder 2-30 tends to be located at the first extreme position or the second extreme position. FIG. 19 and FIG. 20 are top views of the optical element driving mechanism 2-1, illustrating the holder 2-30 is located at the first extreme position and the second extreme position, respectively. In FIG. 19 and FIG. 20, the cap 2-10 is not shown, but the position of the opening 2-11 of the cap 2-10 is shown in dashed lines.

As shown in FIG. 19, when the holder 2-30 is located at the first extreme position, the opening 2-11 is not blocked by the optical element 2-20. As shown in FIG. 20, when the holder 2-30 is located at the second extreme position, the opening 2-11 is completely blocked by the optical element 2-20. In other words, in the present disclosure, the optical element 2-20 tends to change in the two situations in which the opening 2-11 is completely blocked and the opening 2-11 is not blocked. As a result, the opening 2-11 is partially blocked by a portion of the optical element 2-20 is less likely to happen, which is advantageous for controlling the passage time of the light 2-L.

Therefore, the optical element driving mechanism 2-1 may be associated with other optical modules (such as a camera module) to form an optical system, so that the combination of the optical element driving mechanism 2-1 and the optical element 2-20 may be used as a shutter or block the optical module when the optical module is not in use.

Figure 21:
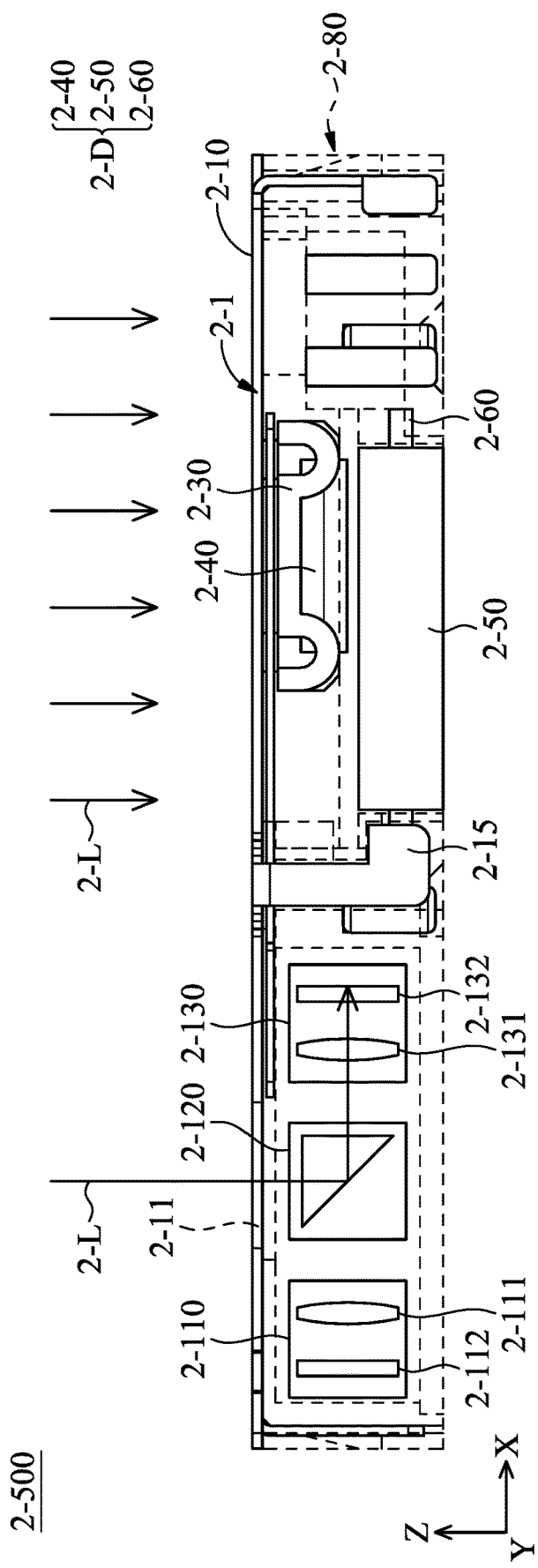
FIG. 21 is a schematic view of an optical system.

FIG. 21 is a schematic view of an optical system 2-500. The optical system 2-500 includes the optical element driving mechanism 2-1, a first camera module 2-110, a light path adjustment module 2-120, and a second camera module 2-130. The light path adjustment module 2-120 and the driving assembly 2-D are arranged along the first direction (X-axis). The light path adjustment module 2-120 is disposed between the first camera module 2-110 and the second camera module 2-130. In some embodiments, the optical system 2-500 may include one or more camera modules and the light path adjustment module may be omitted. For example, a camera module may be directly provided under the opening 2-11 and the light path adjustment module 2-120 may be omitted.

The first camera module 2-110 includes a first lens 2-111 and a first photosensitive element 2-112, and the light 2-L passing through the first lens 2-111 may be imaged on the first photosensitive element 2-112. The second camera module 2-130 includes a second lens 2-131 and a second photosensitive element 2-132. The light 2-L passing through the second lens 2-131 may be imaged on the second photosensitive element 2-132. The light path adjustment module 2-120 includes an light path adjustment element 2-121. The light path adjustment element 2-121 may be a prism, a lens, and the like. The light path adjustment element 2-121 may change the direction of the light 2-L.

The opening 2-11 corresponds to the light path adjustment module 2-120. The light path adjustment module 2-120 corresponds to the first camera module 2-110 and the second camera module 2-130. In FIG. 21, the direction of the light 2-L is changed from parallel with the third direction (Z-axis) to parallel with the first direction (X-axis) and then the light 2-L enters into the second camera module 2-130. However, the light path adjustment element 2-121 may also be rotated (for example, around the second direction (Y-axis) as a rotation axis), so that light 2-L enters into the first camera module 2-110. In addition, the focal length of the first lens 2-111 may be different than that of the second lens 2-131. That is, one of the first camera module 2-110 and the second camera module 2-130 with different focal lengths may be selected to conduct shooting. In addition, the focal lengths of the first lens 2-111 and the second lens 2-131 may be different. In other words, through the light path adjustment module 2-120, one of the first camera module 2-110 and second camera module 2-130 with different focal lengths may be selected for shooting. Therefore, the zoom function is achieved by switching to the first camera module 2-110 or the second camera module 2-130.

Figure 22:
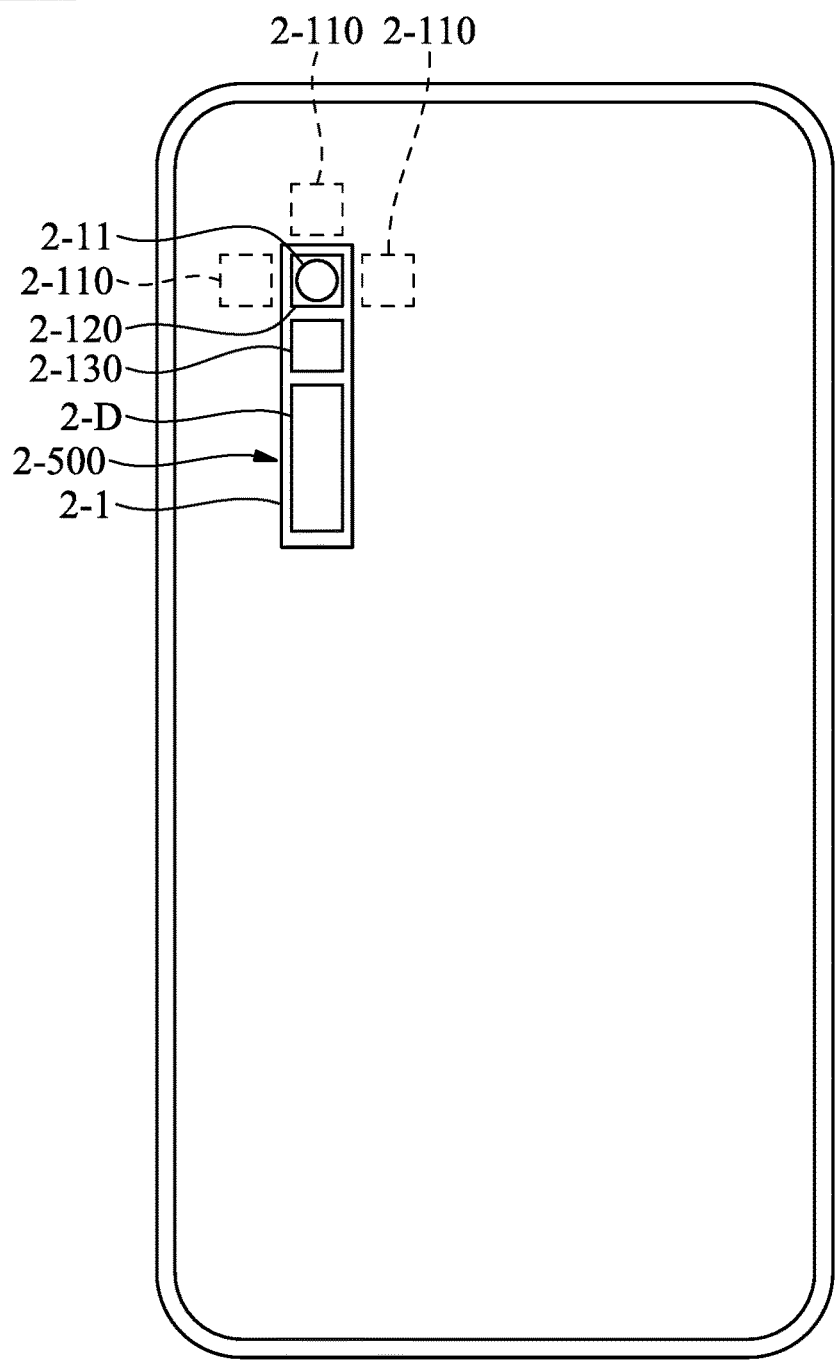
FIG. 22 is a schematic view of an electronic device equipped with the optical system.

FIG. 22 is a schematic view of an electronic device 2-600 equipped with the optical system 2-500. The electronic device 2-600 may be a computer, a tablet computer, a smart phone, and the like. In FIG. 22, each module is drawn in a simplified way, and the possible positions of the first camera module 2-110 are shown with dashed lines. As described above, the arrangement direction of the light path adjustment module 2-120 and the driving assembly 2-D is the first direction. In this embodiment, the light path adjustment module 2-120 and the first camera module 2-110 may be arranged along a direction that is either parallel with or perpendicular to the first direction. However, the arrangement of the light path adjustment module 2-120 and the first camera module 2-110 is not limited thereto. In addition to placing the optical system 2-500 on the corner of the electronic device 2-600, the optical system 2-500 may be placed on the side of the electronic device 2-600.

An optical element driving mechanism and an optical system are provided. The optical element driving mechanism may be associated with a camera module to capture an image. The optical element driving mechanism used as a shutter may properly control the passage time of the light. By the positioning assembly, when the user chooses to open or close the shutter, the situation where the shutter is half open or half closed may be avoided. Furthermore, the overall height of the optical element driving mechanism may be reduced by the arrangement of the coil to achieve miniaturization.

The Third Embodiment Group

Figure 23:
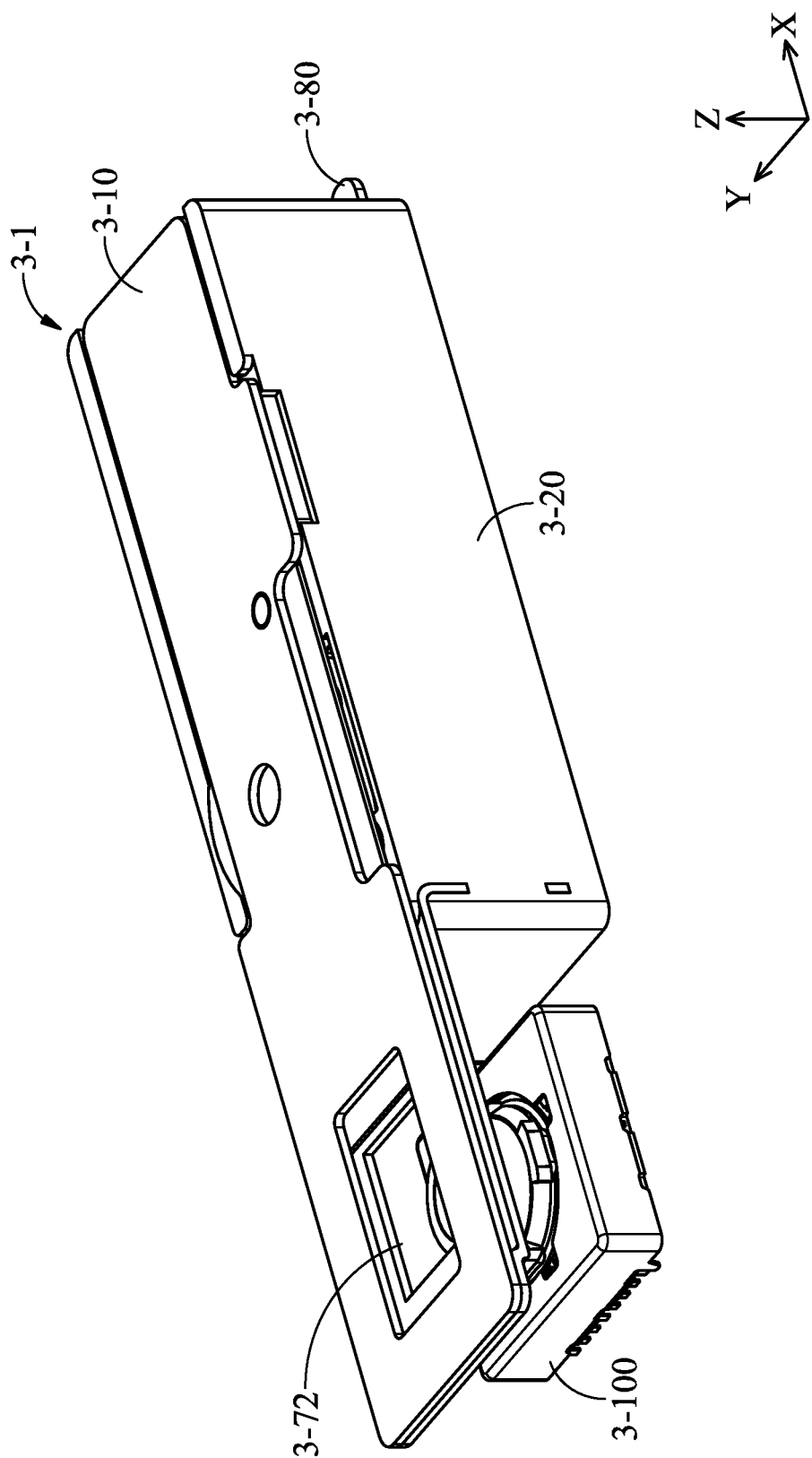
FIG. 23 is a schematic view of an optical element driving mechanism in some embodiments of the present disclosure.
Figure 24:
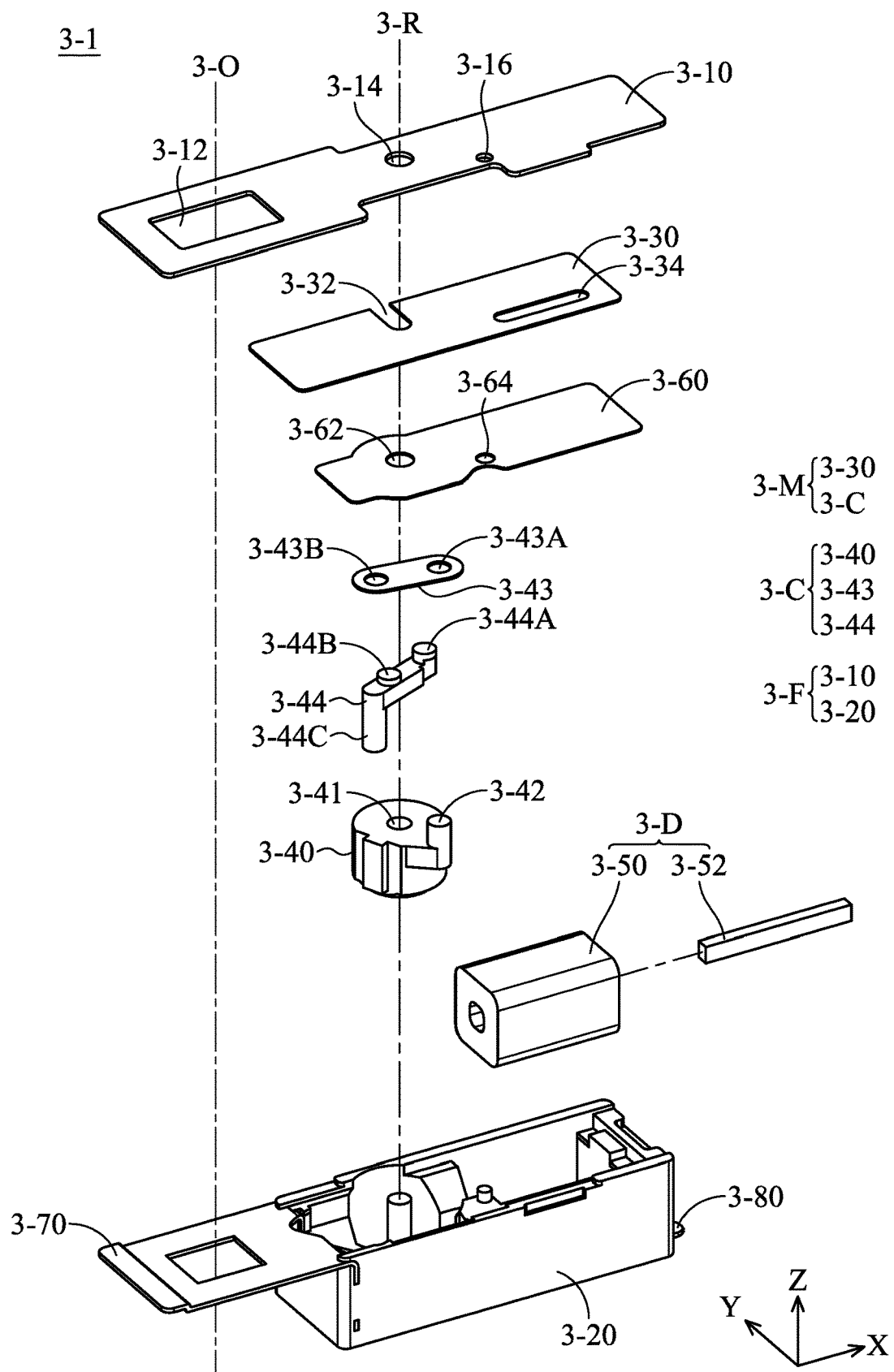
FIG. 24 is an exploded view of the optical element driving mechanism.
Figure 25:
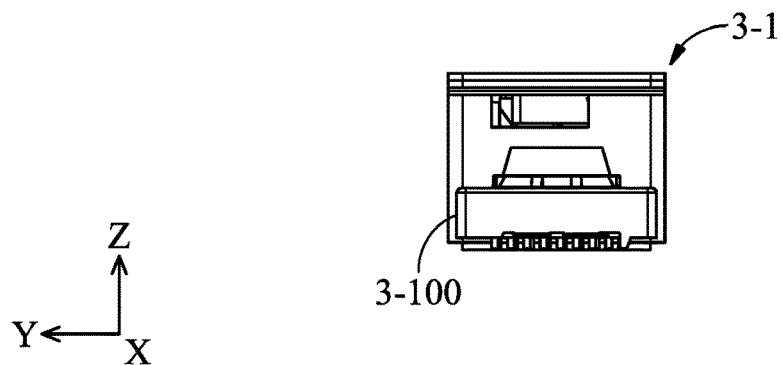
FIG. 25 is a side view of the optical element driving mechanism when viewed in a first direction.
Figure 26:
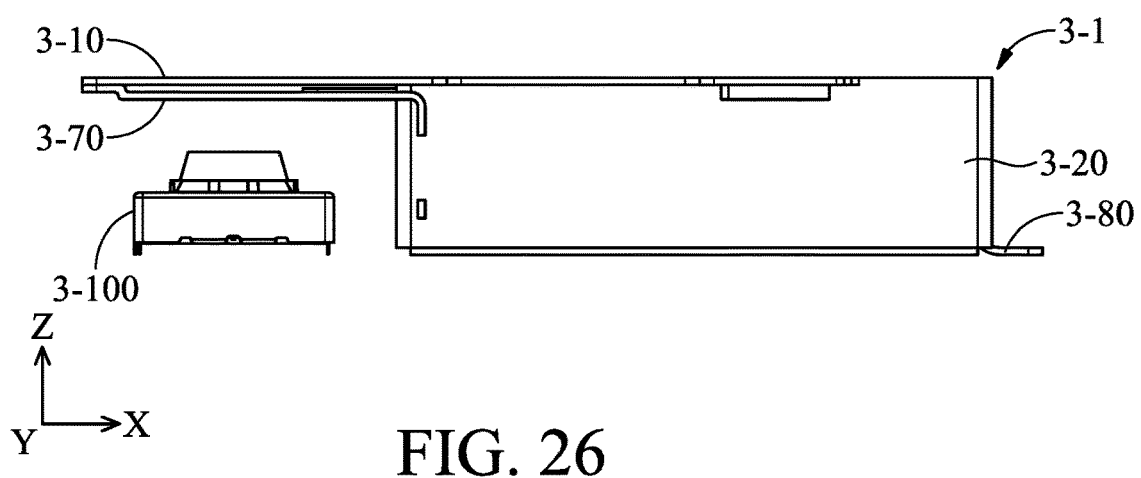
FIG. 26 is a side view of the optical element driving mechanism when viewed in a second direction.
Figure 27:
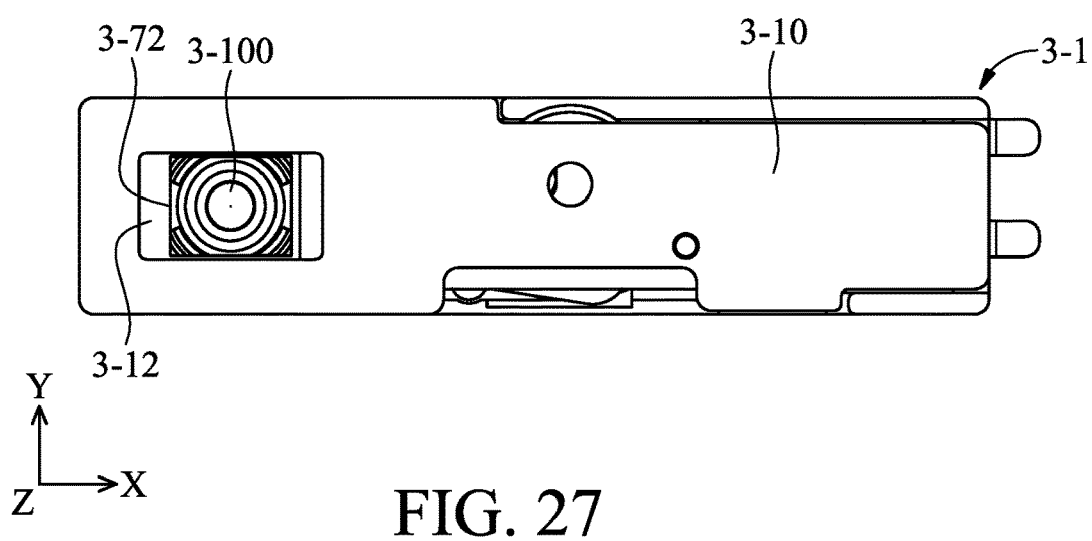
FIG. 27 is a top view of the optical element driving mechanism.

Refer to FIG. 23 to FIG. 27. FIG. 23 is a schematic view of an optical element driving mechanism 3-1 according to some embodiments of the present disclosure, FIG. 24 is an exploded view of the optical element driving mechanism 3-2, FIG. 25 is a side view of the optical element driving mechanism 3-1 when viewed in a first direction, FIG. 26 is a side view of the optical element driving mechanism 3-1 when viewed in a second direction, and FIG. 27 is a top view of the optical element driving mechanism 3-1. The optical element driving mechanism 3-1 mainly includes case 3-10, a base 3-20, an optical element 3-30, a rotation element 3-40, a first connecting element 3-43, a second connecting element 3-44, a magnetic element 3-50, a magnetic permeable element 3-52, and a blocking plate 3-60. An extending element 3-70 and a circuit 3-80 are disposed on the base 3-20.

The optical element driving mechanism 3-1 may be disposed with an optical module 3-100. The optical module 3-100 may be a voice coil motor (VCM) having an optical unit (such as a lens, a mirror, a prism, a beam splitter, or an aperture), or it may be the optical unit itself.

The case 3-10 may have an opening 3-12, a hole 3-14, and a hole 3-16. The main axis 3-O may pass through the opening 3-12, a rotational axis 3-R may pass through the hole 3-14, and the main axis 3-O and the rotational axis 3-R do not intersect. In some embodiments, the case 3-10 and the base 3-20 may be combined as an outer case of the optical element driving mechanism 3-1. Furthermore, the case 3-10 and the base 3-20 may be referred to as a fixed portion 3-F.

The optical element 3-30 may include a recess 3-32 and a passage 3-34, wherein the rotational axis 3-R may pass the passage 3-32. The rotation element 3-40 may be a magnet, and the rotation element 3-40 may have a hole 3-41 and a connecting portion 3-42. In some embodiments, the rotation element 3-40 may be a plastic magnet for facilitating manufacturing and achieving light weight. The first connecting element 3-43 may have a plate shape, and may include holes 3-43A and 3-43B. Protruding portions 3-44A, 3-44B and a connecting portion 3-44C may be positioned on the second connecting element 3-44. In some embodiments, the rotation element 3-40, the first connecting element 3-43 and the second connecting element 3-44 may be referred to as a connecting assembly 3-C for driving the optical element 3-30.

The optical element 3-30 may be moved in the X direction (the first direction) to act as a shutter of the optical module 3-100 or to block the optical module 3-100 when not using the optical module 3-100 (to be described later) to increase security. In some embodiments, the optical element 3-30 may be referred to as a movable portion 3-M and is movably disposed on the fixed portion 3-F.

The magnetic element 3-50 may be, for example, a driving coil, and the magnetic permeable element 3-52 may be disposed in the magnetic element 3-50. In other words, the magnetic element 3-50 and the magnetic permeable element 3-52 may act as an electromagnet. When current with different directions is pass to the magnetic element 3-50, the magnetic element 3-50 will interact with the magnetic field of the rotation element 3-40 to generate an electromagnetic force to rotate the rotation element 3-40 in different directions for controlling the position of the rotation element 3-40. Furthermore, the main axis 3-O does not pass through the magnetic permeable element 3-52. In some embodiments, glue may be provided at sides of the magnetic permeable element 3-52 that are facing or facing away the optical element 3-30, so the magnetic permeable element 3-52 may be attached on the magnetic element 3-50.

The blocking plate 3-60 may be disposed between the optical element 3-30 and the connecting assembly 3-C to limit the range of motion of the optical element 3-30 and the connecting assembly 3-C. Furthermore, holes 3-62 and 3-64 may be positioned on the blocking plate 3-60, and the rotational axis 3-R may pass through the hole 3-62.

Figure 28:
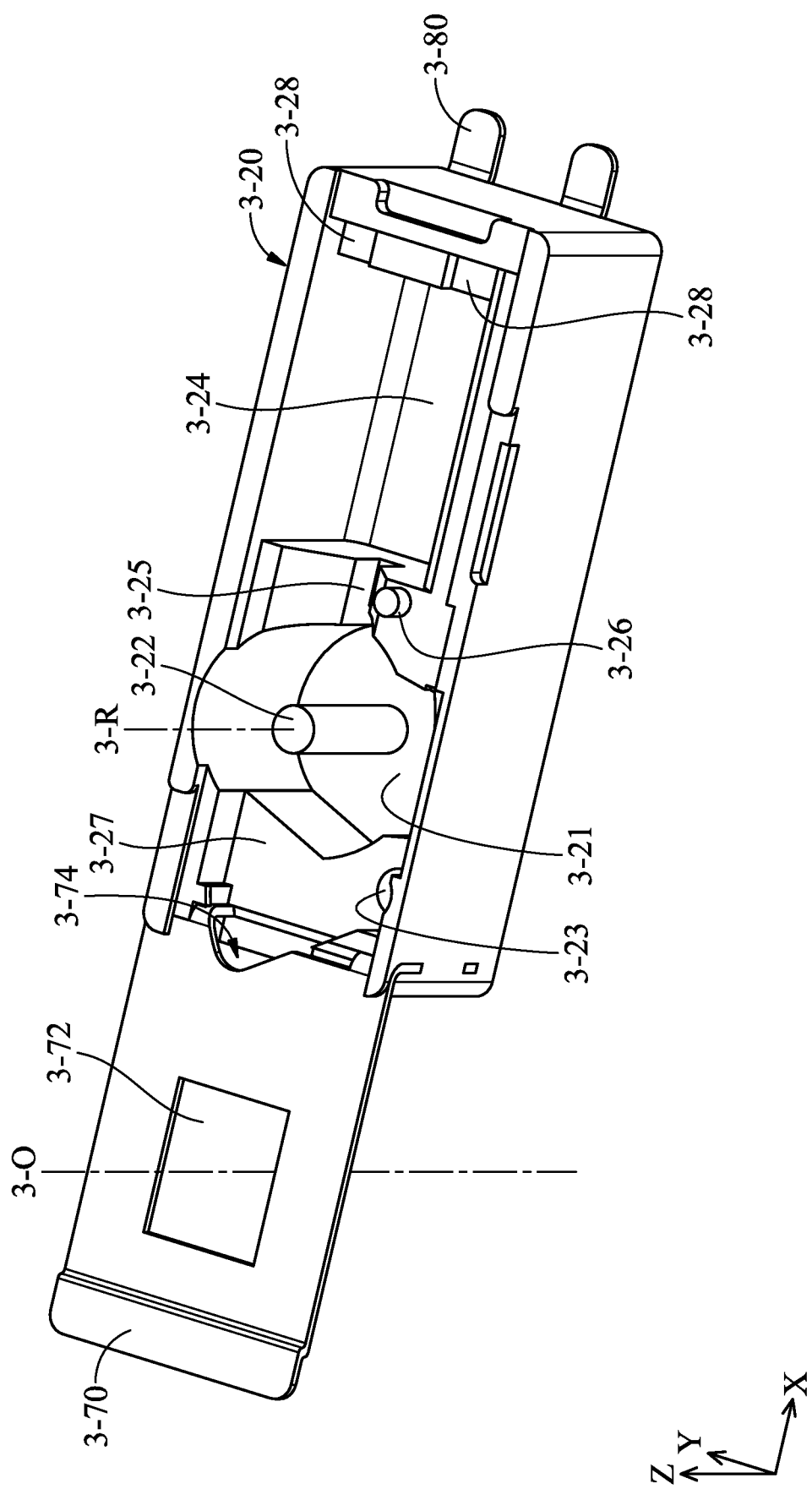
FIG. 28 to FIG. 30 are schematic views of the base viewed in different directions.
Figure 29:
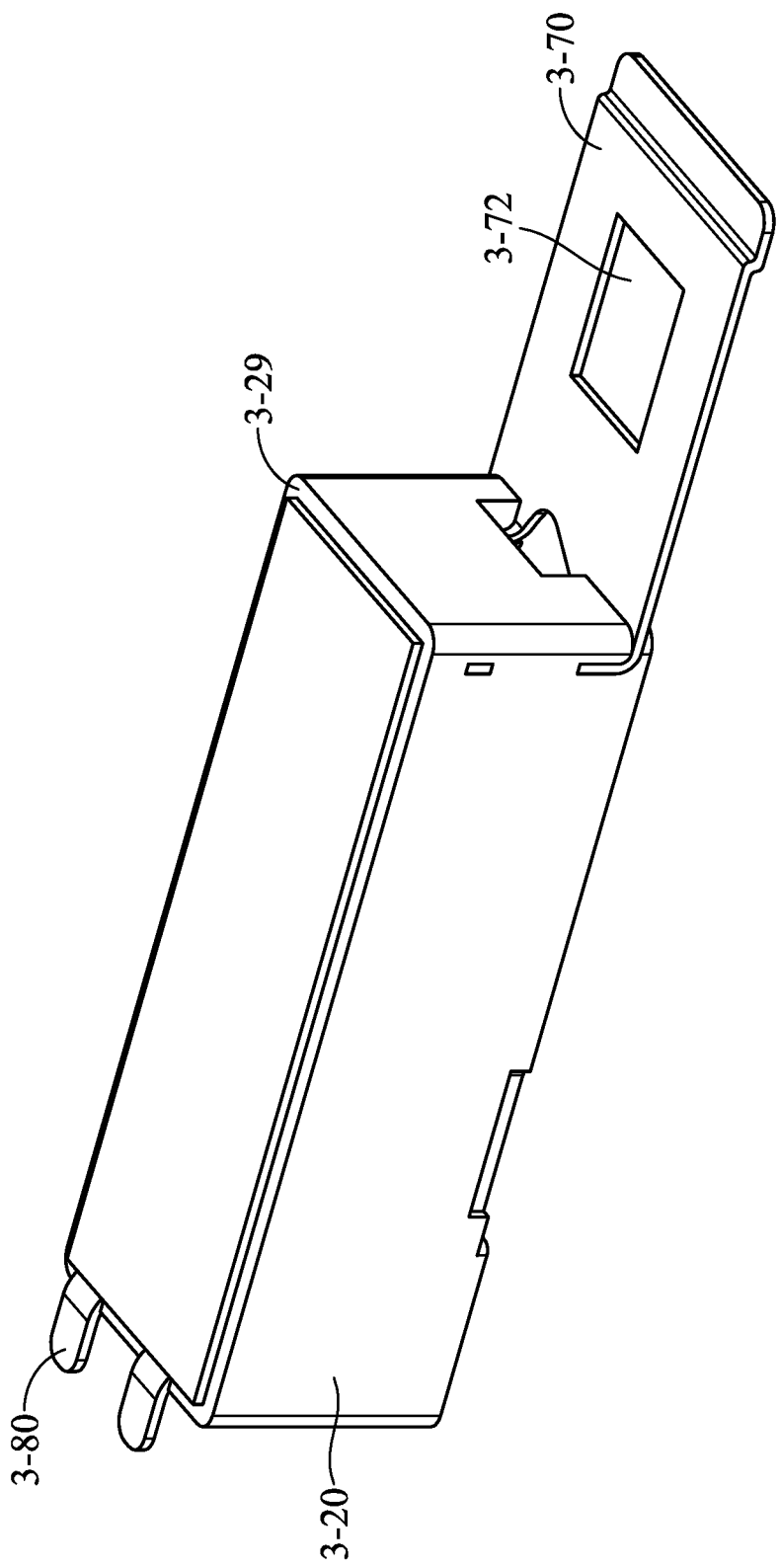
Figure 30:
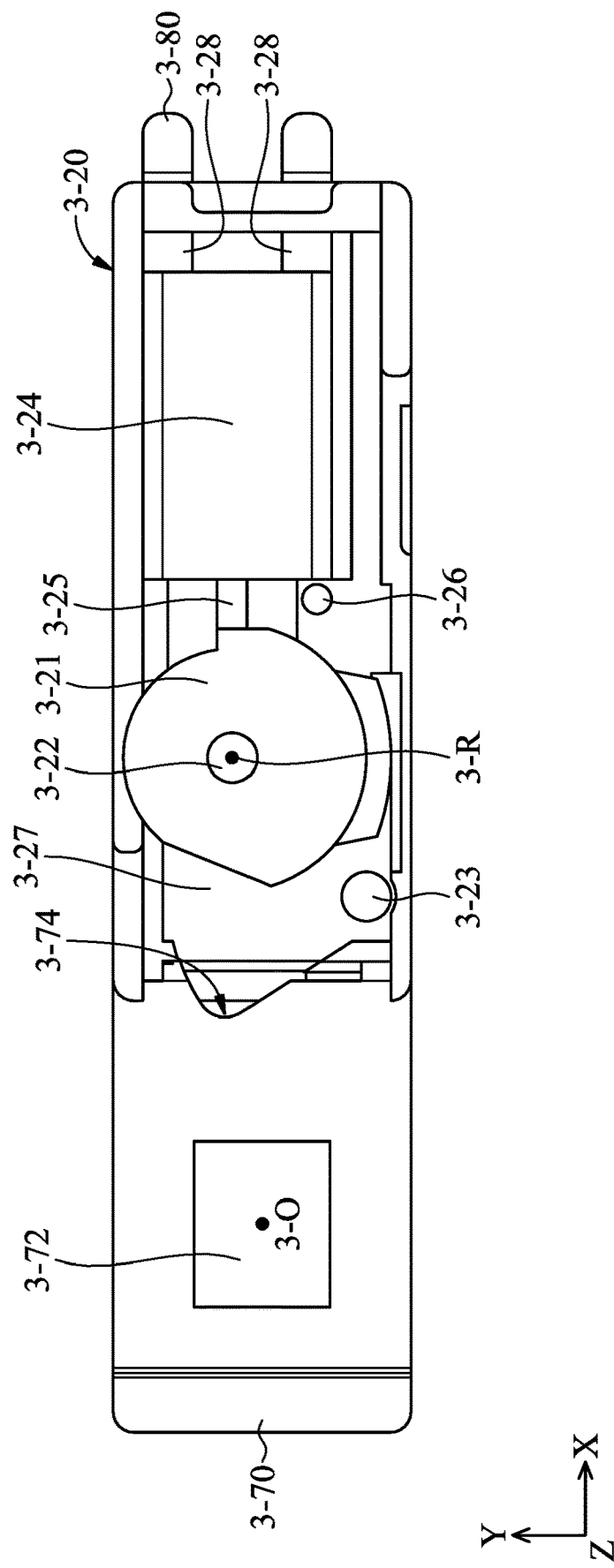

FIG. 28 to FIG. 30 are schematic views of the base 3-20 viewed in different directions. The base 3-20 may include a recess 3-21, a column 3-22 disposed in the recess 3-21, a recess 3-24, a recess 3-25, a limiting portion 3-26, a side portion 3-27, a hole 3-23 positioned on the side portion 3-27, a connecting portion 3-28, and a recess 3-29. Furthermore, the extending element 3-70 and the circuit 3-80 may be disposed on the base 3-20. For example, the extending element 3-70 and the circuit 3-80 may be at least partially embedded in the base 3-20. The extending element may have an opening 3-72, and the main axis 3-O may pass through the opening 3-72. The extending element 3-70 may further include a notch 3-74.

The column 3-22 may extend in the rotational axis 3-R and pass through the hole 3-62 of the block plate 3-60. Furthermore, in some embodiments, the circuit 3-80 may be further disposed on the connecting portion 3-28. In other words, the circuit 3-80 may be exposed from a side of the fixed portion 3-F that faces the optical element 3-30. The circuit 3-80 may be electrically connected to the driving assembly 3-D to provide electrical signal to the driving assembly 3-D. In some embodiments, and exit end of the circuit 3-80 and an exit end of the wiring of the optical module 3-100 may be designed to be positioned at an identical side for facilitating manufacturing.

In some embodiments, the optical element driving mechanism 3-1 and the optical module 3-100 may be disposed on a substrate (not shown), and the elements may be affixed by glue. For example, the optical element driving mechanism 3-1 may be connected to the substrate by the base 3-20, and the recess 3-29 may accommodate excess glue.

Furthermore, as shown in FIG. 26, the extending element 3-70 is exposed from the case 3-10 rather than fully covered by the case 3-10 when viewed in the Y direction (the second direction). In some embodiments, as shown in FIG. 27, the optical module 3-100 is not fully exposed from the opening 3-72 of the extending element 3-70. In other words, the size of the opening 3-72 is less than the size of the driving assembly 3-D.

In some embodiments, a layer of light absorbing material may be provided on the extending element 3-70 to prevent reflected light influencing the optical module 3-100. For example, a layer of the light absorbing material may be provided on a side of the extending element 3-70 facing the optical module 3-100, or may be provided on the entire extending element 3-70, depending on design requirements. For example, the light absorbing material may be formed by plating, chemical plating, or spraying.

In some embodiments, when assembling the optical element driving mechanism 3-1, the driving assembly 3-D may be disposed in the base 3-20, and then the rotation element 3-40, the second magnetic element 3-44, the first magnetic element 3-43, the blocking plate 3-60, the optical element 3-30, the case 3-10 may be provided sequentially. In some embodiments, the block plate 3-60 may be omitted to achieve miniaturization.

Figure 31:
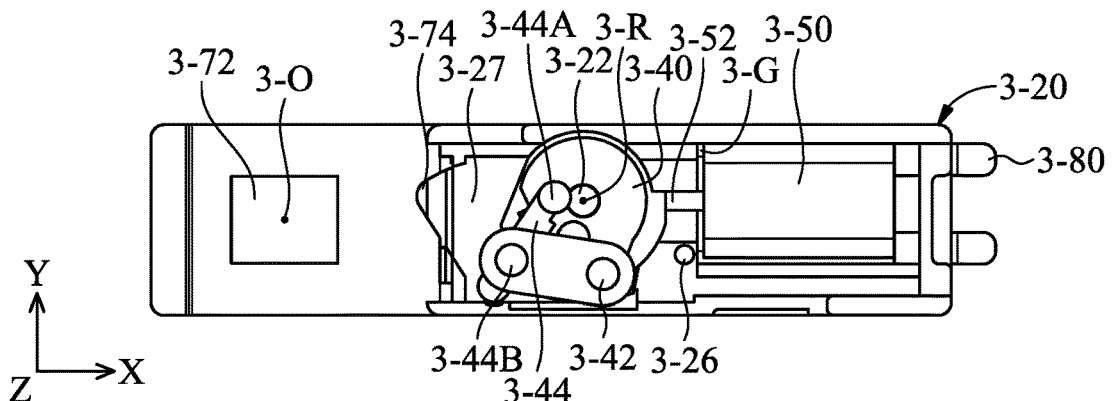
FIG. 31 is a top view of some elements of the optical element driving mechanism in an open condition.
Figure 32:
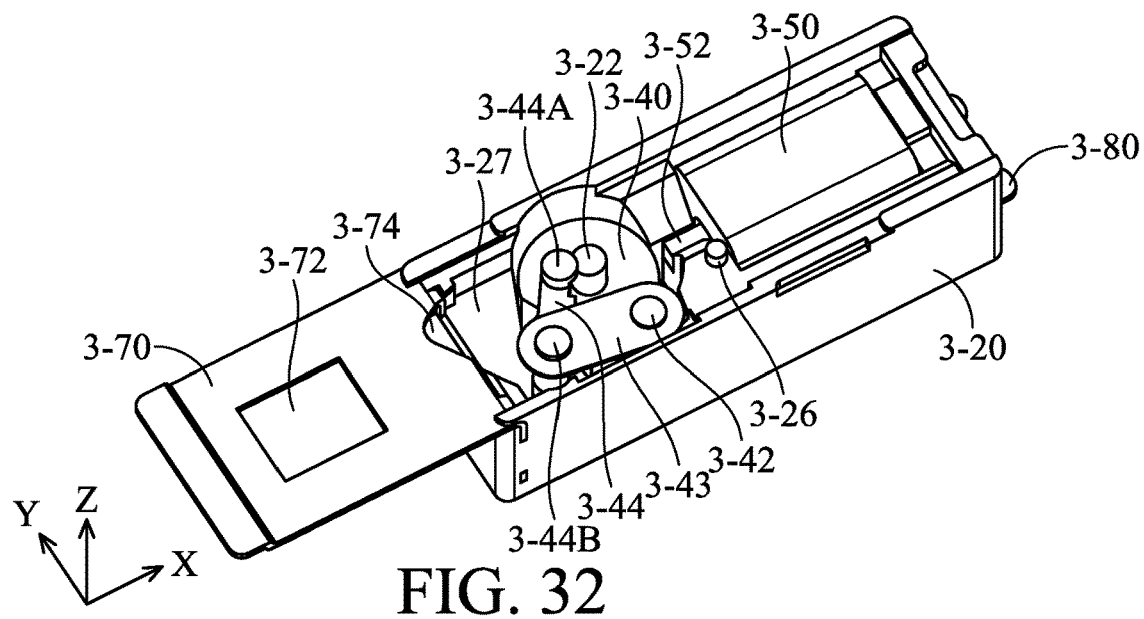
FIG. 32 is a schematic view of some elements of the optical element driving mechanism in the open condition.
Figure 33:
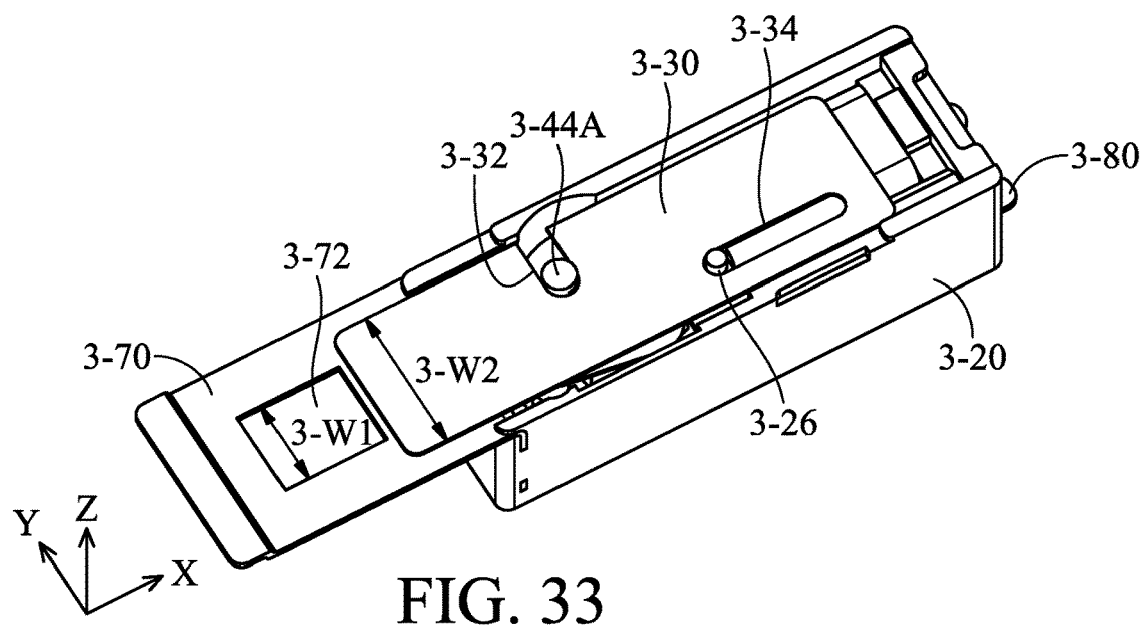
FIG. 33 is a schematic view of some elements of the optical element driving mechanism in the open condition.

FIG. 31 to FIG. 33 are a top view and side views of some elements of the optical element driving mechanism 3-1 in an open condition. As shown in FIG. 31 to FIG. 33, the limiting portion 3-26 of the base 3-20 may be positioned in the passage 3-34 of the optical element 3-30 for limit the range of motion of the optical element 3-30 (the movable portion 3-M) relative to the base 3-20 (the fixed portion 3-F). Furthermore, the limiting portion 3-26 may be disposed in the hole 3-16 of the case 3-10 and the hole 3-62 of the blocking plate 3-60 to define the positions of the case 3-10, the base 3-20, and the blocking plate 3-60.

The rotation element 3-40 may be disposed in the recess 3-21 of the base 3-21, and the column 3-22 may pass through the hole 3-41 of the rotation element 3-40. As a result, the connecting portion 3-42 of the rotation element 3-40 passes the hole 3-43A of the first connecting element 3-43, and the protruding 3-44B of the connecting element 3-44 passes the hole 3-43B of the first connecting element. In other words, the first connecting element 3-43 may be connected to the rotation element 3-40 and the second connecting element 3-44. As shown in FIG. 31, the rotational axis 3-R does not pass through the point where the rotation element 3-40 connects to the first connecting element 3-43 (i.e. the connecting portion 3-42), and the rotational axis 3-R does not pass through the second connecting element 3-44. Furthermore, the second connecting element 3-44 at least partially overlaps the rotation element 3-44 along the main axis 3-0.

As shown in FIG. 31, the magnetic element 3-50 is disposed in the recess 3-24 of the base 3-20, and the magnetic element 3-50 may be affixed on the base 3-20 by glue. In the X direction that is perpendicular to the main axis 3-O (i.e. the first direction), a gap 3-G is formed between the magnetic element 3-50 and the base 3-20 (the fixed portion 3-F), and the magnetic permeable element 3-52 extends in the X direction and may partially expose from the magnetic element 3-50. The portion of the magnetic permeable element 3-52 that is exposed from the magnetic element 3-50 may be disposed in the recess 3-25 of the base 3-20. As a result, the magnetic element 3-50 and the magnetic permeable element 3-52 may be prevented from in direct contact with the base 3-20 in the X direction to enhance their durability.

Figure 37:
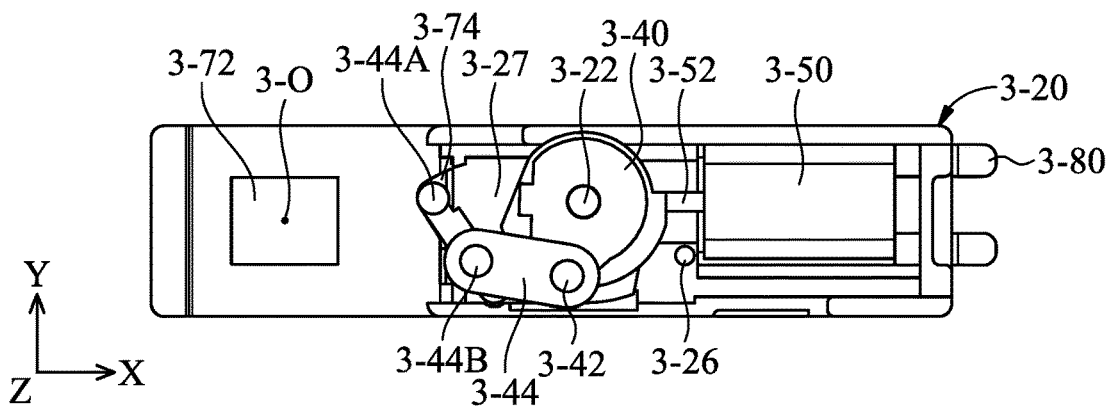
FIG. 37 is a top view of some elements of the optical element driving mechanism in a closed condition.
Figure 38:
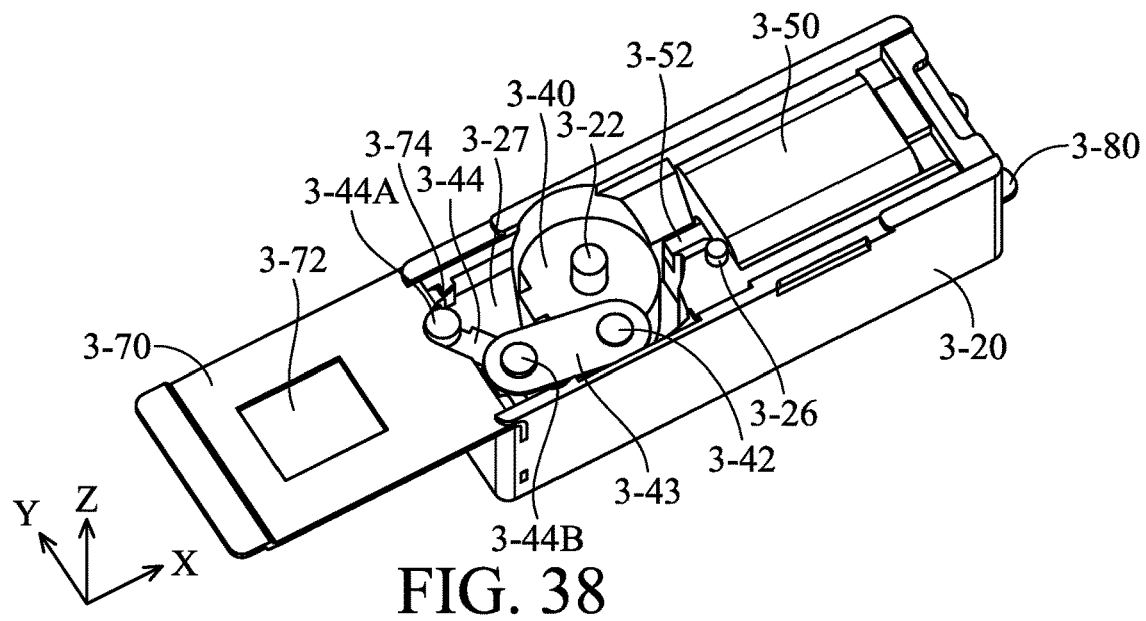
FIG. 38 is a schematic view of some elements of the optical element driving mechanism in the closed condition.
Figure 39:
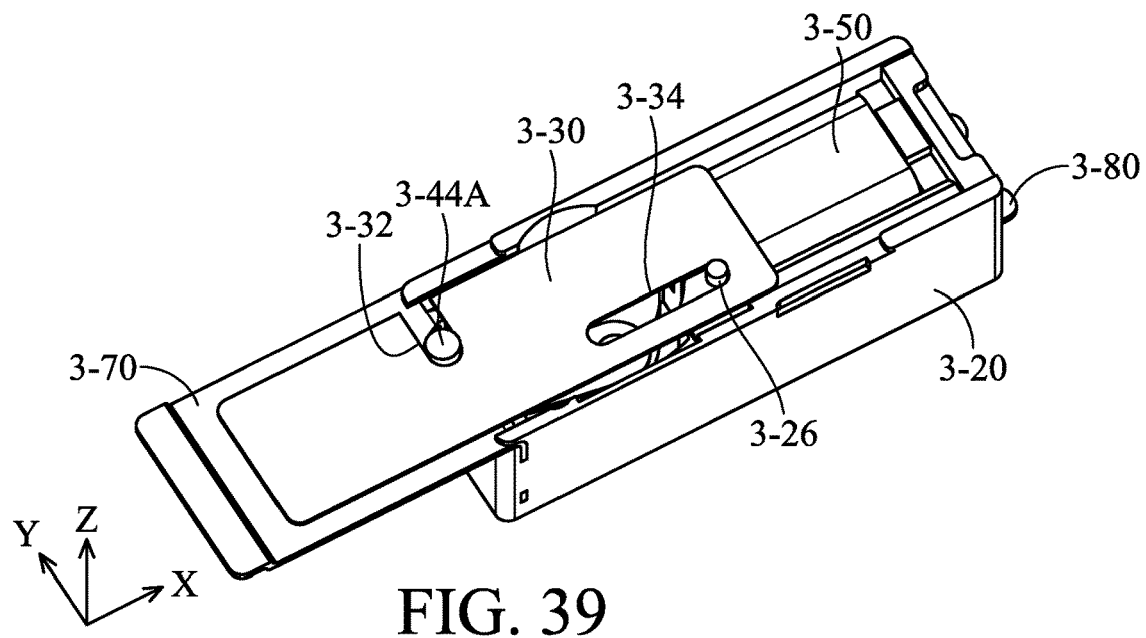
FIG. 39 is a schematic view of some elements of the optical element driving mechanism in the closed condition.

In some embodiments, as shown in FIG. 31, the size of the opening 3-72 if the extending element 3-70 is less than the size of the driving assembly 3-D. In some embodiments, as shown in FIG. 31, the size 3-W2 of the optical element 3-30 is greater than the size 3-W1 of the opening 3-72 of the extending element 3-70 in the Y direction (the second direction). As a result, the opening 3-72 of the extending element 3-70 may be fully blocked by the optical element 3-30 to prevent light from passing the opening 3-72 to reach the optical module 3-100 (FIG. 37 to FIG. 39).

Moreover, the size of the opening 3-12 may be greater than the size of the opening 3-72 (such as the size in the X direction or in the Y direction) to reduce the size of the opening that is closer to the optical module 3-100, and the optical route of the light entering the optical module 3-100 may be adjusted.

As shown in FIG. 25 and FIG. 31, the optical module 3-100 has a rectangular shape and is arranged with the driving assembly 3-D in the X direction that is perpendicular to the optical axis 3-O (the first direction), and the optical module 3-100 at least partially overlaps the fixed portion 3-F. As a result, the required space may be reduced to achieve miniaturization.

Figure 34:
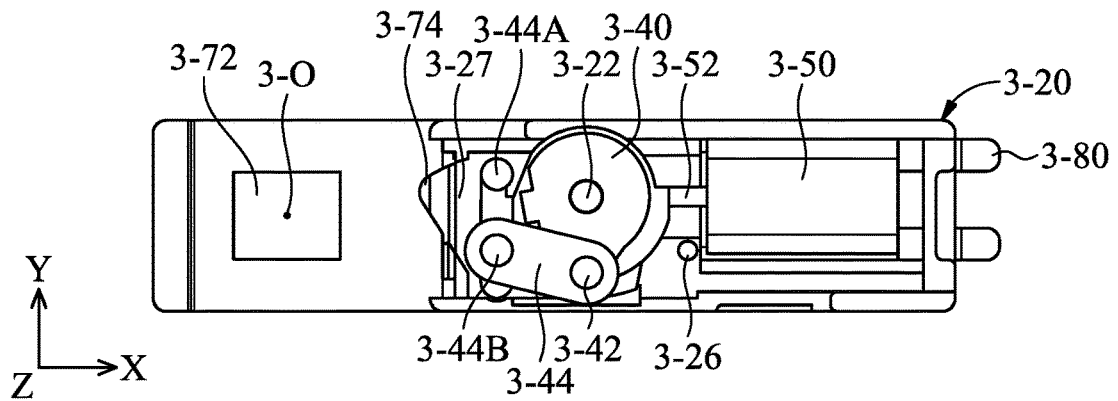
FIG. 34 is a top view of some elements of the optical element driving mechanism in a transitional condition.
Figure 35:
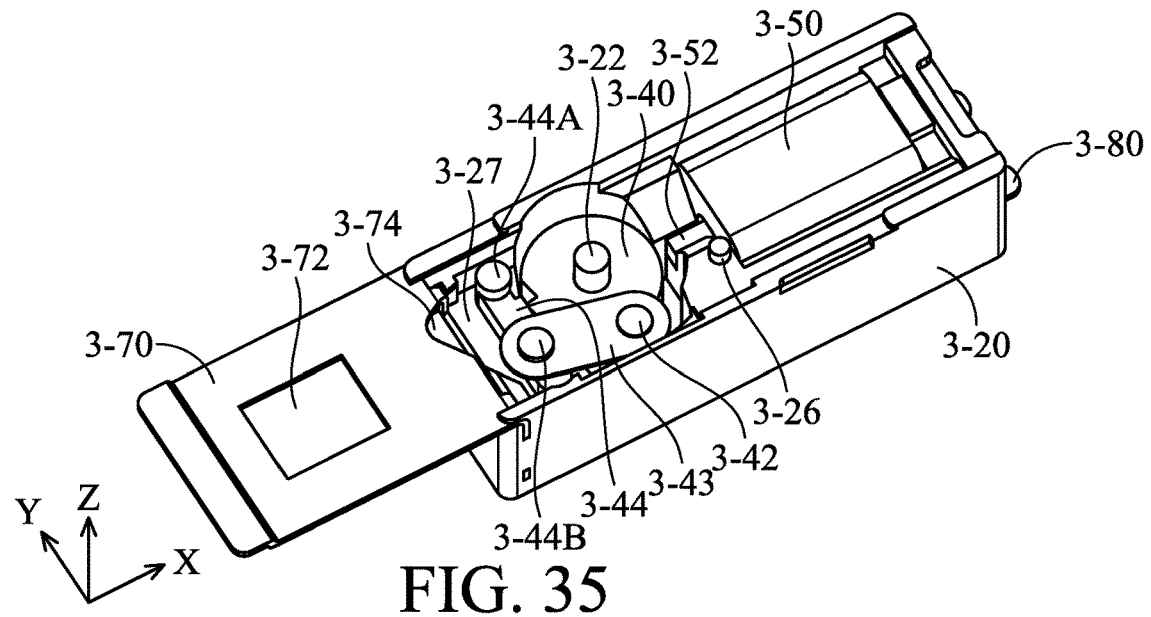
FIG. 35 is a schematic view of some elements of the optical element driving mechanism in the transitional condition.
Figure 36:
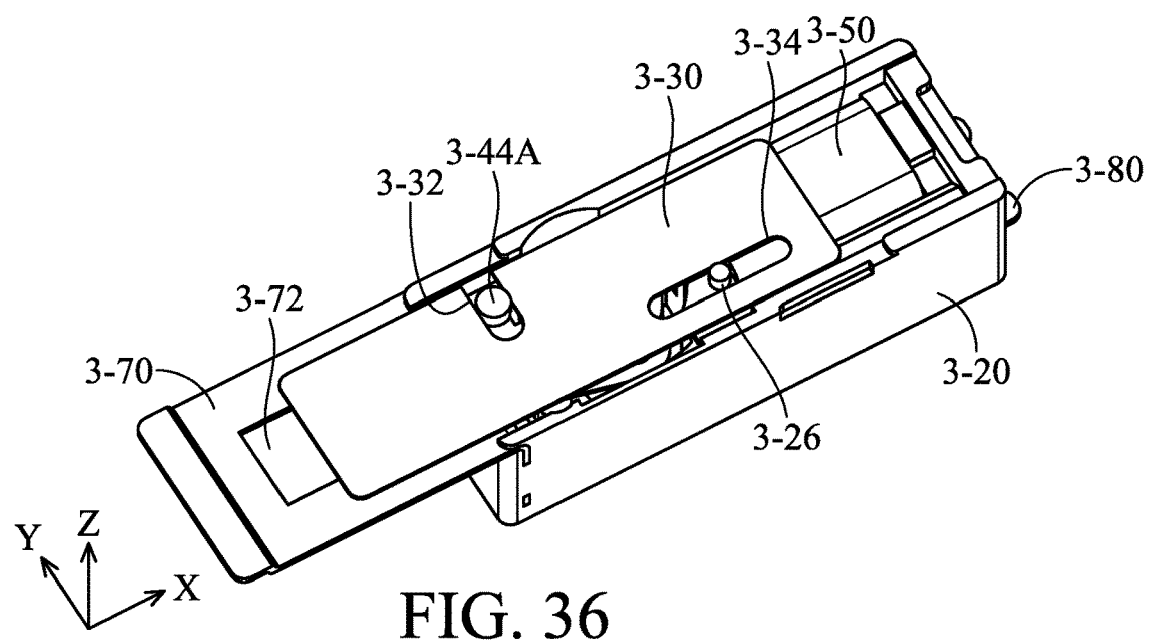
FIG. 36 is a schematic view of some elements of the optical element driving mechanism in the transitional condition.

FIG. 34 to FIG. 36 are a top view and side views of some elements of the optical element driving mechanism 3-1 in a transitional condition. An electromagnetic force is applied to the rotation element 3-40 by the driving assembly 3-D to rotate the rotation element 3-40. It should be noted that the connecting portion 3-42 of the rotation element 3-40 is disposed in the hole 3-43A of the first connecting element 3-43, so the first connecting element 3-43 may be moved with the rotation of the rotation element 3-40. Furthermore, the protruding portion 3-44B of the second connecting element 3-44 is disposed in the hole 3-43B of the first connecting element, and the connecting portion 3-44C is disposed in the hole 3-23 of the base 3-20 and is rotatable in the hole 3-23, so the second connecting element 3-44 may rotate using the connecting portion 3-44C as a rotational axis with the rotation of the rotation element 3-40. It should be noted that the second connecting element 3-44 does not in direct contact with the side portion 3-27 of the base 3-20. In other words, the second connecting element 3-44 has a distance that is greater than zero to the base 3-20 in the Z direction.

As shown in FIG. 36, the protruding portion 3-44A of the second connecting element 3-44 is disposed in the recess 3-32 of the optical element 3-30, so the optical element 3-30 may be moved in the X direction with the second connecting element 3-44 when the second connecting element 3-44 is rotating using the connecting portion 3-44C as a rotational axis. In other words, the mode of motion of the optical element 3-30 (i.e. translational movement) is different than the mode of motion of the connecting assembly 3-C (i.e. rotational movement). It should be noted that the opening 3-72 of the extending element 3-70 is partially covered by the optical element 3-30.

FIG. 37 to FIG. 39 are a top view and side views of some elements of the optical element driving mechanism 3-1 in a closed condition. An electromagnetic force may be further applied to the rotation element 3-40 by the driving assembly 3-D until the protruding portion 3-44A is in contact with the notch 3-74 of the extending element 3-70, or until the passage 3-34 of the optical element 3-30 is in contact with the limiting portion 3-26 of the base 3-20 to stop the movement of the optical element 3-30 and the connecting assembly 3-C.

It should be noted that the opening 3-72 of the extending element 3-70 and the optical module 3-100 (not shown) are covered by the optical element 3-30, so light may be prevented from entering the optical module 3-100. As a result, the optical element 3-30 may act as a shutter of the optical module 3-100, which means only covering the optical module 3-100 of a specific period. In some embodiments, the optical module 3-100 may be continuously covered by the optical element 3-30 to increase the security when the optical module 3-100 is not in use.

Figure 40:
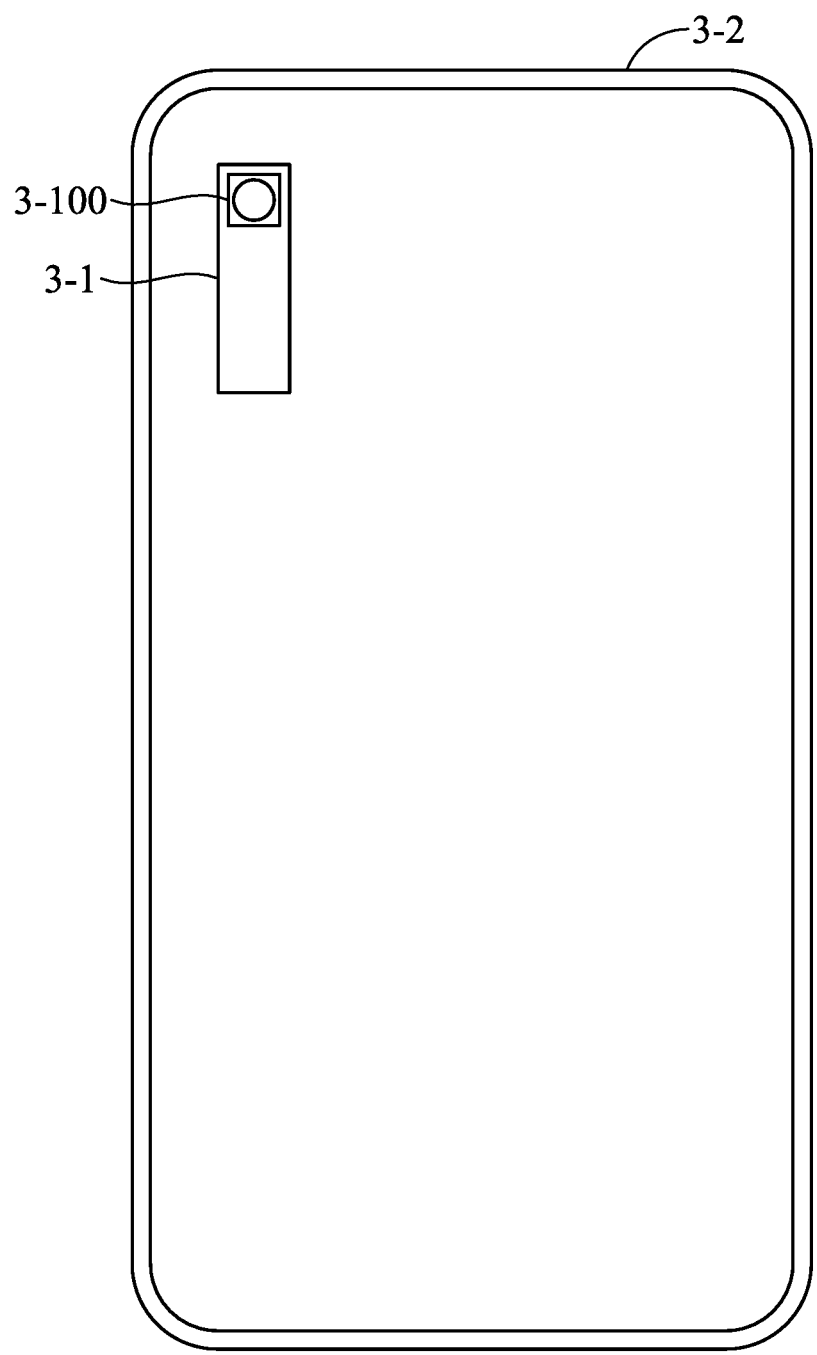
FIG. 40 and FIG. 41 are schematic views when the optical element driving mechanism is disposed in electronic elements.
Figure 41:
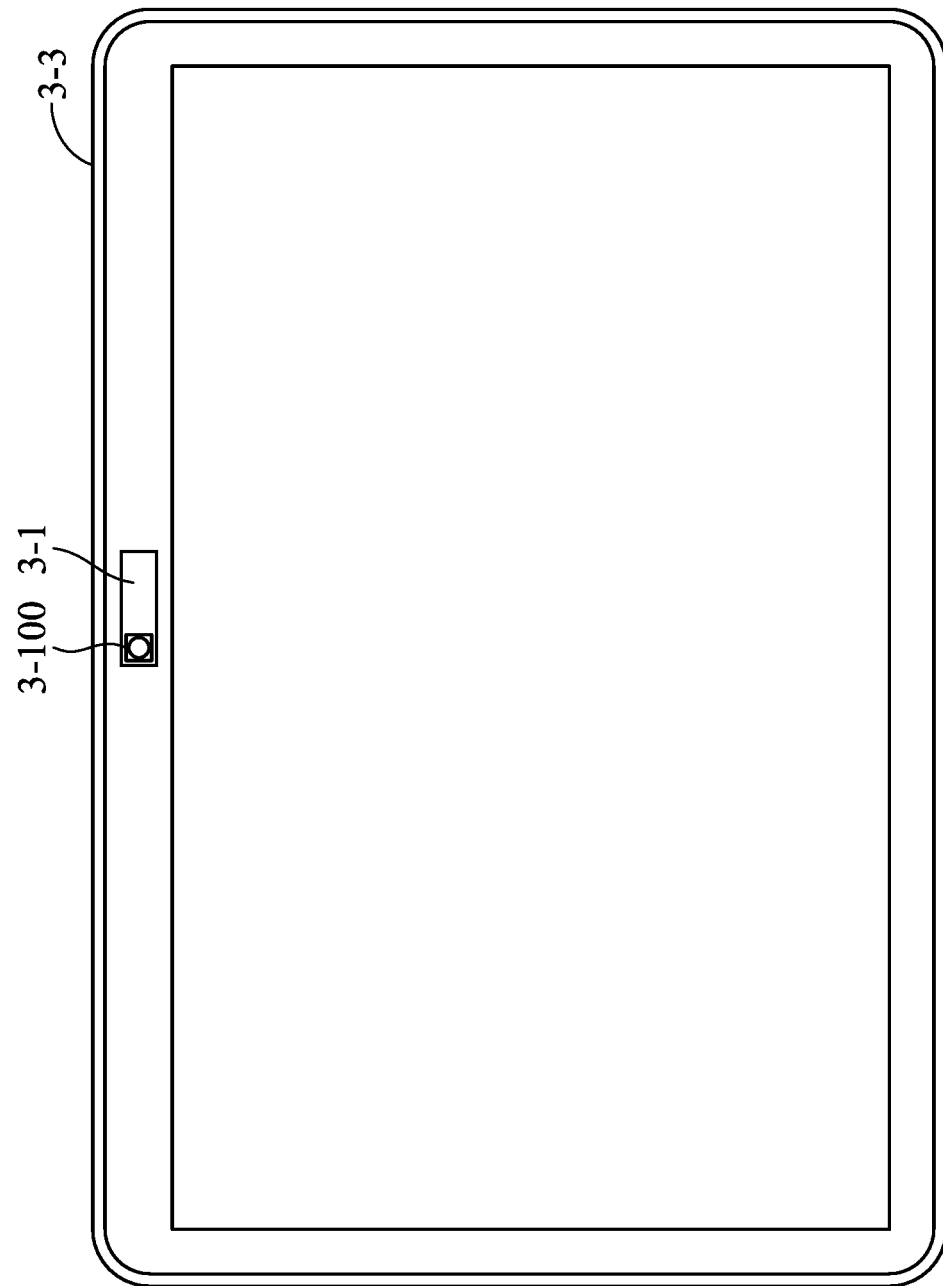

FIG. 40 and FIG. 41 are schematic views when the optical element driving mechanism 3-1 is disposed in electronic elements 3-2 and 3-3. The way that how the optical element driving mechanism 3-1 is positioned in the electronic devices may be changed based on the direction of the display of the electronic devices. For example, the electronic element 3-2 may be a cellphone, the electronic element 3-3 may be a computer display, and the long side of the optical element driving mechanism 3-1 may position at an identical side of the long side of the electronic elements 3-2 or 3-3 to enhance performance.

In summary, an optical element driving mechanism is provided. The optical element driving mechanism includes a fixed portion, a movable portion, and a driving assembly. The fixed portion includes a limiting portion. The movable portion is movably disposed on the fixed portion and includes an optical element and a connecting assembly. The optical element has a main axis. The connecting assembly is connected to the optical element. The driving assembly is at least partially disposed on the fixed portion, wherein the limiting portion is used for limiting the range of motion of the movable portion relative to the fixed portion. As a result, the optical module may be prevented from being exposed from the opening to increase the security of the optical module when the optical module is not in use, or the optical element driving mechanism may act as a shutter of the optical module.

The Fourth Embodiment Group

Figure 42:
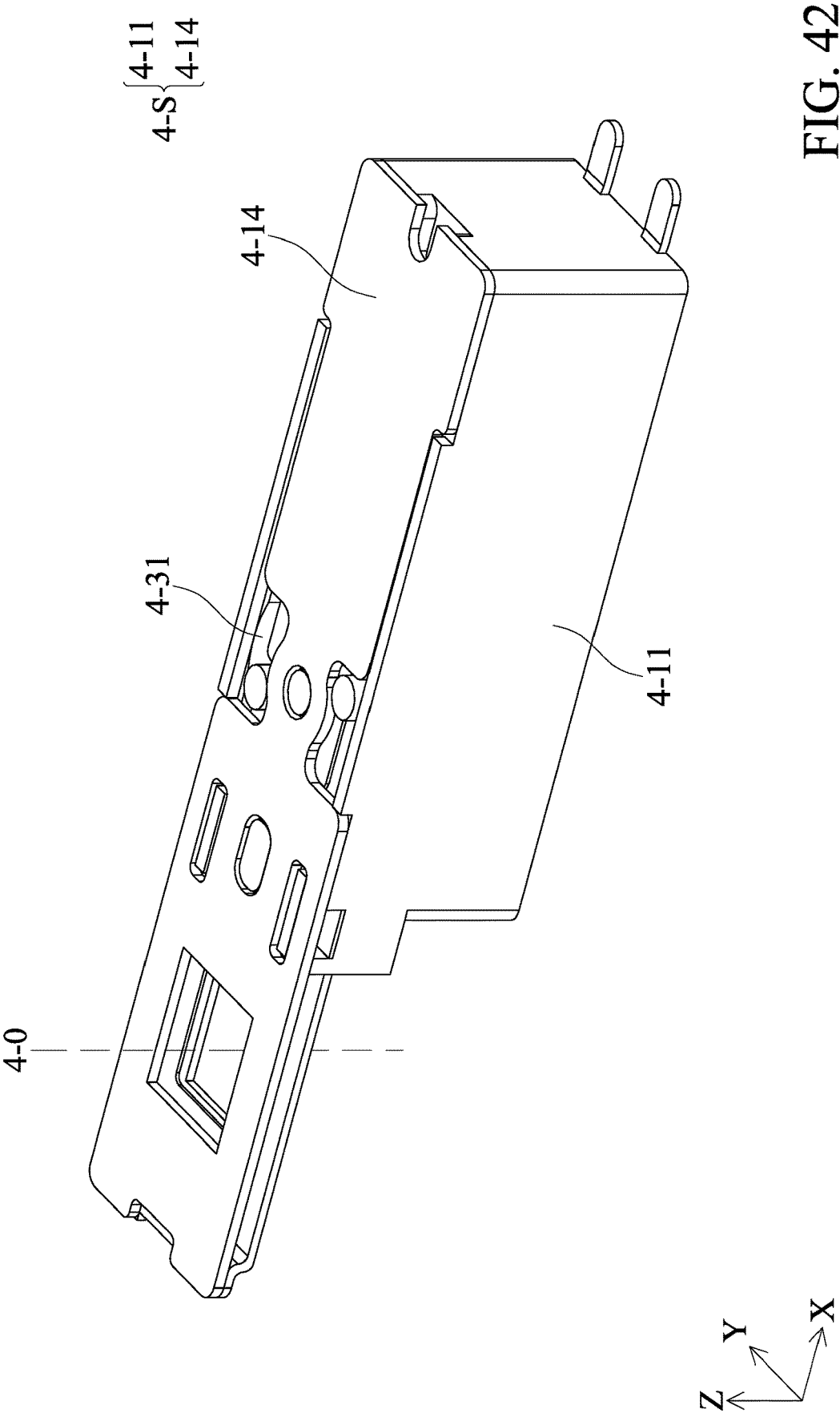
FIG. 42 is a perspective view showing an optical element driving mechanism according to an embodiment of the present invention.
Figure 43:
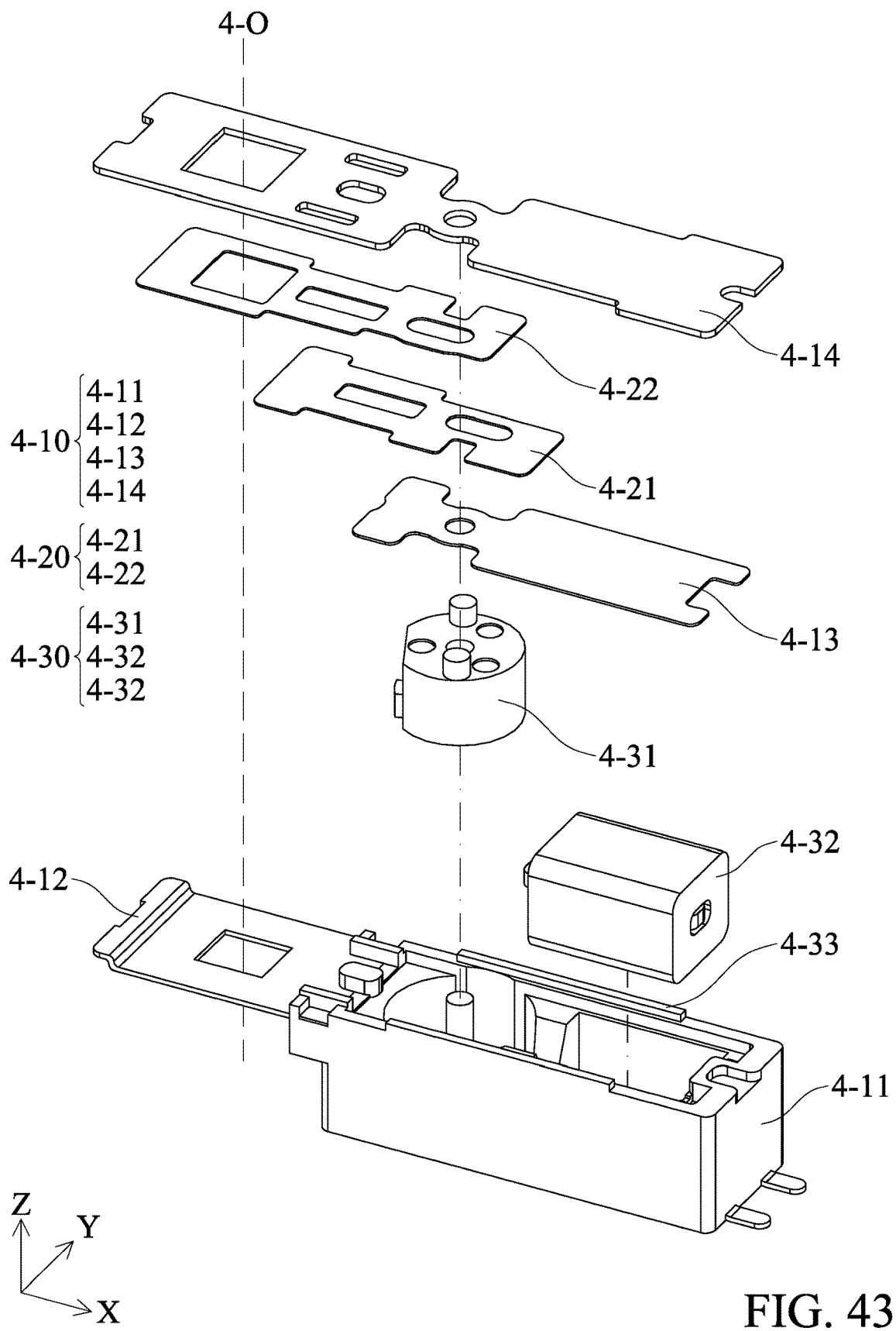
FIG. 43 is an exploded view of an optical element driving mechanism according to an embodiment of the present invention.

Refer to FIG. 42 to FIG. 43. FIG. 42 is a perspective view of an optical element driving mechanism 4-1 according to an embodiment of the present invention, and FIG. 43 is an exploded view of an optical element driving mechanism 4-1 according to an embodiment of the present invention. The optical element driving mechanism 4-1 has an optical axis 4-0, and includes a fixed portion 4-10, a movable portion 4-20, and a driving assembly 4-30. The fixed portion 4-10 includes a base 4-11, a frame 4-12, a fixing plate 4-13, and a cover 4-14. The movable portion 4-20 includes a first shutter 4-21 and a second shutter 4-22. The driving assembly 4-30 includes a magnetic element 4-31, a driving coil 4-32, and a magnetically permeable element 4-33. The movable portion 4-20 is movably disposed on the fixed portion 4-10. The driving assembly 4-30 is disposed on the fixed portion 4-10.

Figure 44:
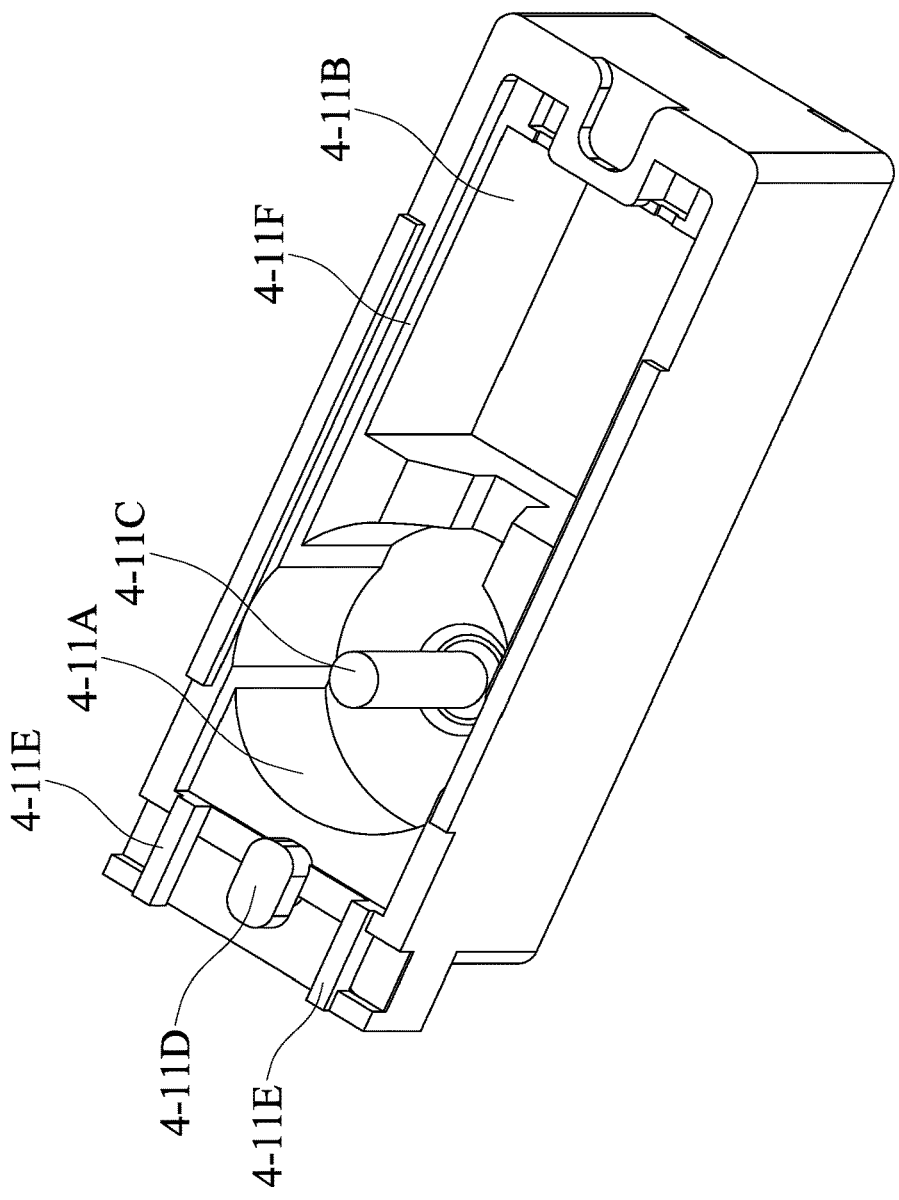
FIG. 44 is a perspective view of a base of an optical element driving mechanism according to an embodiment of the present invention.

Refer to FIG. 44, which is a perspective view of the base 4-11 of the optical element driving mechanism 4-1 according to an embodiment of the present invention. The base 4-11 has a magnetic element receiving portion 4-11A, a driving coil receiving portion 4-11B, a support shaft 4-11C, a main stopper 4-11D, an auxiliary stopper 4-11E, and a slide rail 4-11F. The magnetic element receiving portion 4-11A receives the magnetic element 4-31, and the driving coil receiving portion 4-11B receives the driving coil 4-32. The support shaft 4-11C is disposed in the magnetic element receiving portion 4-11A. The main stopper 4-11D and the auxiliary stopper 4-11E are extension structures of the side walls of the base 4-11. The slide rail 4-11F is disposed on the two side walls of the base 4-11, and receives a part of the first shutter 4-21 and the second shutter 4-22. In this embodiment, the base 4-11 is made of resin to avoid affecting the driving assembly 4-30 disposed therein.

Figure 45:
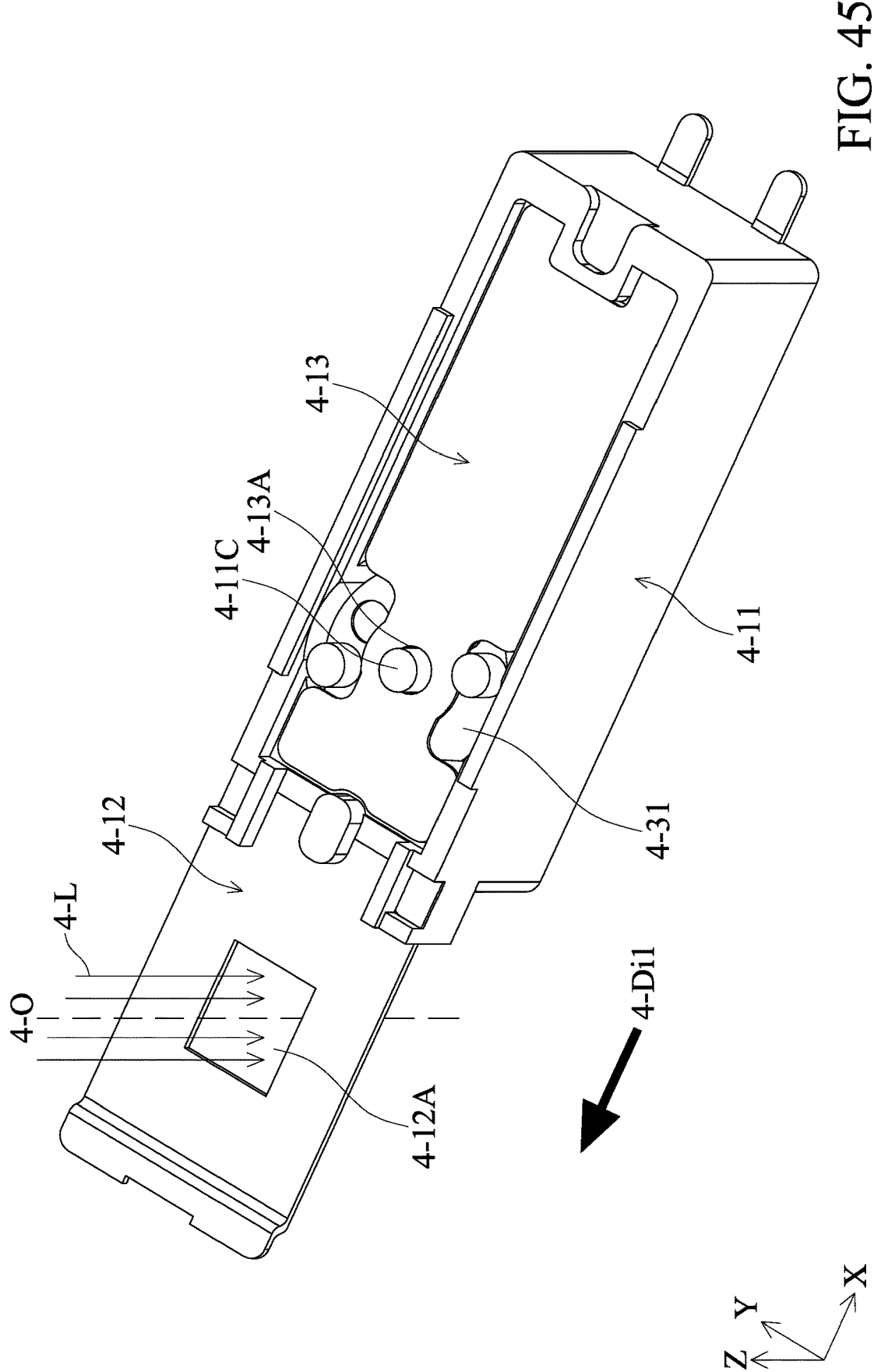
FIG. 45 is a schematic diagram of a partial structure of an optical element driving mechanism according to an embodiment of the present invention.

Refer to FIG. 45, which is a schematic diagram of a partial structure of the optical element driving mechanism 4-1 according to an embodiment of the present invention. The frame 4-12 is made of metal to support the movable portion 4-20 and the cover 4-14. A part of the frame 4-12 is embedded and fixed in the base 4-11 by insert molding. The remaining part extends toward a first direction 4-Di1 and away from the base 4-11, and the first direction 4-Di1 is perpendicular to the optical axis 4-0. The frame 4-12 has an opening 4-12A, so that an incident light 4-L can pass through. The opening 4-12A is rectangular, and a long side of the opening 4-12A is parallel with the first direction 4-Di1. Because the frame 4-12 is made of metal, it has better support and can be made thinner.

The fixing plate 4-13 has a hole 4-13A through which the support shaft 4-11C of the base 4-11 passes. The fixing plate 4-13 is disposed above the driving coil 4-32 and the magnetic element 4-31, and prevents the magnetic element 4-31 from being detached from the base 4-11 or hitting other elements when driven.

Figure 46:
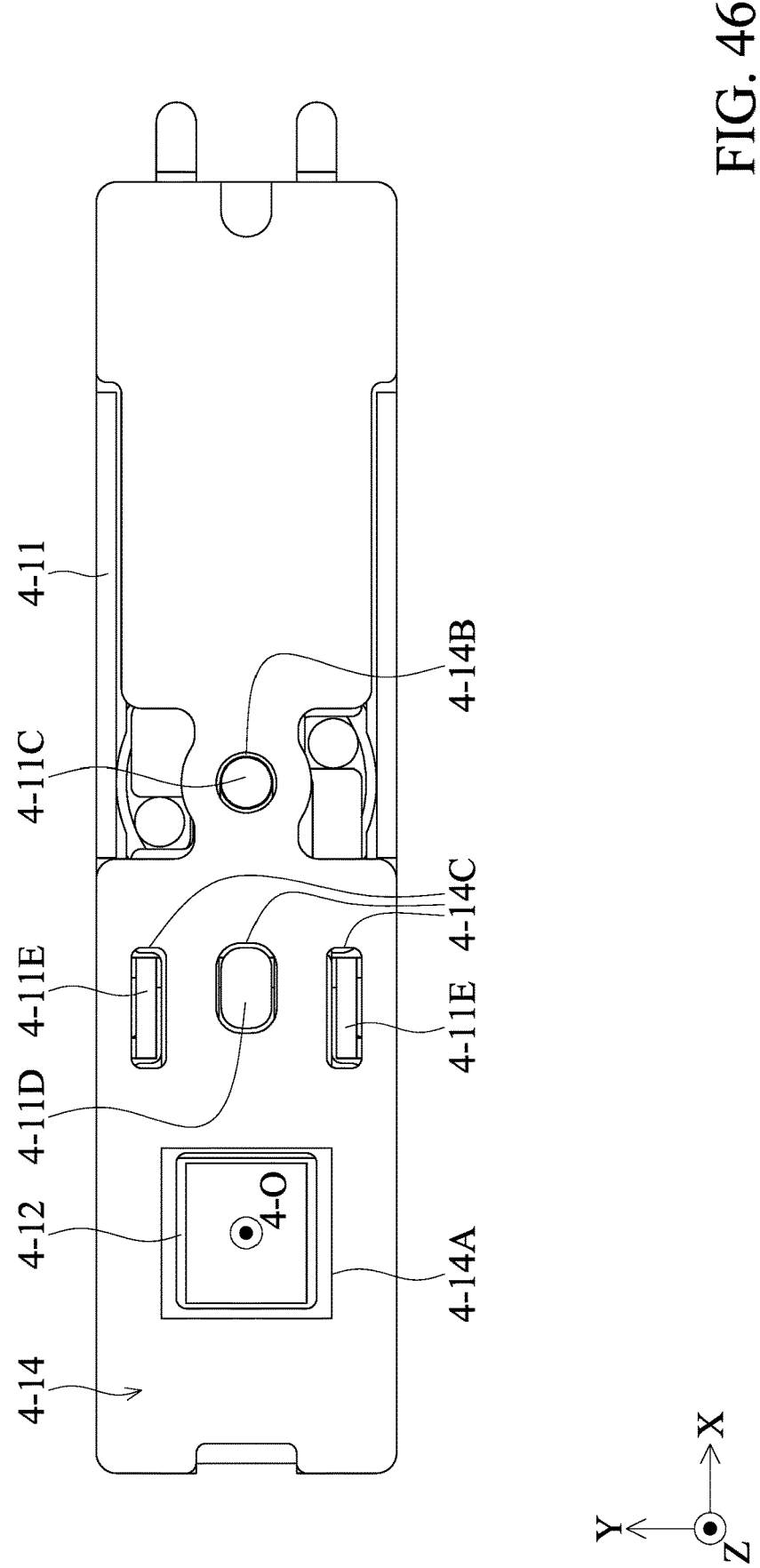
FIG. 46 is a schematic diagram of a partial structure of an optical element driving mechanism according to an embodiment of the present invention.

Refer to FIG. 46. FIG. 46 is a schematic diagram of a partial structure of the optical element driving mechanism 4-1 according to an embodiment of the present invention. The cover 4-14 is disposed above the base 4-11 and the frame 4-12, and has a cover opening 4-14A, a cover hole 4-14B, and three cover hollows 4-14C. The cover opening 4-14A allows the incident light 4-L to pass through. The cover hole 4-14B receives the support shaft 4-11C of the base 4-11. The cover hollows 4-14C receive the main stopper 4-11D and the auxiliary stopper 4-11E, respectively. The cover 4-14 and the base 4-11 can form a housing 4-S (as shown in FIG. 42) of the optical element driving mechanisms 4-1 by engaging the cover opening 4-14B and the cover hollows 4-14C to the support shaft 4-11C of the base 4-11, the main stopper 4-11D, and the auxiliary stopper 4-11E.

Figure 47:
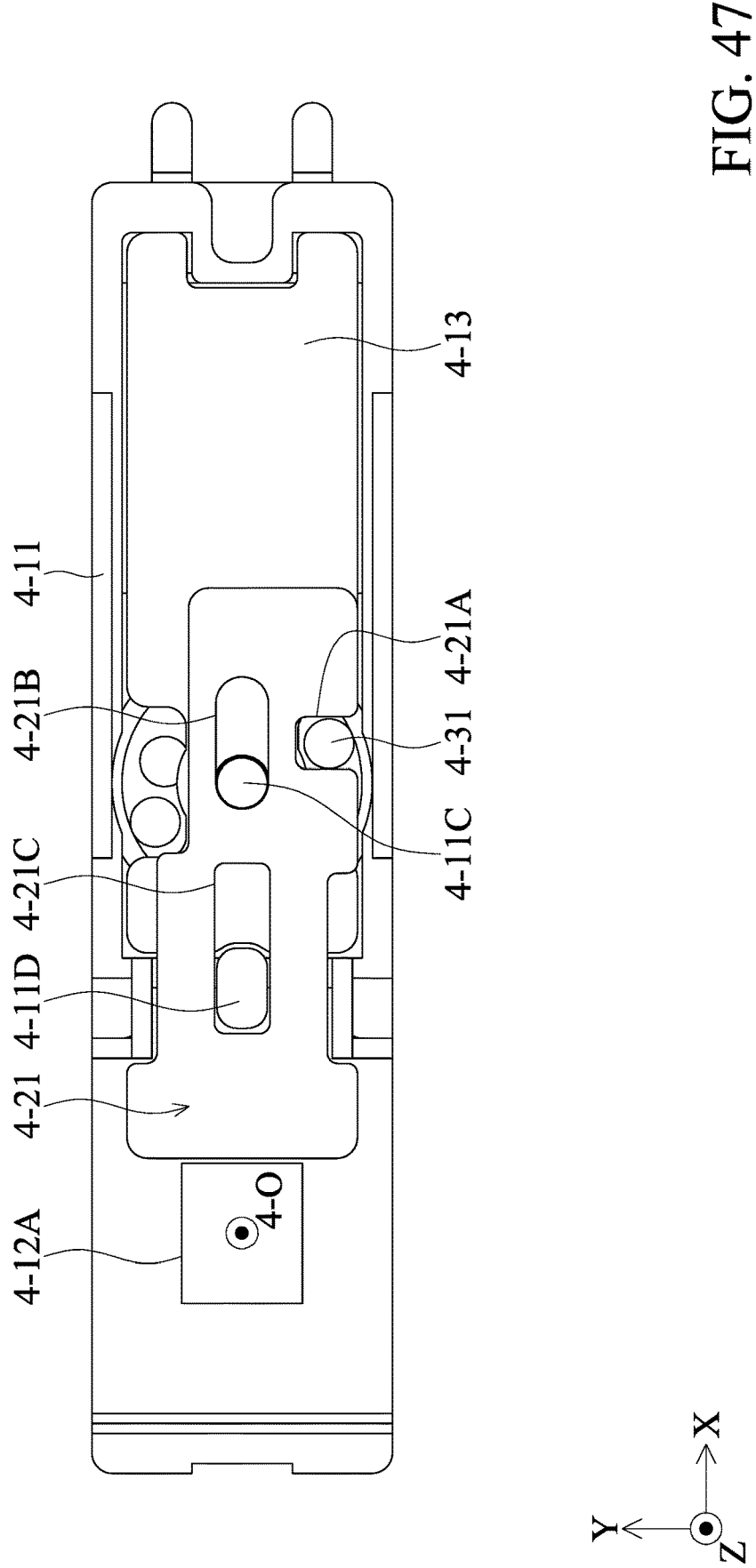
FIG. 47 is a schematic diagram of a partial structure of an optical element driving mechanism according to an embodiment of the present invention.
Figure 48:
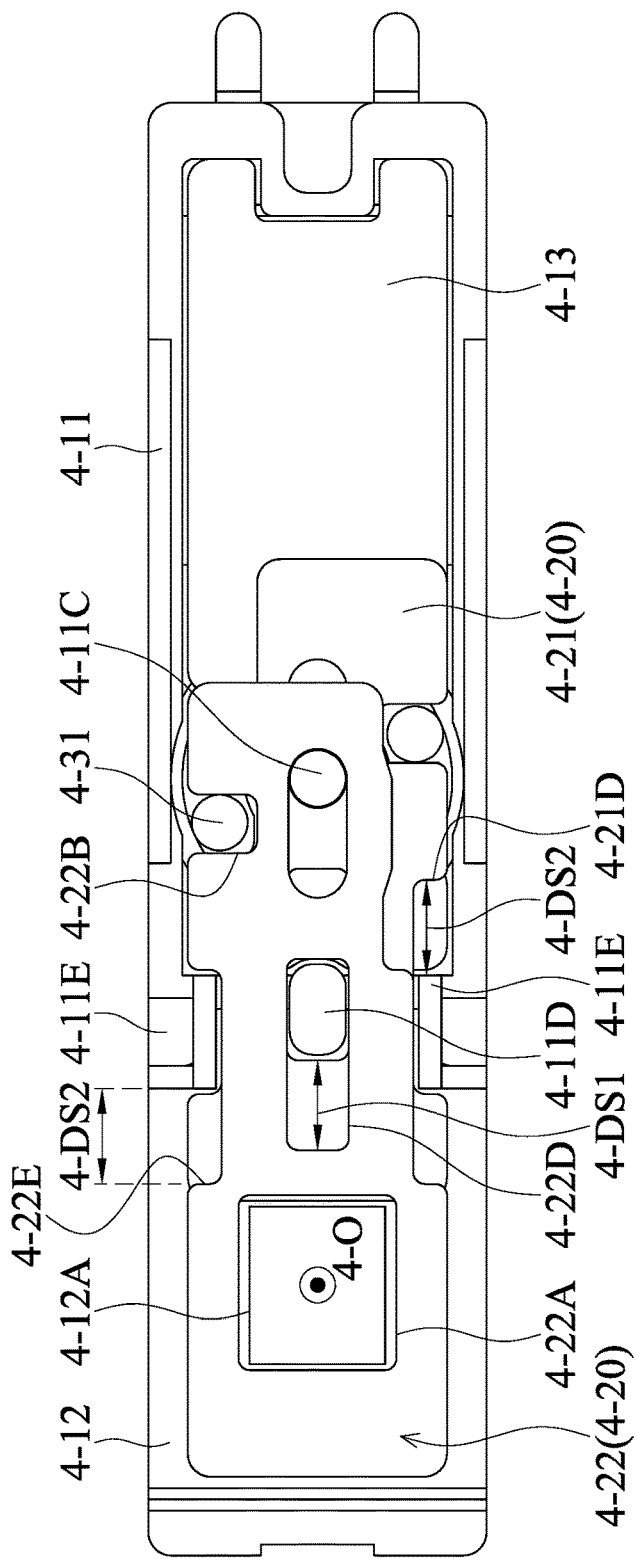
FIG. 48 is a schematic diagram of a partial structure of an optical element driving mechanism according to an embodiment of the present invention.

Refer to FIG. 47 to FIG. 48, which are schematic diagrams of a partial structure of the optical element driving mechanism 4-1 according to an embodiment of the present invention. The first shutter 4-21 has a first recessed portion 4-21A, a first shutter hole 4-21B, and a first shutter hollow 4-21C. The first recessed portion 4-21A is engaged with the magnetic element 4-31, the support shaft 4-11C of the base 4-11 passes through the first shutter hole 4-21B, and the main stopper 4-11D passes through the first shutter hollow 4-21C.

The second shutter 4-22 has a second shutter opening 4-22A, a second recessed portion 4-22B, a second shutter hole 4-22C, and a second shutter hollow 4-22D. The second shutter opening 4-22A allows the incident light 4-L to pass through, the second recessed portion 4-22B engages with the magnetic element 4-31, and the support shaft 4-11C of the base 4-11 passes through the second shutter hole 4-22C, the main stopper 4-11D passes through the second shutter hollow 4-22D.

In this embodiment, the material of the first shutter 4-21 and the second shutter 4-22 is polyethylene terephthalate (PET), and the surface layer is coated with carbon fiber, so that the whole has Non-fragile structure. However, the material is not limited to this, and can be changed to meet requirements. The first shutter 4-21 and the second shutter 4-22 have a roughly rectangular shape, and the length of the short side of the first shutter 4-21 and the second shutter 4-22 are longer than the length of the short side of the opening 4-12A, so as to achieve the shielding effect. A part of the first shutter 4-21 and the second shutter 4-22 are disposed in the slide rail 4-11F of the base 4-11. In this embodiment, the first shutter 4-21 and the second shutter 4-22 are shared the same slide rail 4-11F so as to miniaturize the mechanism. However, it is not limited to this, and can be changed to meet requirements, for example, the first shutter 4-21 and the second shutter 4-22 are disposed on different slide rails 4-11F.

The first shutter 4-21 and the second shutter 4-22 are disposed between the fixing plate 4-13 and the cover 4-14.

In this embodiment, as shown in FIG. 48, when viewed in a direction that is parallel with the axis 4-0, the first shutter 4-21 is below the second shutter 4-22, but is not limited this. The order of assembling of the first shutter 4-21 and the second shutter 4-22 may be changed. In other words, the first shutter 4-21 may be above the second shutter 4-22.

Figure 49:
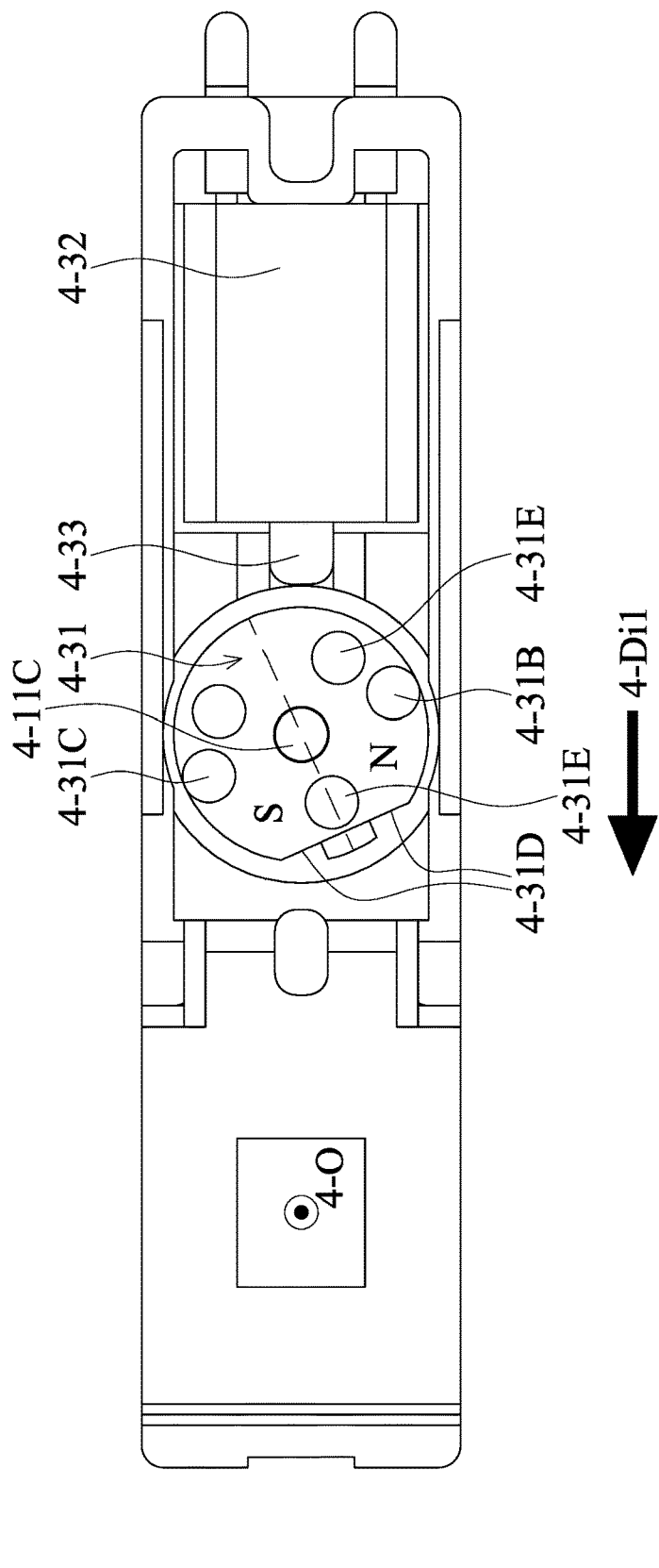
FIG. 49 is a schematic diagram of a partial structure of an optical element driving mechanism according to an embodiment of the present invention.

Refer to FIG. 49. FIG. 49 is a schematic diagram of a partial structure of an optical element driving mechanism 4-1 according to an embodiment of the present invention. The magnetic element 4-31 has a through hole 4-31A in the center, and a first protruding portion 4-31B and a second protruding portion 4-31C on the surface. The magnetic element 4-31 is disposed in the magnetic element receiving portion 4-11A via the shaft 4-11C to pass through the through hole 4-31A. The first protruding portion 4-31B is engaged with the first recessed portion 4-21A of the first shutter 4-21, and the second protruding portion 4-31C is engaged with the second recessed portion 4-22B of the second shutter 4-22 (as shown in FIG. 48).

The magnetic element 4-31 is a plastic magnet made by mixing plastic with iron oxide powder and then injection molding through a mold. The advantage of the plastic magnet is that it is easy to process and can obtain small-sized products, so that the optical element driving mechanism 4-1 may achieve miniaturization. In this embodiment, the magnetic element 4-31 has a cylindrical shape with a plurality of notches 4-31D, the notches 4-31D are located away from the driving coil 4-32 when assembled to the base 4-11, and there are a plurality of voids 4-31E on a surface of the magnetic element 4-31. The magnetic element 4-31 may be further reduced in weight without affecting the required magnetic field by these voids 4-31E and the notches 4-31D.

The magnetically permeable element 4-33 is disposed in the driving coil 4-32, and a direction of a winding axis of the driving coil 4-32 is parallel with the first direction 4-Di1. One end of the magnetically permeable element 4-33 is exposed from the driving coil 4-32, and is close to the magnetic element 4-31. A strong electromagnetic force may be generated when a current is applied to the driving coil 4-32 by covering the magnetically permeable element 4-33 with the driving coil 4-32. Moreover, the magnetically permeable element 4-33 is disposed close to the magnetic element 4-31, when the current is not applied, the attractive force between the magnetically permeable element 4-33 and the magnetic element 4-31 may make the magnetic element 4-31 in a stable state.

Figure 50:
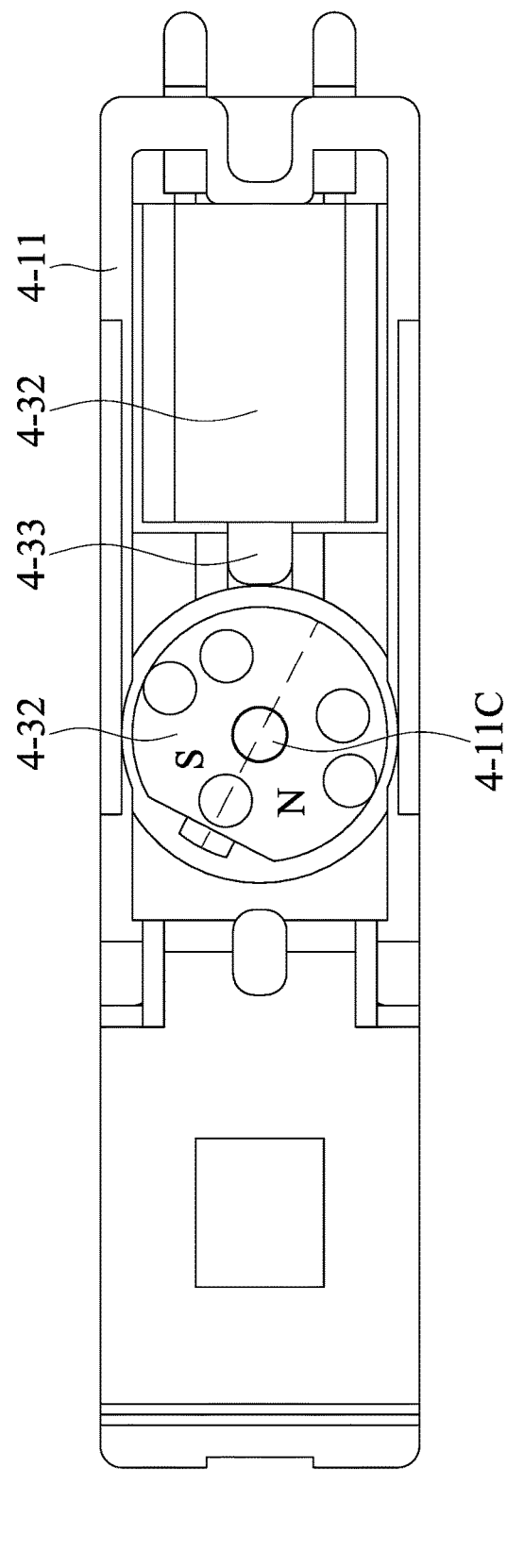
FIG. 50 is a schematic diagram of a partial structure of an optical element driving mechanism according to an embodiment of the present invention.

Refer to FIG. 49 to FIG. 50. FIG. 50 is a schematic diagram of a partial structure of the optical element driving mechanism 4-1 according to an embodiment of the present invention. When a current is applied to the driving coil 4-32, a magnetic field is generated at one end of the magnetically permeable element 4-33. The magnetic field interacts with the magnetic element 4-31, so that the magnetic element 4-31 may rotate around the shaft 4-11C as the center. In this embodiment, when the magnetic element 4-31 is assembled to the base 4-11, it is adjusted to a specific angle. As shown in FIG. 49, when no current is applied, the N-pole of the magnetic element is close to the magnetically permeable element 4-33. When a current is applied to the driving coil 4-32, a magnetic field is generated and a N-pole of the magnetic field is close to the exposed magnetically permeable element 4-33, which is mutually exclusive with the N-pole of the magnetic element and attracts the S-pole of the magnetic element, so the magnetic element 4-31 is driven to rotate at an angle, as shown in FIG. 50, so that the S pole of the magnetic element 4-31 is close to the N pole of the magnetic field. The magnetic element 4-31 may be rotated back to an initial position by applying an opposite current to the driving coil 4-32, so that the magnetic field which is close to the magnetically permeable element 4-33 may change from the N pole to S pole, which is mutually exclusive with the S-pole of the magnetic element 4-31 and attracts the N-pole of the magnetic element 4-31, so the magnetic element 4-31 is driven to rotate back to the initial position.

Figure 51A:
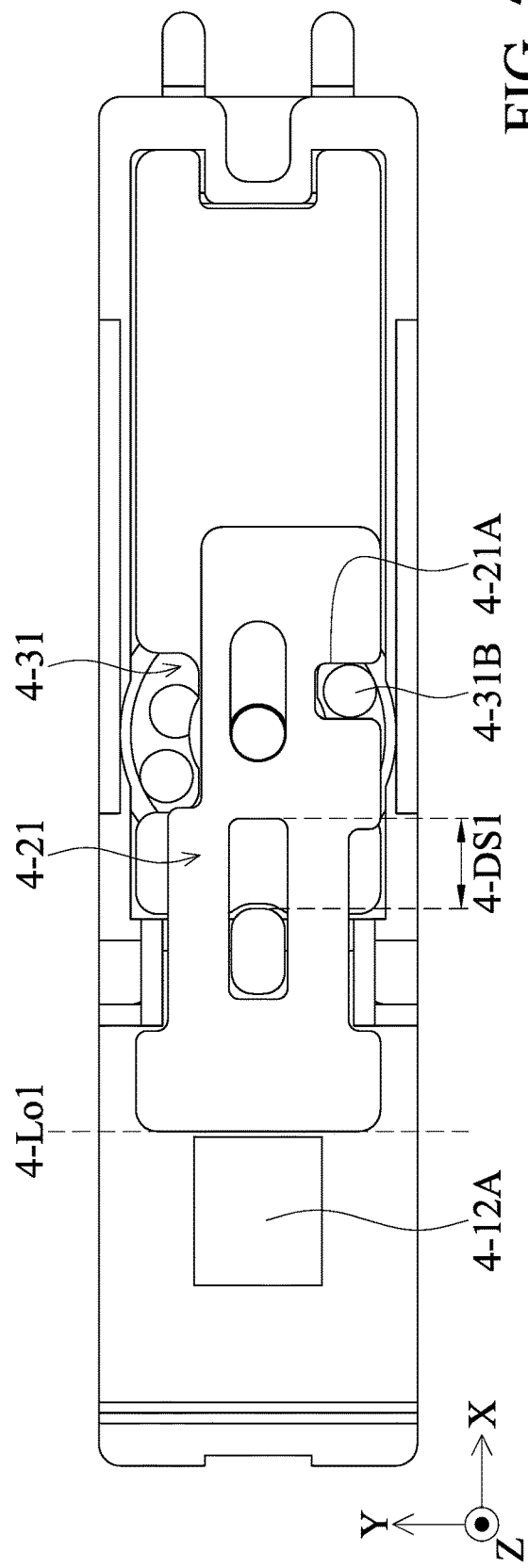
FIG. 51A is a schematic diagram of a partial structure of an optical element driving mechanism according to an embodiment of the present invention.
Figure 53:
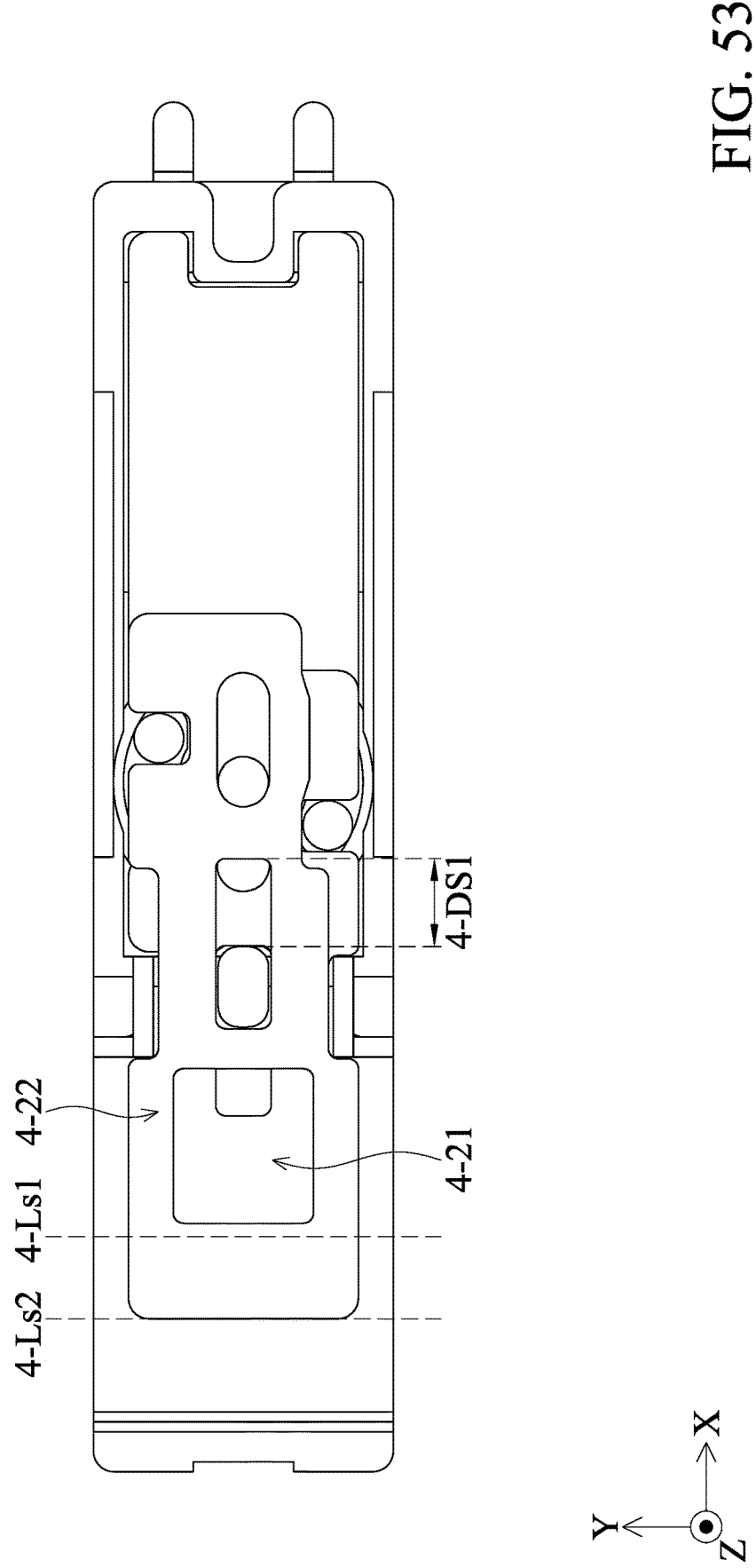
FIG. 53 is a schematic diagram of a partial structure of an optical element driving mechanism according to an embodiment of the present invention.

Refer to FIG. 51A to FIG. 53, which are schematic diagrams of a partial structure of an optical element driving mechanism 4-1 according to an embodiment of the present invention. FIG. 51A shows that the first shutter 4-21 is located at a first shutter initial position 4-Lo1 before the magnetic element 4-31 is rotated. FIG. 51B shows that the first shutter 4-21 is moved to a first shutter shielding position 4-Ls1 after the magnetic element 4-31 is rotated. FIG. 52A shows that the second shutter 4-22 is located at a second initial position 4-Lo2 before the magnetic element 4-31 is rotated. FIG. 52B shows that the second shutter 4-22 is moved to a second shielding position 4-Ls2 after the magnetic element 4-31 is rotated. FIG. 53 shows that the first shutter 4-21 and the second shutter 4-22 shied the opening 4-12A after the magnetic element 4-31 is rotated. As described above, the magnetic element 4-31 may be driven to rotate at an angle by the driving assembly 4-30, so that other elements connected to the magnetic element 4-31 may also be moved in a certain range. More specifically, as shown in FIG. 51A and FIG. 51B, the first shutter 4-21 is engaged with the first protruding portion 4-31B of the magnetic element 4-31 through the first recessed portion 4-21A. When the magnetic element 4-31 rotates an angle, the first shutter 4-21 moves from a first shutter initial position 4-Lo1 to the first shutter shielding position 4-Ls1 by a first distance 4-D1. In addition, as shown in FIG. 52A and FIG. 52B, the second shutter 4-22 is engaged with the second protruding portion 4-31C of the magnetic element 4-31 through the second recessed portion 4-22B. When the magnetic element 4-31 rotates an angle, the second shutter 4-22 moves from the second shutter initial position 4-Lo2 to the second shutter shielding position 4-Ls2 by a second distance 4-D2, and the first distance 4-D1 and the second distance 4-D2 are equal. In this embodiment, the first shutter 4-21 moves in the first direction 4-Di1, and the second shutter 4-22 moves in a second direction 4-Di2, and the second direction 4-Di2 is the opposite of the first direction 4-Di1. That is, the moving direction of the first shutter 4-21 is the opposite of the moving direction of the second shutter 4-22.

Figure 51B:
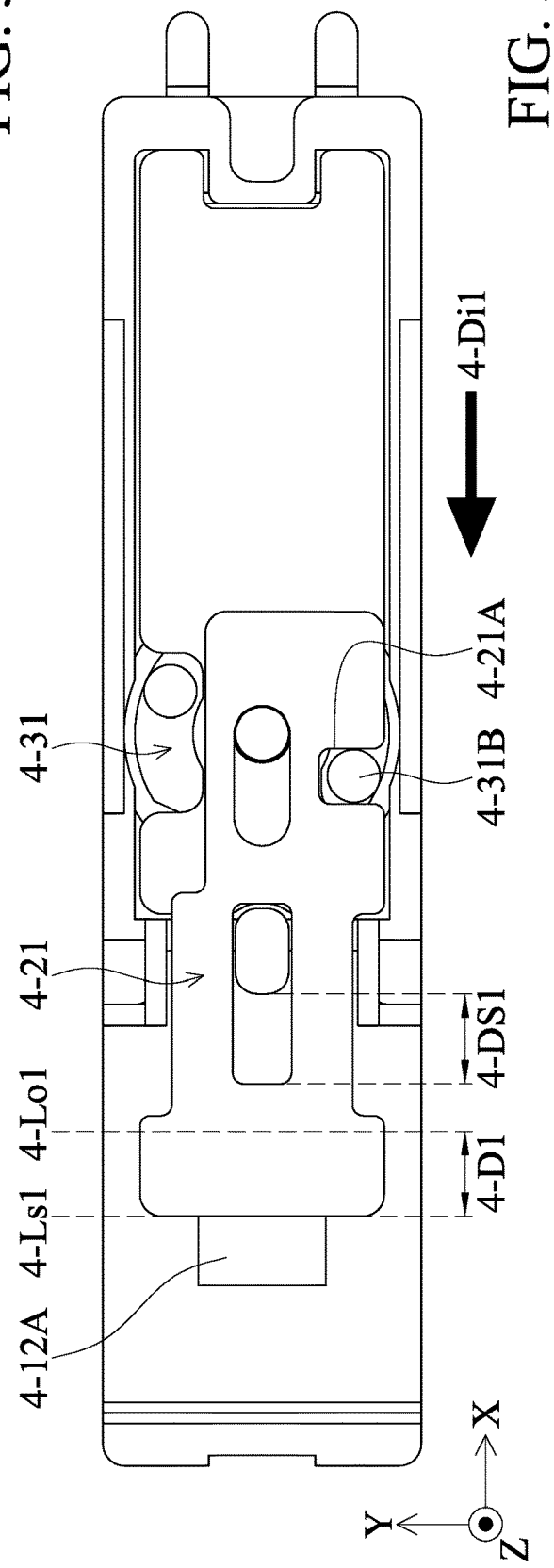
FIG. 51B is a schematic diagram of a partial structure of an optical element driving mechanism according to an embodiment of the present invention.

As shown in FIG. 53, when the first shutter 4-21 is located at the first shutter shielding position 4-Ls1, and the second shutter 4-22 is located at the second shutter shielding position 4-Ls2, the first shutter 4-21 and the second shutter 4-22 completely shield the opening 4-12A. More specifically, the first shutter 4-21 shields at least half of the area of the opening 4-12A (as shown in FIG. 51B), and the second shutter 4-22 also shields at least half the area of the opening 4-12A (as shown in FIG. 52B). When viewed in a direction parallel with the optical axis 4-O at the position of the opening 4-12A, the first shutter 4-21 and the second shutter 4-22 may partially overlap to shield the opening 4-12A completely.

There are two ways to stop the optical element driving mechanism 4-1. The first way is to control the rotation angle of the magnetic element 4-31 by the current input to the driving coil 4-32, and the optical element driving mechanism 4-1 may stop when the magnetic element 4-31 is driven to rotate to a certain angle. The second way is to dispose a stop portion, and the optical element driving mechanism 4-1 may stop when an element strikes the stop portion. This embodiment combines the two ways described above to control the magnetic element 4-31 to rotate in the certain angle, so that the movable portion 4-20 moves within the first distance 4-D1. Moreover, the movable portion 4-20 is restricted to moving within a first stopping distance 4-DS1 by the main stopper 4-11D being disposed in the first shutter hollow 4-21C and the second shutter hollow 4-22D. More specifically, refer to FIG. 48, and FIG. 51A to FIG. 53. When the movable portion 4-20 is in the initial position, a side wall of the main stopper 4-11D is in contact with a surface of the first shutter hollow 4-21C or a surface of the second shutter hollow 4-22D, and the distance between another side wall opposite the side wall and another surface opposite the surface is the first stopping distance 4-DS1. The first stopping distance 4-DS1 is slightly longer than half the length of the long side of the opening 4-12A, and is slightly longer than or equal to the first distance 4-D1. The movable section 4-20 may stop when the surface of the first shutter hollow 4-21C or the surface of the second shutter recess 4-22D touches the main stopper 4-11D. Therefore, with this structural design, the movable portion 4-20 may still be controlled so that it remains within the first stopping distance 4-DS1, even if the first shutter 4-21 or the second shutter 4-22 moves beyond the first distance 4-D1 because of the current control error.

In addition, in this embodiment, there are two auxiliary stopping portions 4-11E to further restrict the range of motion of the movable portion 4-20. The two auxiliary stoppers 4-11E protrude inward from the two side walls of the base 4-11. The distance between a stop surface 4-21D of the first shutter 4-21 and the auxiliary stopper 4-11E is the second stopping distance 4-DS2, and the distance between a stop surface 4-22E of the second shutter 4-22 and the auxiliary stop 4-11E is the second stopping distance 4-DS2. The movable portion 4-20 stops when the stop surface 4-21D of the first shutter 4-21 or the stop surface 4-22E of the second shutter 4-22 touches the auxiliary stopper 4-11E, so that the movable portion 4-20 is restricted to moving within the second stopping distance 4-DS2. In this embodiment, the first stopping distance 4-DS1 is shorter than the second stopping distance 4-DS2, but it is not limited to this, and can be changed to meet requirements.

Moreover, the movable portion 4-20 is restricted to moving only within a certain range by the main stopper 4-11D and the auxiliary stopper 4-11E as described above. Therefore, it may not happen that the movable portion 4-20 exceeds the movement range, and the magnetic element 4-31 is rotated by more than the certain angle, so that the magnetic element 4-31 may not be driven back to the initial position by the driving coil 4-32.

When the opposite current is input, the operation of each element is described below in detail. When the opposite current is applied to the driving coil 4-32, the driving coil 4-32 drives the magnetic element 4-31 to rotate back to the initial direction, and the first shutter 4-21 moves from the first shutter shielding position 4-Ls1 back to the first shutter initial position 4-Lo1 by the first distance 4-D1, and the second shutter 4-22 moves from the second shutter shielding position 4-Ls2 back to the second shutter initial position 4-Lo2 by the second distance 4-D2. Therefore, the opening 4-12A returns from the state of being shielded to the state of not being shielded.

Figure 54:
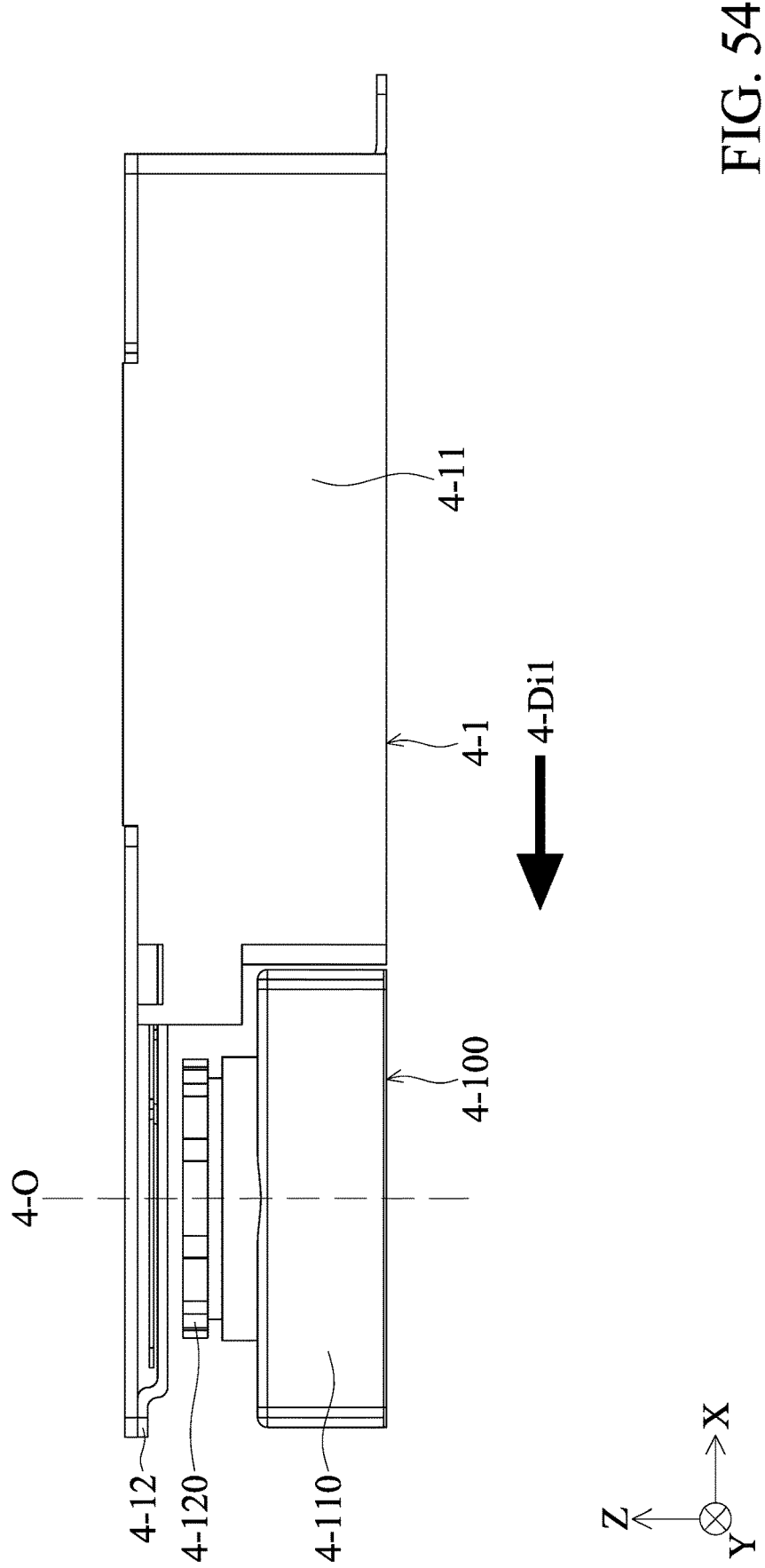
FIG. 54 is a side view of an optical element driving mechanism according to another embodiment of the present invention.
Figure 55:
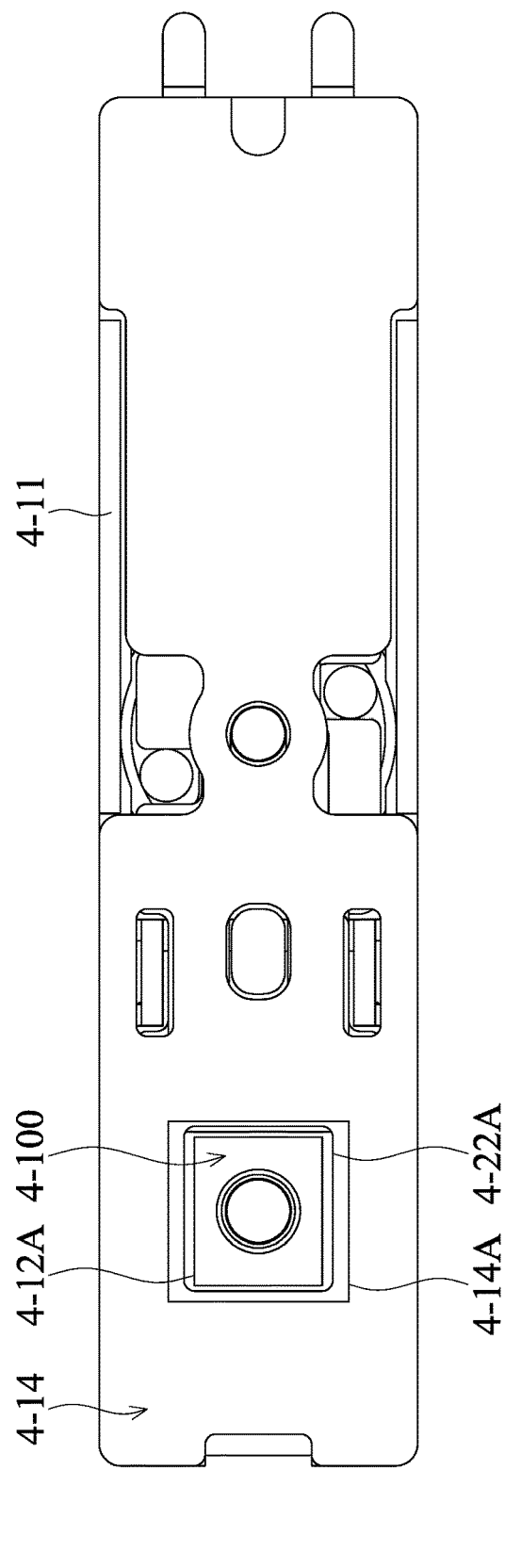
FIG. 55 is a top view of an optical element driving mechanism according to another embodiment of the present invention.

Refer to FIG. 54 to FIG. 55. FIG. 54 is a side view of an optical element driving mechanism 4-1 according to another embodiment of the present invention, and FIG. 55 is a top view of an optical element driving mechanism 4-1 according to another embodiment of the present invention. With the operation as described above, the movable portion 4-20 may be applied as optical elements such as shutter blades, filters, deflectors, polarizers, etc., and the optical element driving mechanism 4-1 may be used to control the amount of light. As shown in FIG. 54, the optical element driving mechanism 4-1 further includes an optical module 4-100. The optical module 4-100 has a rectangular structure and includes a casing 4-110, a lens 4-120, and an image sensor (not shown). The optical module 4-100 is disposed below the frame 4-12. The optical axis 4-O passes through the center of the optical module 4-100. When viewed in a direction parallel with the first direction 4-Di1, the optical module 4-100 overlaps the base 4-11, the magnetic element 4-31, and the driving coil 4-32.

The incident light 4-L enters the optical module 4-100 through the cover opening 4-14A, the second shutter opening 4-22A, and the opening 4-12A in order. In order to avoid interference of reflected light and stray light, a light absorbing material is coated on a side of the frame 4-12 near the optical module 4-100. In addition, a simulation of light cone is used to determine the size of the different openings. The closer the opening is to the lens 4-120 of the optical module 4-100, the smaller the opening is. That is, the size of the outer cover opening 4-14A is larger than the second shutter opening 4-22A, the second shutter opening 4-22A is larger than the opening 4-12A, and the opening 4-12A is larger than the lens 4-120.

The arrangement of the optical module 4-100 is not limited to the above structure. For example, the frame 4-12 can be disposed to the inside of the optical module 4-100 so that the incident light 4-L may pass through the lens 4-120 and then through the movable portion, such the structural design may be applied to, for example, a single lens reflex camera.

In summary, the present embodiment provides an optical element driving mechanism including a fixed portion, a movable portion, and a driving assembly. The movable portion is movably disposed on the fixed portion. The driving assembly is disposed on the fixed portion and drives the movable portion to move relative to the fixed portion. Thereby, it is possible to provide an optical mechanism that is more compact and can be applied to various kind of light quantity control.

The Fifth Embodiment Group

Figure 56:
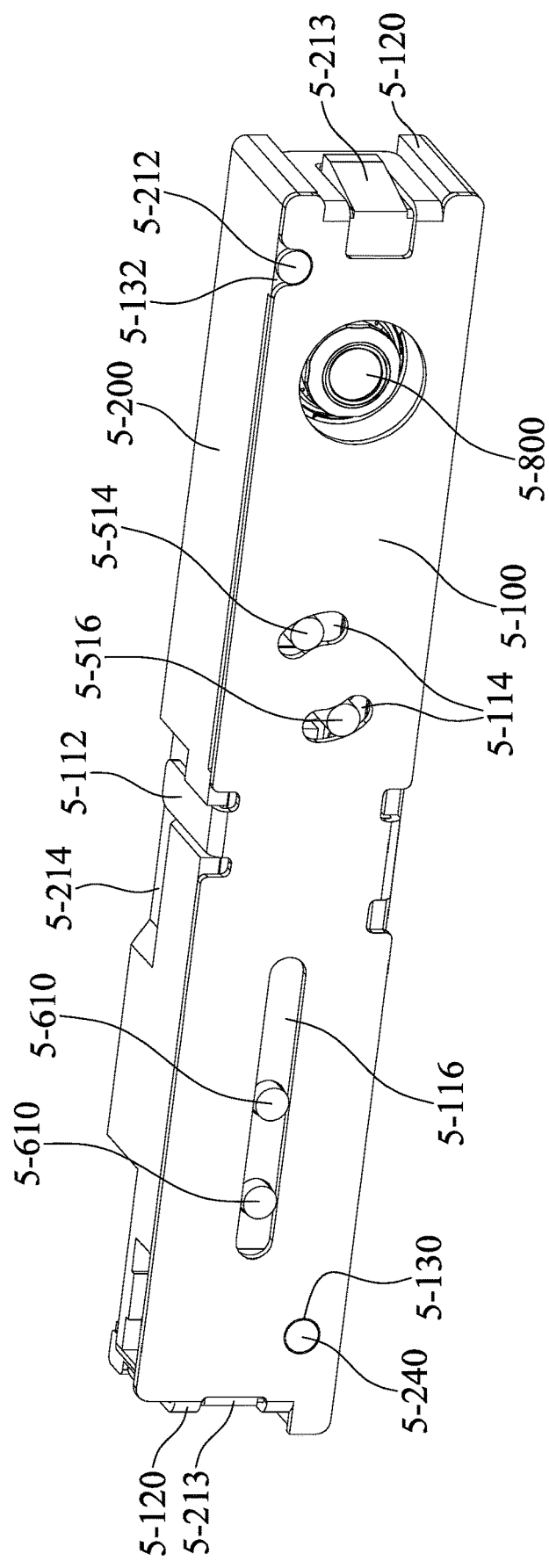
FIG. 56 is a schematic view of an optical element driving mechanism according to some embodiments of the present disclosure.
Figure 57:
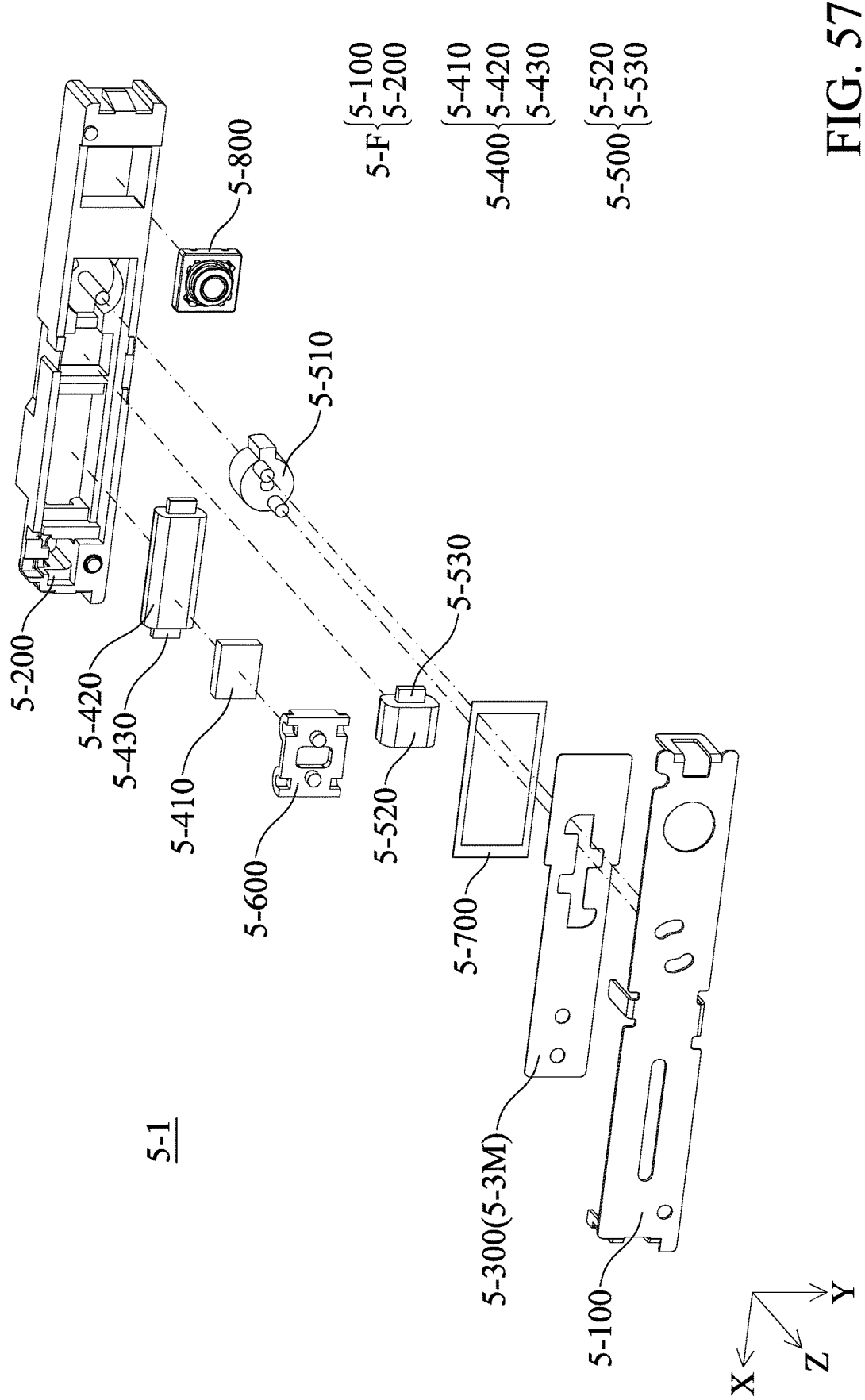
FIG. 57 is an exploded view of the optical element driving mechanism.
Figure 58:
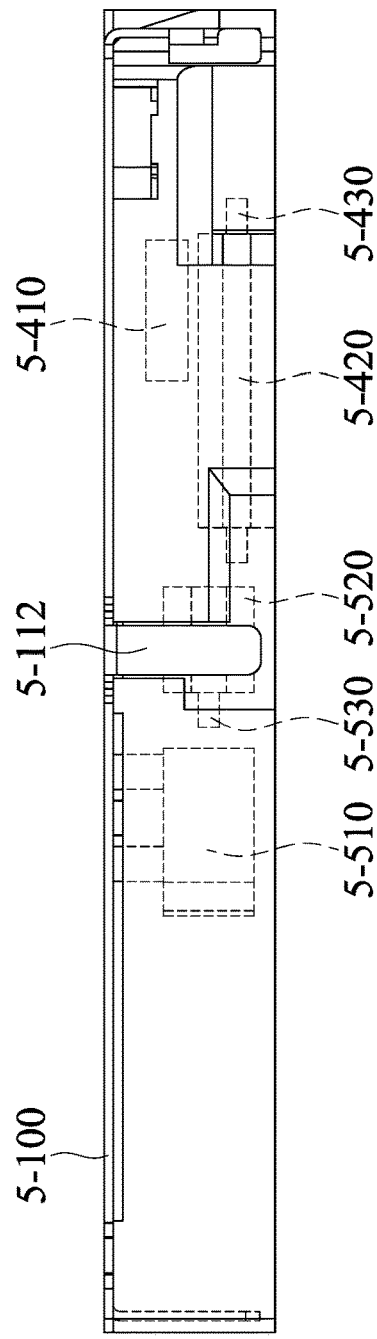
FIG. 58 is a side view of the optical element driving mechanism.

Refer to FIG. 56 to FIG. 58. FIG. 56 is a schematic view of an optical element driving mechanism 5-1 according to some embodiments of the present disclosure, FIG. 57 is an exploded view of the optical element driving mechanism 5-2, and FIG. 58 is a side view of the optical element driving mechanism 5-1. The optical element driving mechanism 5-1 mainly includes case 5-100, a base 5-200, an optical element 5-300, a first driving assembly 5-400 (which includes a first magnetic element 5-410, a second magnetic element 5-420, and a third magnetic element 5-430), a second driving assembly 5-500 (which includes a fourth magnetic element 5-520 and a fifth magnetic element 5-530), a positioning element 5-510, a holder 5-600, and a limiting element 5-700. An optical module 5-800 may be disposed in the optical element driving mechanism 5-1. The optical module 5-800 may be a voice coil motor (VCM) having an optical unit (such as a lens, a mirror, a prism, a beam splitter, or an aperture), or it may be the optical unit itself.

In some embodiments, the case 5-100 and the base 5-200 may be combined as an outer case of the optical element driving mechanism 5-1. Furthermore, the case 5-100 and the base 5-200 may be referred to as a fixed portion 5-F.

The optical element 5-300 may be moved in the X direction (the first direction) to act as a shutter of the optical module 5-800 or to block the optical module 5-800 when not using the optical module 5-800 (to be described later) to increase security. In some embodiments, the optical element 5-300 may be referred to as a movable portion 5-M and is movably disposed on the fixed portion 5-F.

Figure 59:
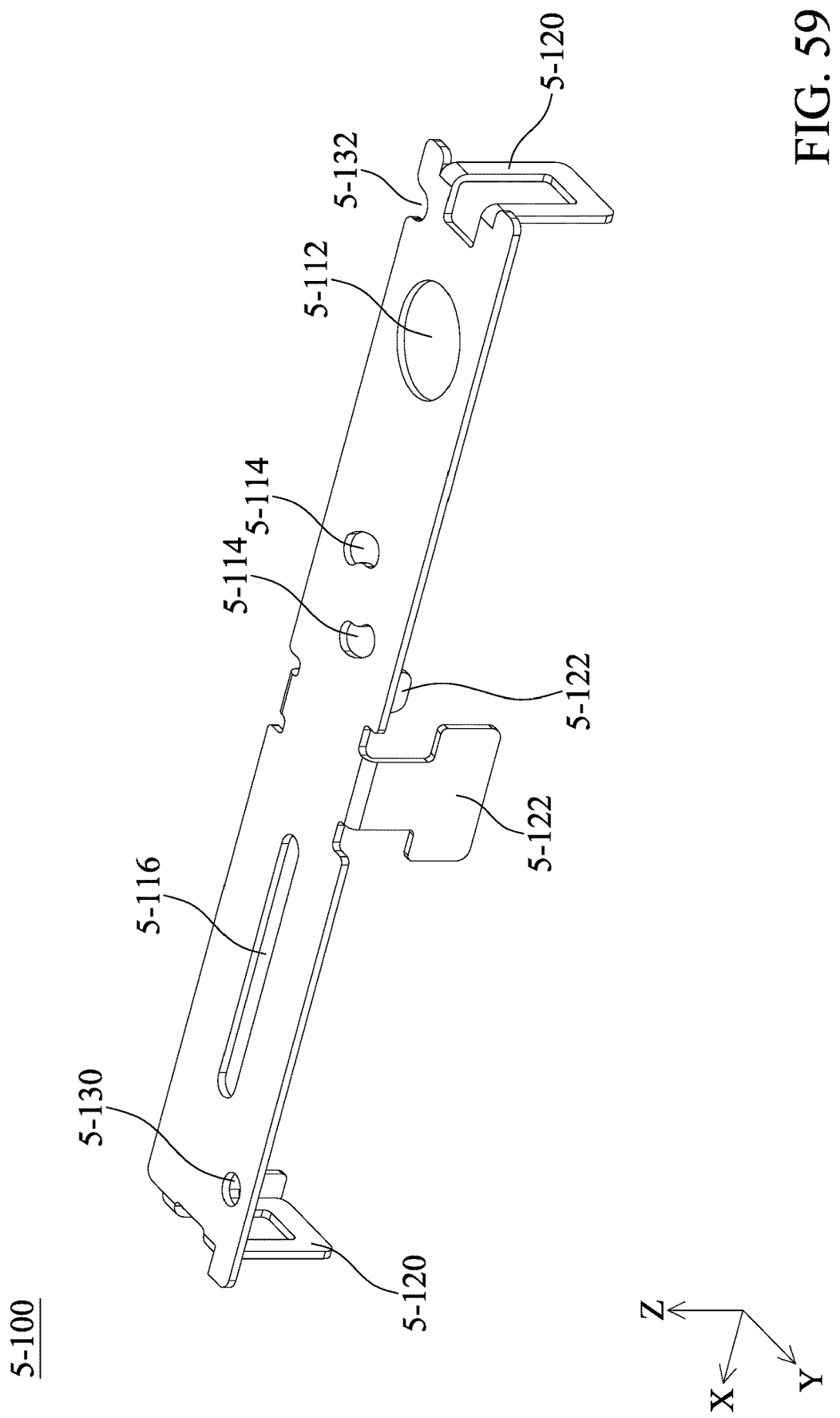
FIG. 59 is a schematic view of the case.

FIG. 59 is a schematic view of the case 5-100. The case 5-100 may include an optical opening 5-112, a pair of connecting openings 5-114, a passage 5-116, connecting portions 5-120 positioned on short sides of the case 5-100, connecting portions 5-122 positioned on long sides of the case 5-100, a positioning opening 5-130, and a positioning recess 5-132.

As shown in FIG. 56 and FIG. 59, the optical opening 5-112 allows the optical module 5-800 to be exposed, so that the optical module 5-800 may capture images from outside. The connecting opening 5-114 may allow the limiting portions 5-514 and 5-516 of the positioning element 5-510 to rotate, and the passage 5-116 allows the positioning element 5-610 of the holder 5-600 to move in the passage 5-116 (to be described later).

Figure 60:
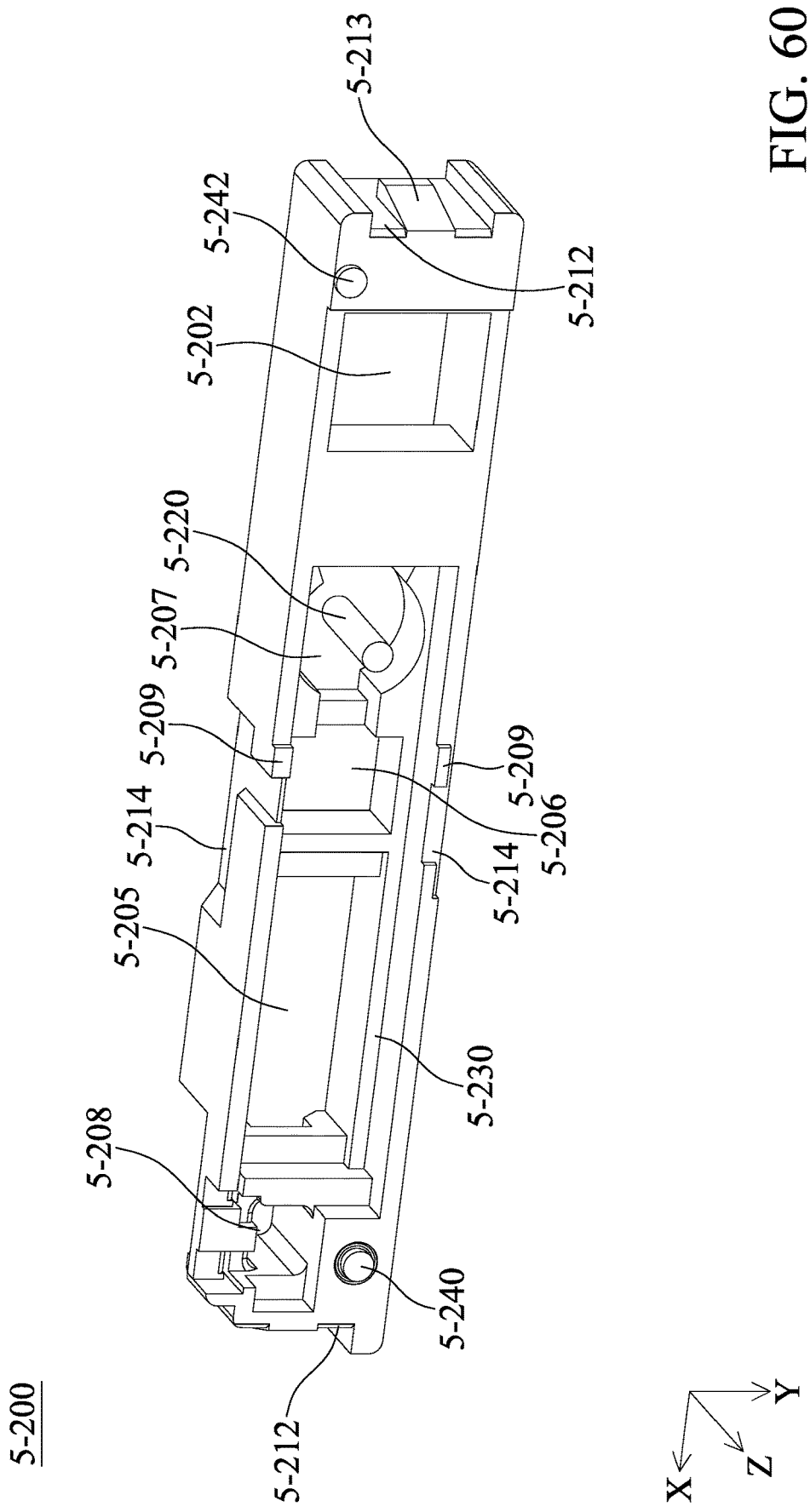
FIG. 60 and FIG. 61 are schematic views of the base when viewed in different directions.
Figure 61:
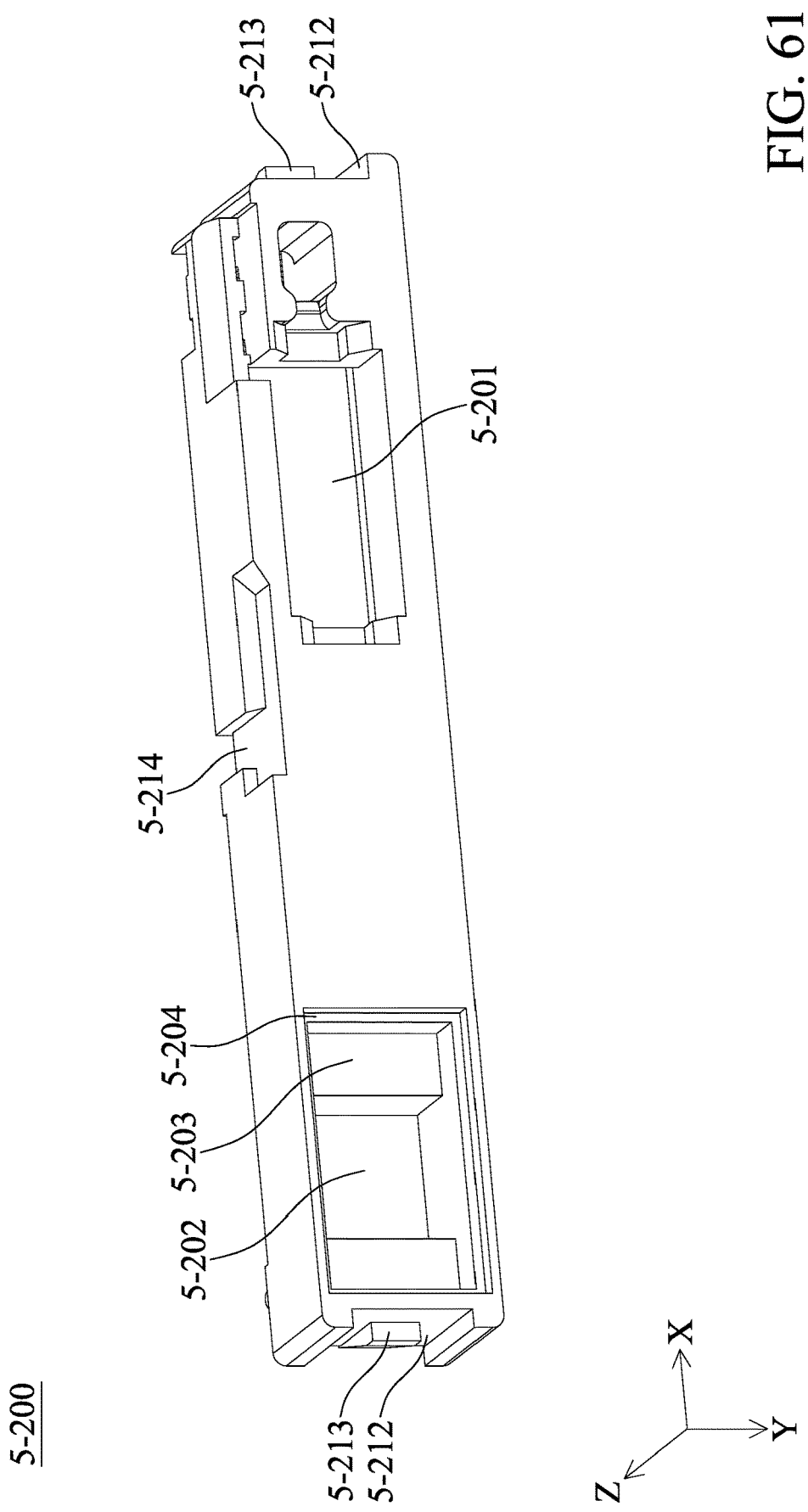

FIG. 60 and FIG. 61 are schematic views of the base 5-200 when viewed in different directions. The base 5-200 may include a recess 5-201 and a concave portion 5-203 positioned at one side of the base 5-200, an opening 5-202 in the concave portion 5-203, a recess at the side of the concave portion 5-203, and recesses 5-205, 5-206, 5-207, and 5-208 positioned at another side of the base 5-200, a protruding portion 5-209 positioned at a side of the base 5-200, concave portions 5-212 positioned at opposite sides of two short sides of the base 5-200, protruding portions 5-213 in the concave portions 5-212, concave portions 5-214 positioned at long sides of the base 5-200, a column 5-220 in the recess 5-207, contact portions 5-230 on opposite sides of the recess 5-205, a first positioning portion, and a second positioning portion 5-242.

As shown in FIG. 56, the first positioning portion 5-240 and the second positioning portion 5-242 of the base 5-200 may be positioned in the positioning opening 5-130 and the positioning recess 5-132 of the case 5-100, respectively, to define the position of the case 5-100 relative to the base 5-200. The elements (such as the case 5-100 or the base 5-200) may have a manufacturing tolerance, and the positioning recess 5-132 may allow the elements to be assembled to each other even if tolerance occurs in these elements.

In some embodiments, the optical module 50800 may be disposed at the opening 5-202 and the concave portion 5-203 of the base 5-200, and the light incident side of the optical module 5-800 may be exposed from the opening 5-202. In other words, as shown in FIG. 56, the opening 5-20 and the optical module 5-800 at least partially overlap each other when viewed in the Z direction (the second direction) to allow light to pass through the opening 5-202 to reach the optical module 5-800. In some embodiments, the optical module 5-800 may be affixed to the base 5-200 with glue, and the recess 5-204 may store excess glue to prevent the glue from coming onto contact with other elements.

In some embodiments, an electronic element (not shown) may be disposed in the recess 5-201 of the base 5-200, such as a chip, and the first driving assembly 5-400 may be positioned between the electronic element and the positioning element 5-510. The electronic element may control the operation of the optical element driving mechanism 5-1. Furthermore, a circuit (not shown) may be disposed in the recess 5-208 and electrically connected to the first driving assembly 5-400 to provide electrical signal to the driving assembly 5-400. The first driving assembly 5-400 is positioned between the recess 5-208 and the positioning element 5-510.

The connecting portion 5-120 of the case 5-100 may be positioned in the concave portion 5-212 of the base 5-200 at the short sides of the optical element driving mechanism 5-1, and the protruding portion 5-213 may be exposed from the connecting portion 5-120. As a result, the case 5-100 and the base 5-200 may be engaged with each other. Furthermore, the connecting portion 5-122 of the case 5-100 may be positioned in the concave portion 5-214 of the base 5-200 at the long sides of the optical element driving mechanism 5-1, to allow the connecting portion 5-122 to be in direct contact with the base 5-200, which further defines the position of the case 5-100 and the base 5-200. Moreover, as shown in FIG. 58, the connecting portion 5-122 may be positioned between the first driving assembly 5-400 and the positioning element 5-510, and the second driving assembly 5-500 and the connecting portion 5-122 may be at least partially overlap each other when viewed in a third direction (Y direction) to achieve miniaturization.

Figure 62:
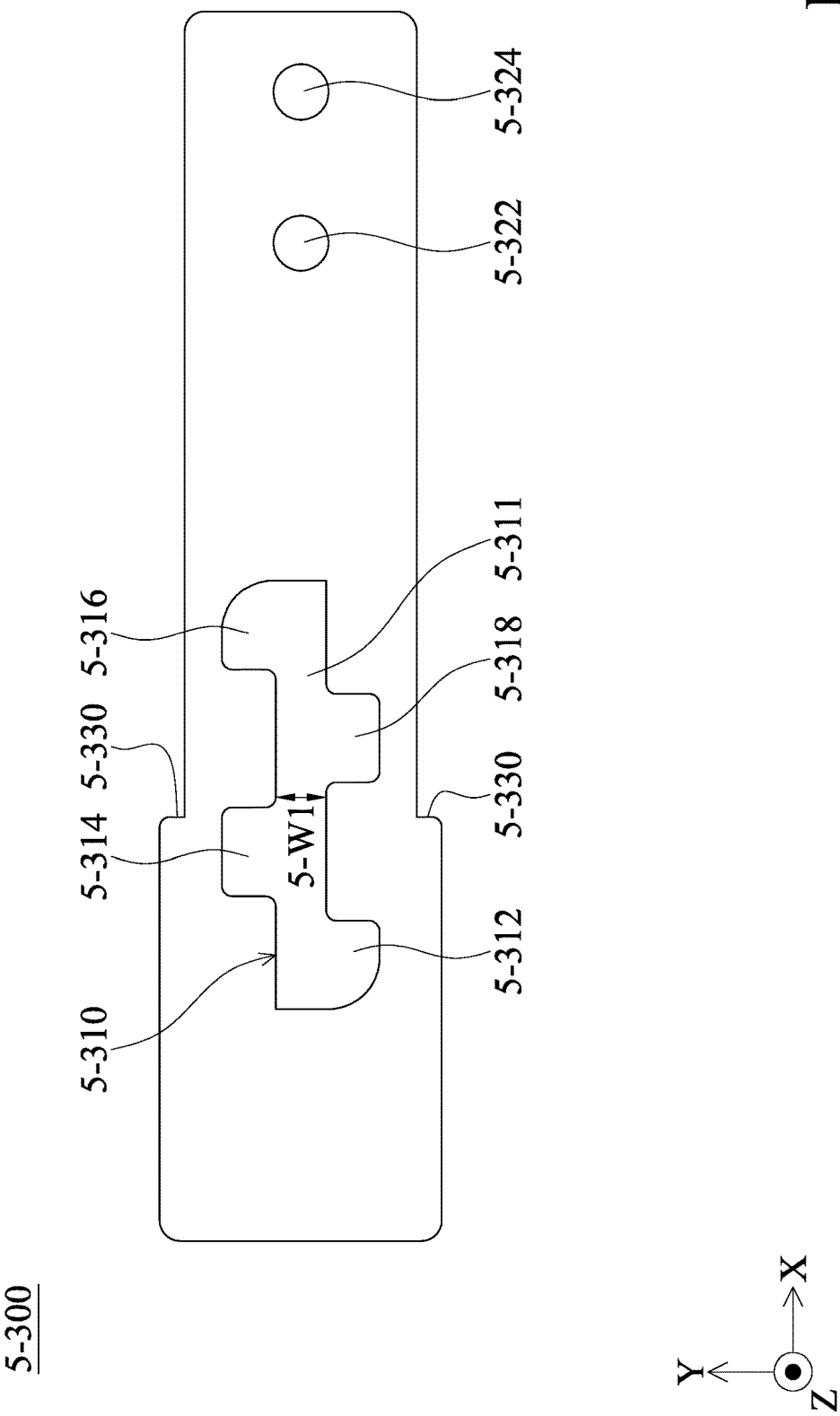
FIG. 62 is a top view of the optical element.

FIG. 62 is a top view of the optical element 5-300. In some embodiments, the optical element 5-300 may be plate-shaped. An opening 5-310 may be formed on the optical element 5-300, the opening 5-310 has notches 5-312, 5-314, 5-316, 5-318 and a passage connecting the notches 5-312, 5-314, 5-316, 5-318. Moreover, the optical element 5-300 has openings 5-322 and 5-324. Stopping portions 5-300 are formed at sides of the optical element 5-300. In some embodiments, the width of the passage 5-311 is 5-W in the Y direction.

Figure 63:
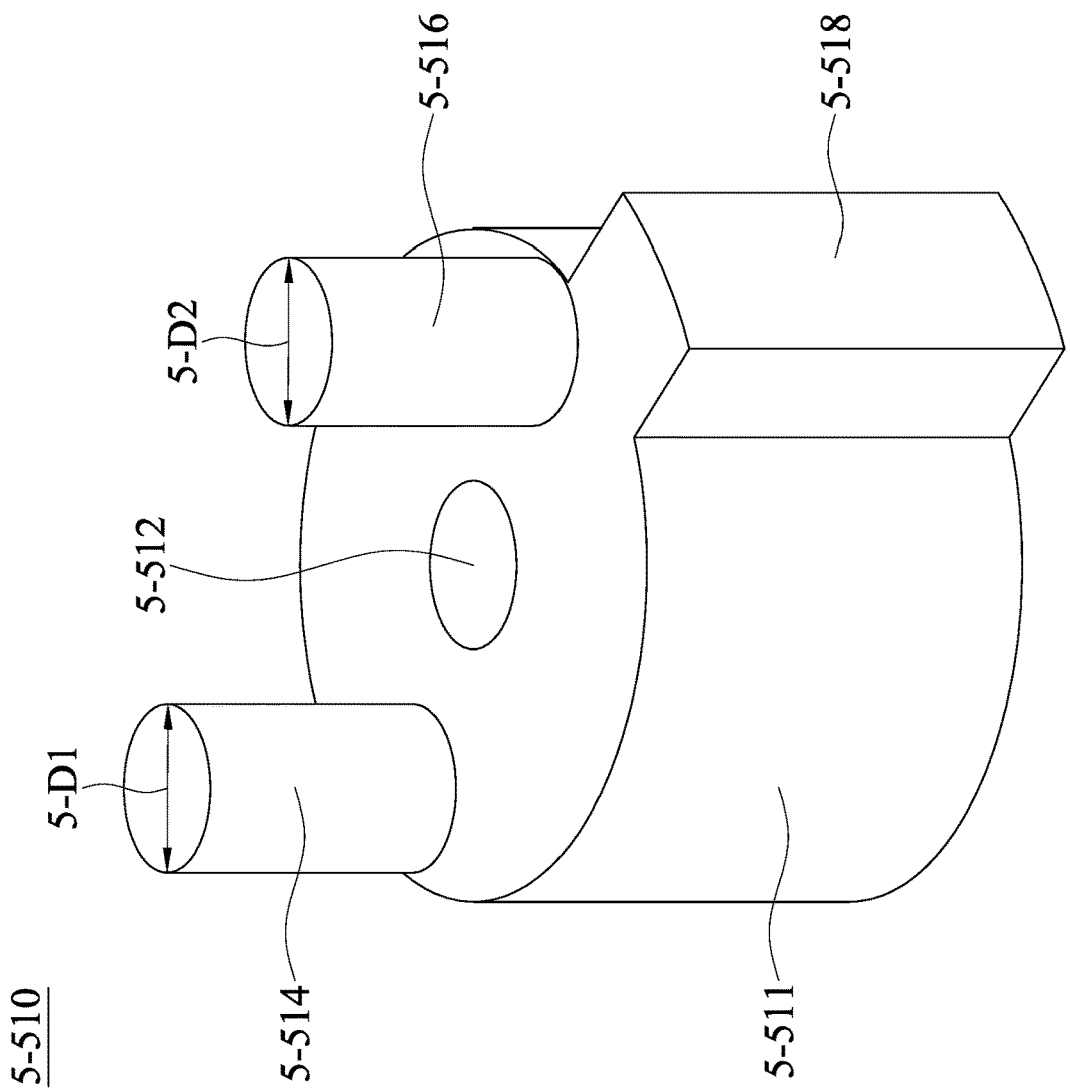
FIG. 63 is a schematic view of the positioning element.

FIG. 63 is a schematic view of the positioning element 5-510. The positioning element 5-510 may include a column-like shaped main body 5-511. The main body 5-511 has a hole 5-512 running through the main body 5-511, and limiting portions 5-514 and 5-516 extending in the Z direction (second direction). Furthermore, a stopping portion 5-518 may be formed at the side of the main body 5-511 and extending from the main body 5-511 in the X direction (the first direction). In some embodiments, the limiting portions 5-514 and 5-516 may be column-like shaped, and the diameters of the limiting portions 5-514 and 5-516 may be 5-D1 and 5-D2, respectively. In some embodiments, diameter 5-D1 may be substantially identical to diameter 5-D2.

Figure 64:
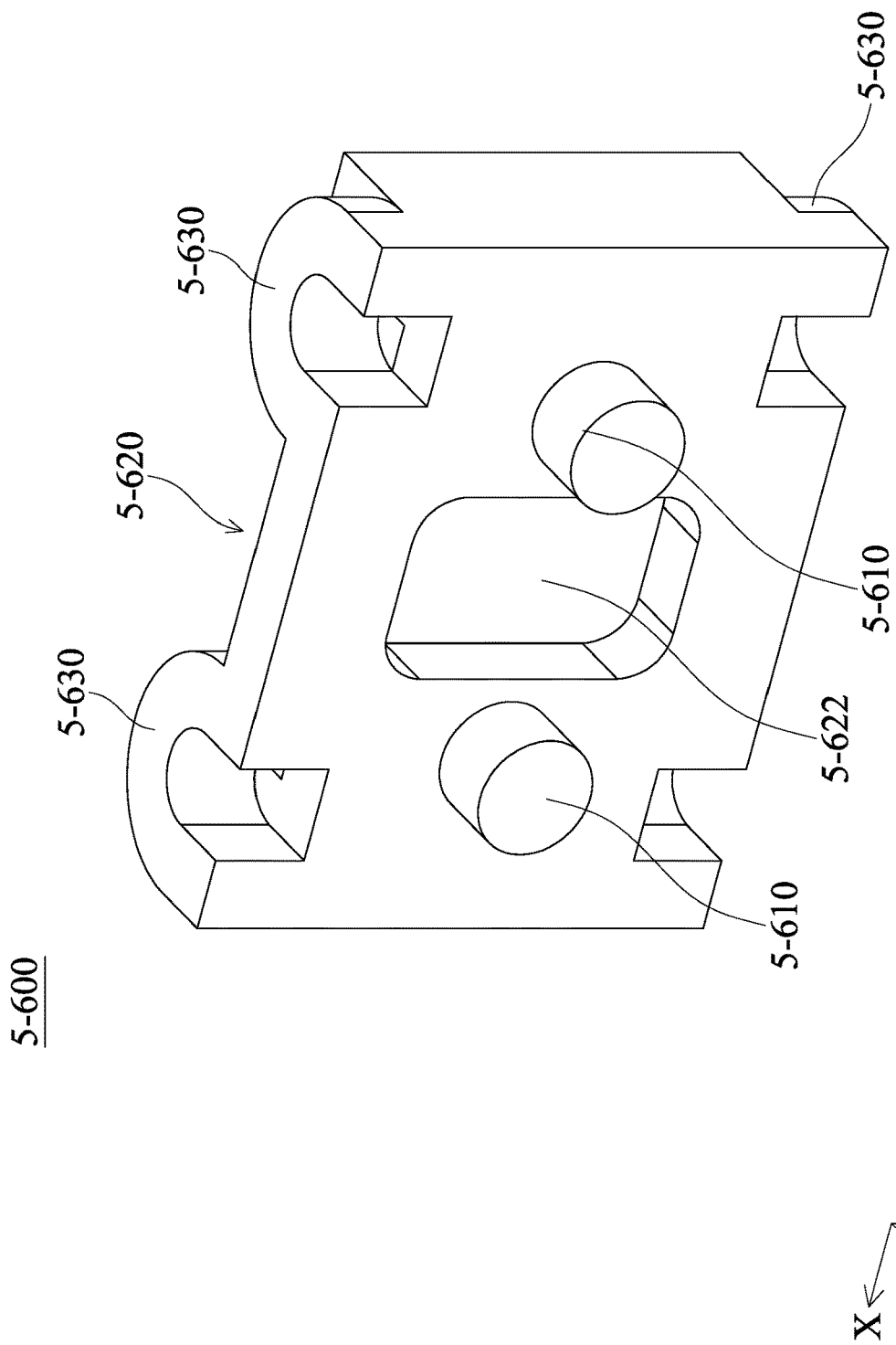
FIG. 64 is a schematic view of the holder.

FIG. 64 is a schematic view of the holder 5-600. The holder 5-600 may include a main body 5-605, two positioning elements 5-610 on one side of the main body 5-605, a recess 5-620 on another side of the main body 5-605, and an opening 5-622 on the main body 5-605. Furthermore, in some embodiments, a plurality of contact portions 5-630 may be formed on the side of the main body 5-605, wherein the sides of the contact portions 5-630 may be arc-shaped to reduce friction between the contact portions 5-630 and other elements (such as the base 5-200).

Figure 65:
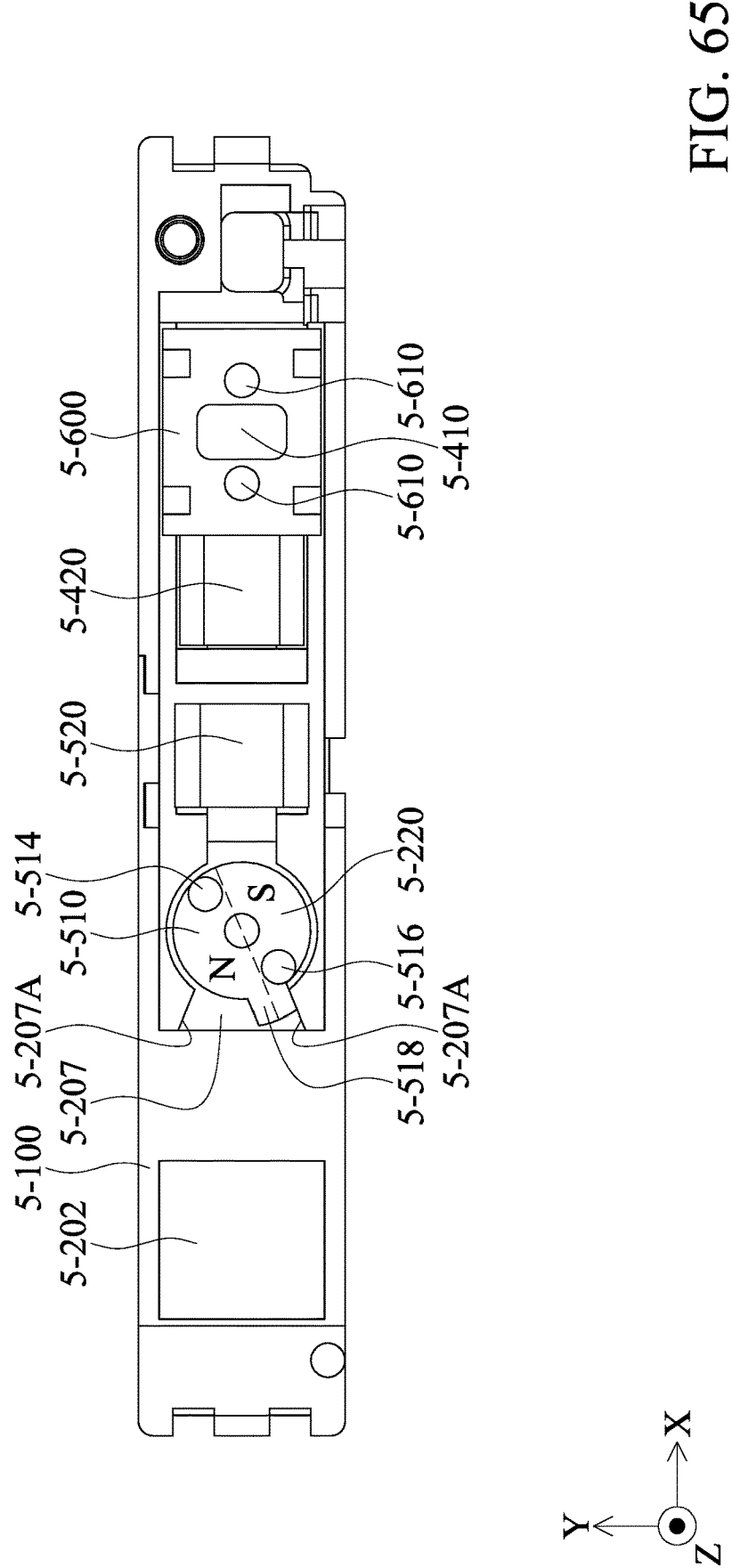
FIG. 65 and FIG. 66 are schematic views of the positioning element during operation.
Figure 66:
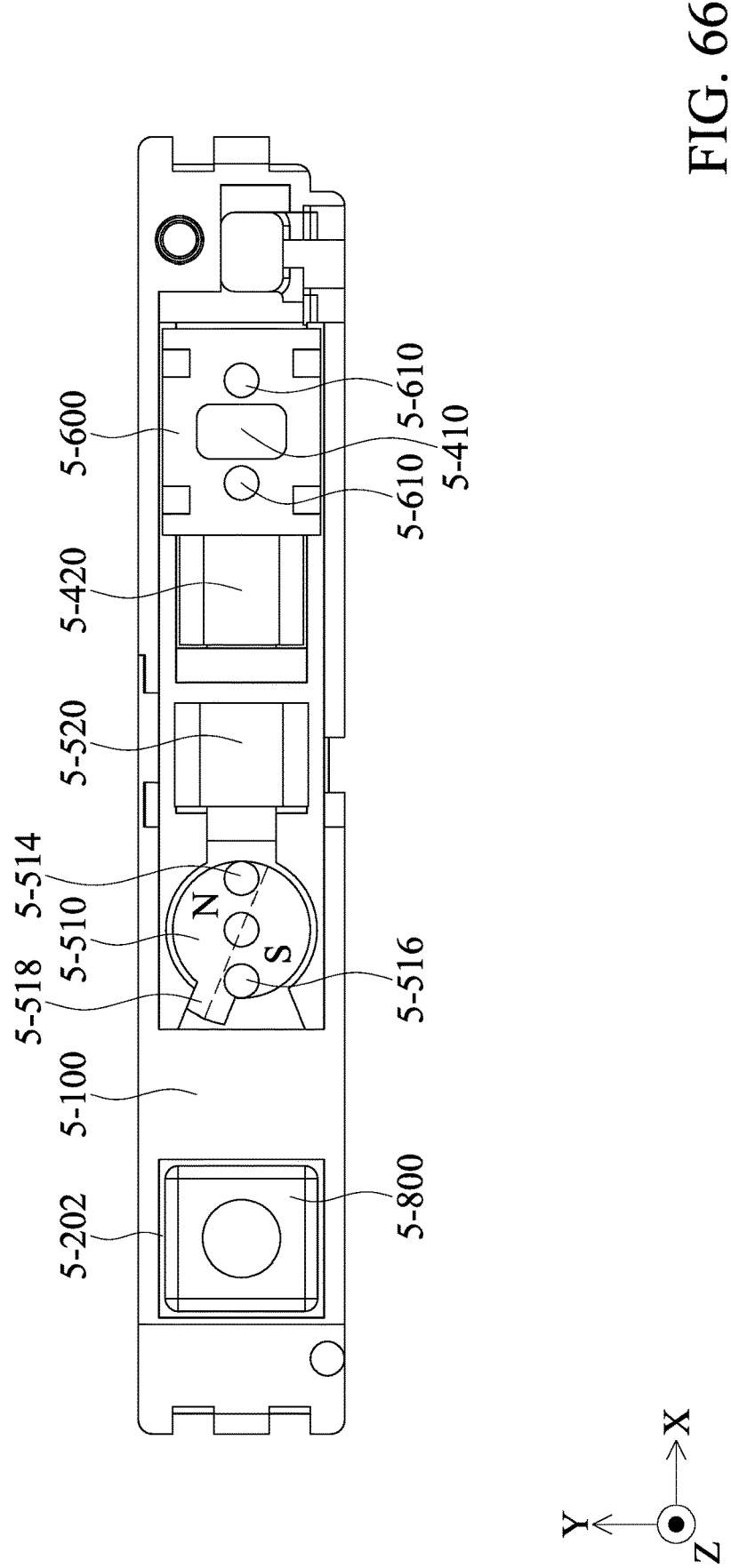

FIG. 65 and FIG. 66 are schematic views of the positioning element 5-510 during operation. The second magnetic element 5-420 and the third magnetic element 5-430 may be disposed in the recess 5-205 of the base 5-200 (FIG. 60), the fourth element 5-520 and the fifth magnetic element 5-530 may be disposed in the recess 5-206 of the base 5-200, and the positioning element 5-510 may be disposed in the recess 5-207 of the base 5-200. Furthermore, the third magnetic element 5-430 may be disposed in the second magnetic element 5-420 and partially exposed from the second magnetic element 5-420, and the fifth magnetic element 5-530 may be disposed in the fourth magnetic element 5-520 and partially exposed from the fourth magnetic element 5-520.

As shown in FIG. 65 and FIG. 66, the positioning element 5-510 may rotate in the recess 5-207 using the column 5-220 that passes through the hole 5-512 as a rotational axis, until the stopping portion 5-518 comes into contact with the side 5-207A of the recess 5-207. It should be noted that the limiting portions 5-514 and 5-516 are not arranged in the X direction in FIG. 65, and the limiting portions 5-514 and 5-516 are substantially arranged in the X direction in FIG. 66.

It should be noted that the positioning element 5-510 may be a magnet, and the magnetic pole directions may be shown in FIG. 65 and FIG. 66. In some embodiments, the magnetic pole directions of the positioning element 5-510 may be exchanged, and is not limited thereto. In some embodiments, the fourth magnetic element 5-520 may be a coil, and the fifth magnetic element 5-530 may be magnetic permeable material disposed in the coil. In other words, the fourth magnetic element 5-520 and the fifth magnetic element 5-530 may act as an electromagnet. When current with different directions is pass to the fourth magnetic element 5-520, the fourth magnetic element 5-520 will interact with the magnetic field of the positioning element 5-510 to generate an electromagnetic force to rotate the positioning element 5-510 in different directions for controlling the position of the positioning element 5-510. Furthermore, the second driving assembly 5-500 and the first driving assembly 5-400 may be separated for a distance to prevent magnetic interference from occurring.

In some embodiments, the first driving assembly 5-400, the second driving assembly 5-500 and the positioning element 5-510 are arranged in the first direction (the X direction) to reduce the size on other directions and to control the direction of magnetic force. Furthermore, the limiting element 5-700 (FIG. 57) may be used to limit the movable range of the elements (such as the positioning element 5-510) in the optical element driving mechanism 5-1 in the Z direction to prevent the elements in the optical element driving mechanism 5-1 from falling out. For example, the limiting element 5-700 may be disposed between the case 5-100 and the positioning element 5-510, which means the limiting element 5-700 may be disposed between the positioning element 5-510 and the fixed portion 5-F.

Figure 67:
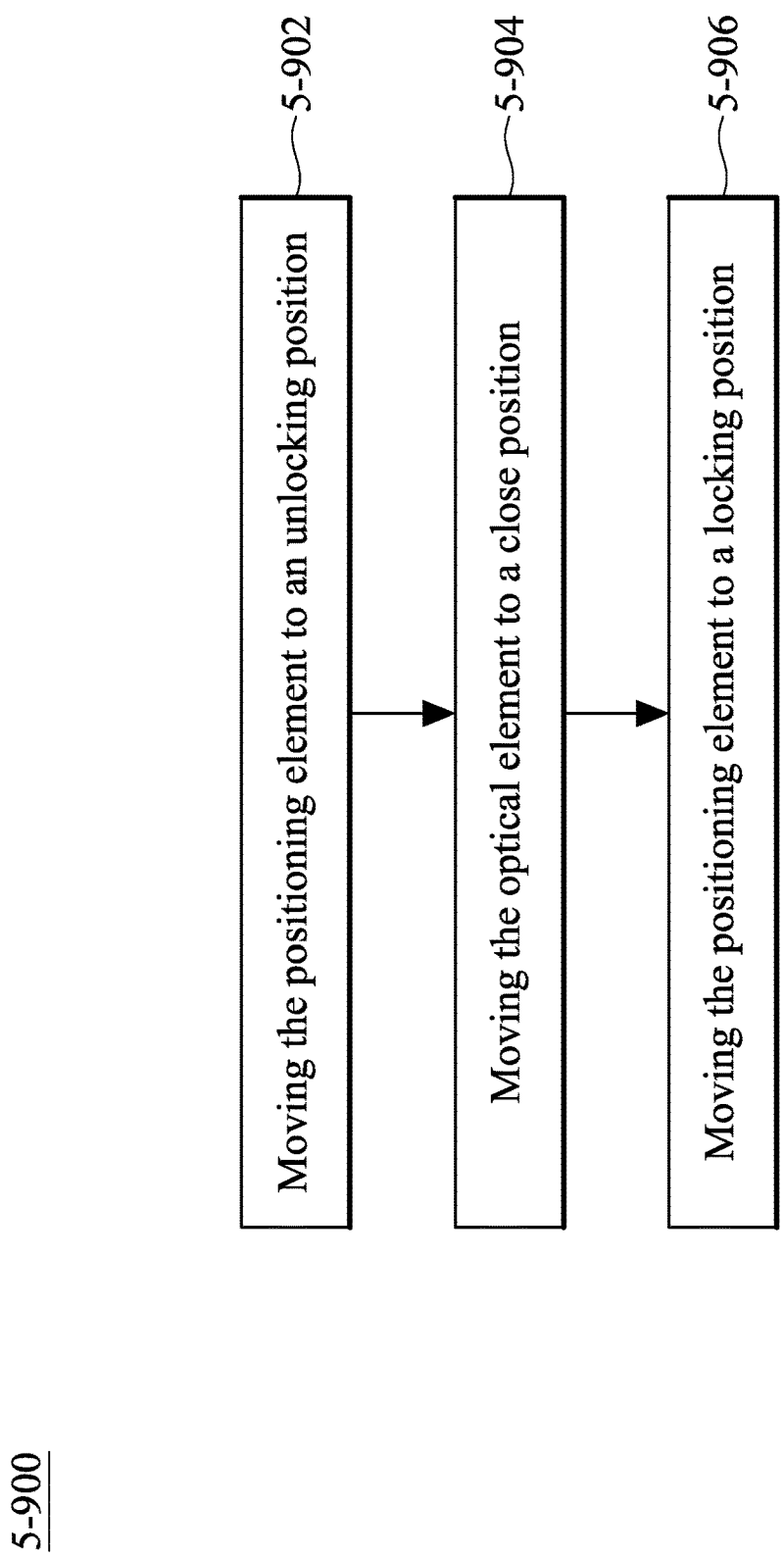
FIG. 67 and FIG. 68 are block diagrams of methods for operating the optical element driving mechanism.
Figure 68:
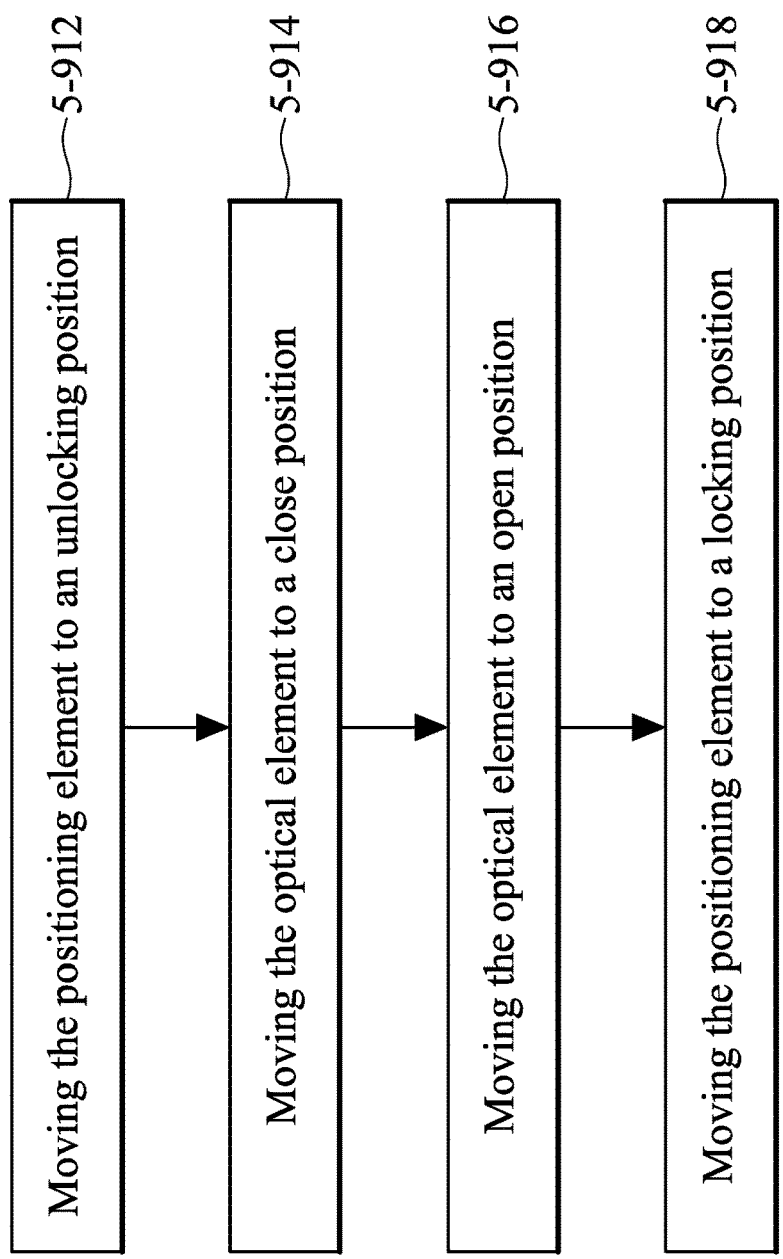
Figure 69:
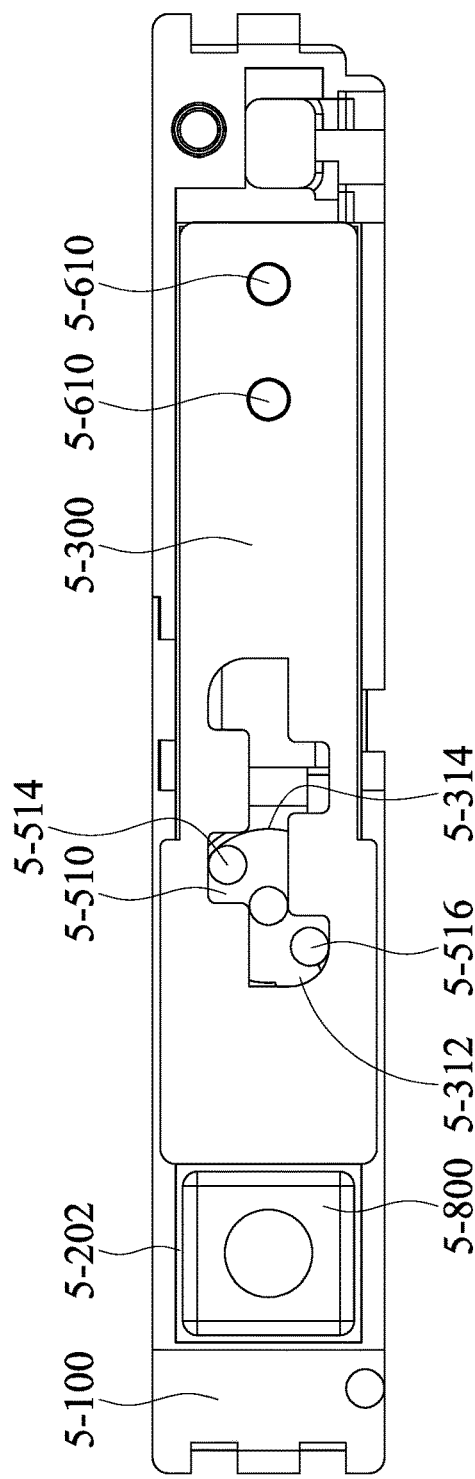
FIG. 69 to FIG. 74 are schematic views of the optical element driving mechanism during operation.

FIG. 67 and FIG. 68 are block diagrams of methods 5-900, 5-910 for operating the optical element driving mechanism 5-1, and FIG. 69 to FIG. 74 are schematic views of the optical element driving mechanism 5-1 during operation.

Figure 70:
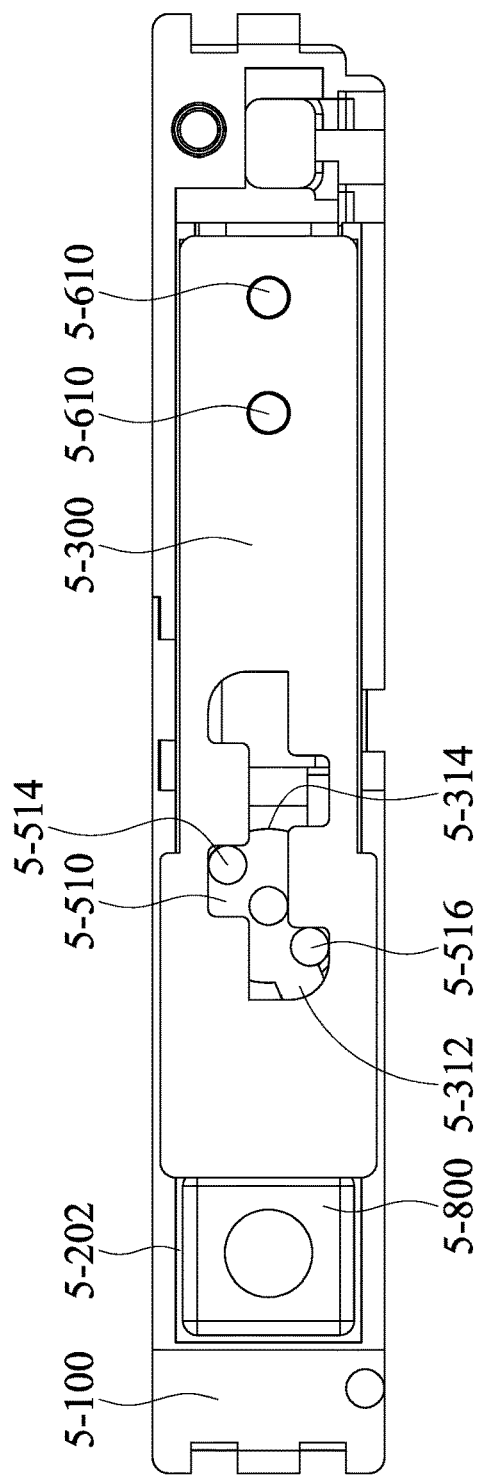

When the optical element driving mechanism 5-1 is not operating, the limiting portions 5-514 and 5-516 of the positioning element 5-510 may pass through the optical element 5-300 and in the notches 5-314 and 5-312, respectively. In other words, the positing element 5-510 is in a locking position, and the optical element 5-300 cannot move freely on the contact portions 5-230 (FIG. 60) of the base 5-200. For example, as shown in FIG. 70, when the optical element 5-300 is moved to the left by an external force, the limiting portions 5-514 and 5-516 may come into contact with the sides of the notches 5-314 and 5-312, respectively, to limit the movable range of the optical element 5-300. As a result, the optical element 5-300 may be prevented from blocking the opening 5-202 and the optical module 5-800 will allow light to pass through the opening 5-202 to the optical module 5-800. In some embodiments, if the optical element 5-300 is moved to right, the stopping portion 5-330 of the optical element 5-300 may in contact with the protruding portion 5-209 (not shown) of the base 5-200 to limit the position of the optical element 5-300.

Figure 71:
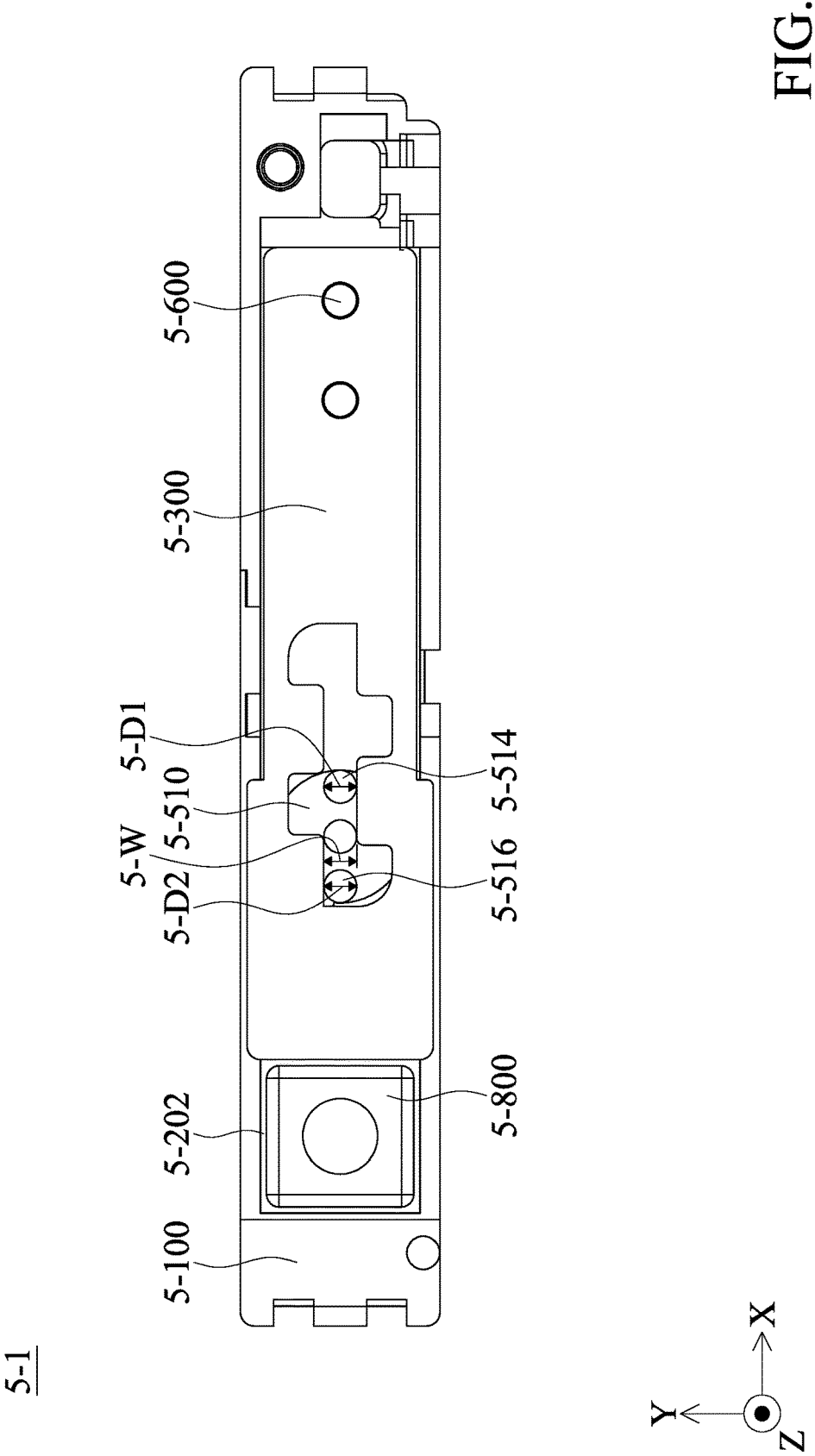

The operation method 5-900 of the optical element driving mechanism 5-1 includes an operation 5-902 for moving the positioning element 5-510 to an unlocking position, which corresponds to FIG. 71. In FIG. 71, the positioning element 5-510 rotates to allow the limiting portions 5-514 and 5-516 to be substantially arranged in the X direction, i.e. parallel to the extension direction of the passage 5-311. The width 5-W of the passage 5-311 may be designed to be greater than the diameter 5-D1 of the limiting portion 5-514 and the diameter 5-D2 of the limiting portion 5-516 to allow the limiting portion 5-514 and the limiting portion 5-516 to pass through the passage 5-311. It should be noted that the optical module 5-800 is still exposed from the opening 5-202.

It should be noted that the holder 5-600 may be fixed by the positioning element 5-610 and the optical element 5-300, the first magnetic element 5-410 may be disposed in the recess 5-620 of the holder 5-600, exposed from the opening 5-622, and arranged with the second magnetic element 5-420 in the second direction (the Z direction), and the holder 5-600 may be disposed between the optical element 5-300 and the first driving assembly 5-400. As a result, the optical element 5-300 may be moved with the first magnetic element 5-410. For example, the first magnetic element 5-410 may include magnet, and the second magnetic element 5-420 and the third magnetic element 5-430 may be a coil and magnetic permeable material disposed in the coil. In other words, the second magnetic element 5-420 and the third magnetic element 5-430 may act as an electromagnet. As a result, current having different directions may be provided to the second magnetic element 5-420 to control the position of the first magnetic element 5-410 and the optical element 5-300.

Figure 72:
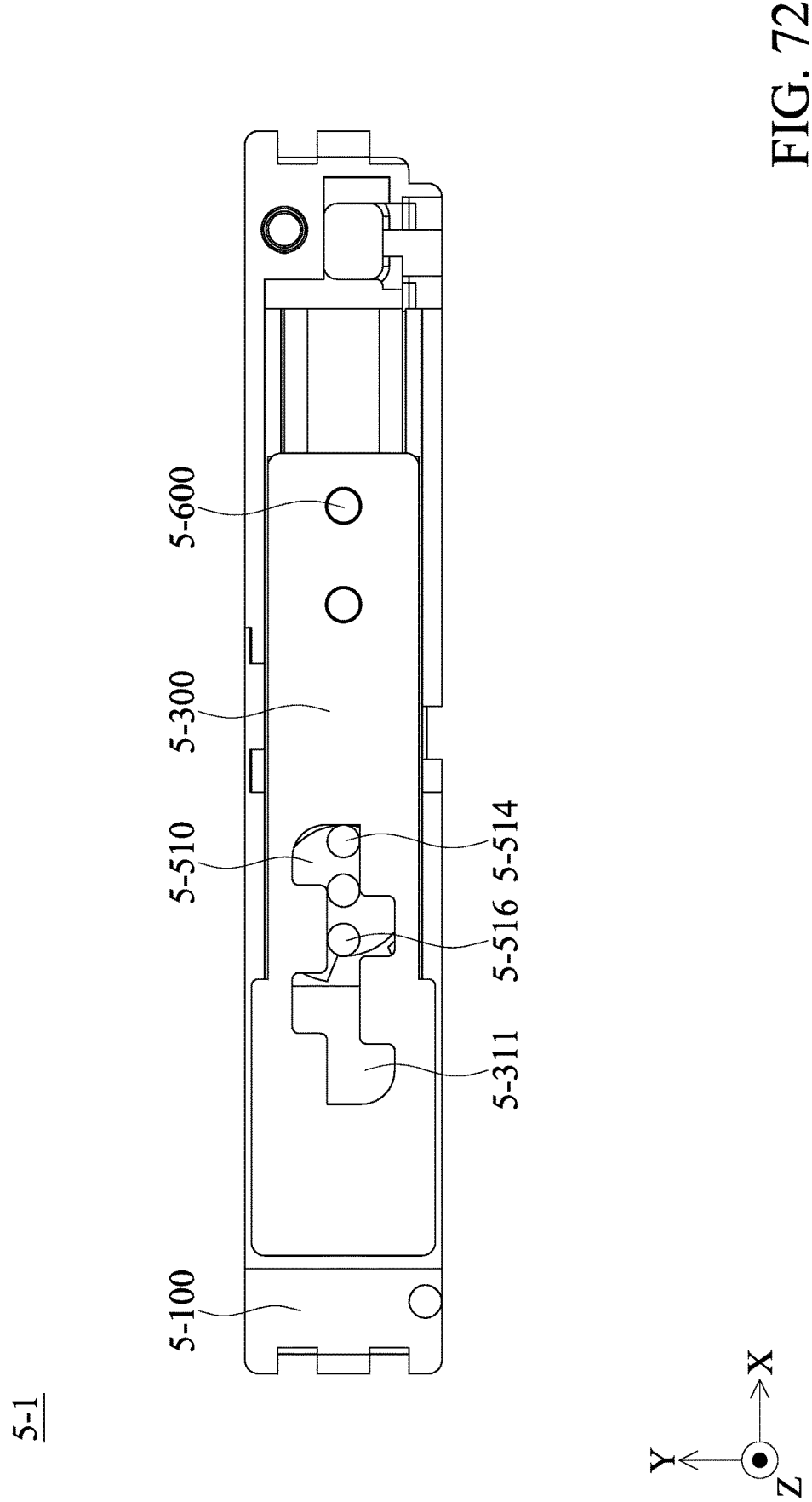

Afterwards, the operation method 5-900 continues to an operation 5-904 for moving the optical element 5-300 to a closed position, corresponding to FIG. 72. In FIG. 72, the optical element 5-300 moves to the left to allow the opening 5-202 and the optical module 5-800 disposed in the opening 5-202 to be covered by the optical element 5-300.

Figure 73:
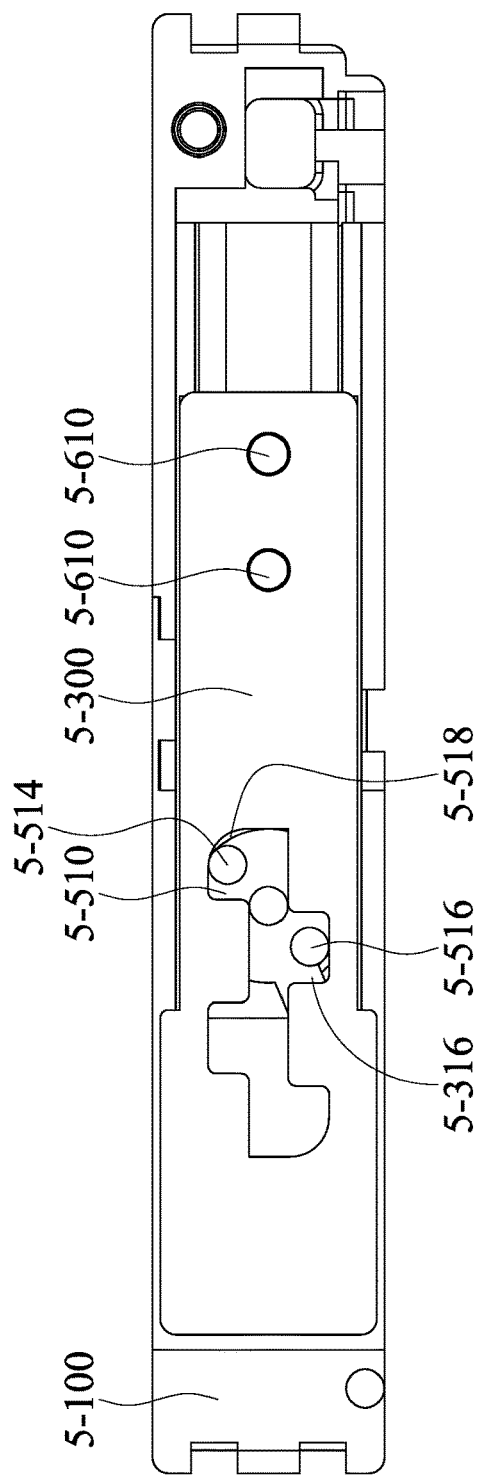
Figure 74:
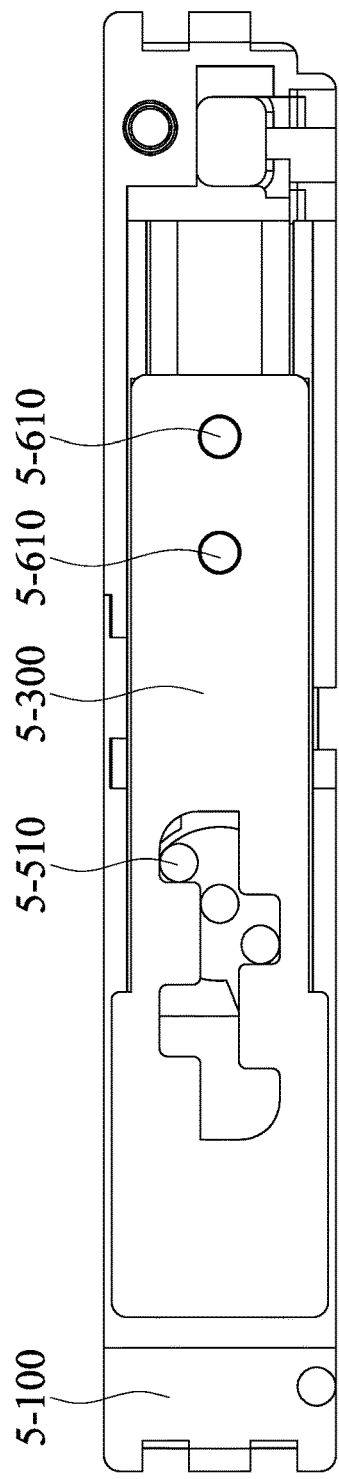

Afterwards, the operation method 5-900 continues to an operation 5-906 for moving the positioning element 5-510 to a locking position, corresponding to FIG. 73. In FIG. 73, the stopping portions 5-514 and 5-516 of the positioning element 5-510 may be positioned in the notches 5-318 and 5-316, respectively, to limit the movement of the optical element 5-300. In other words, the positioning element 5-510 is at a locking position, and the optical element 5-300 cannot move freely on the contact portion 5-230 (FIG. 60) of the base 5-200. For example, as shown in FIG. 74, when the optical element moves to the left by an external force, the limiting portions 5-514 and 5-516 may in contact with the sides of the notches 5-318 and 5-316 to limit the movable range of the optical element 5-300. As a result, the optical module 5-800 may be prevented from being exposed from the opening 5-202 to increase security when the optical module is not in use.

The present disclosure also provides an operating method 5-910 of the optical element driving mechanism 5-1. The operating method 5-910 includes an operation 5-912 for moving the positioning element 5-510 to an unlocking position, which corresponds to FIG. 71. Afterwards, the operation method 5-910 continues to an operation 5-914 for moving the optical element 5-300 to a closed position, corresponding to FIG. 72. The details are similar to those of operations 5-902 and 5-904, and are not repeated.

Afterwards, the operation method 5-910 continues to an operation 5-916 for moving the optical element 5-300 to an open position, corresponding to FIG. 71, and an operation 5-918 for moving the positioning element 5-510 to a locking position, corresponding to FIG. 70. In other words, during the operating method 5-910, the optical element 5-300 does not continuously cover the opening 5-202 and the optical module 5-800, and is turned back to the condition in FIG. 70 where the optical module 5-800 is exposed from the optical element 5-300. As a result, the optical element 5-300 may act as a shutter of the optical module 5-800, which means that it only covers the optical module 5-800 for a specific amount of time. Furthermore, when the optical element 5-300 is not in use, moving the positioning element 5-510 to the locking position may prevent the optical element 5-300 being moved by external forces.

In summary, an optical element driving mechanism is provided. The optical element driving mechanism includes a fixed portion, a movable portion, a first driving assembly, and a positioning element. The movable portion is movably disposed on the fixed portion and comprising an optical element, wherein the optical element moves in a first direction. The first driving assembly is at least partially disposed on the fixed portion. The positioning element is rotatably disposed on the fixed portion or the movable portion, wherein when the first driving assembly is not activated, the positioning element is used to limit the position of the movable portion relative to the fixed portion to a limit position. As a result, the optical module may be prevented from being exposed from the opening to increase the security of the optical module when the optical module is not in use, or the optical element driving mechanism may act as a shutter of the optical module.

The Sixth Embodiment Group

Figure 75:
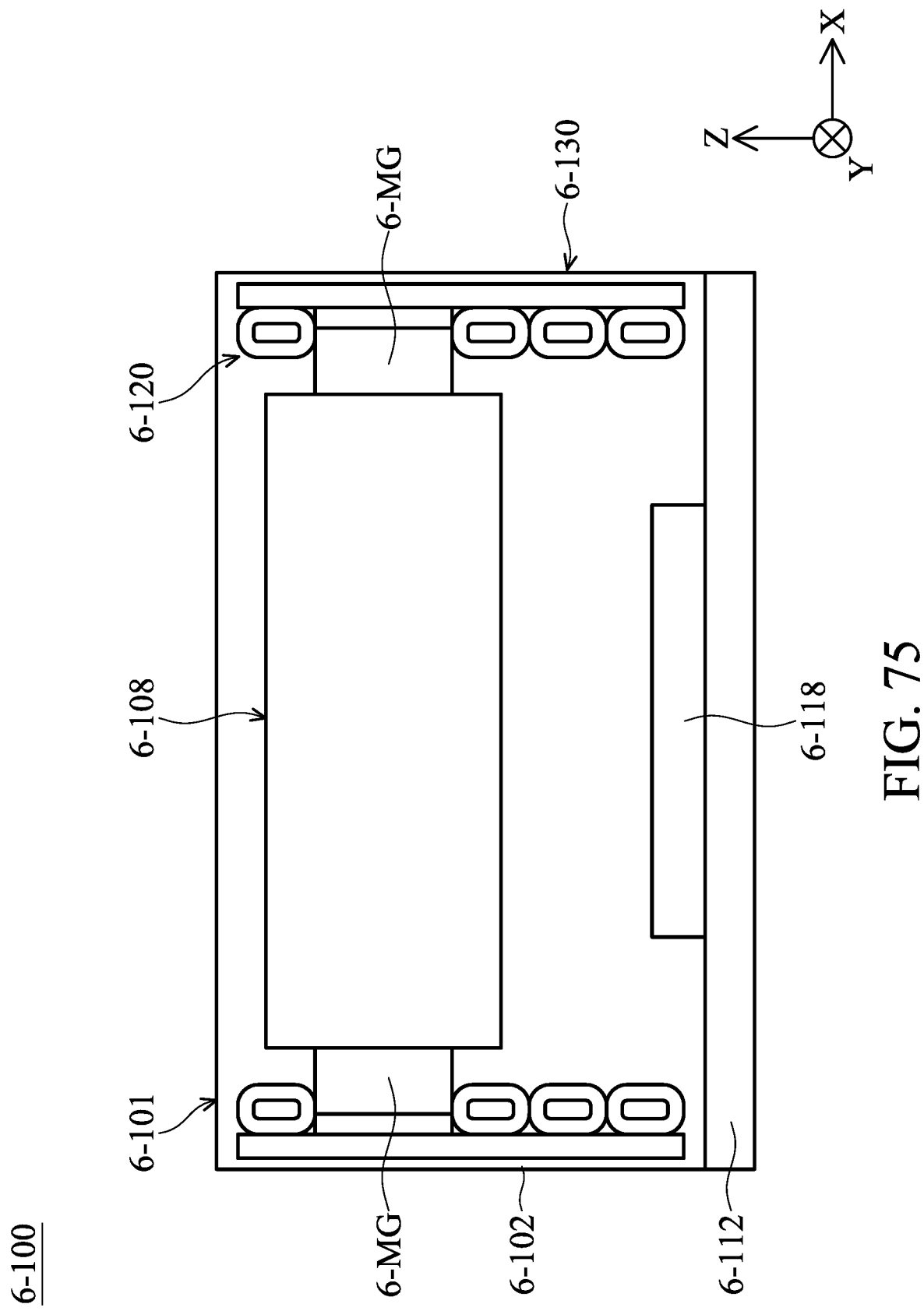
FIG. 75 is a schematic diagram of an optical element driving mechanism 6-100 according to an embodiment of the present disclosure.

Please refer to FIG. 75, which is a schematic diagram of an optical element driving mechanism 6-100 according to an embodiment of the present disclosure. In this embodiment, the optical element driving mechanism 6-100 can be an optical camera module, which can be installed in various electronic devices or portable electronic devices, such as a smart phone, for allowing users to perform image capture function. In this embodiment, the optical element driving mechanism 6-100 may be a voice coil motor (VCM) with an autofocus (AF) function, but this disclosure is not limited thereto. In other embodiments, the optical element driving mechanism 6-100 may also have the functions of automatic focus (AF) and optical image stabilization (OIS). In addition, the optical element driving mechanism 6-100 can be a periscope camera module.

As shown in FIG. 75, the optical element driving mechanism 6-100 includes a fixed assembly 6-101, a movable assembly 6-108, a driving assembly 6-120, and a circuit assembly 6-130. The fixed assembly 6-101 may include a casing 6-102 and a base 6-112. The movable assembly 6-108 is disposed in the fixed assembly 6-101 and configured to hold and drive an optical element (not shown in the figures), for example a camera lens. The circuit assembly 6-130 can be fixed to the fixed assembly 6-101 and can be electrically connected to the driving assembly 6-120, and the driving assembly 6-120 is configured to drive the movable assembly 6-108 to move relative to the fixed assembly 6-101, such as moving along the Z-axis (the first direction). A photosensitive element 6-118 can be disposed on the base 6-112, and the external light may arrive at the photosensitive element 6-118 after traveling through the optical element held by the movable assembly 6-108 so as to generate a digital image. The driving assembly 6-120 and the circuit assembly 6-130 may be a linear motor, but they are not limited to this embodiment.

Figure 76:
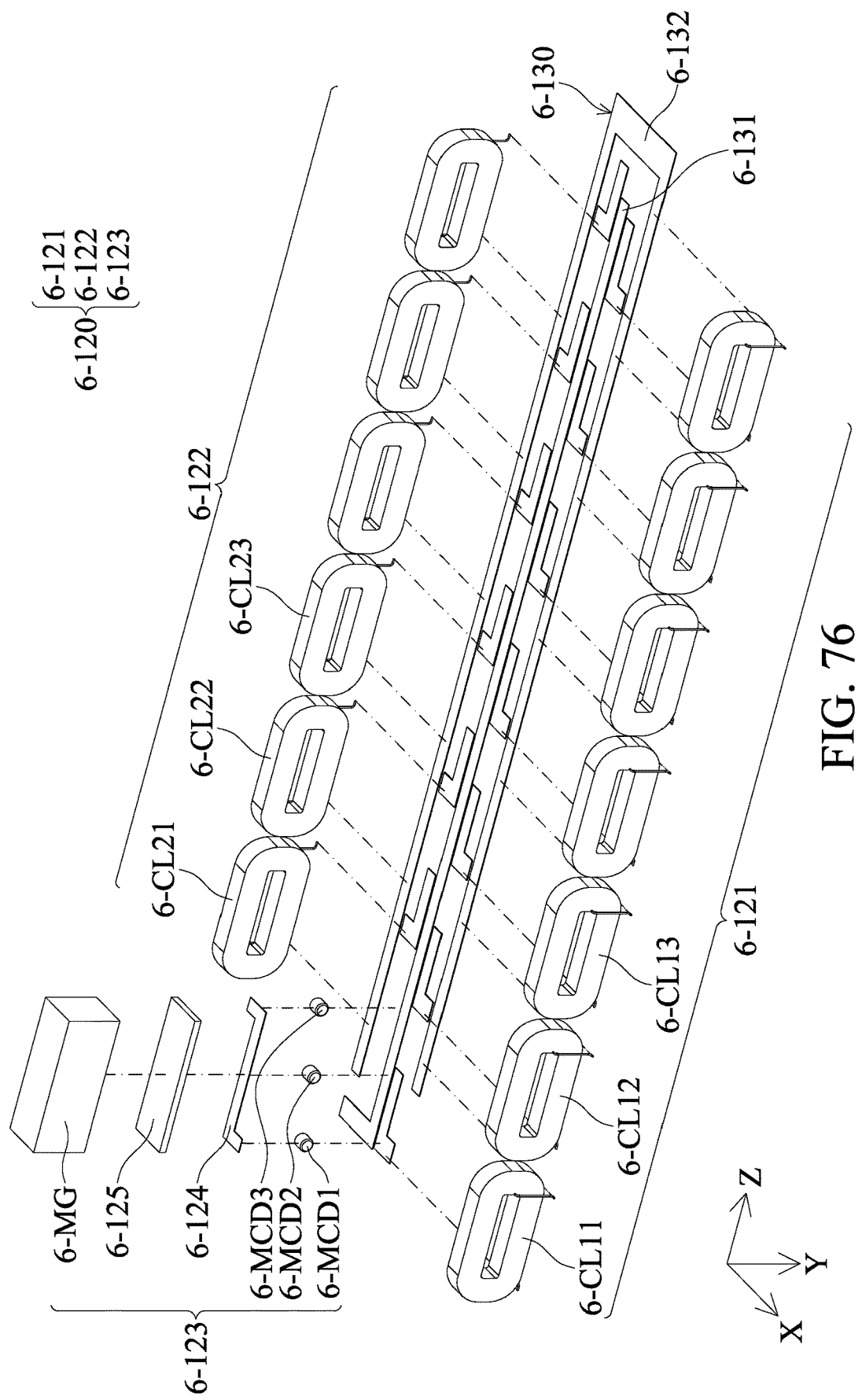
FIG. 76 is an exploded diagram of the driving assembly 6-120 and the circuit assembly 6-130 according to an embodiment of the present disclosure.
Figure 77:
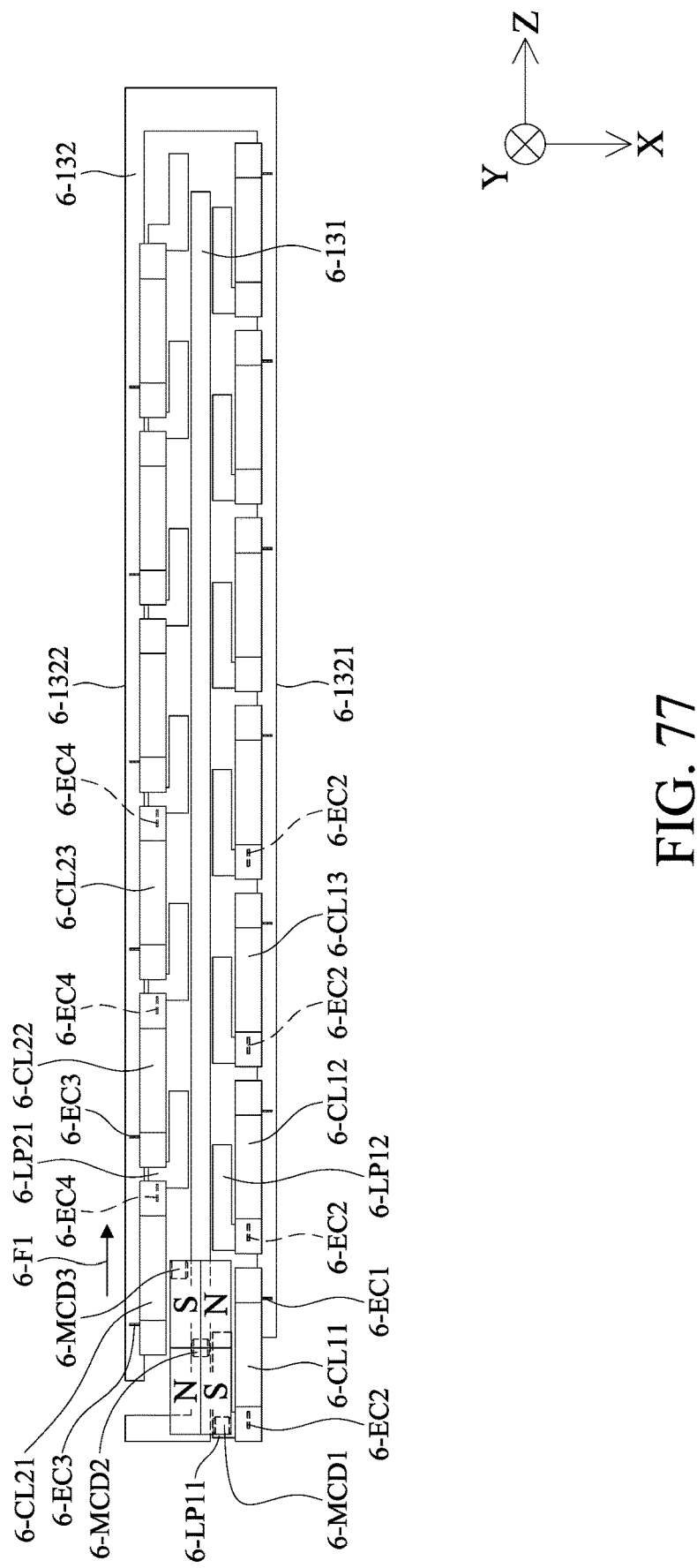
FIG. 77 is a top view of the driving assembly 6-120 and the circuit assembly 6-130 according to an embodiment of the present disclosure.

Please refer to FIG. 76 and FIG. 77. FIG. 76 is an exploded diagram of the driving assembly 6-120 and the circuit assembly 6-130 according to an embodiment of the present disclosure, and FIG. 77 is a top view of the driving assembly 6-120 and the circuit assembly 6-130 according to an embodiment of the present disclosure. As shown in FIG. 76, the circuit assembly 6-130 includes a first circuit member 6-131, a second circuit member 6-132, and a plurality of L-shaped conductive plates. The first circuit member 6-131 has a long strip-shaped structure and is configured to be electrically connected to the ground, and the second circuit member 6-132 has a U-shaped structure and is configured to be connected to a power source. The plurality of L-shaped conductive plates are disposed between the first circuit member 6-131 and the second circuit member 6-132.

Furthermore, as shown in FIG. 76, the driving assembly 6-120 includes a first coil group 6-121, a second coil group 6-122, and a magnetic module 6-123. The first coil group 6-121 and the second coil group 6-122 respectively have a plurality of first coils (first coils 6-CL11, 6-CL12, 6-CL13, etc.) and a plurality of second coils (second coils 6-CL21, 6-CL22, 6-CL23, etc.). The first coils and the second coils are arranged along the Z-axis (the first direction), and the first coil group 6-121 and the second coil group 6-122 are disposed on different planes.

As shown in FIG. 77, the plurality of first coils respectively correspond to the L-shaped conductive plates adjacent to a first side 6-1321 of the second circuit member 6-132, and the plurality of second coils respectively correspond to the L-shaped conductive plates adjacent to a second side 6-1322 of the second circuit member 6-132. For example, the first coil 6-CL11 corresponds to the L-shaped conductive plate 6-LP11, the second coil 6-CL21 corresponds to the L-shaped conductive plate 6-LP21, and so on. For example, the L-shaped conductive plate 6-LP12 corresponds to the first coil 6-CL12.

It should be noted that each first coil has a first electrical connection portion 6-EC1 and a second electrical connection portion 6-EC2, and the first electrical connection portion 6-EC1 is electrically connected to the second circuit member 6-132, and the second electrical connection portion 6-EC2 is electrically connected to the corresponding L-shaped conductive plate. As shown in FIG. 77, the intervals between the second electrical connection portions 6-EC2 are substantially the same along the Z-axis (the first direction).

Furthermore, each second coil has a third electrical connection portion 6-EC3 and a fourth electrical connection portion 6-EC4. The third electrical connection portion 6-EC3 is electrically connected to the second circuit member 6-132, and the fourth electrical connection portion 6-EC4 is electrically connected to the corresponding L-shaped conductive plate. Similarly, the intervals between the fourth electrical connection portions 6-EC4 are substantially the same along the Z-axis (the first direction).

In addition, as shown in FIG. 77, when viewed in a direction of the winding axis of the first coil, for example, along the X-axis (the second direction), the first coil partially overlaps at least two second coils. For example, the first coil 6-CL12 partially overlaps the second coil 6-CL21 and the second coil 6-CL22.

Figure 78:
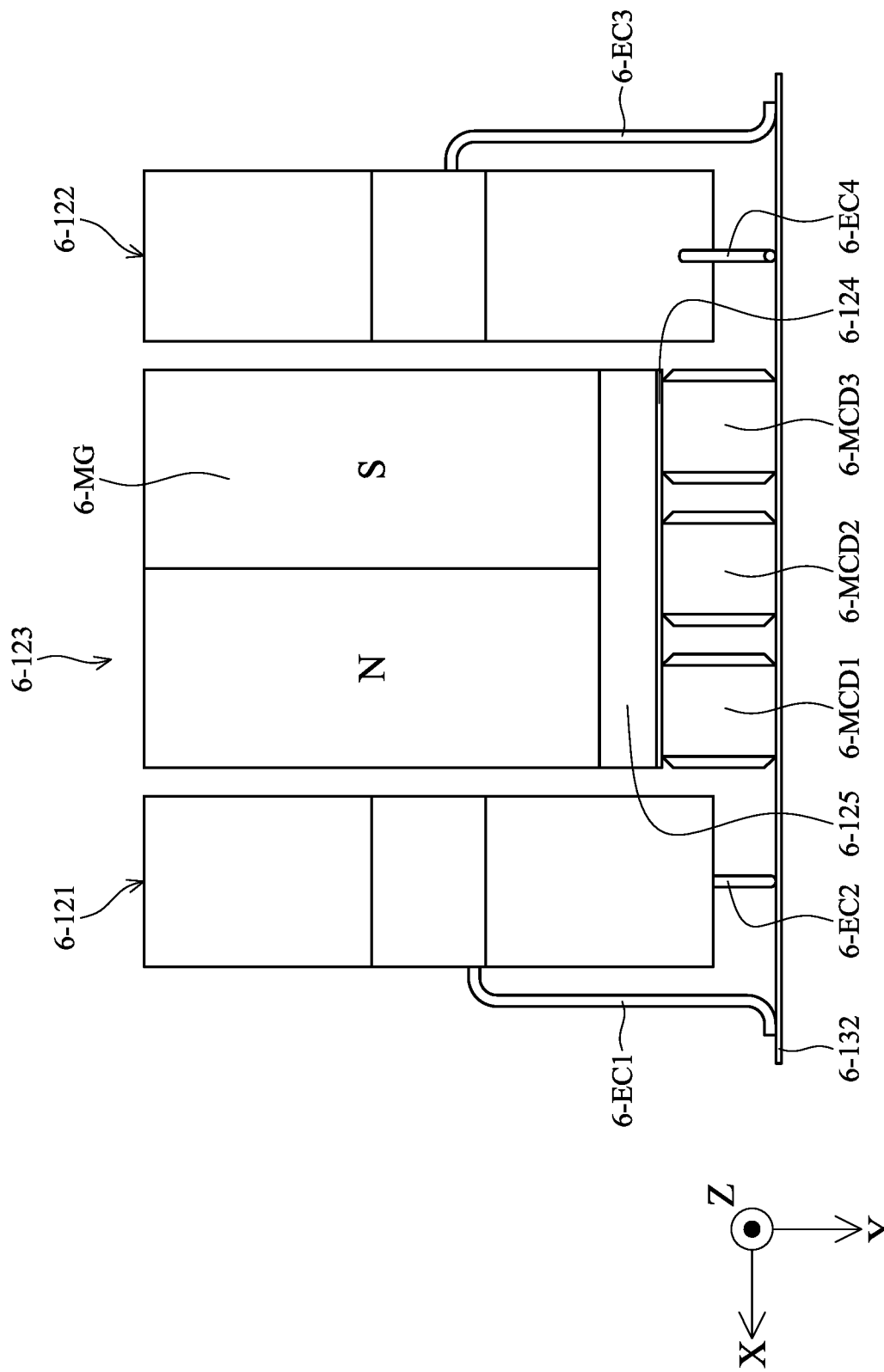
FIG. 78 is a front view of the driving assembly 6-120 and the circuit assembly 6-130 according to an embodiment of the present disclosure.

Next, please refer to FIG. 76 to FIG. 78. FIG. 78 is a front view of the driving assembly 6-120 and the circuit assembly 6-130 according to an embodiment of the present disclosure. In this embodiment, the magnetic module 6-123 may include a first conductive element 6-124, at least one second conductive element, an insulating element 6-125, and a magnetic element 6-MG. As shown in FIG. 76, the first conductive element 6-124 is in contact with three second conductive elements 6-MCD1, 6-MCD2, 6-MCD3, and the first conductive element 6-124 is electrically connected to the first circuit member 6-131 through the second conductive element 6-MCD2. The second conductive elements can be cylinders, so that the second conductive elements can move relative to the first conductive element 6-124 and/or the first circuit member 6-131, such as rolling or sliding.

As shown in FIG. 78, the insulating element 6-125 is disposed between the magnetic element 6-MG and the first conductive element 6-124 for preventing the magnetic element 6-MG from being electrically connected to these second conductive elements. In addition, the magnetic module 6-123 is disposed between the first coil group 6-121 and the second coil group 6-122.

In addition, as shown in FIG. 78, the second electrical connection portions 6-EC2 and the fourth electrical connection portions 6-EC4 are disposed on the same plane, such as the XZ plane.

In this embodiment, the magnetic element 6-MG may have a plurality of magnetic pole units, and each magnetic pole unit includes an North pole (N-pole) and a South pole (S-pole), and the magnetic pole directions of the magnetic pole units are different from the first direction. For example, as shown in FIG. 77 and FIG. 78, the magnetic element 6-MG includes a left magnetic pole unit and a right magnetic pole unit, which are arranged in the first direction, and the magnetic pole direction of each magnetic pole unit is along the X-axis (the second direction), and the second direction is perpendicular to the first direction.

When the first circuit member 6-131 is electrically connected to the ground and the second circuit member 6-132 receives a positive voltage, the magnetic module 6-123 moves along the Z-axis (the first direction). Furthermore, when the magnetic module 6-123 is located in different positions relative to the first coil group 6-121, the first conductive element 6-124 is electrically connected to the second electrical connection portion 6-EC2 of different first coils in sequence so that the first coils which are electrically connected to the first conductive element 6-124 are electrically connected to the first circuit member 6-131 and the second circuit member 6-132, and the second electrical connection portions 6-EC2 of the first coils which are not electrically connected to the first conductive element 6-124 remain open.

Similarly, when the magnetic module 6-123 is located in different positions relative to the second coil group 6-122, the first conductive element 6-124 is electrically connected to the fourth electrical connections 6-EC4 of different second coils in sequence, so that the second coils which are electrically connected to the first conductive element 6-124 are electrically connected to the first circuit member 6-131 and the second circuit member 6-132, and the fourth electrical connections 6-EC4 of the second coils which are not electrically connected to the first conductive element 6-124 remain open.

Figure 79A:
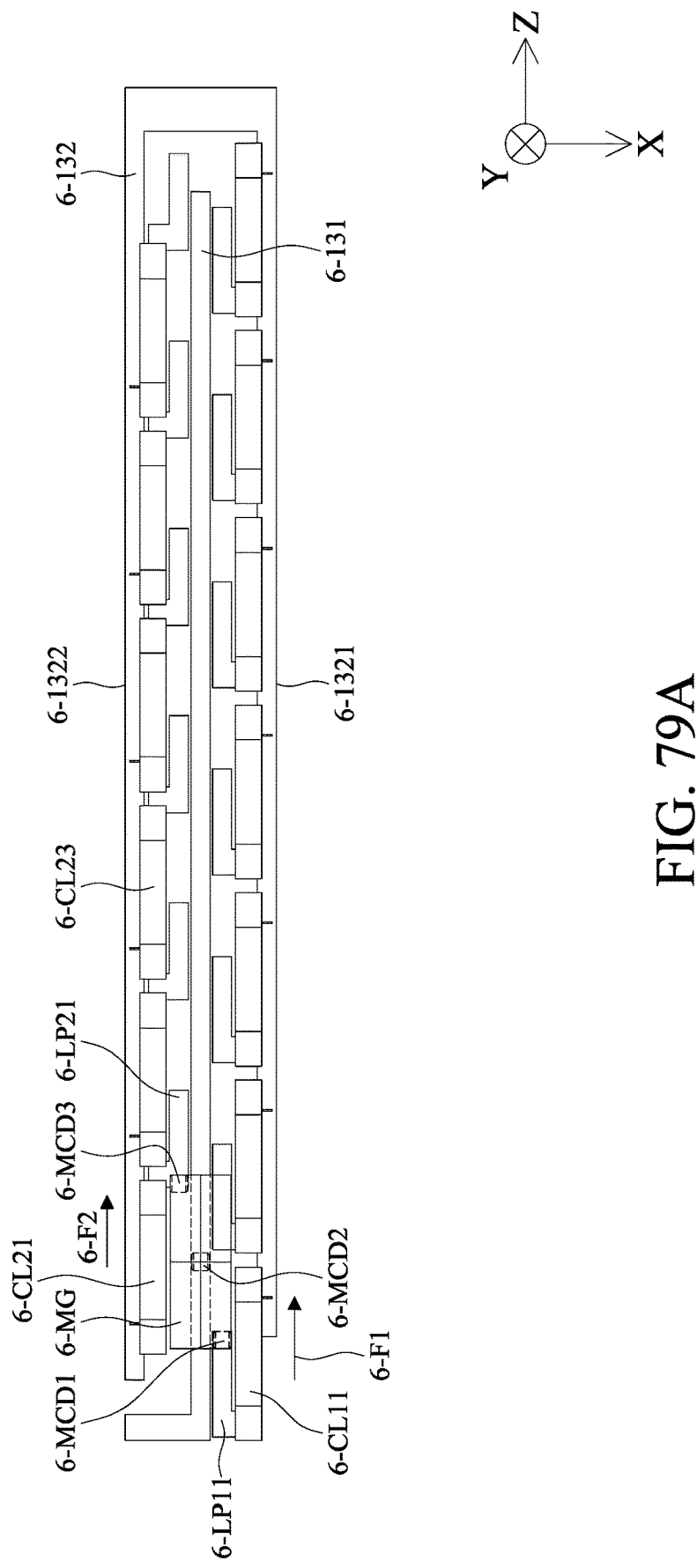
FIG. 79A and FIG. 79B are schematic diagrams of the magnetic module 6-123 located in different positions according to an embodiment of the present disclosure.
Figure 79B:
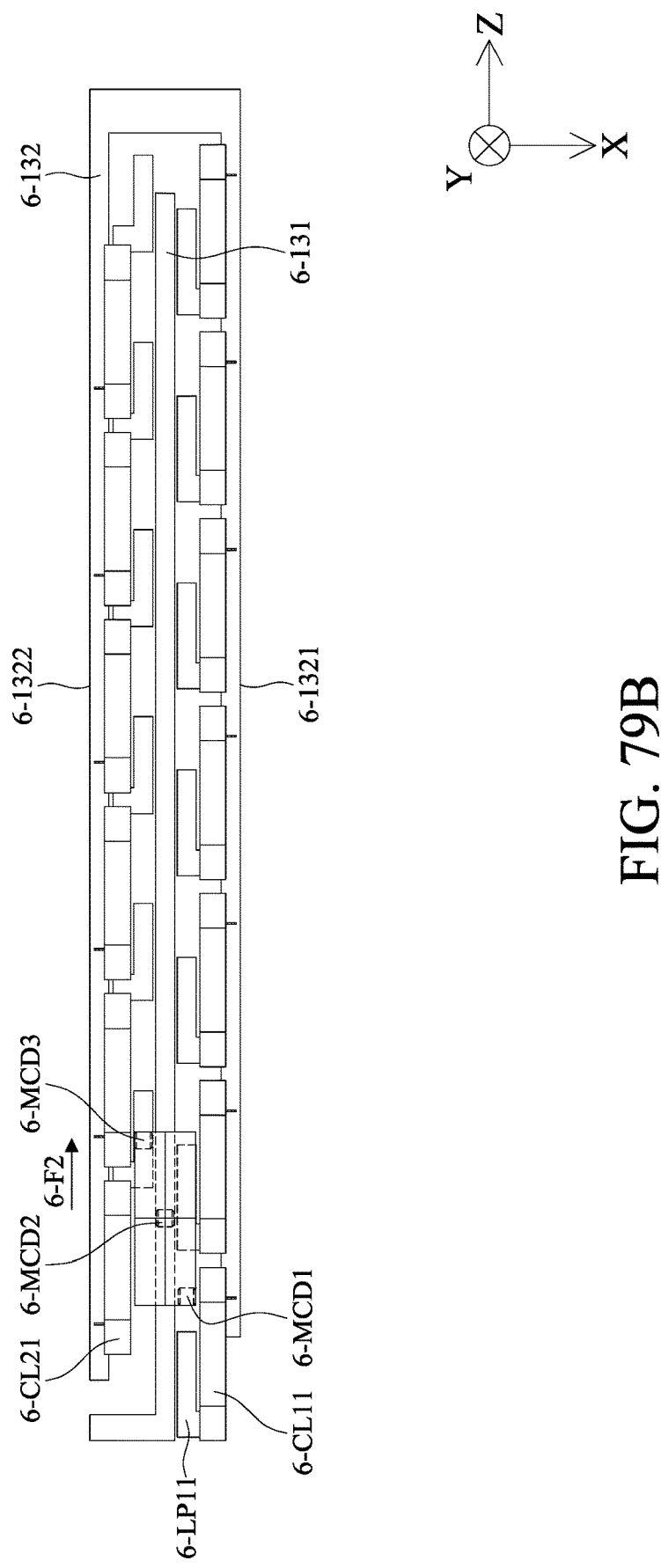

Next, please refer to FIG. 77, FIG. 79A, and FIG. 79B. FIG. 79A and FIG. 79B are schematic diagrams of the magnetic module 6-123 located in different positions according to an embodiment of the present disclosure. First, as shown in FIG. 77, the magnetic module 6-123 is located at a preset position (also referred to as an initial position). At this time, the second conductive element 6-MCD1 contacts the first L-shaped conductive plate 6-LP11 on the first side 6-1321, and the second conductive element 6-MCD2 contacts the first circuit member 6-131, so that the first coil 6-CL11 is electrically connected to the first circuit member 6-131 and the second circuit member 6-132. As a result, the first coil 6-CL11 is powered on and starts to act with the magnetic element 6-MG to generate an electromagnetic driving force 6-F1 to push the magnetic module 6-123 to move along the Z-axis (the first direction).

Next, when the magnetic module 6-123 moves to the position in FIG. 79A, the second conductive element 6-MCD3 contacts the first L-shaped conductive plate 6-LP21 on the second side 6-1322, so that the second coil 6-CL21 is electrically connected to the first circuit member 6-131 and the second circuit member 6-132. As a result, the second coil 6-CL21 is powered on and acts with the magnetic element 6-MG to generate another electromagnetic driving force 6-F2. The electromagnetic driving force 6-F2 cooperates with the electromagnetic driving force 6-F1 to push the magnetic module 6-123 so that the magnetic module 6-123 continues to move along the Z-axis (the first direction).

Furthermore, when the magnetic module 6-123 moves to the position in FIG. 79B, the second conductive element 6-MCD1 is separated from the first L-shaped conductive plate 6-LP11 on the first side 6-1321, the first coil 6-CL11 is turned off, so that at this time, the magnetic module 6-123 is pushed by the electromagnetic driving force 6-F2 to continue to move along the Z-axis (the first direction). The subsequent operation of the magnetic module 6-123 is the same, so the description about the subsequent operation is omitted herein.

Figure 80:
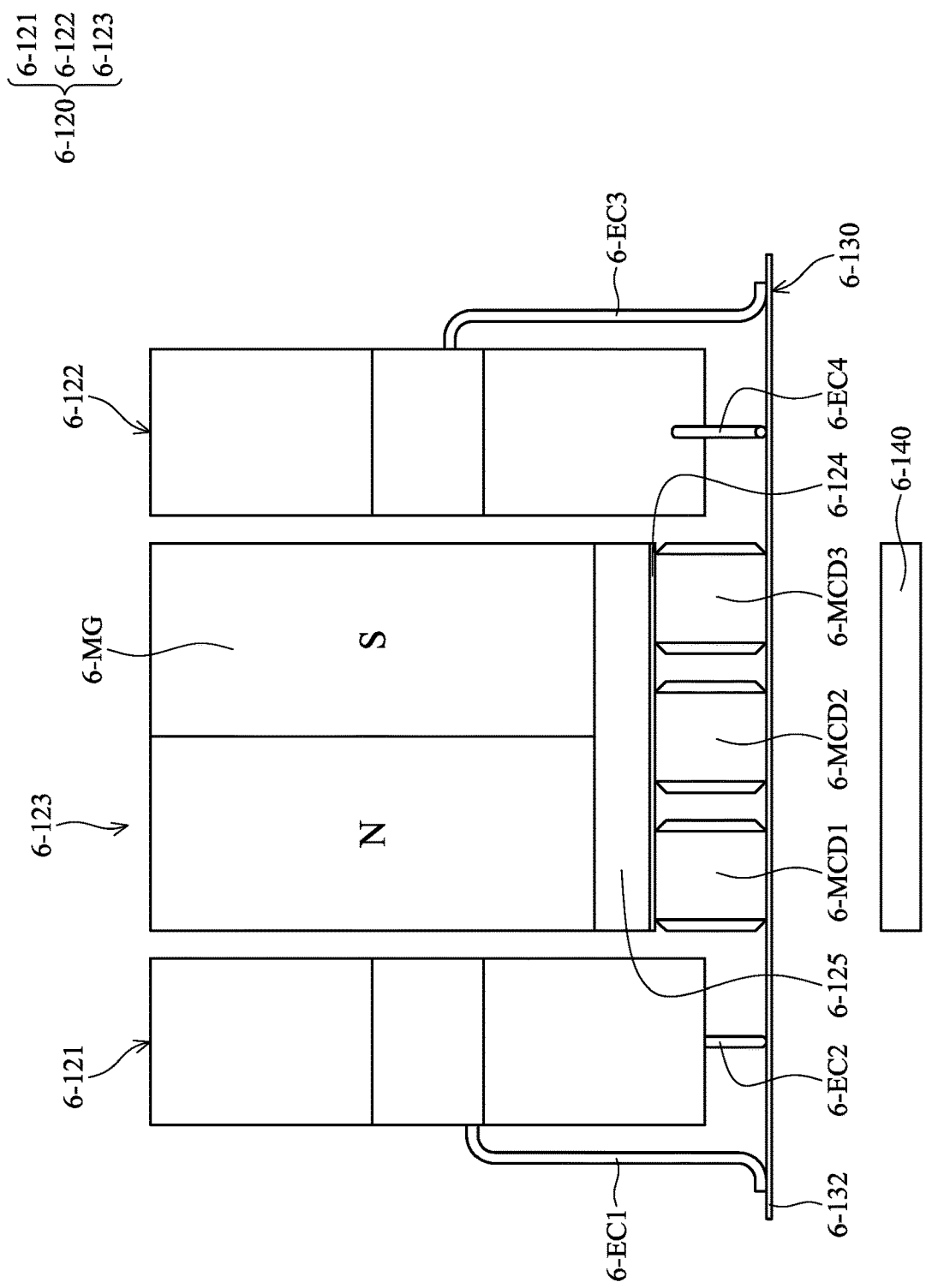
FIG. 80 is a front view of the driving assembly 6-120 and the circuit assembly 6-130 according to another embodiment of the present disclosure.

Next, please refer to FIG. 80, which is a front view of the driving assembly 6-120 and the circuit assembly 6-130 according to another embodiment of the present disclosure. In this embodiment, the optical element driving mechanism 6-100 may further include a pressing assembly 6-140 for driving the magnetic element 6-MG to contact the first circuit member 6-131. Specifically, the pressing assembly 6-140 has a magnetically conductive element, such as a magnet, corresponding to the magnetic element 6-MG, so that the magnet of the pressing assembly 6-140 and the magnetic element 6-MG generate a magnetic attraction force to drive the magnetic element 6-MG to push the pressing assembly 6-140 so as to prevent the second conductive element 6-MCD1, the second conductive element 6-MCD2, and the second conductive element 6-MCD3 from separating from the first conductive element 6-124.

Figure 81:
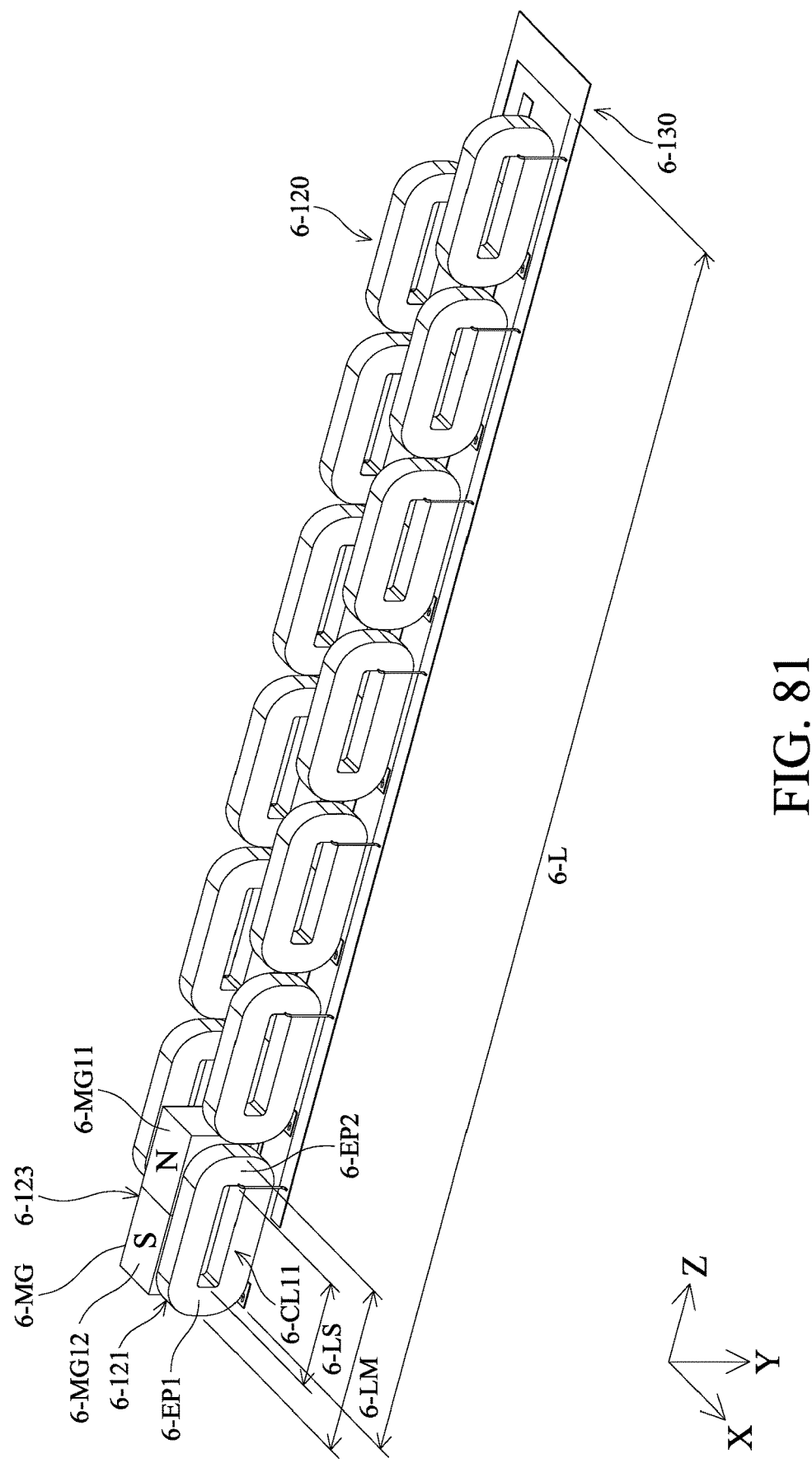
FIG. 81 is a schematic diagram of the driving assembly 6-120 and the circuit assembly 6-130 according to another embodiment of the present disclosure.

Please refer to FIG. 81, which is a schematic diagram of the driving assembly 6-120 and the circuit assembly 6-130 according to another embodiment of the present disclosure. As shown in FIG. 81, in this embodiment, the magnetic element 6-MG has a first magnetic portion 6-MG11 (the N-pole) and a second magnetic portion 6-MG12 (the S-pole), and the magnetic pole direction of the magnetic element 6-MG (that is, the arrangement direction of the N-pole and S-pole) is parallel to the Z-axis (the first direction). Therefore, the configuration and the arrangement of the driving assembly 6-120 and the circuit assembly 6-130 of the present disclosure can be determined according to the structural configuration of the electronic device to meet the actual needs.

It should be noted that the magnetic module 6-123 can be fixedly disposed on the movable assembly 6-108 in FIG. 75, so that the driving assembly 6-120 can drive the movable assembly 6-108 to move within a limit range of motion. For example, as shown in FIG. 81, the magnetic module 6-123 can move along the Z-axis (the first direction), and the limit range of motion can be a length 6-L. Furthermore, each of the first coils in the first coil group 6-121 may have a first end portion and a second end portion, which are arranged in the first direction.

For example, the first coil 6-CL11 has a first end portion 6-EP1 and a second end portion 6-EP2 that are parallel to each other. A shortest distance 6-LS between the first end portion 6-EP1 and the second end portion 6-EP2 is less than the limit range of motion (the length 6-L), and a maximum distance 6-LM between the first end portion 6-EP1 and the second end portion 6-EP2 is also shorter than the length 6-L.

Figure 82:
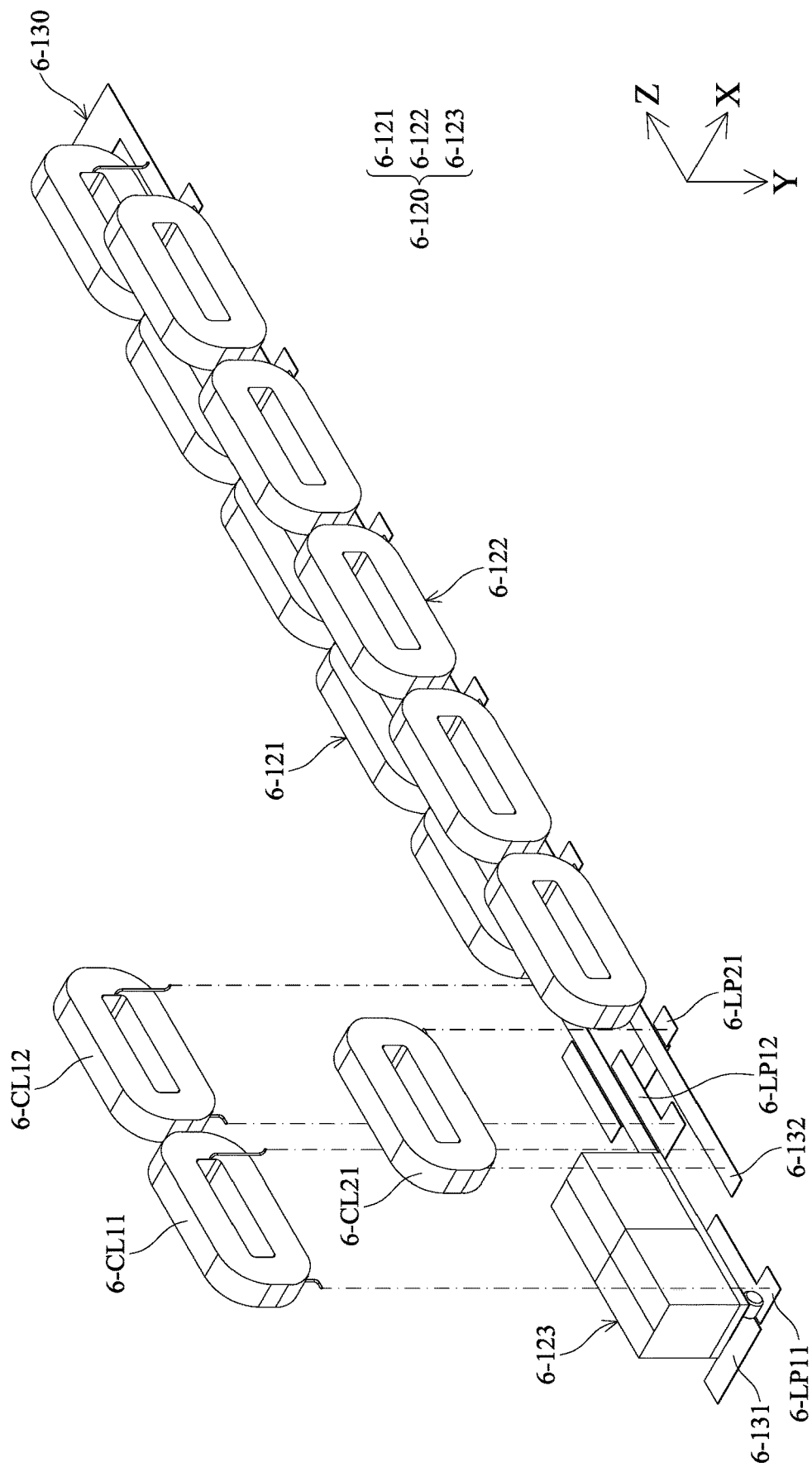
FIG. 82 is a partial exploded diagram of the driving assembly 6-120 and the circuit assembly 6-130 according to another embodiment of the present disclosure.
Figure 83:
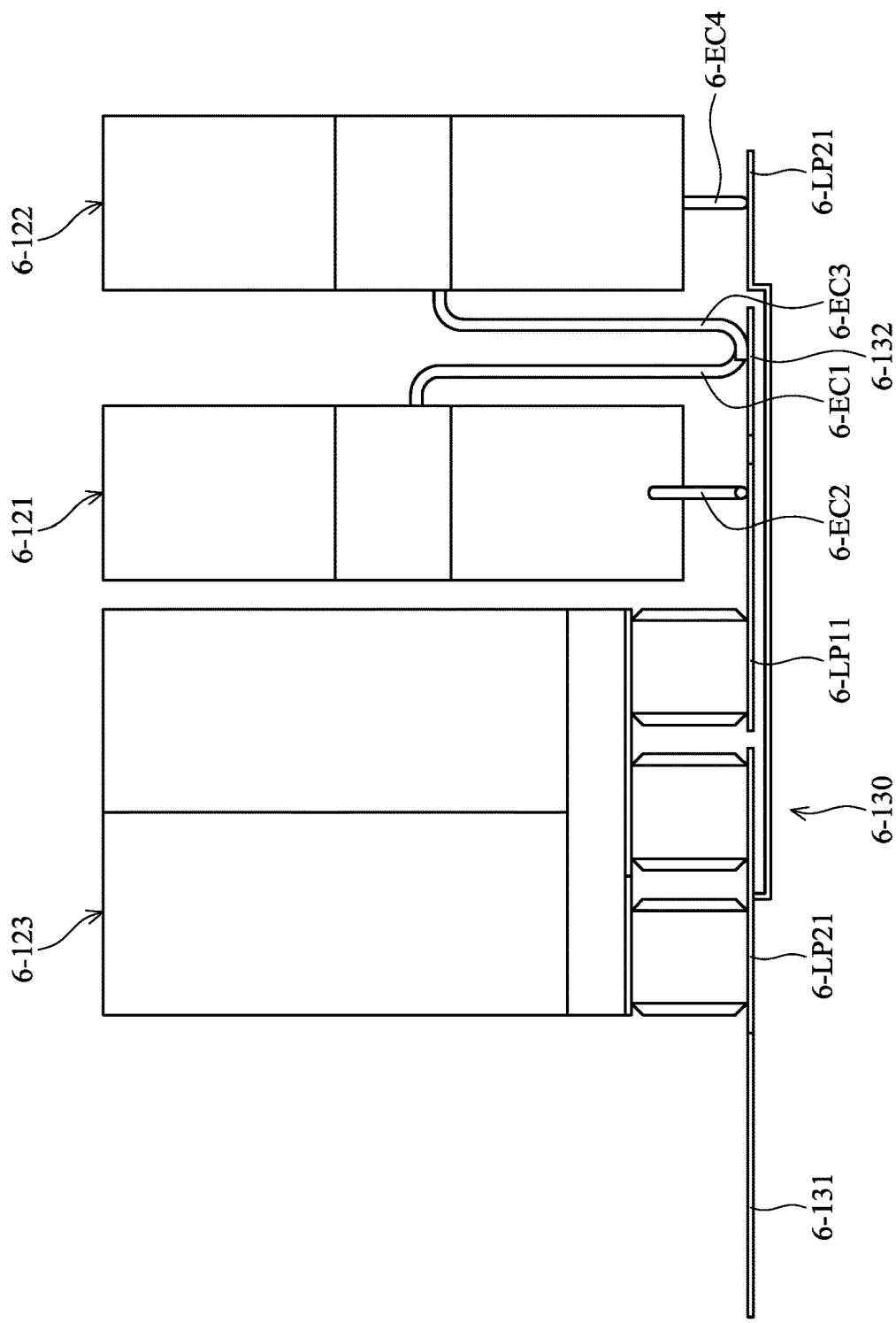
FIG. 83 is a front view of the driving assembly 6-120 and the circuit assembly 6-130 according to another embodiment of the present disclosure.

Please refer to FIG. 82 and FIG. 83. FIG. 82 is a partial exploded diagram of the driving assembly 6-120 and the circuit assembly 6-130 according to another embodiment of the present disclosure, and FIG. 83 is a front view of the driving assembly 6-120 and the circuit assembly 6-130 according to another embodiment of the present disclosure. In this embodiment, as shown in FIG. 83, the first coil group 6-121 is disposed between the magnetic module 6-123 and the second coil group 6-122.

Furthermore, the optical element driving mechanism in this embodiment may include a plurality of first conductive plates and a plurality of second conductive plates. As shown in FIG. 82, the first coil 6-CL11 is electrically connected to the corresponding first conductive plate (the L-shaped conductive plate 6-LP11), and the second coil 6-CL21 is electrically connected to the corresponding second conductive plate (the L-shaped conductive plate 6-LP21). It should be noted that, as shown in FIG. 83, the L-shaped conductive plate 6-LP11 and at least one portion of the L-shaped conductive plate 6-LP21 are disposed on different planes to prevent the L-shaped conductive plate 6-LP11 from being electrically connected to the L-shaped conductive plate 6-LP21.

Figure 84A:
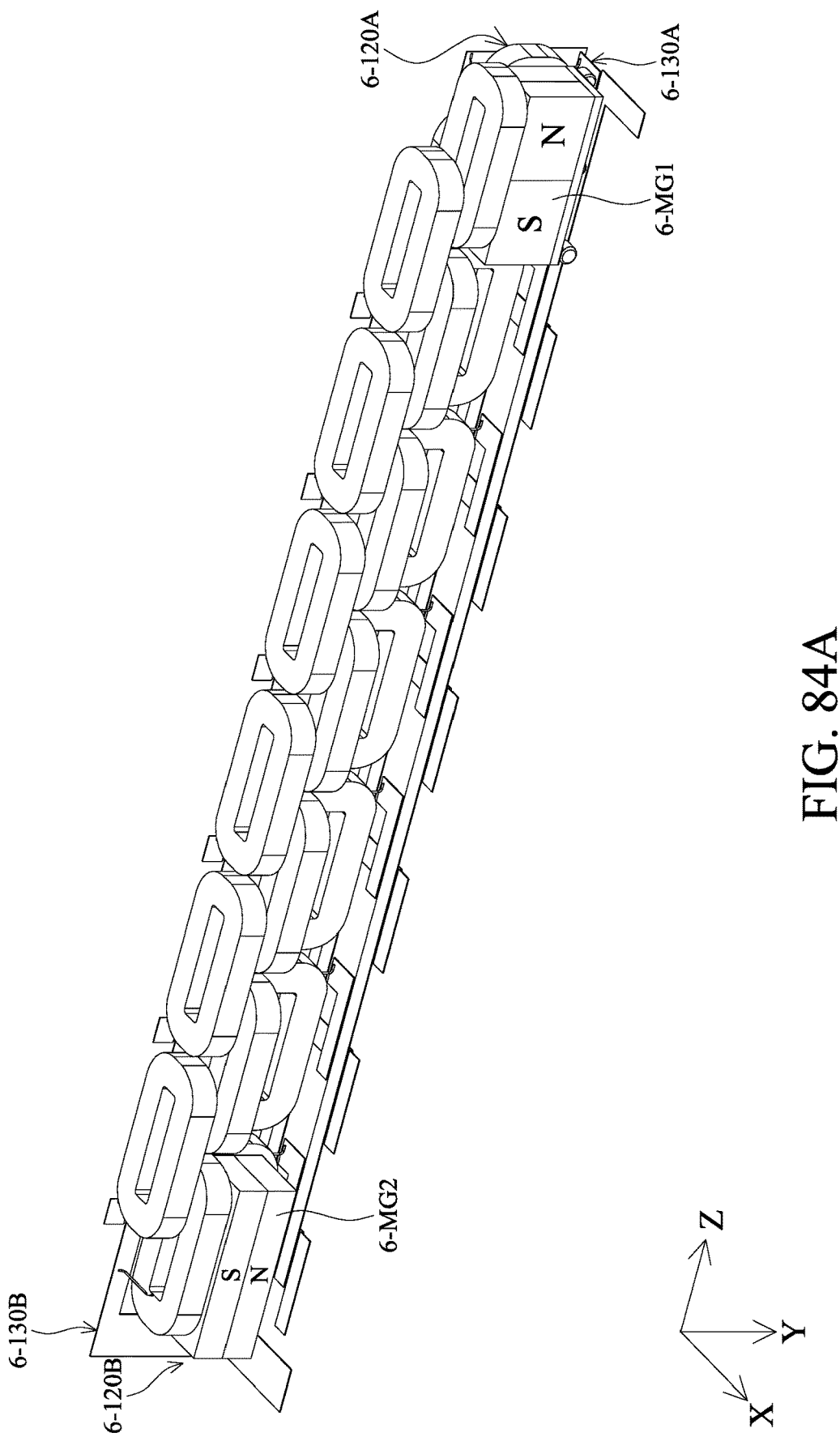
FIG. 84A is a schematic diagram of the driving assembly and the circuit assembly according to another embodiment of the present disclosure.

Please refer to FIG. 84A and FIG. 84B. FIG. 84A is a schematic diagram of the driving assembly and the circuit assembly according to another embodiment of the present disclosure, and FIG. 84B is a front view of FIG. 84A according to another embodiment of the present disclosure. In this embodiment, the optical element driving mechanism may further include a plurality of movable assemblies, a plurality of driving assemblies, and a plurality of circuit assemblies. For example, two driving assemblies 6-120A and 6-120B and two corresponding circuit assemblies 6-130A and 6-130B are provided in FIG. 84A. The magnetic element 6-MG1 of the driving assembly 6-120A can be fixedly connected to a movable assembly (not shown in the figures), and the magnetic element 6-MG2 of the driving assembly 6-120B can be fixedly connected to another movable assembly. These two movable assemblies can be similar to the movable assembly 6-108 in FIG. 75.

As shown in FIG. 84A, these movable assemblies and the magnetic elements 6-MG1, 6-MG2 are arranged along the Z-axis (the first direction), and the driving assemblies 6-120A, 6-120B can be configured to drive these movable assemblies to move in the first direction.

Furthermore, the magnetic pole directions of the magnetic element 6-MG1 and the magnetic element 6-MG2 are different. As shown in FIG. 84A, the magnetic pole direction of the magnetic element 6-MG1 is along the X-axis (the second direction), and the magnetic pole direction of the magnetic element 6-MG2 is along the Y-axis.

In addition, as shown in FIG. 84B, the circuit assembly 6-130B is disposed between the first coil group 6-121A of the driving assembly 6-120A and the magnetic element 6-MG1, and the first coil group 6-121A is disposed between the circuit assembly 6-130B and the second coil group 6-122A. Similarly, the first coil group 6-121B of the driving assembly 6-120B is disposed between the magnetic element 6-MG2 and the second coil group 6-122B.

Figure 85:
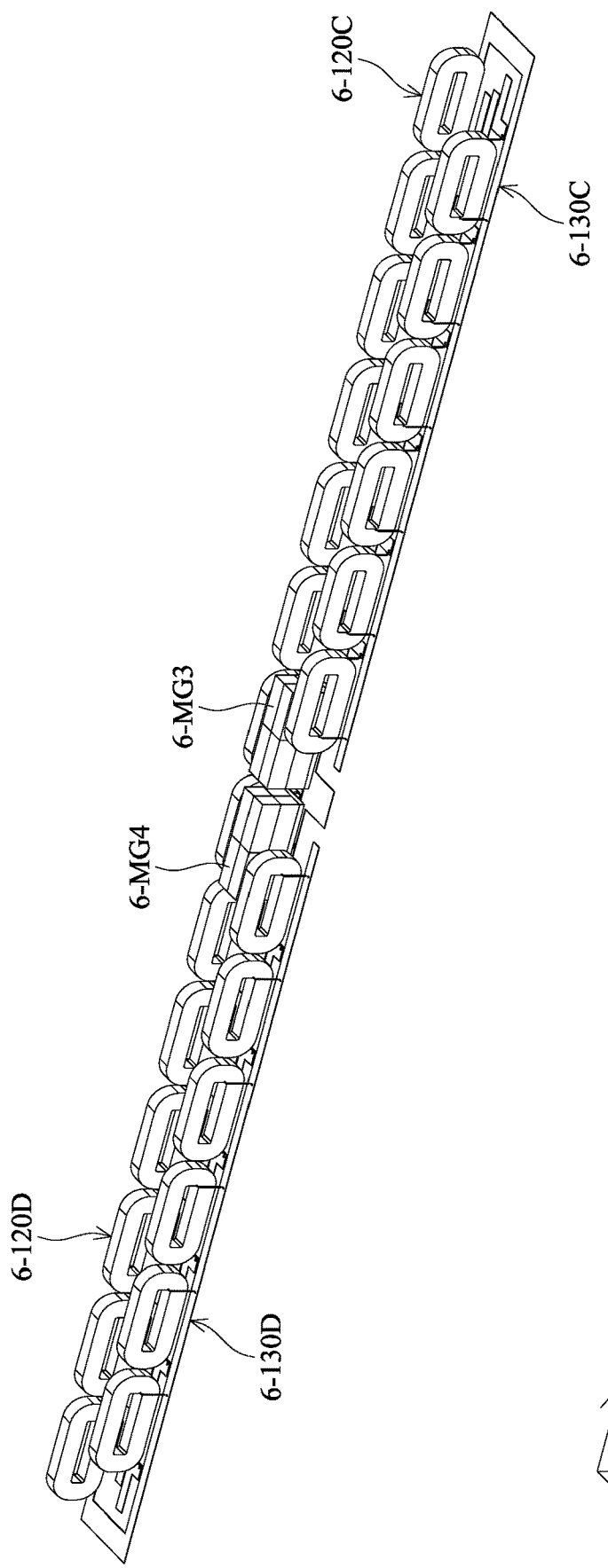
FIG. 85 is a schematic diagram of an optical element driving mechanism according to another embodiment of the present disclosure.

Please refer to FIG. 85, which is a schematic diagram of an optical element driving mechanism according to another embodiment of the present disclosure. In this embodiment, the optical element driving mechanism includes the driving assembly 6-120C, the driving assembly 6-120D, the circuit assembly 6-130C, and the circuit assembly 6-130D. The driving assembly 6-120C and the driving assembly 6-120D are similar to the driving assembly 6-120, and the circuit assembly 6-130C and the circuit assembly 6-130D are similar to the circuit assembly 6-130.

Figure 86:
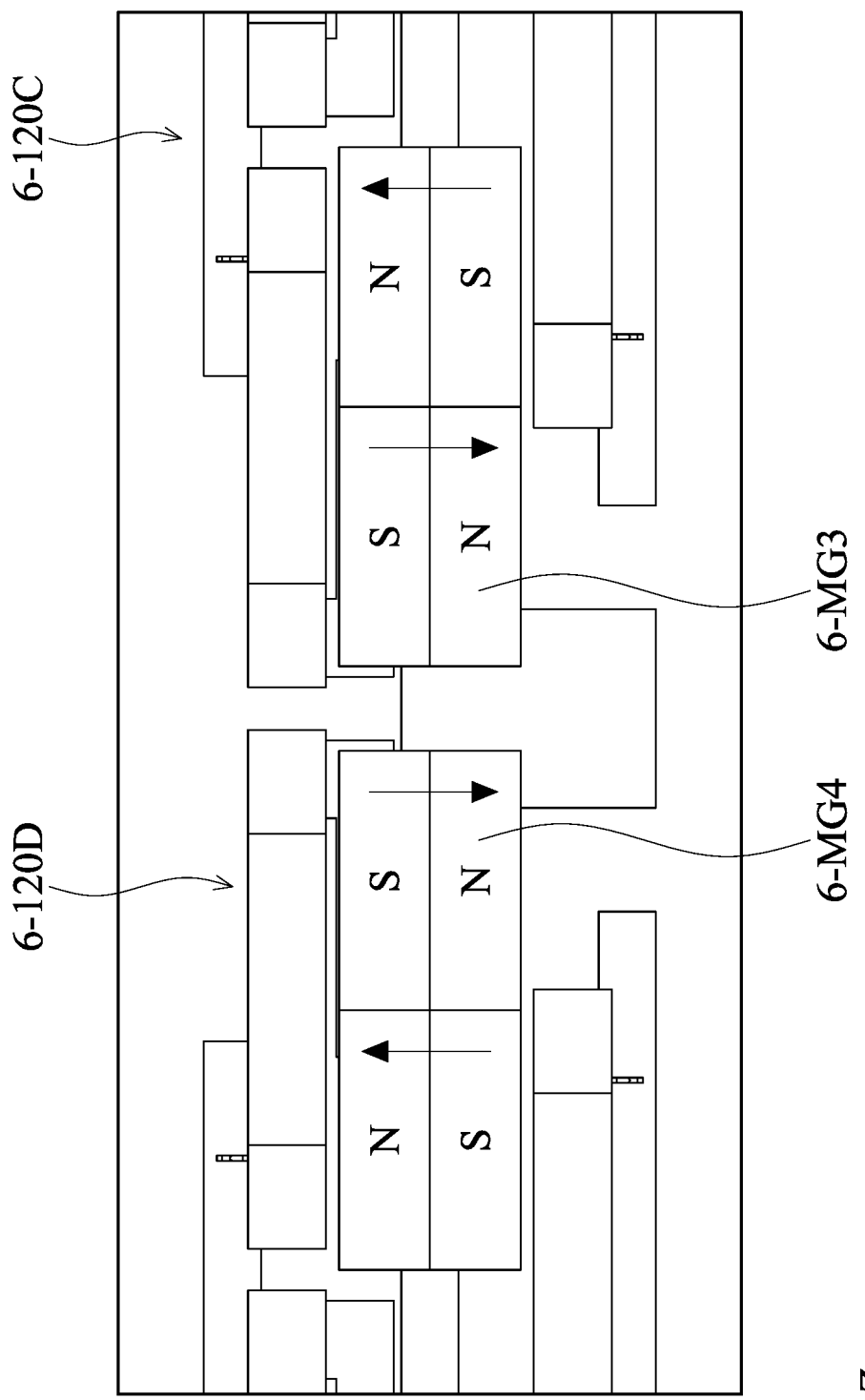
FIG. 86 is an enlarged schematic diagram of FIG. 85 according to the embodiment of the present disclosure.

Please refer to FIG. 85 and FIG. 86. FIG. 86 is an enlarged schematic diagram of FIG. 85 according to the embodiment of the present disclosure. In this embodiment, the magnetic pole directions of the magnetic element 6-MG3 of the driving assembly 6-120C and the magnetic element 6-MG4 of the driving assembly 6-120D are parallel to each other, and the magnetic element 6-MG3 and the magnetic element 6-MG4 can move in the opposite directions. For example, the magnetic element 6-MG3 moves in the +Z-axis, and the magnetic element 6-MG4 moves in the −Z-axis.

In addition, in this embodiment, the circuit assembly 6-130C and the circuit assembly 6-130D share the same ground terminal, but in other embodiments, they can be connected to different ground terminals respectively.

The present disclosure provides an optical element driving mechanism configured to drive the movable assembly 6-108 (for example, a camera lens) for performing the auto-focus function. In an embodiment of the present disclosure, the optical element driving mechanism 6-100 may include a first coil group 6-121, a second coil group 6-122, and a magnetic module 6-123. When the first coil group 6-121 and the second coil group 6-122 are provided with electricity, they can act with the magnetic module 6-123 to generate the electromagnetic driving force to move the magnetic module 6-123 in the first direction. Because the coils in the first coil group 6-121 and the second coil group 6-122 are turned on in sequence, it can ensure that the magnetic module 6-123 moves smoothly in the first direction, and the range of motion of the movable assembly 6-108 can be increased.

Based on the design of the optical element driving mechanism in this disclosure, a greater driving force can be achieved to drive the aforementioned camera lens, and the purpose of miniaturization can also be achieved at the same time.

The Seventh Embodiment Group

Figure 87:
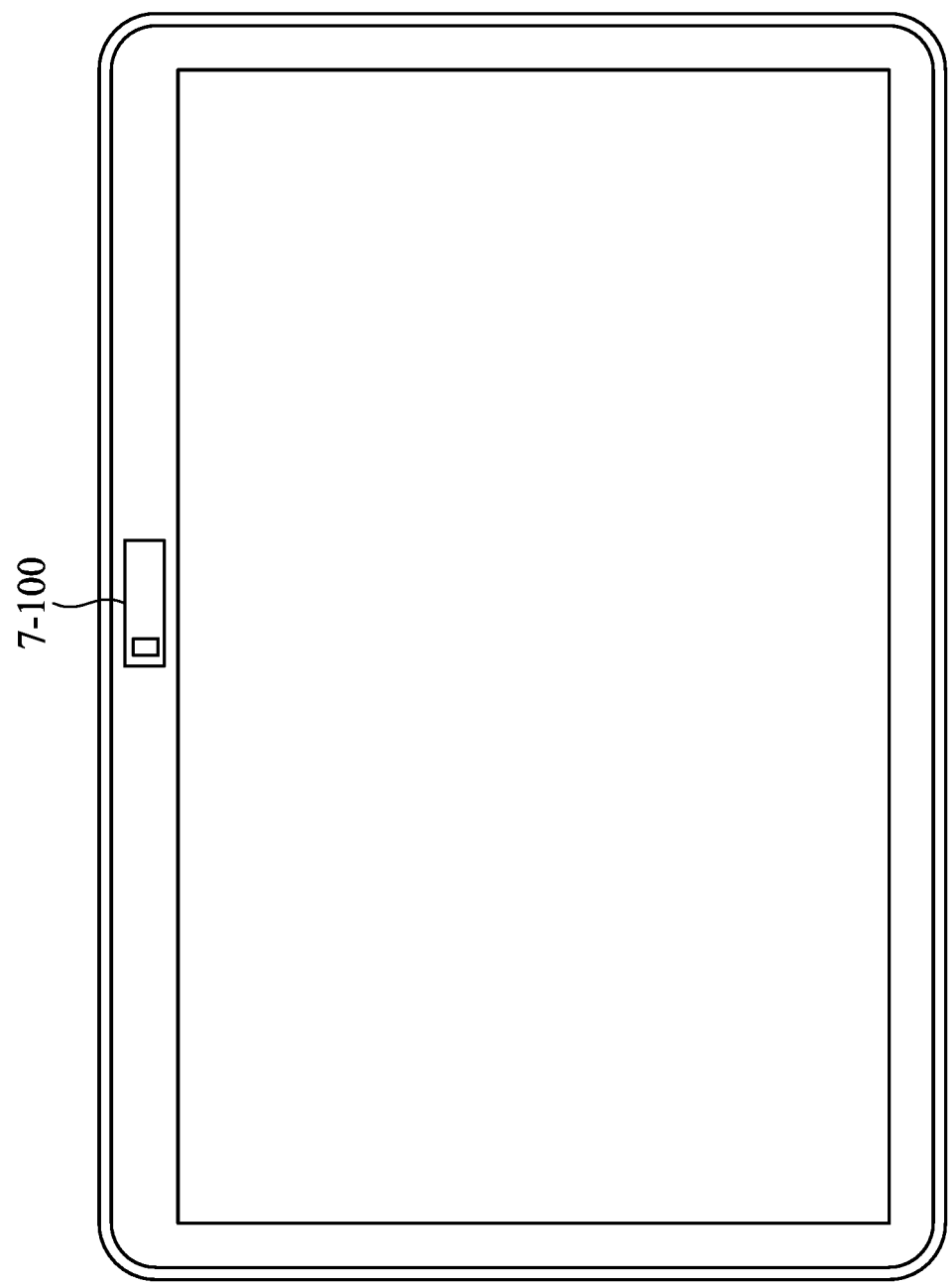
FIG. 87 shows a schematic view of an electrical device with an optical element driving mechanism according to an embodiment of the present disclosure.

Firstly, please refer to FIG. 87, an optical element driving mechanism 7-100 of an embodiment of the present disclosure may be mounted in an electrical device 7-1 for taking photos or videos, wherein the aforementioned electrical device 7-1 may, for example, be a smartphone, a tablet or a computer, but the present disclosure is not limited to these. It should be noted that the position and the size between the optical element driving mechanism 7-100 and the electrical device 7-1 shown in FIG. 87 are only an example, which is not for limiting the position and the size between the optical element driving mechanism 7-100 and the electrical device 7-1. In fact, according to different needs, the optical element driving mechanism 7-100 may be mounted at different positions in the electrical device 7-1.

Figure 88:
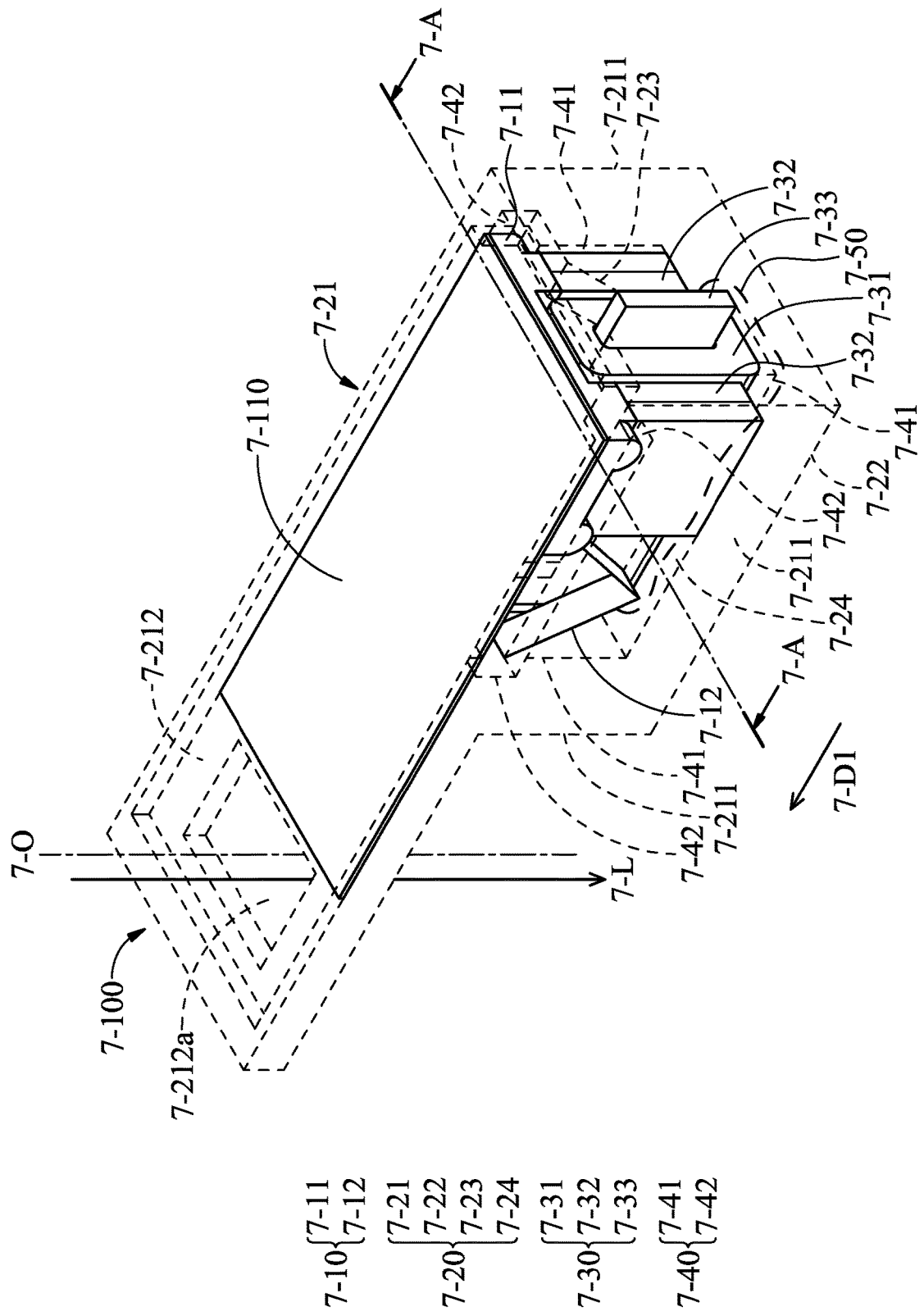
FIG. 88 shows a perspective view of the optical element driving mechanism and a first optical element according to an embodiment of the present disclosure, wherein a fixed part of the optical element driving mechanism is shown as a dashed line.

Please refer to FIG. 88, the optical element driving mechanism 7-100 has an optical axis 7-0, the optical axis 7-O passes through the optical element driving mechanism 7-100. The optical element driving mechanism 7-100 includes a movable part 7-10, a fixed part 7-20, a driving assembly 7-30, a stopping assembly 7-40 and an adhesive element 7-50.

Figure 89:
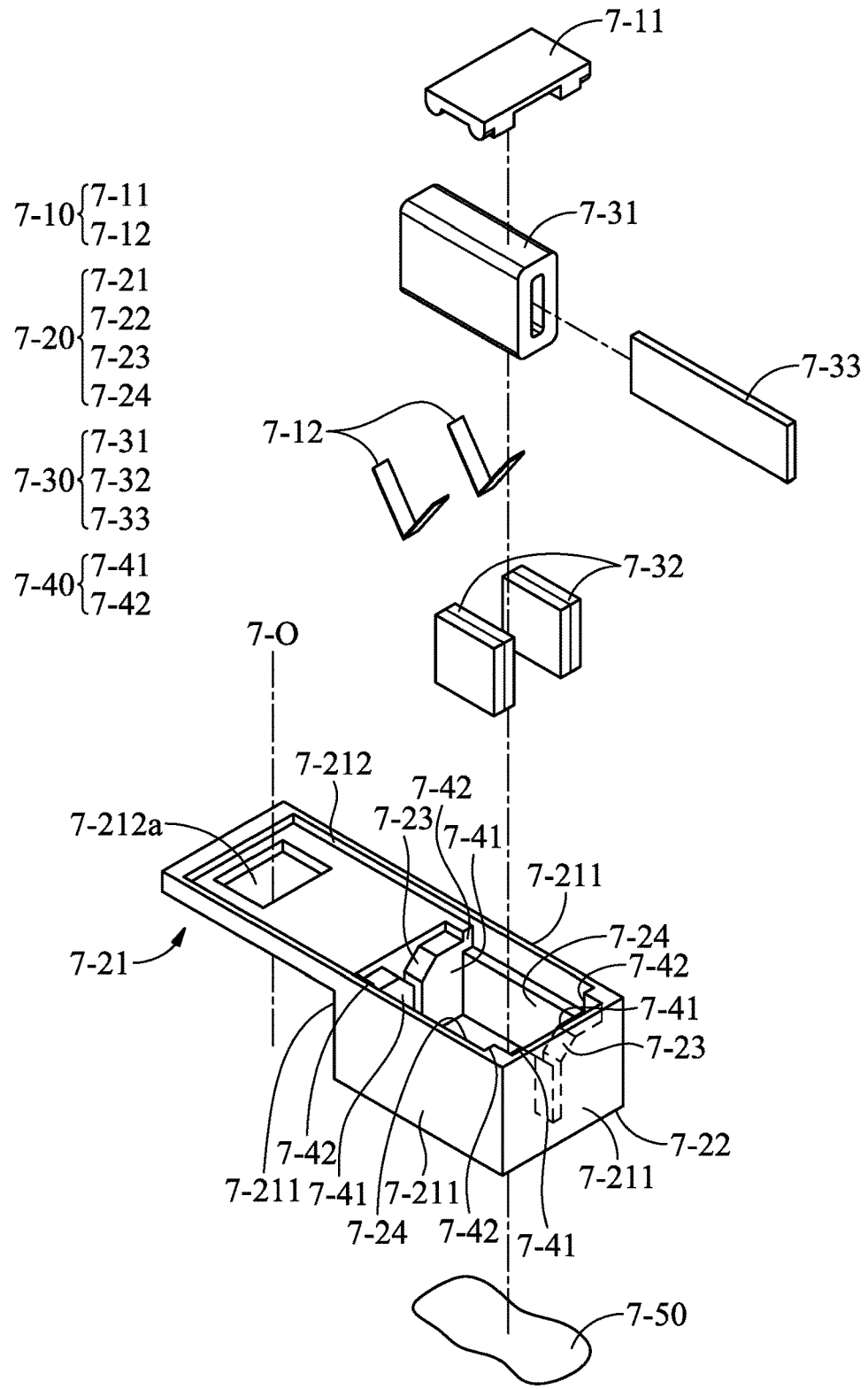
FIG. 89 shows an exploded view of the optical element driving mechanism according to an embodiment of the present disclosure.

Please refer to FIGS. 88 and 89, the movable part 7-10 includes a holder 7-11 and two elastic elements 7-12. The holder 7-11 of the movable part 7-10 is movably disposed on the fixed part 7-20, and the movable part 7-10 connects to a first optical element 7-110. Specifically, the first optical element 7-110 is disposed on the holder 7-11, and the first optical element 7-110 may move as the holder 7-11 moves relative to the fixed part 7-20.

Please refer to FIGS. 88 and 89, the fixed part 7-20 includes an outer frame 7-21, a base plate 7-22, a magnetic conductive element accommodation 7-23 and a magnetic element accommodation 7-24. The outer frame 7-21 of the fixed part 7-20 includes four outer frame sidewalls 7-211 and an outer frame extension part 7-212, and the holder 7-11 is disposed on the outer frame 7-21. The four outer frame sidewalls 7-211 face the driving assembly 7-30, and are parallel to the optical axis 7-0. Each of the outer frame sidewalls 7-211 is connected to the other two outer frame sidewalls 7-211 to form an inner space surrounded by four outer frame sidewalls 7-211. The outer frame extension part 7-212 extends outwardly in a first direction 7-D1 perpendicular to the optical axis 7-O from one of the outer frame sidewalls 7-211. The outer frame extension part 7-212 has an outer frame extension opening 7-212a, and the outer frame extension opening 7-212a may allow a light 7-L to pass through.

Please refer to FIGS. 88 and 89 again, the driving assembly 7-30 includes a driving coil 7-31, two magnetic elements 7-32 and a magnetic conductive element 7-33. The driving coil 7-31, the magnetic element 7-32 and the magnetic conductive element 7-33 of the driving assembly 7-30 may be disposed on the fixed part 7-20, and may be disposed in the inner space. The driving coil 7-31 surrounds (e.g., winds) the magnetic conductive element 7-33 in the first direction 7-D1, and the outer frame sidewalls 7-211 face the driving coil 7-31. The magnetic elements 7-32 are disposed on the respective sides of the driving coil 7-31.

Please refer to FIGS. 88 and 89 again, the stopping assembly 7-40 includes four magnetic elements stoppers 7-41 and four holder stoppers 7-42. The magnetic element stoppers 7-41 of the stopping assembly 7-40 are disposed between the magnetic elements 7-32 and the outer frame sidewalls 7-211 to limit the range of motion of the magnetic elements 7-32. The holder stoppers 7-42 of the stopping assembly 7-40 are disposed between the holder 7-11 and the outer frame sidewalls 7-211 to limit the range of motion of the holder 7-11 relative to the fixed part 7-20.

Figure 90:
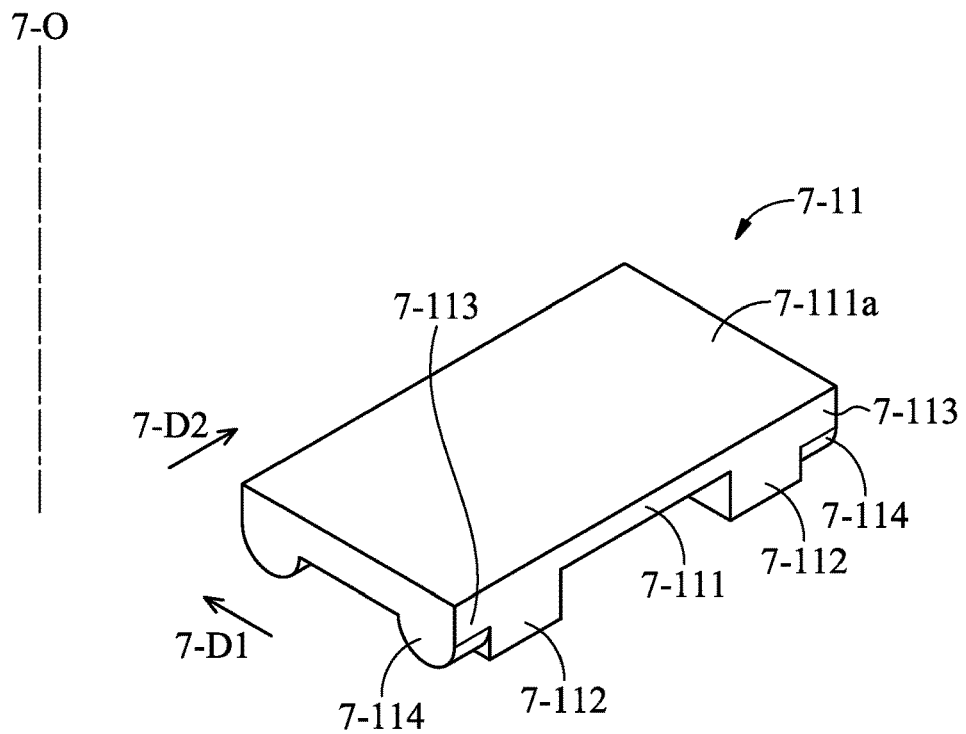
FIG. 90 shows a schematic view of a holder of the optical element driving mechanism according to an embodiment of the present disclosure.

Please refer to FIG. 90, the holder 7-11 of the movable part 7-10 includes a holder body 7-111, two holder connecting parts 7-112, two holder protrusions 7-113 and two holder sliding parts 7-114. The holder body 7-111 has a holder body surface 7-111a. The first optical element 7-110 is disposed on the holder body surface 7-111a, and is fixedly connected to the holder body surface 7-111a (FIG. 88). Therefore, the holder body surface 7-111a may have a flat shape, or any shape that may be effectively connected to the first optical element 7-110. The holder connecting part 7-112 is located on both sides of the holder body 7-111, and the holder connecting part 7-112 extends downwardly from the holder body 7-111, and is respectively connected to the two magnetic elements 7-32 (FIG. 88).

The holder protrusion 7-113 extends outwardly in a second direction 7-D2 perpendicular to the optical axis 7-O and the first direction 7-D1 from both sides of the holder body 7-111. The holder sliding parts 7-114 are located on both sides of the holder 7-11, and may connect to the holder connecting part 7-112. The holder sliding parts 7-114 may be disposed on the outer frame sidewalls 7-211 to move on the outer frame sidewall 7-211. It should be noted that the holder sliding part 7-114 may have a wheel shape, or any shape that is helpful to the movement of the holder 7-11.

Figure 91:
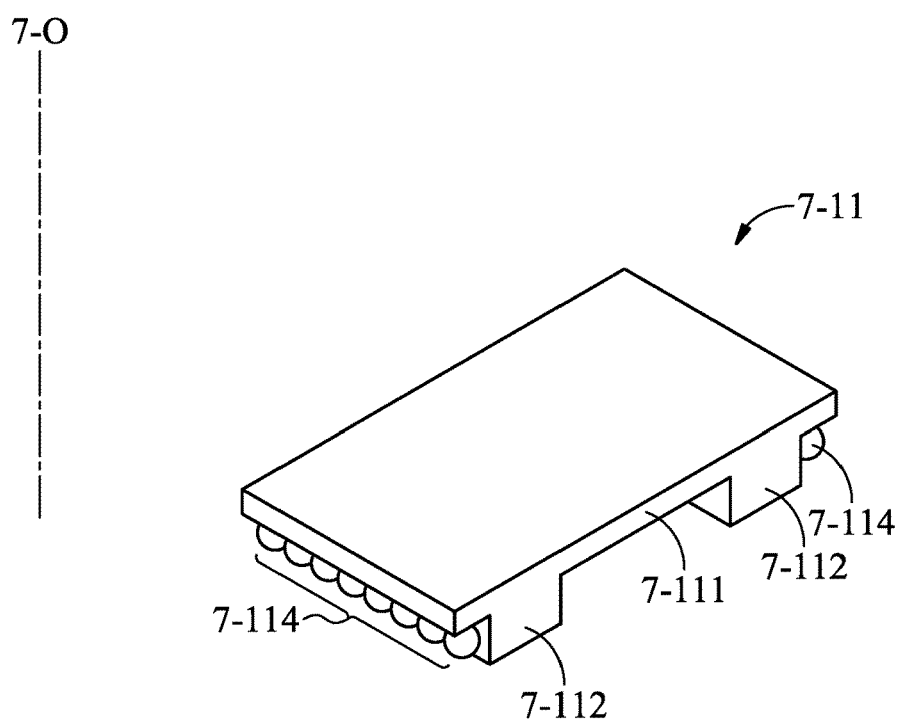
FIG. 91 shows a schematic view of the holder of the optical element driving mechanism according to another embodiment of the present disclosure.

As shown in FIG. 91, in some embodiments, the holder sliding part 7-114 may also be a plurality of balls 7-114. In the embodiment shown in FIG. 91, the balls 7-114 move (e.g. roll) between the holder body 7-111 and the outer frame sidewall 7-211 (may refer to FIG. 88), so that the holder 7-11 may move relative to the fixed part 7-20.

Figure 92:
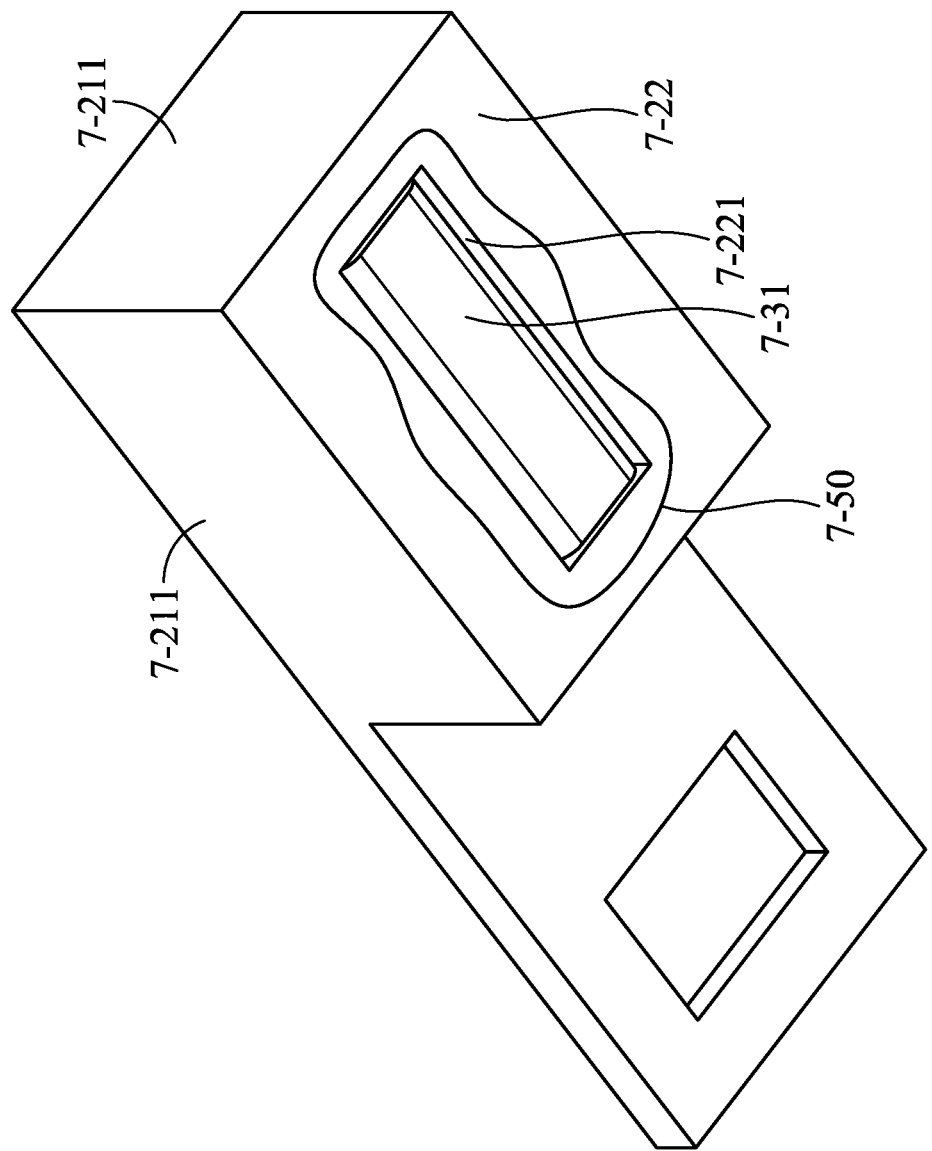
FIG. 92 shows a bottom view of the optical element driving mechanism according to an embodiment of the present disclosure.

Please refer to FIG. 92, the base plate 7-22 is located below the outer frame sidewalls 7-211, and is connected to the outer frame sidewalls 7-211. The base plate 7-22 has a base plate opening 7-221. The base plate opening 7-221 corresponds to the driving coil 7-31, which makes the driving coil 7-31 exposed to the base plate opening 7-221. The adhesive element 7-50 may be disposed on the portion of the driving coil 7-31 exposed to the base plate opening 7-221, so as to fix the driving coil 7-31 and prevent foreign matter such as dust and water from entering the optical element driving mechanism 7-100 through the base plate opening 7-221. It should be noted that the adhesive element 7-50 shown in FIG. 92 is for reference only, it does not indicate the actual shape the adhesive element 7-50.

Figure 93:
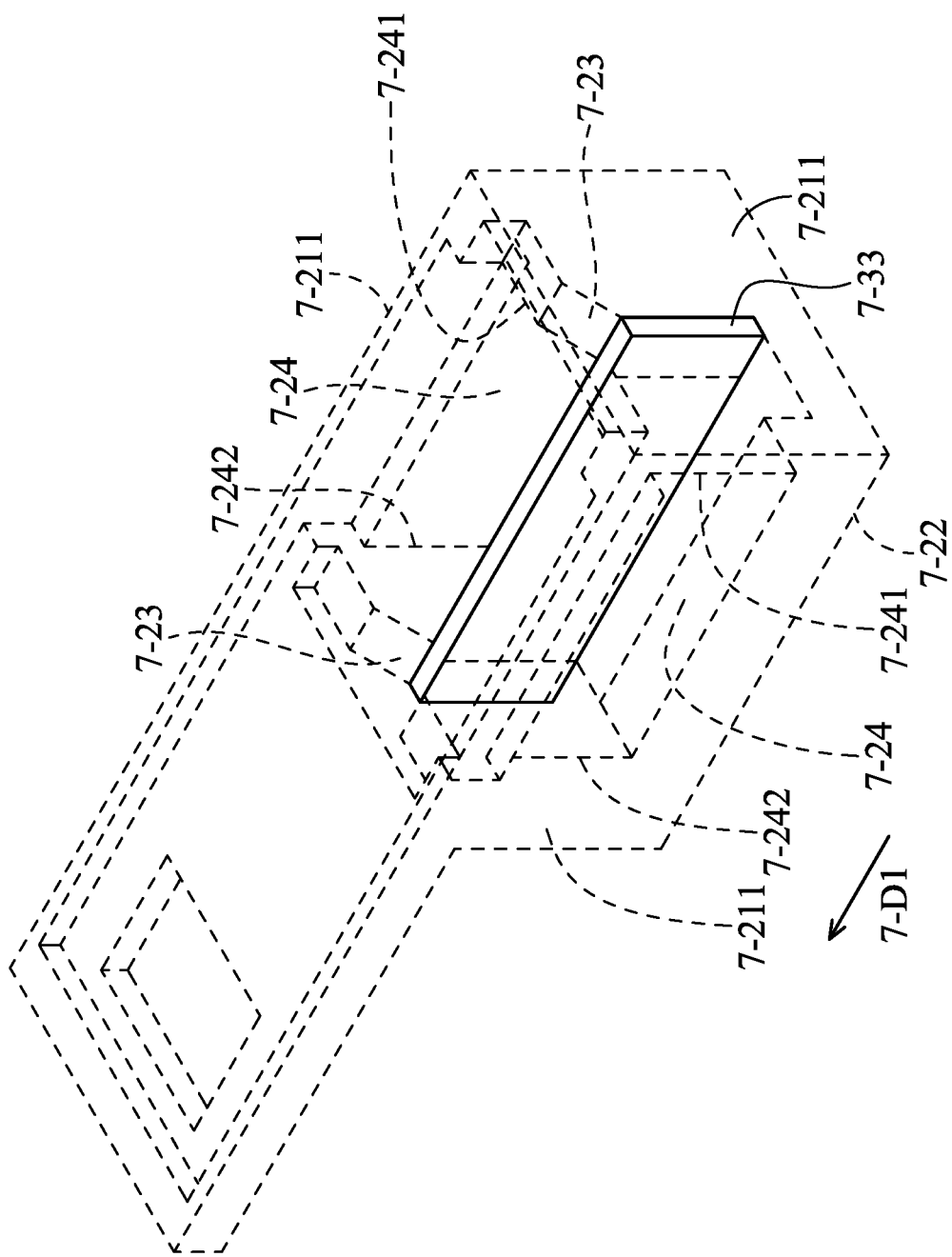
FIG. 93 shows a perspective view of the fixed part and a magnetic conductive element of the optical element driving mechanism according to an embodiment of the present disclosure, wherein the fixed part is shown as a dashed line.

Please refer to FIG. 93, the magnetic conductive element 7-33 is disposed in the magnetic conductive element accommodation 7-23. The magnetic conductive element accommodation 7-23 is disposed on the outer frame sidewall 7-211, and has an indented structure. That is, the width of the upper of the magnetic conductive element accommodation 7-23 is greater than the width of the lower of the magnetic conductive element accommodation 7-23, so as to be helpful to place the magnetic conductive element 7-33 into the magnetic conductive element accommodation 7-23. The magnetic element accommodation 7-24 is disposed on the outer frame sidewall 7-211 not provided with magnetic conductive element accommodation 7-23. The magnetic element accommodation 7-24 extends in the first direction 7-D1 and is adjacent to the base plate 7-22. The magnetic element accommodation 7-24 has a first side 7-241 and a second side 7-242 opposite each other.

Figure 94A:
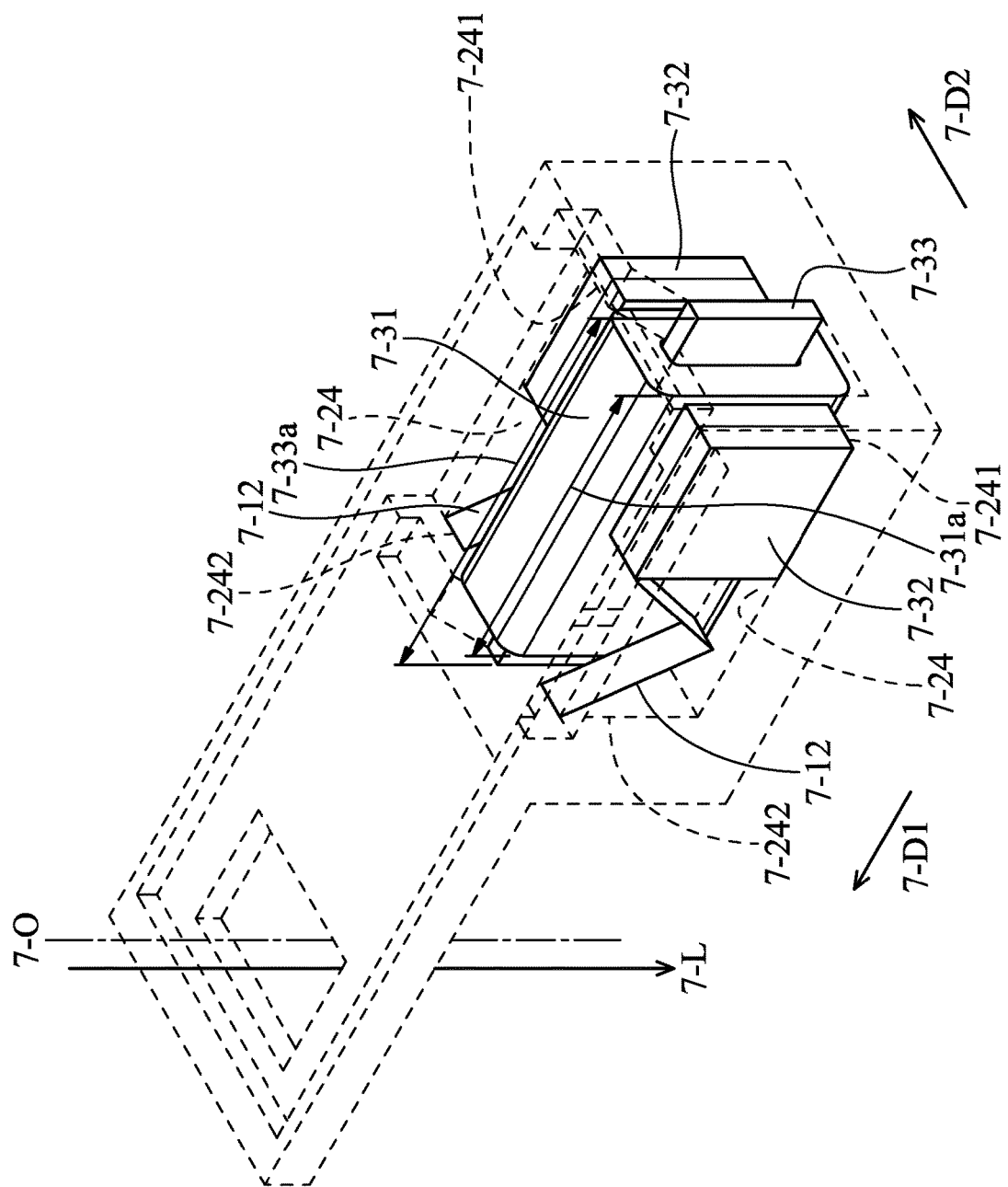
FIG. 94A shows a perspective view of the optical element driving mechanism according to an embodiment of the present disclosure, wherein the fixed part is shown as a dashed line and the holder is omitted.

Please refer to FIG. 94A, in the first direction 7-D1, the largest size 7-31a of the driving coil 7-31 is smaller than the largest size 7-33a of the magnetic conductive element 7-33. By doing so, loosing of the driving coil 7-31 and separating from the magnetic conductive element 7-33 are avoided. The magnetic elements 7-32 are accommodated in the magnetic element accommodation 7-24, and when the driving coil 7-31 does not receive an external current, the magnetic element 7-32 is located on the first side 7-241 (may be regarded as the starting position) of the magnetic element accommodation 7-24. Please refer to FIG. 88, when the magnetic element 7-32 is located on the first side 7-241, the driving assembly 7-30 does not drive the holder 7-11 and the first optical element 7-110, and the first optical element 7-110 does not overlap with the outer frame extension opening 7-212a. That is, the first optical element 7-110 does not shield the outer frame extension opening 7-212a.

Figure 94B:
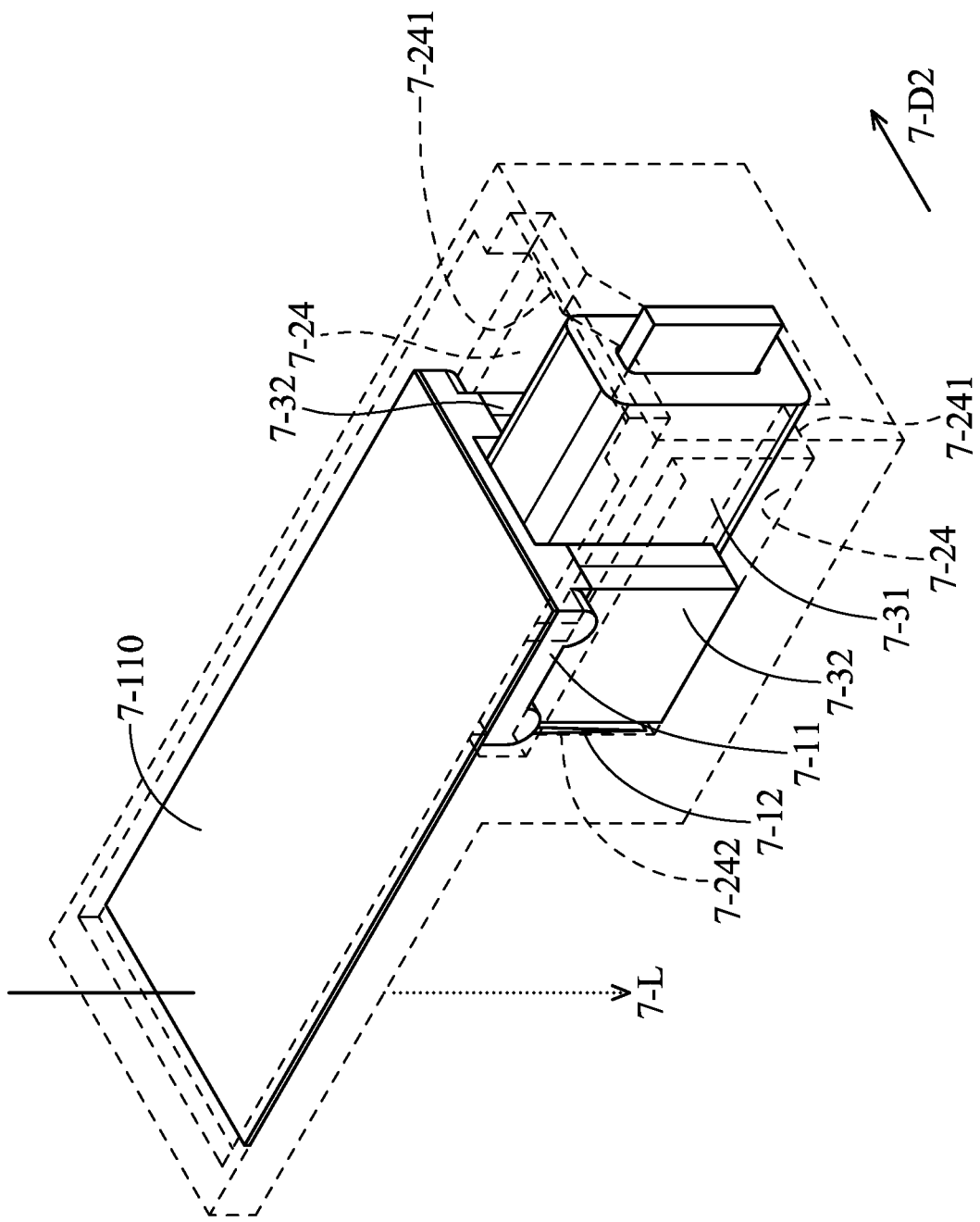
FIG. 94B shows a perspective view of the optical element driving mechanism and the first optical element according to an embodiment of the present disclosure, wherein the fixed part is shown as a dashed line.

When the driving coil 7-31 receives the external current, the magnetic element 7-32 is located on the second side 7-242 (may be regarded as the final position) of the magnetic element accommodation 7-24 (FIG. 94B). By doing so, the holder 7-11 and the first optical element 7-110 may be driven by the driving assembly 7-30, so that the first optical element 7-110 overlaps with the outer frame extension opening 7-212a (FIG. 94B). That is, the first optical element 7-110 shields the outer frame extension opening 7-212a. When the first optical element 7-110 is a shutter, a filter, a neutral density filter (ND filter), a polarizer, etc., the first optical element 7-110 may shield or reduce the light 7-L passing through the outer frame extension opening 7-212a.

As shown in FIG. 94A, the magnetic elements 7-32 are located on the left side and right side of the driving coil 7-31, respectively. That is, the magnetic elements 7-32 and the driving coil 7-31 are aligned in the second direction 7-D2. By doing so, the height of the optical element driving mechanism 7-100 in direction of the optical axis 7-O may be reduced. The magnetic conductive element 7-33 is connected to the fixed part 7-20, and is disposed in the magnetic conductive element accommodation 7-23 to prevent the magnetic conductive element 7-33 from moving relative to the fixed part 7-20.

In the embodiment shown in FIG. 94A, the elastic element 7-12 of the movable part 7-10 is disposed between the second side 7-242 of the magnetic element accommodation 7-24 and the magnetic element 7-32, and is connected to the second side 7-242 of the magnetic element accommodation 7-24 and the magnetic element 7-32. By doing so, when the driving coil 7-31 does not receive the external current, by the stretching force of the elastic element 7-12, the magnetic element 7-32 is disposed on the first side 7-241 of the magnetic element accommodation 7-24 more stably.

Figure 95A:
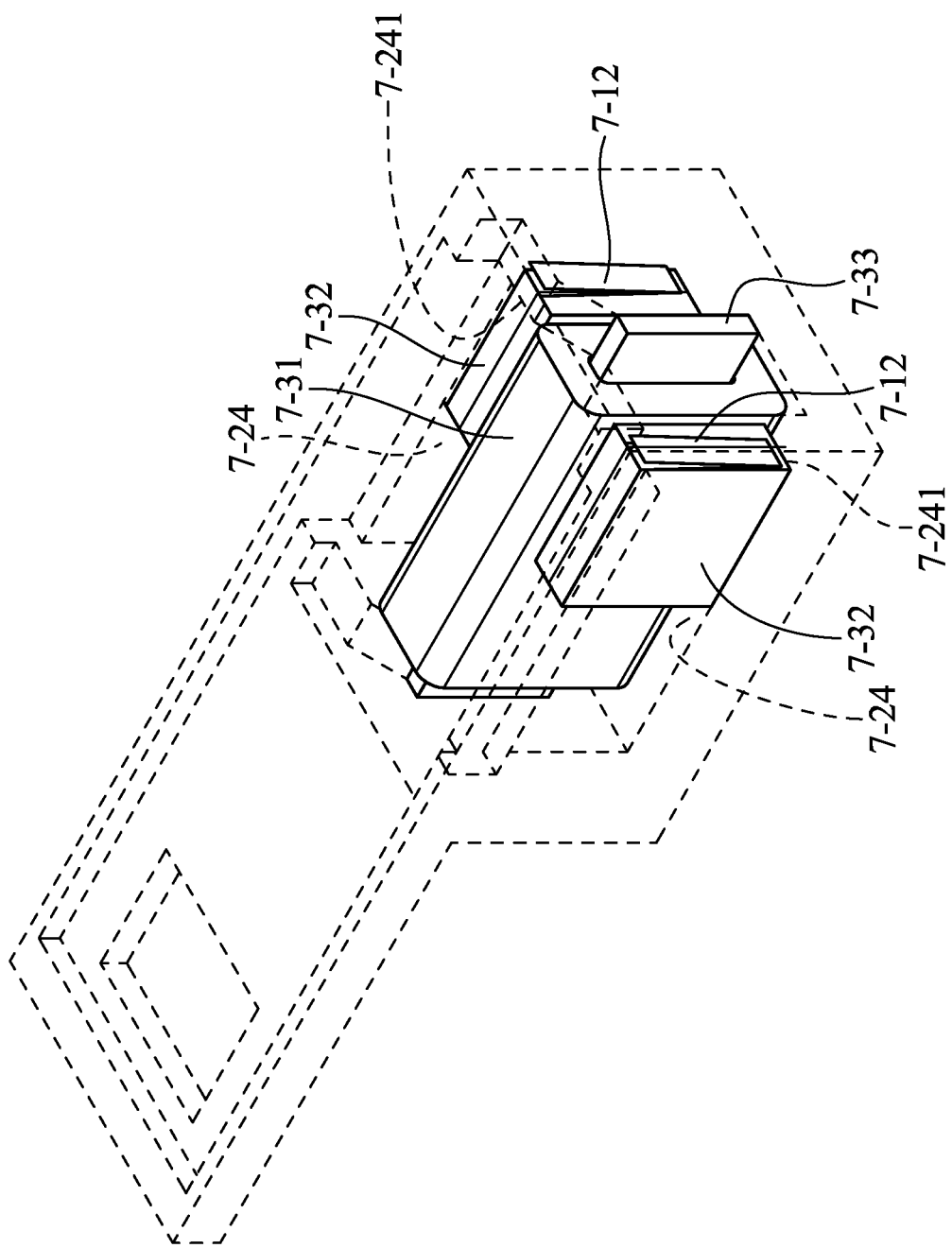
FIG. 95A shows a perspective view of the optical element driving mechanism according to another embodiment of the present disclosure, wherein the fixed part is shown as a dashed line and the holder is omitted.

Please refer to FIG. 95A, in the embodiment shown in FIG. 95A, the elastic element 7-12 of the movable part 7-10 is disposed between the first side 7-241 of the magnetic element accommodation 7-24 and the magnetic element 7-32, and is connected to the first side 7-241 of the magnetic element accommodation 7-24 and the magnetic element 7-32. By doing so, when the driving coil 7-31 does not receive the external current, by the contraction force of the elastic element 7-12, the magnetic element 7-32 is disposed on the first side 7-241 of the magnetic element accommodation 7-24 more stably.

Figure 95B:
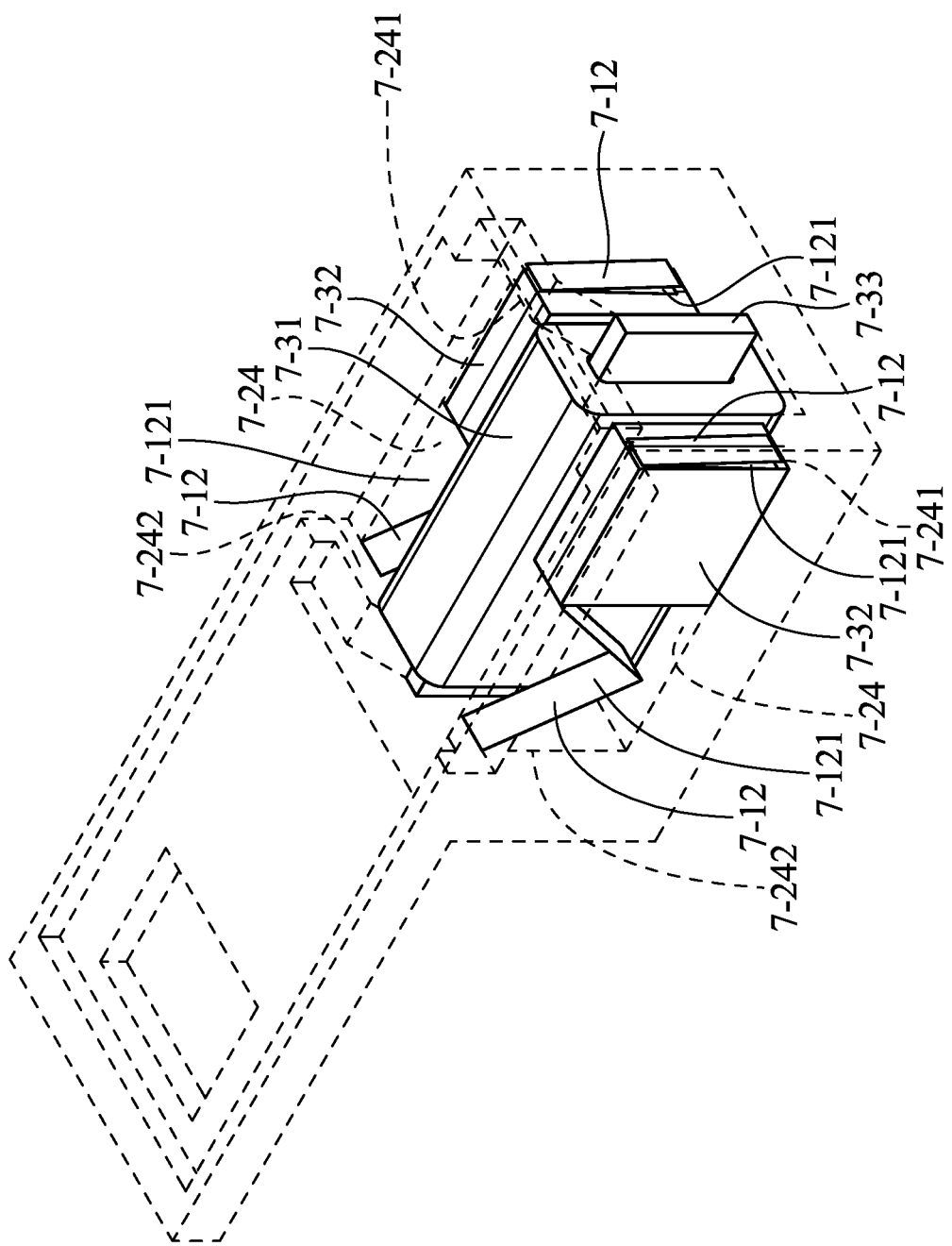
FIG. 95B shows a perspective view of the optical element driving mechanism according to another embodiment of the present disclosure, wherein the fixed part is shown as a dashed line and the holder is omitted.

Please refer to FIG. 95B, in the embodiment shown in FIG. 95B, the movable part 7-10 includes four elastic elements 7-12. The elastic elements 7-12 are disposed between the first side 7-241 of the magnetic element accommodation 7-24 and the magnetic element 7-32 and between the second side 7-242 of the magnetic element accommodation 7-24 and the magnetic element 7-32. The elastic elements 7-12 are connected to the first side 7-241 and the second side 7-242 of the magnetic element accommodation 7-24 and the magnetic element 7-32. By doing so, when the driving coil 7-31 does not receive the external current, by the stretching force and the contraction force of the elastic element 7-12, the magnetic element 7-32 is disposed on the first side 7-241 of the magnetic element accommodation 7-24 more stably. Moreover, the elastic elements 7-12 located in the same magnetic element accommodation 7-24 are upside down arranged. That is, when an opening 7-121 of the elastic element 7-12 located on the first side 7-241 faces up, the opening 7-121 of the elastic element 7-12 located on the second side 7-242 faces down (not shown); and when the opening 7-121 of the elastic element 7-12 located on the second side 7-242 faces up, the opening 7-121 of the elastic element 7-12 located on the first side 7-241 faces down (as shown in FIG. 95B). By doing so, the stretching force and the contraction force applied on the magnetic element 7-32 are more even, and thereby the magnetic element 7-32 is more stable.

Figure 96:
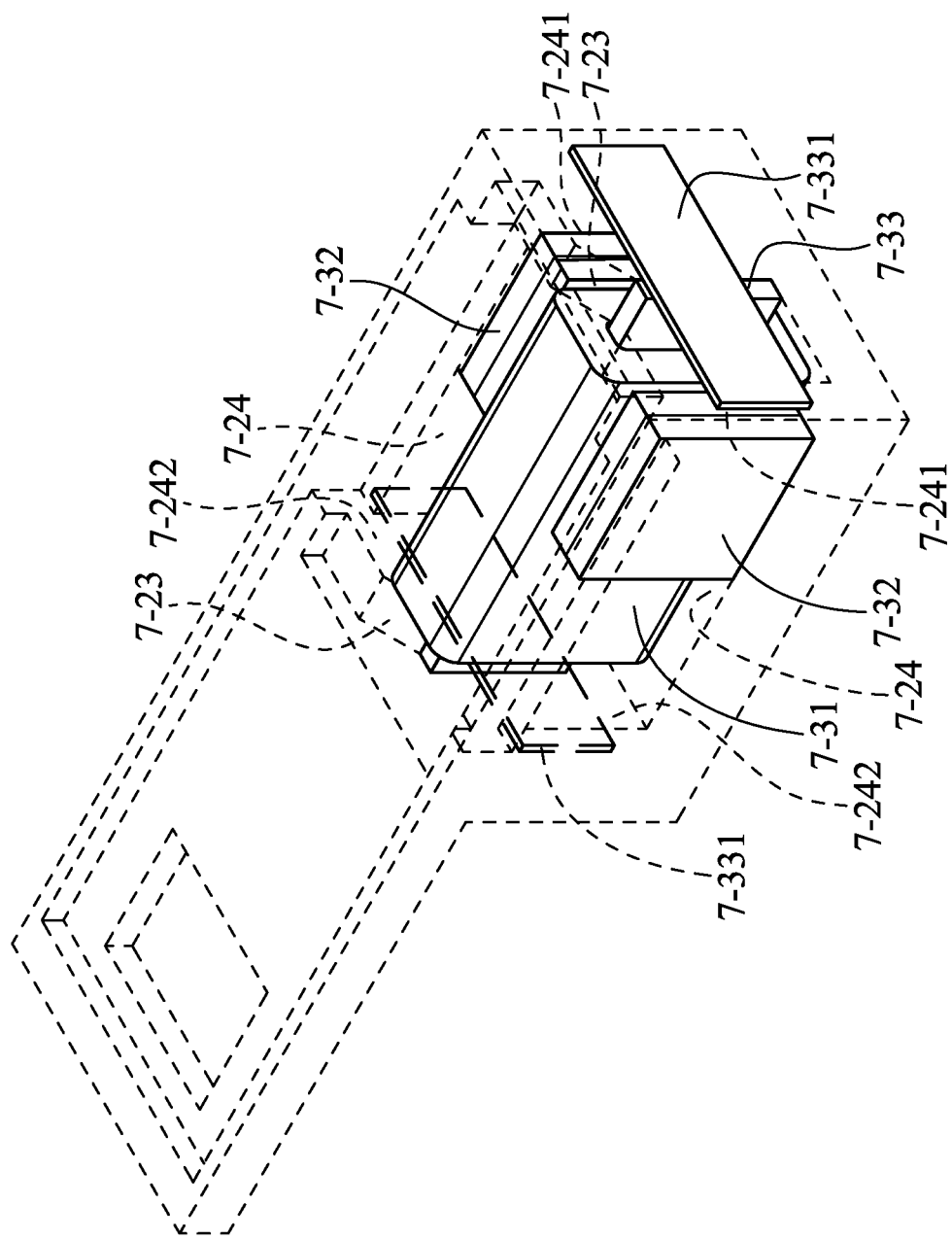
FIG. 96 shows a perspective view of the optical element driving mechanism according to another embodiment of the present disclosure, wherein the fixed part is shown as a dashed line and the holder is omitted.

Please refer to FIG. 96, a magnetic conductive element 7-331 may be disposed in the front of or behind the magnetic conductive element accommodation 7-23, so that the magnetic element 7-32 stays on the first side 7-241 or the second side 7-242 by the attractive force of the magnetic conductive element 7-33. In this way, when the driving coil 7-31 does not receive the external current, the holder 7-11 and the first optical element 7-110 (not shown in FIG. 96) may stay on the first side 7-241 (starting position) or the second side 7-242 (final position). It should be noted that although FIG. 96 shows two magnetic conductive elements 7-331, however, in practice, one, three, or more magnetic conductive elements 7-331 may be provided. In the embodiment shown in FIG. 96, the movable part 7-10 may no longer include the elastic element 7-12, and the magnetic element 7-32, holder 7-11 and the first optical element 7-110 stay at the desired position only by the attractive force between the magnetic element 7-32 and the magnetic conductive element 7-331.

Figure 97:
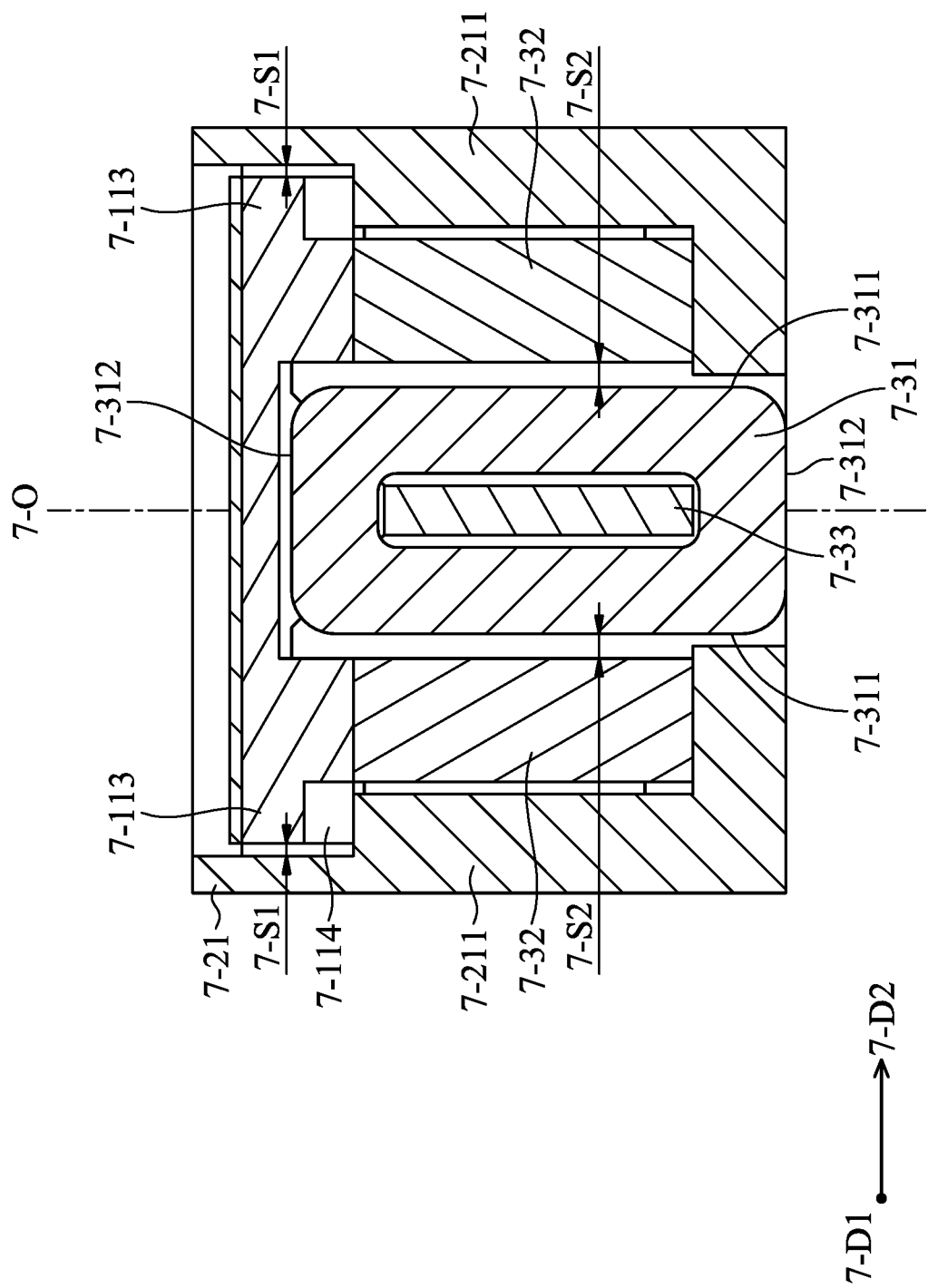
FIG. 97 shows a cross-sectional view of the optical element driving mechanism according to an embodiment of the present disclosure along a line 7-A-7-A in FIG. 88.

Please refer to FIG. 97, since the driving coil 7-31 surrounds (e.g. wounds) the magnetic conductive element 7-33 in the first direction 7-D1, therefore, the driving coil 7-31 has a polygonal structure when observed in the first direction 7-D1. Further, the driving coil 7-31 has two long sides 7-311 and two short sides 7-312. The long side 7-311 of the driving coil 7-31 is parallel to the optical axis 7-0, and the short side 7-312 of the driving coil 7-31 is parallel to the second direction 7-D2. The magnetic element 7-32 is disposed corresponding to the long side 7-311 of the driving coil 7-31. In this way, the electromagnetic force is effectively increased, so as to increase the driving force of the driving assembly 7-30 which drives the movable part 7-10. Moreover, the like magnetic poles of the magnetic elements 7-32 face the driving coil 7-31 (e.g. the north-seeking poles of the magnetic elements 7-32 face the driving coil 7-31, or the south-seeking poles of the magnetic elements 7-32 face the driving coil 7-31). By doing so, the magnetic elements 7-32 may move in the first direction 7-D1 at the same time when affected by the electromagnetic force. The minimum distance 7-S1 between the holder protrusion 7-113 of the holder 7-11 and the outer frame sidewall 7-211 of the outer frame 7-21 of the fixed part 7-20 is smaller than the minimum distance 7-S2 between the magnetic element 7-32 and the driving coil 7-31. In this way, the holder protrusion 7-113 contacts with the outer frame sidewall 7-211 first when the holder 7-11 is impacted and moves in the second direction 7-D2, and the magnetic element 7-32 is not in contact with the driving coil 7-31, thereby preventing the magnetic element 7-32 from colliding with the driving coil 7-31, and the damage is prevented.

Figure 98:
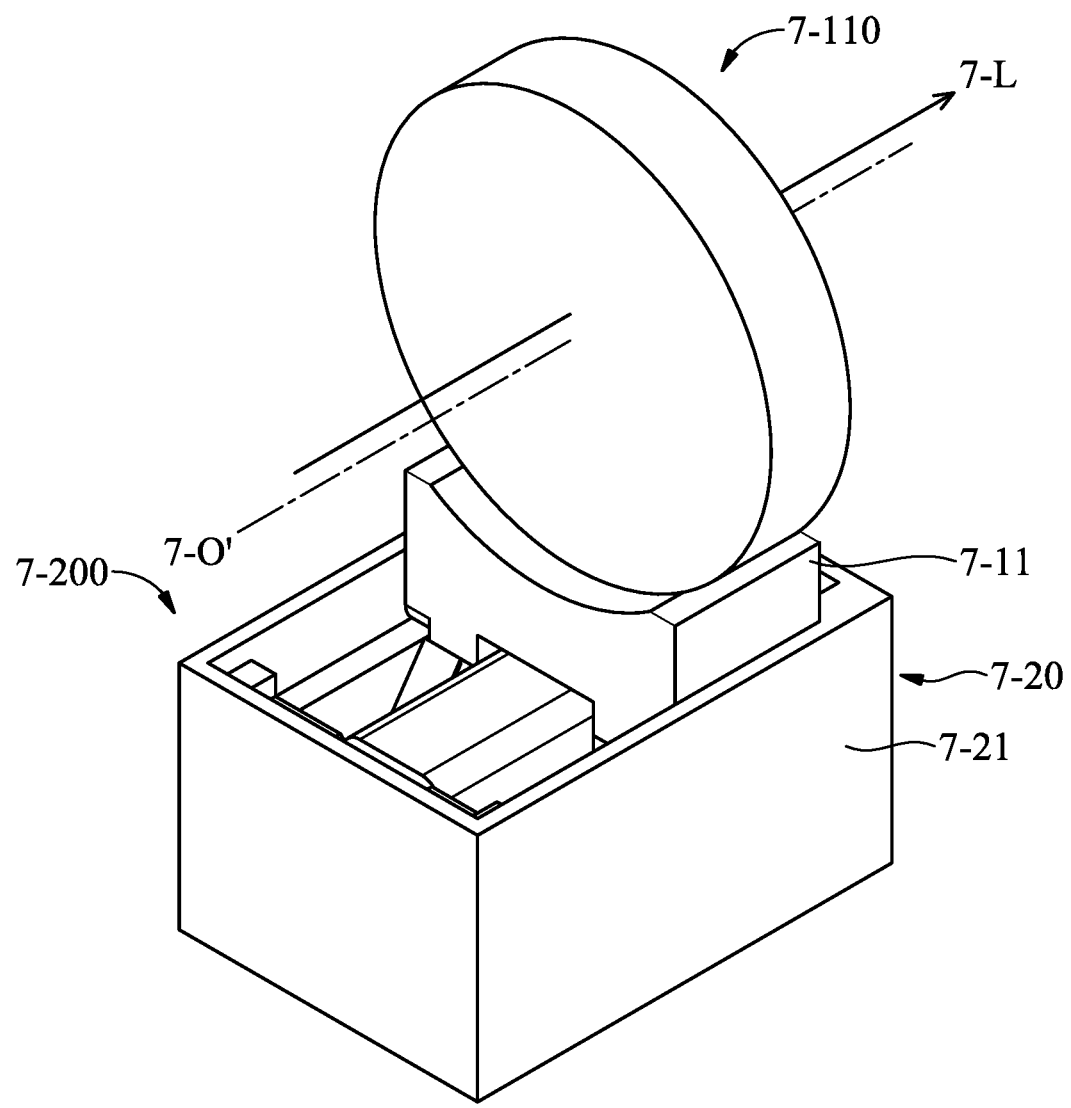
FIG. 98 shows a perspective view of the optical element driving mechanism and the first optical element according to another embodiment of the present disclosure.

Please refer to FIG. 98, FIG. 98 is a perspective view of an optical element driving mechanism 7-200 and the first optical element 7-110 of another embodiment of the present disclosure. The outer frame 7-21 of the fixed part 7-20 of the optical element driving mechanism 7-200 no longer includes an outer frame extension, and the first optical element 7-110 is a lens or the like. The main structure, function, and configuration of the optical element driving mechanism 7-200 same as that of the optical element driving mechanism 7-100 are not repeated herein. In the present embodiment, the optical axis 7-0' does not pass through the optical element driving mechanism 7-200, instead, the moving direction of the holder 7-11 the first optical element 7-110 is parallel to the optical axis 7-0'. With the movement of the first optical element 7-110, the path of the light 7-L is varied, thereby achieving zooming focusing.

Figure 99:
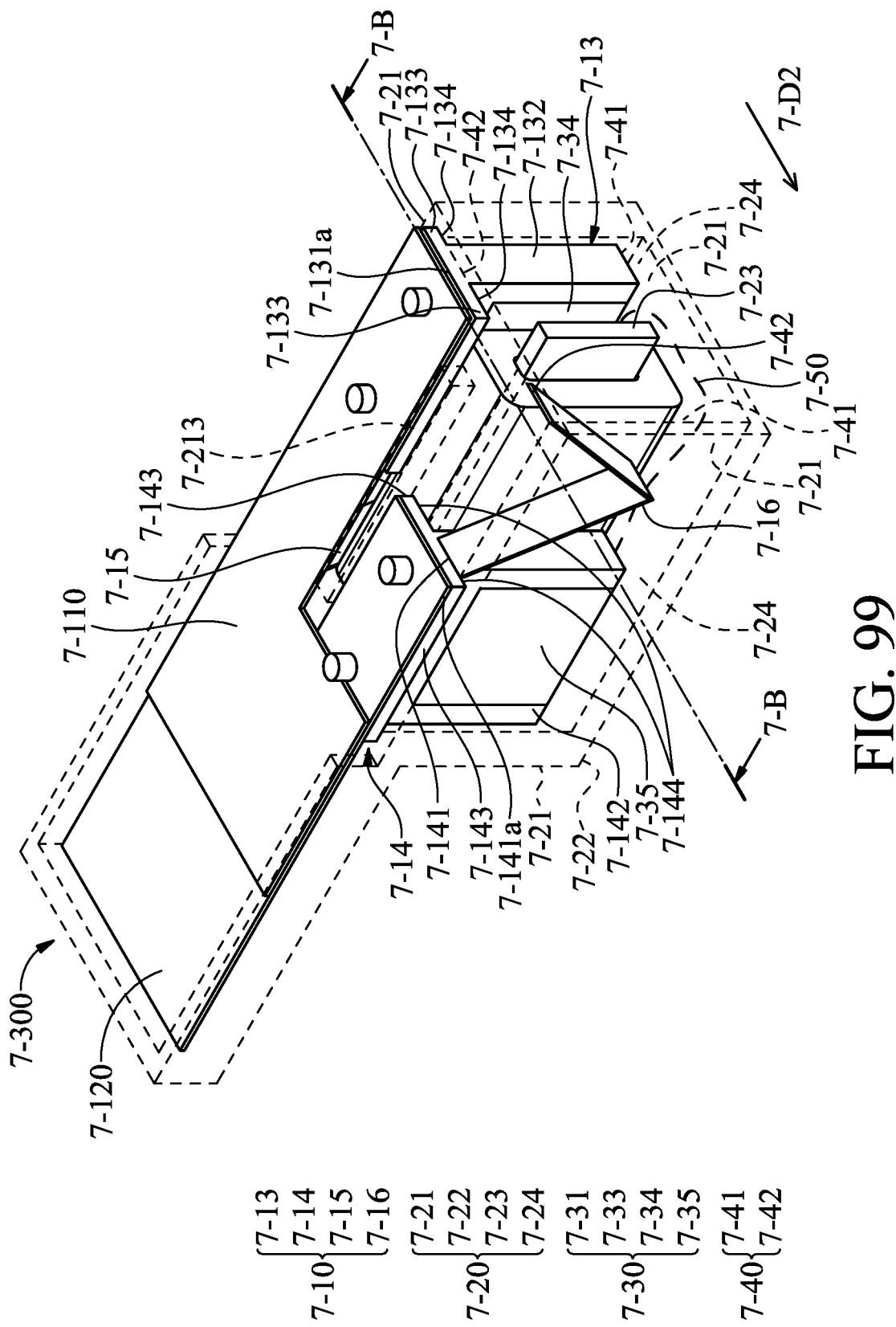
FIG. 99 shows a perspective view of the optical element driving mechanism, the first optical element and a second optical element according to another embodiment of the present disclosure.
Figure 100:
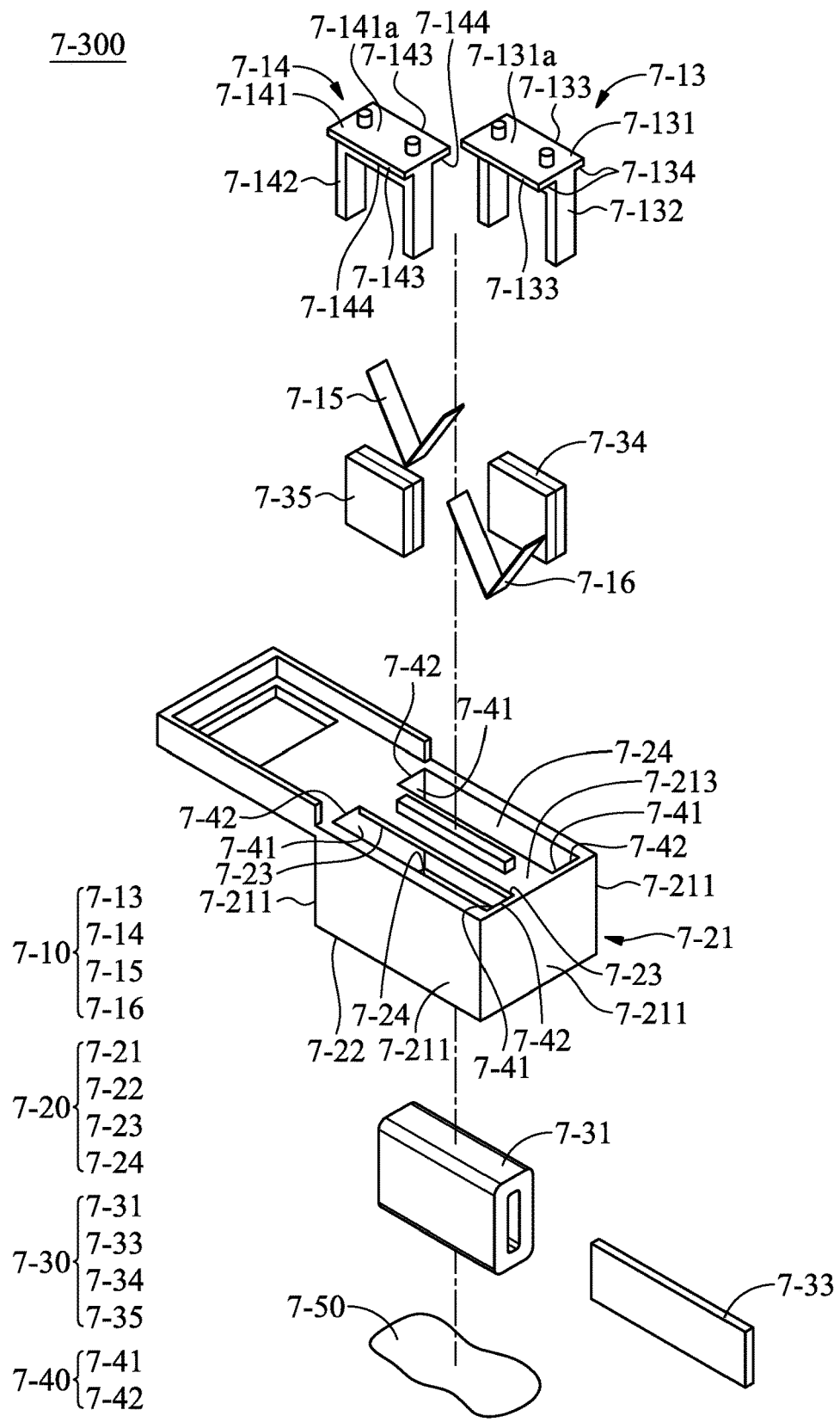
FIG. 100 shows an exploded view of the optical element driving mechanism according to another embodiment of the present disclosure.

Please refer to FIGS. 99 and 100, FIG. 99 is a perspective view of an optical element driving mechanism 7-300, the first optical element 7-110 and a second optical element 7-120 of another embodiment of the present disclosure, while FIG. 100 is an exploded view of the optical element driving mechanism 7-300. The main structure, function, and configuration of the optical element driving mechanism 7-300 same as that of the optical element driving mechanism 7-100 are not repeated herein.

As shown in FIGS. 99 and 100, the movable part 7-10 of the optical element driving mechanism 7-300 no longer includes a holder 7-11 or an elastic element 7-12. However, the movable part 7-10 includes a first movable unit 7-13, a second movable unit 7-14, a first elastic element 7-15, and a second elastic element 7-16. It should be noted that the configuration of the first elastic element 7-15 and the second elastic elements 7-16 is different from the configuration of the elastic elements 7-12. The outer frame 7-21 of the fixed part 7-20 of the optical element driving mechanism 7-300 includes an outer frame supporting wall 7-213. The driving assembly 7-30 of the optical element driving mechanism 7-300 no longer includes magnetic elements 7-32. However, the driving assembly 7-30 further includes a first magnetic element 7-34 and a second magnetic element 7-35. It should be noted that the configuration of the first magnetic element 7-34 and the second magnetic element 7-35 is different from that of the magnetic elements 7-32.

Please refer to FIG. 99 again, the structures of the first movable unit 7-13 and the second movable unit 7-14 are similar to the holder 7-11 of the optical element driving mechanism 7-100. The first movable unit 7-13 and the second movable unit 7-14 are movably disposed on the outer frame 7-21 of the fixed part 7-20, and are connected to the first optical element 7-110 and the second optical element 7-120, respectively. The first optical element 7-110 and the second optical element 7-120 may be a shutter, a filter, a neutral density filter (ND filter), a polarizer, or the like. Specifically, the first optical element 7-110 is disposed on the first movable unit 7-13, and the first optical element 7-110 may move as the first movable unit 7-13 moves relative to the fixed part 7-20; the second optical element 7-120 is disposed on the second movable unit 7-14, and the second optical element 7-120 may move as the second movable unit 7-14 moves relative to the fixed part 7-20.

The first movable unit 7-13 includes a first movable unit body 7-131, a first movable unit connecting part 7-132, two first movable unit protrusions 7-133, and a first movable unit sliding part 7-134. The first movable unit body 7-131 has a first movable unit body surface 7-131a. The first optical element 7-110 is disposed on the first movable unit body surface 7-131a, and is fixedly connected to the first movable unit body surface 7-131a. Therefore, the first movable unit body surface 7-131a may have a flat shape, or any shape that may be effectively connected to the first optical element 7-110. The first movable unit connecting part 7-132 is located on both sides of the first movable unit body 7-131, and the first movable unit connecting part 7-132 extends downwardly from the first movable unit body 7-131, and is connected to the first magnetic element 7-34.

The first movable unit protrusions 7-133 extend outwardly in the second direction 7-D2 from the both sides of the first movable unit body 7-131. The first movable unit sliding part 7-134 is located at the two sides of the first movable unit 7-13. The first movable unit sliding part 7-134 may be placed on the outer frame sidewalls 7-211 and the outer frame supporting wall 7-213 to move on the outer frame sidewalls 7-211 and the outer frame supporting wall 7-213. It should be noted that the first movable unit sliding part 7-134 may have a flat shape, a wheel shape, or any shape that is helpful to the movement of the first movable unit 7-13. In some embodiments, the first movable unit sliding part 7-134 may also be balls separated from the first movable unit body 7-131 (may refer to FIG. 91). The balls move (e.g. roll) between the first movable unit body 7-131 and the outer frame sidewall 7-211, so that the first movable unit 7-13 may move relative to the fixed part 7-20.

The second movable unit 7-14 includes a second movable unit body 7-141, a second movable unit connecting part 7-142, two second movable unit protrusions 7-143, and a second movable unit sliding part 7-144. The second movable unit body 7-141 has a second movable unit body surface 7-141a. The structure of the second movable unit 7-14 is similar to that of the first movable unit 7-13. That is, the second movable unit body 7-141, the second movable unit connecting part 7-142, the second movable unit protrusions 7-143, and the second movable unit sliding part 7-144 are similar to the first movable unit body 7-131, the first movable unit connecting part 7-132, the first movable unit protrusions 7-133, and the first movable unit sliding part 7-134, respectively. Therefore, the main structure, function, and configuration of the second movable unit 7-14 same as that of the first movable unit 7-13 are not repeated herein. However, it should be noted that the second movable unit connecting part 7-142 is connected to the second magnetic element 7-35 instead of the first magnetic element 7-34.

Figure 101:
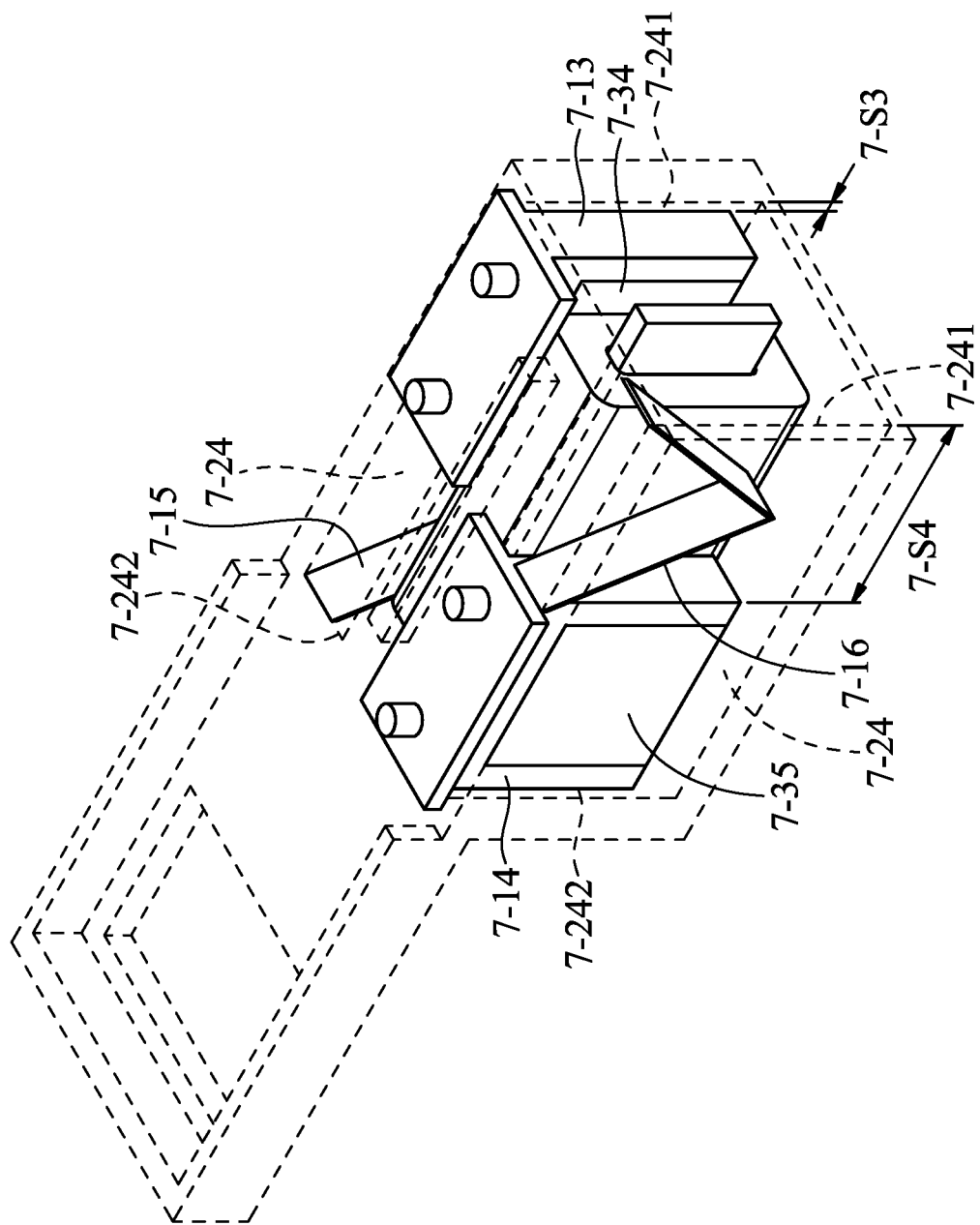
FIG. 101 shows a perspective view of the optical element driving mechanism according to another embodiment of the present disclosure, wherein the fixed part is shown as a dashed line.

Please refer to FIG. 101, the first elastic element 7-15 is disposed between the first movable unit 7-13 and the second side 7-242 of the magnetic element accommodation 7-24, and the first elastic element 7-15 is connected to the first movable unit 7-13 and the second side 7-242. The second elastic element 7-16 is disposed between the second movable unit 7-14 and the first side 7-241 of the magnetic element accommodation 7-24, and the second elastic element 7-16 is connected to the second movable unit 7-14 and the first side 7-241. The configuration of the first elastic element 7-15 and the second elastic element 7-16 may also refer to the configuration of the magnetic elements 7-32 of the optical element driving mechanism 7-100 in FIGS. 94A-95B. Of course, it is fine to refer to FIG. 96 as well, the magnetic conductive element 7-331 may be provided in front of or behind the magnetic conductive element accommodation 7-23 as well. However, it should be noted that when the driving coil 7-31 does not receive the external current, the first movable unit 7-13 and the first magnetic element 7-34 are adjacent to the first side 7-241, and the second movable unit 7-14 and the second magnetic element 7-35 are adjacent to the second side 7-242. That is, the shortest distance 7-S3 between the first magnetic element 7-34 and the first side 7-241 is smaller than the shortest distance 7-S4 between the second magnetic element 7-35 and the first side 7-241. However, in other embodiments, when the driving coil 7-31 does not receive the external current, the first movable unit 7-13 and the first magnetic element 7-34 are adjacent to the second side 7-242, and the second movable unit 7-14 and the second magnetic element 7-35 are adjacent to the first side 7-241. That is, the first movable unit 7-13, the first magnetic element 7-34, the second movable unit 7-14, and the second magnetic element 7-35 are not all located on the first side 7-241, nor all of them are located on the second side 7-242.

Figure 102:
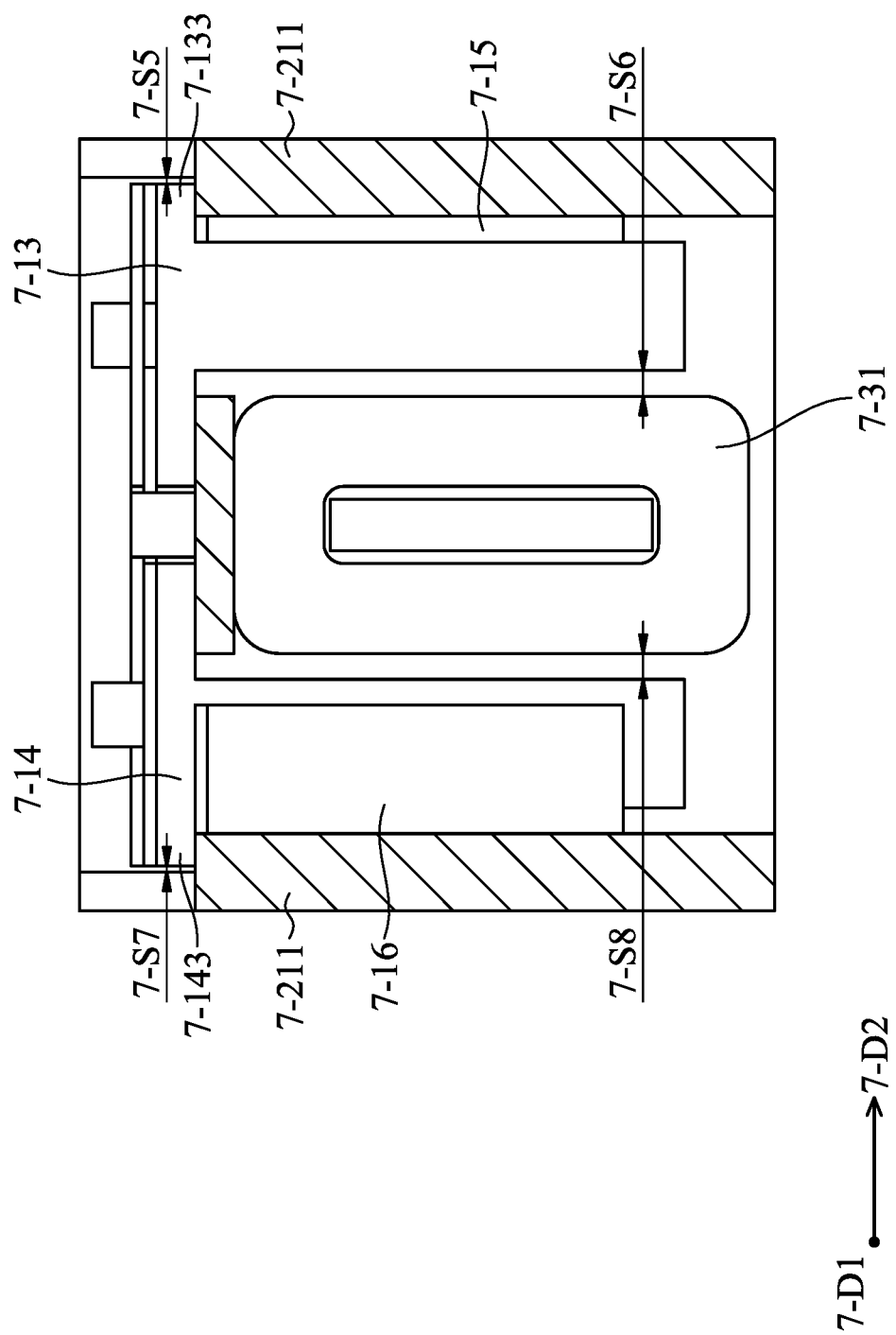
FIG. 102 shows a cross-sectional view of the optical element driving mechanism according to another embodiment of the present disclosure along a line 7-B-7-B in FIG. 99.

Please refer to FIG. 102, the opposite magnetic poles of the first magnetic element 7-34 and the second magnetic element 7-35 face the driving coil 7-31 (for example, the north-seeking pole of the first magnetic element 7-34 faces the driving coil 7-31, while the south-seeking pole of the second magnetic element 7-35 faces the driving coil 7-31; or, the south-seeking pole of the first magnetic element 7-34 faces the driving coil 7-31, while the north-seeking pole of the second magnetic element 7-35 faces the driving coil 7-31). By doing so, when affected by the electromagnetic force, one of the first magnetic element 7-34 and the second magnetic element 7-35 may move in the first direction 7-D1 while the other one of the first magnetic element 7-34 and the second magnetic elements 7-35 may move in a direction opposite the first direction 7-D1. Thus, the first movable unit 7-13 and the second movable unit 7-14 may be driven in the opposite direction, thereby the first optical element 7-110 and the second optical element 7-120 do not overlap the outer frame extension opening 7-212a at the same time. That is, the first movable unit 7-13 and the first optical element 7-110 may move relative to the second movable unit 7-14 and the second optical element 7-120, and the second movable unit 7-14 and the second optical element 7-120 may move relative to the first movable unit 7-13 and the first optical element 7-110 as well. In addition, the first optical element 7-110 and the second optical element 7-120 do not shield the outer frame extension opening 7-212a at the same time, so as to avoid the characteristic of the light 7-L from being affected by the first optical element 7-110 and the second optical element 7-120 at the same time.

As shown in FIG. 102, the minimum distance 7-S5 between the first movable unit protrusion 7-133 of the first movable unit 7-13 and the outer frame sidewall 7-211 and the outer frame supporting wall 7-213 of the outer frame 7-21 of the fixed part 7-20 is smaller than the minimum distance 7-S6 between the first magnetic element 7-34 and the driving coil 7-31. The minimum distance 7-S7 between the second movable unit protrusion 7-143 of the second movable unit 7-14 and the outer frame sidewall 7-211 and the outer frame supporting wall 7-213 of the outer frame 7-21 of the fixed part 7-20 is smaller than the minimum distance 7-S8 between the second magnetic element 7-35 and the driving coil 7-31. By doing so, when the first movable unit 7-13 and the second movable unit 7-14 are impacted and move in the second direction 7-D2, the first movable unit protrusion 7-133 and the second movable unit protrusion 7-143 contact with the outer frame sidewall 7-211 or the outer frame supporting wall 7-213 first, and the first magnetic element 7-34 and the second magnetic element 7-35 are not in contact with the driving coil 7-31, so as to prevent the first magnetic element 7-34 and the second magnetic element 7-352 from colliding with the driving coil 7-31 to avoid damage.

Figure 103:
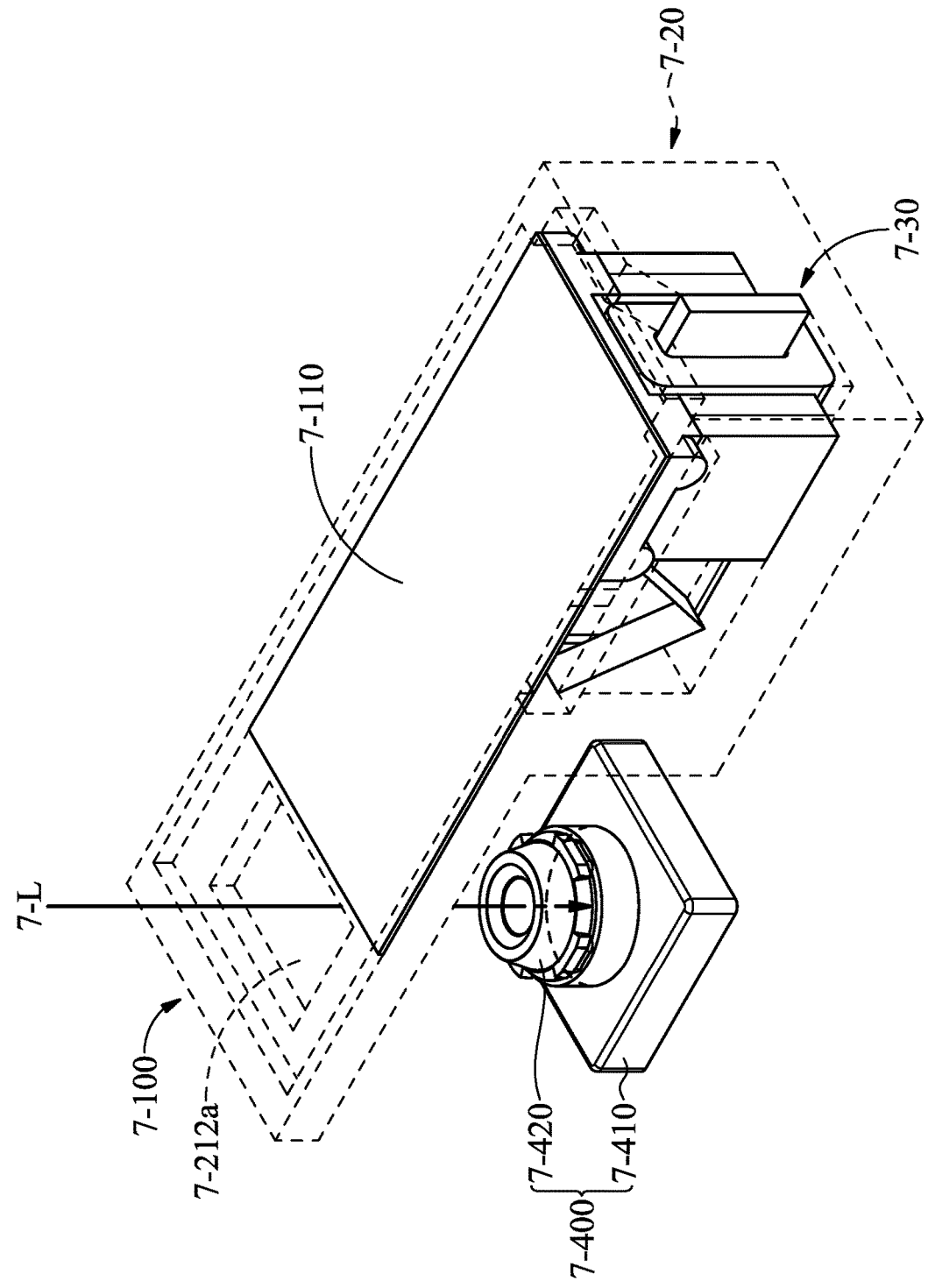
FIG. 103 shows a perspective view of an optical device according to an embodiment of the present disclosure, wherein the fixed part is shown as a dashed line.

Please refer to FIG. 103, FIG. 103 is a perspective view of an optical device 7-2 of an embodiment of the present disclosure. The optical device 7-2 may be mounted in the electronic apparatus 7-1 (may refer to FIG. 87). The optical device 7-2 includes any one or any combination of the aforementioned optical element driving mechanism 7-100, optical element driving mechanism 7-200, or optical element driving mechanism 7-300 (however, the embodiment shown in FIG. 103 is based on the optical element driving mechanism 7-100 only), and a camera module 7-400. The camera module 7-400 includes a photosensitive element 7-410 and an optical unit 7-420. The optical unit 7-420 is located between the optical element driving mechanism 7-100 and the photosensitive element 7-410. The optical unit 7-420 may be an optical element such as a lens, etc. After the light 7-L passes through the outer frame extension opening 7-212a and the optical unit 7-420 (the light 7-L may or may not pass through the first optical element 7-110 or the second optical element 7-120), the light 7-L may image on the photosensitive element 7-410 for taking photos or videos. The camera module 7-400 corresponds to the fixed part 7-20. Specifically, the space below the outer frame extension opening 7-212a of the fixed part 7-20 of the optical element driving mechanism 7-100 or the optical element driving mechanism 7-300 may accommodate the camera module 7-400. Further, the driving assembly 7-30 at least partially overlaps the photosensitive element 7-410 when observed in the first direction 7-D1. In this way, the space is used effectively, so that miniaturization of the optical element driving mechanism 7-100 and the optical element driving mechanism 7-300 is achieved.

The Eighth Embodiment Group

Figure 104:
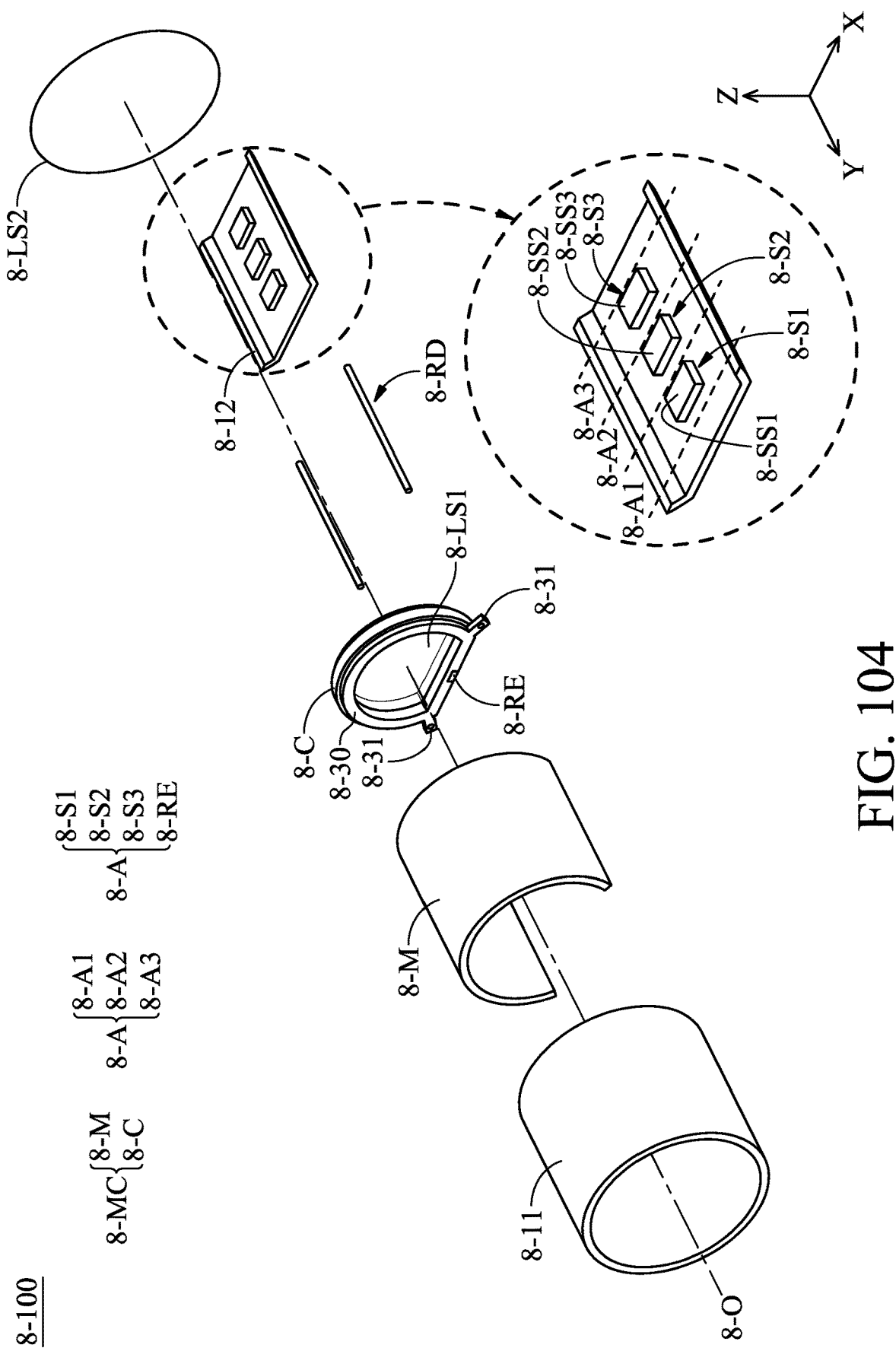
FIG. 104 is a schematic exploded diagram of an optical driving mechanism according to an embodiment of the present invention.
Figure 105A:
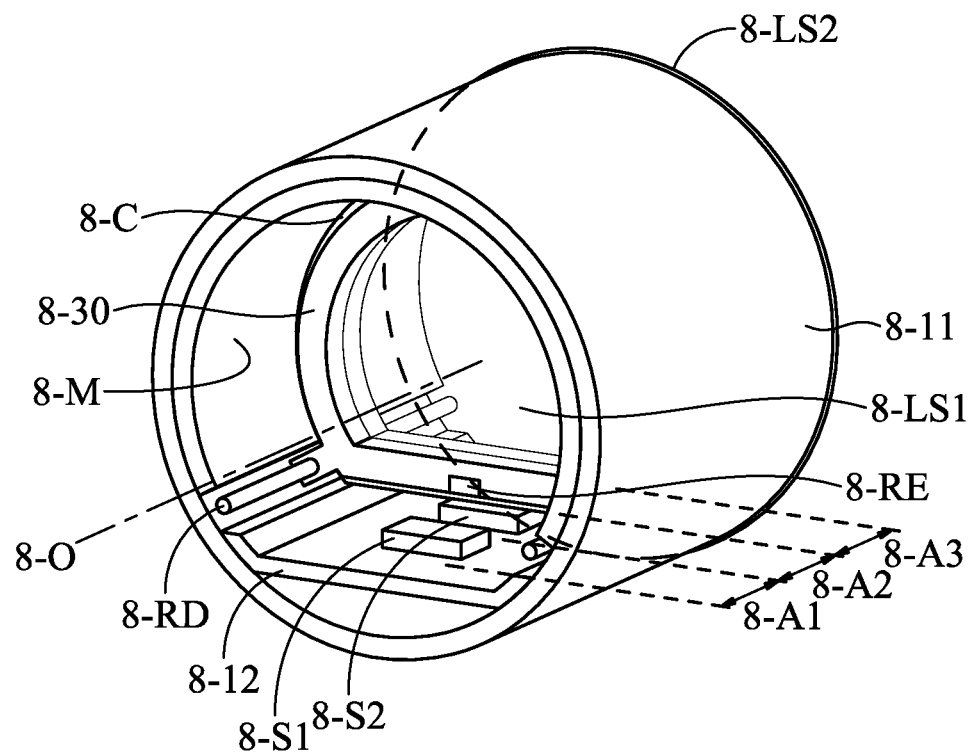
FIG. 105A is a schematic diagram of the optical driving mechanism in FIG. 104 after it has been assembled.

Referring to FIGS. 104 and 105A, FIG. 104 is a schematic exploded diagram of an optical driving mechanism 8-100, and FIG. 105 is the optical driving mechanism 8-100 in FIG. 104 after assembly. The optical driving mechanism 8-100 can be disposed inside a camera module of an electronic device (such as a camera, a tablet or a mobile phone), as a mechanism in the camera module which can provide photographing and video functions. When light (incident light) from the outside enters the optical driving mechanism 8-100 in the camera module, by the optical lens driven via the optical driving mechanism 8-100, the light can pass through a first optical elements 8-LS1 (such as a lens element or a lens assembly including a plurality of lens elements), and then pass through a second optical element 8-LS2 to an image sensor to obtain an image. The first optical element 8-LS1 can be moved relative to the second optical element 8-LS2 to achieve optical zooming, auto-focusing (AF) or optical image stabilization (OIS). The detailed structure of the aforementioned optical drive mechanism 8-100 will be described below.

The optical driving mechanism 8-100 includes a fixed portion 8-10, a movable portion 8-30, a drive assembly 8-MC, and a position sensing assembly 8-S. The fixed portion 8-10 includes a housing 8-11, a carrying plate 8-12, and a second optical element 8-LS2. The housing 8-11 has a hollow cylindrical or elliptical column structure, and the carrying plate 8-12 is located and fixed in the housing 8-11. The second optical element 8-LS2 is fixed to one end of the housing 8-11. The movable portion 8-30, the drive assembly 8-MC and the position sensing assembly 8-S are disposed in the housing 8-11, and can be protected by the housing 8-11. In some embodiments, the second optical element 8-LS2 may be independent of the fixed portion 8-10, but fixed to the fixed portion 8-10. In some embodiments, in a direction parallel to the optical axis 8-O of the optical driving mechanism 8-100, the size of the first optical element 8-LS1 is smaller than the size of the second optical element 8-LS2.

The fixed portion 8-10 further includes a guiding structure 8-RD. In this embodiment, the guiding structure 8-RD has a plurality of (two) elongated strip-shaped guiding members. With the optical axis 8-O as the center, the two are respectively arranged on both sides of the housing 8-11, and can be used to guide the movable portion 8-30 to move relative to the fixed portion 8-10. The movable portion 8-30 includes a connecting member 8-31, which is movably connected to the guiding structure 8-RD of the fixed portion 8-10 and abuts the inner wall of the casing 8-11. In this embodiment, the connecting member 8-31 has a hollow structure, and the guiding structure 8-RD passes through the hollow structure of the connecting member 8-31, so that the movable portion 8-30 can be disposed on the guiding structure 8-RD, and can move along the long axis direction of the guide structure 8-RD (or along the optical axis 8-O). In this embodiment, the connecting member 8-31 is located on the lower side of the main body of the movable portion 8-30, and includes two connecting sub-members. The two guiding members of the guide structure 8-RD respectively pass through the two connecting sub-members which are located on both sides of the main body of the movable portion 8-30 and adjacent to the position sensing assembly 8-S, or the connecting sub-members are located below the optical axis 8-O and adjacent to the position sensing assembly 8-S.

The movable portion 8-30 may be a holder for carrying the first optical element 8-LS1. The drive assembly 8-MC is disposed on the movable portion 8-30 and the housing 8-11, and is used to drive the portion 8-30 and the first optical element 8-LS1 to move relative to the fixed portion 8-10, to adjust the posture or the position of the movable portion 8-30 with the first optical element 8-LS1 of the LS, and thus achieves the purpose of zooming, optical auto-focusing (AF) or optical image stabilization (OIS).

In detail, the drive assembly 8-MC may be an electro-magnetic drive assembly, which includes a coil 8-C and a magnetic element 8-M, which are respectively disposed on the movable portion 8-30 and the housing 8-11. The magnetic element 8-M and the coil 8-C correspond to each other, and a gap 8-G is between them. When a driving signal is applied to the drive assembly 8-MC (for example, a current is applied to the coil 8-C by an external power source), a magnetic force is generated between the magnetic element 8-M and the coil 8-C, which can drive the movable portion 8-30 moves with respect to the fixed portion 8-10. In this way, when the drive assembly 8-MC receives a drive signal, the drive assembly 8-MC drives the movable portion 8-30 with the first optical element 8-LS1 to move back and forth along the optical axis 8-0, so as to achieve optical image stabilization, autofocus or change of focal length efficacy. The drive assembly 8-MC in this embodiment is a moving coil type, and in another embodiment, it may be a moving magnetic type. In this embodiment, the drive assembly 8-MC can drive the movable portion 8-30 relative to the fixed portion 8-10 to move within a limited range 8-A, which will be described in more detail later.

In this embodiment, the aforementioned magnetic element M has an arched-shaped, or arc-shaped structure, and is affixed to fit on the inner wall of the housing 8-11, and surrounds the movable portion 8-30. The shape of the magnetic element M is like a tunnel. The magnetic element 8-M has an opening 8-MO, and the opening direction of the opening 8-MO is toward the position sensing assembly 8-S.

In some embodiments, the optical driving mechanism 8-100 may further include a permeability element disposed between the housing 8-11 and the magnetic element 8-M, so that the magnetic force of the magnetic element 8-M can be concentrated in a predetermined direction to enhance the magnetic force of the drive assembly 8-MC driving the movable portion 8-30, and reduce the effect of magnetic interference. In another embodiment, the permeability element can be embedded in housing 8-11, or the housing 8-11 has permeability material, which can strengthen the mag-netic force (between the magnetic element 8-M and the coil 8-C) in a predetermined direction, and the overall mechanical strength of the fixed portion 8-10 can be enhanced.

The aforementioned position sensing assembly 8-S may be a position sensor. For example, it may be a magnetoresistive sensor (MRS) or an optical sensor, which is used to sense the relative positional relationship between the movable portion 8-30 and the fixed portion 8-10, to facilitate a control unit (not shown) adjusting the positions between the two by the drive assembly 8-MC.

Figure 106:
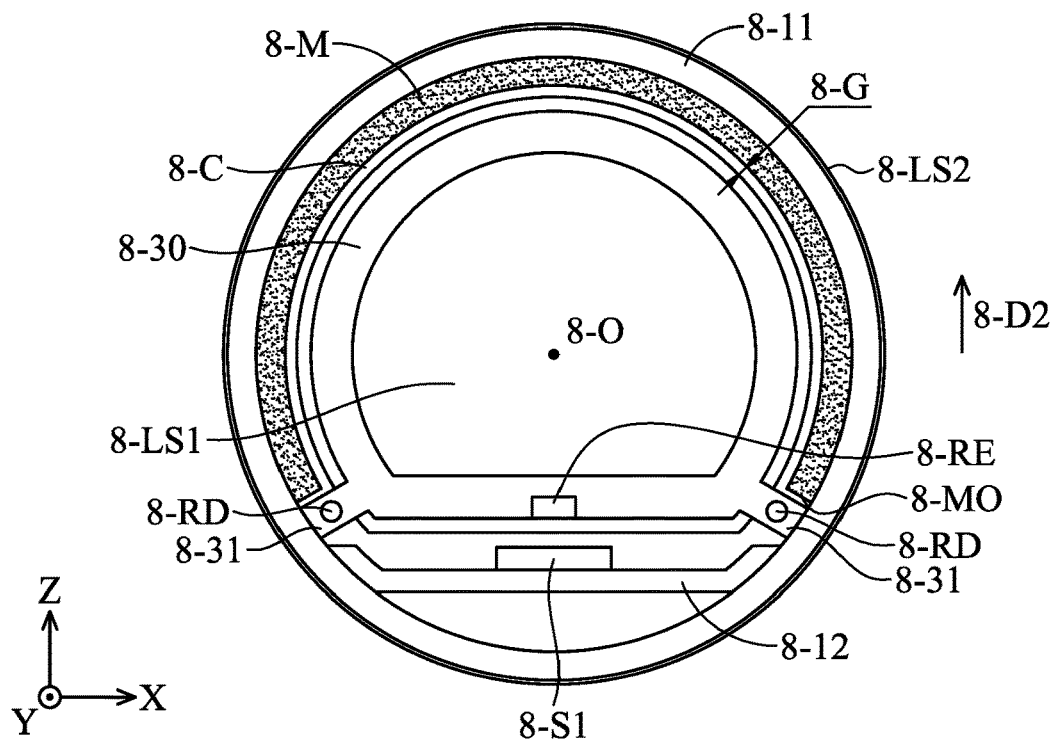
FIG. 106 is a front view diagram of the optical driving mechanism in FIG. 105A.

Referring to FIGS. 104, 105A, and 106, in this embodiment, the position sensing assembly 8-S has three position sensing elements: a first position sensing element 8-S1, and a second position sensing element 8-S2 and the third position sensing element 8-S3, and a reference element 8-RE. The first position sensing element 8-S1, the second position sensing element 8-S2, and the third position sensing element 8-S3 are disposed on the carrying plate 8-12 and arranged along the optical axis 8-O direction (or the first direction 8-D1), wherein a first position sensing surface 8-SS1 of the first position sensing element 8-S1, a second position sensing surface 8-SS2 of the second position sensing element 8-S2 and a third position sensing surface 8-SS3 of the third position sensing element 8-S3 are arranged in the first direction 8-D1. In some embodiments, the first to third position sensing surfaces 8-SS1 to 8-SS3 are parallel or co-planar. The reference element 8-RE is disposed on the movable portion 8-30 (that is, the movable portion 8-30 carries a part of the position sensing assembly 8-S), and faces and corresponds to the first to third position sensing elements 8-S1 to 8-S3. Viewed in the first direction 8-D1 (or optical axis 8-0), the position sensing assembly 8-S is located between the two guiding members 8-RD. In a second direction 8-D2 that is perpendicular to the first directions 8-D1, the magnetic element 8-M overlaps the movable portion 8-30 and the position sensing assembly 8-S.

The movable portion 8-30 is driven by the drive assembly 8-MC, and can move relative to the fixed portion 8-10 in the limited range 8-A. The limited range 8-A includes a first range 8-A1, a second The range 8-A2 and a second range 8-A3 correspond to the first position sensing element 8-S1, the second position sensing element 8-S2, and the third position sensing element 8-S3, respectively. In the direction that is perpendicular to the optical axis 8-O (or in the second direction 8-D2), when the movable portion 8-30 is in the second range 8-A2 (8-A1, 8-A3) of the limited range 8-A, the movable portion 8-30 overlaps the position sensing element 8-S2 (8-S1, 8-S3) and the magnetic element M.

Referring to FIG. 105A, it is shown that the movable portion 8-30 is located in the second range 8-A2, and the second position sensing element 8-S2 corresponds the reference element 8-RE (which is disposed on the movable portion 8-30) in the second range 8-A2, to sense the position of the movable portion 8-30 relative to the fixed portion 8-10.

Figure 105B:
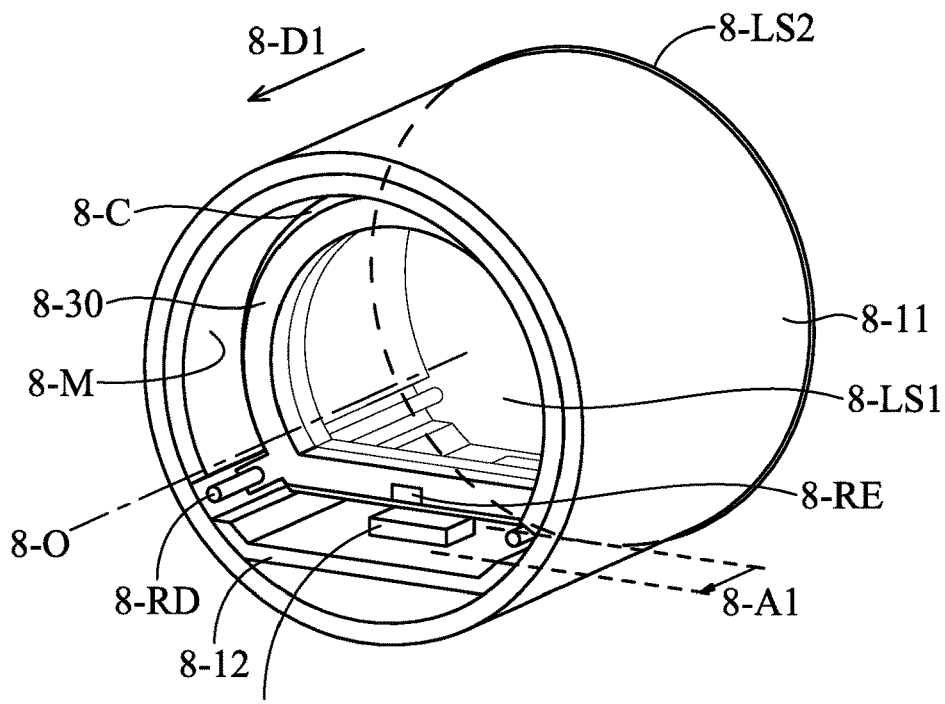
FIG. 105B is a schematic diagram of the movable portion and the first optical element moving in the first direction.

Referring to FIGS. 105A and 105B, they show the movable portion 8-30 moving in the first direction D1, which is moved from a position within the second range 8-A2 to a position within the first range 8-A1. In FIG. 105B, the first position sensing element 8-S1 corresponds to the reference element 8-RE (on the movable portion 8-30) in the first range 8-A1, thereby sensing the relative position of the movable portion 8-30 with respect to the fixed portion 8-10. When the movable portion 8-30 moves to the first range 8-A1, it is sensed by the first position sensing element 8-S1 which is also in the first range 8-A1, so that the position sensing accuracy for the moving portion 8-30 can be greatly improved. Compared with the case where only one position sensing element is provided, in this embodiment, a plurality of position sensing elements are provided in the first to third ranges 8-A1 to 8-A3, which can more accurately determine the position of the movable portion 8-30. In this way, zooming, autofocus or optical image stabilization functions are enhanced and improved.

Figure 105C:
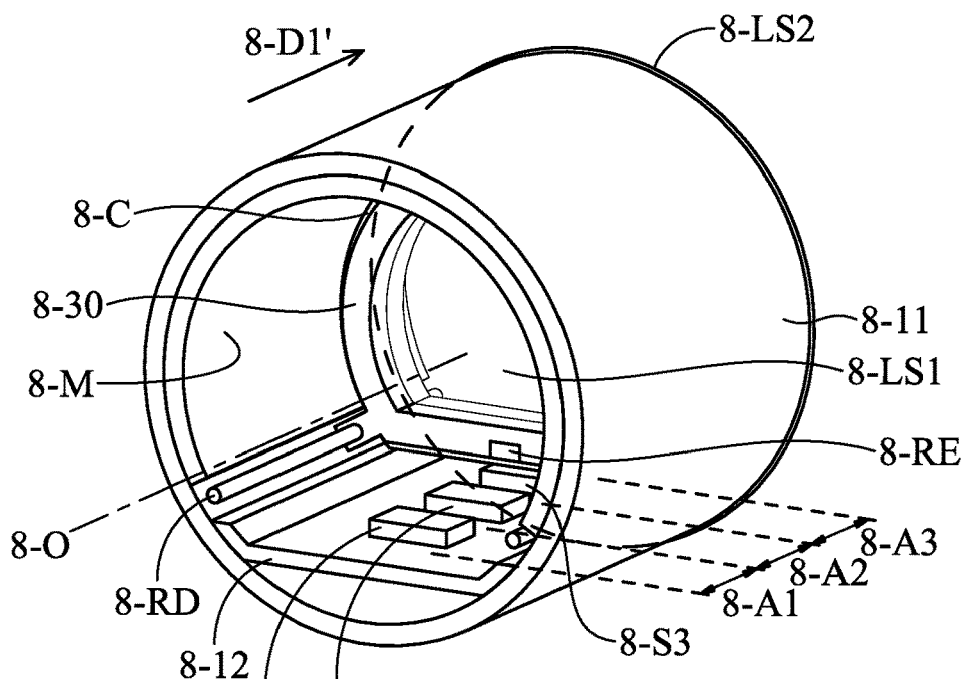
FIG. 105C is a schematic diagram of the movable portion and the first optical element moving along the direction that is reverse to first direction.

Referring to FIGS. 105A and 105C, it is a schematic diagram showing that the movable portion 8-30 moves in a direction 8-D1' that is the opposite of the first direction 8-D1, which moves from a position within the second range 8-A2 to a position within the third range 8-A3. The third position sensing element 8-S3 corresponds to the reference element 8-RE in the third range 8-A3, thereby sensing the position of the movable portion 8-30 relative to the fixed portion 8-10, in which the movable portion 8-30 moves to the third range 8-A3, it is sensed by the third position sensing element 8-S3 which is also in the third range 8-A3. The position sensing accuracy for the movable portion 8-30 is significantly improved.

Figure 105D:
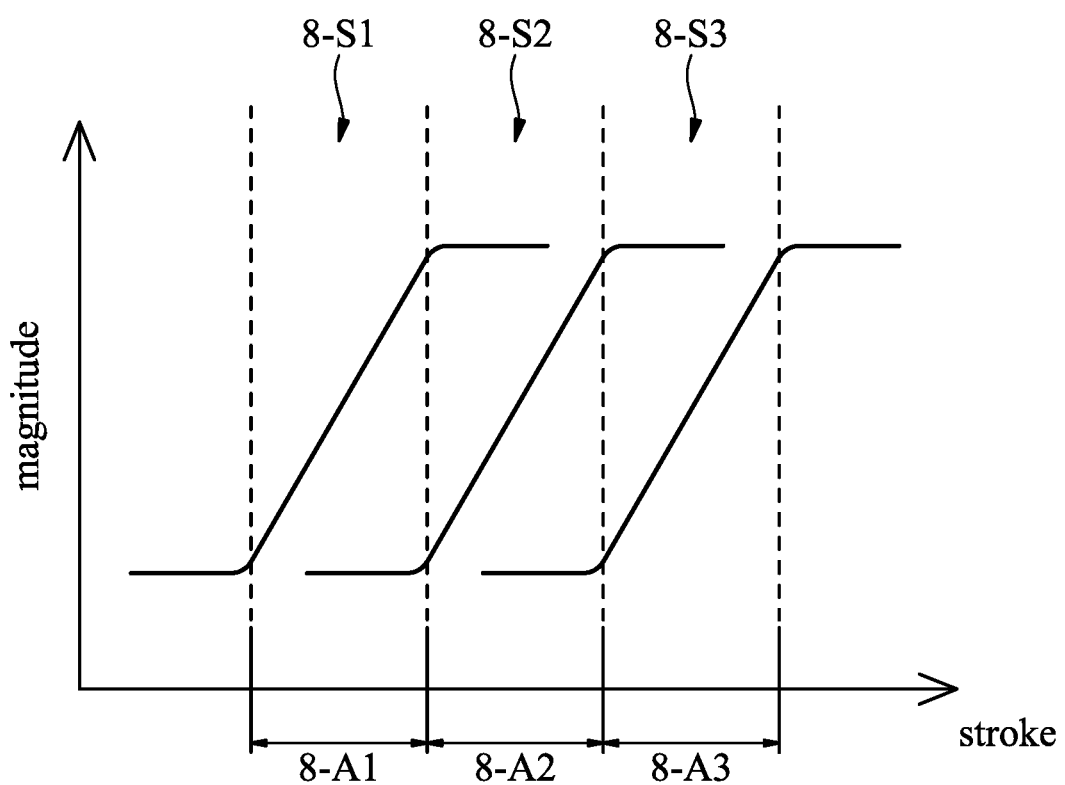
FIG. 105D is a schematic diagram showing the relationship between the moving stroke of the movable portion and the signal magnitude sensed or output by several position sensing elements.

By sensing the relative position of the movable portion 8-30 with respect to the fixed portion 8-10 by using different position sensing elements in different ranges as described above, the stroke of the movable portion 8-30 can be greatly increased. Refer to FIG. 105D, which shows the relationship between the movement stroke (X-axis) of the movable portion 8-30 and the signal magnitude (Y-axis) sensed by the position sensing elements 8-S1 to 8-S3. As shown in FIG. 105D, the signal magnitude sensed (or the signal magnitude output) by the three position sensing elements 8-S1 to 8-S3 in the first to third ranges 8-A1 to 8-A3 has a linear relationship with the stroke of the movable portion 8-30, but it has a non-linear relationship in the non-corresponding area.

For example, when the movable portion 8-30 moves within the first range 8-A1, the signal output by the first position sensing element 8-S1 and the moving stroke range of the movable portion 8-30 have a linear relationship (or substantially linear relationship); and when the movable portion 8-30 moves within the second range 8-A2, the signal output by the first position sensing element 8-S1 and the moving stroke range of the movable portion 8-30 are non-linear relationship.

In another example, when the movable portion 8-30 moves within the second range 8-A2, the signal output by the second position sensing element 8-S2 and the moving stroke range of the movable portion 8-30 have a linear relationship (or substantially linear relationship); and when the movable portion 8-30 moves within the first range 8-A1, the signal output by the second position sensing element 8-S2 and the moving stroke range of the movable portion 8-30 are nonlinear relationship.

By reading the segments of the aforementioned linear relationship, in the case where the moving stroke of the movable portion 8-30 is increased, and the accurate sensing position of the movable portion 8-30 can still be provided. As a result, auto-focusing, zoom capabilities, and optical image stabilization of the device are greatly enhanced.

Figure 107:
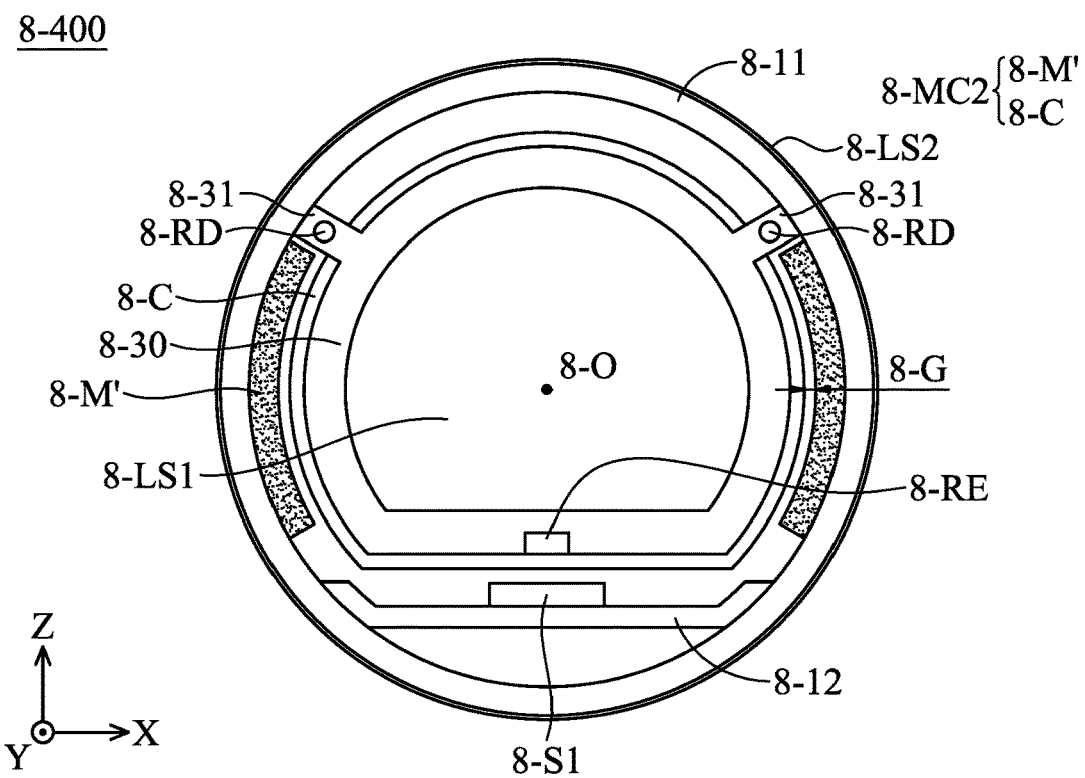
FIG. 107 is a schematic diagram of an optical driving mechanism according to another embodiment of the present invention.

FIG. 107 shows an optical driving mechanism 8-400 according to another embodiment of the present invention. In this embodiment, the main difference between the optical driving mechanism 8-400 and the optical driving mechanism 8-100 in FIGS. 104 and 106 is that the drive assembly MC2 of the optical driving mechanism 8-400 has a plurality of independent magnetic elements 8-M'. In the direction (X axis) that is perpendicular to the optical axis 8-O, two magnetic elements 8-M' are respectively disposed on both sides of the movable portion 8-30; and the guiding structure RD is disposed on the side of the movable portion 8-30 away from the position sensing assembly 8-S. The movable portion 8-30 is slidable on the guiding structure RD by the connecting member 31 located on the upper side of the movable portion 8-30 body (the side which is away from the position sensing assembly 8-S).

Each magnetic element 8-M' has an arcuate structure, and in a direction perpendicular to the optical axis 8-O (or the second direction 8-D2), the magnetic elements 8-M' are positioned between the guiding structure 8-RD and the position sensing assembly 8-S. The two magnetic elements 8-M' are symmetrical to each other (the YZ-plane as symmetry plane) and are attached to the housing 8-11, and correspond to the coil 8-C in common. A magnetic force is generated between the magnetic elements 8-M' and the coil 8-C, which can then drive the movable portion 8-30 relative to the fixed portion 8-10 to achieve the effect of zooming, preventing image shake or autofocus of the optical image.

Figure 108:
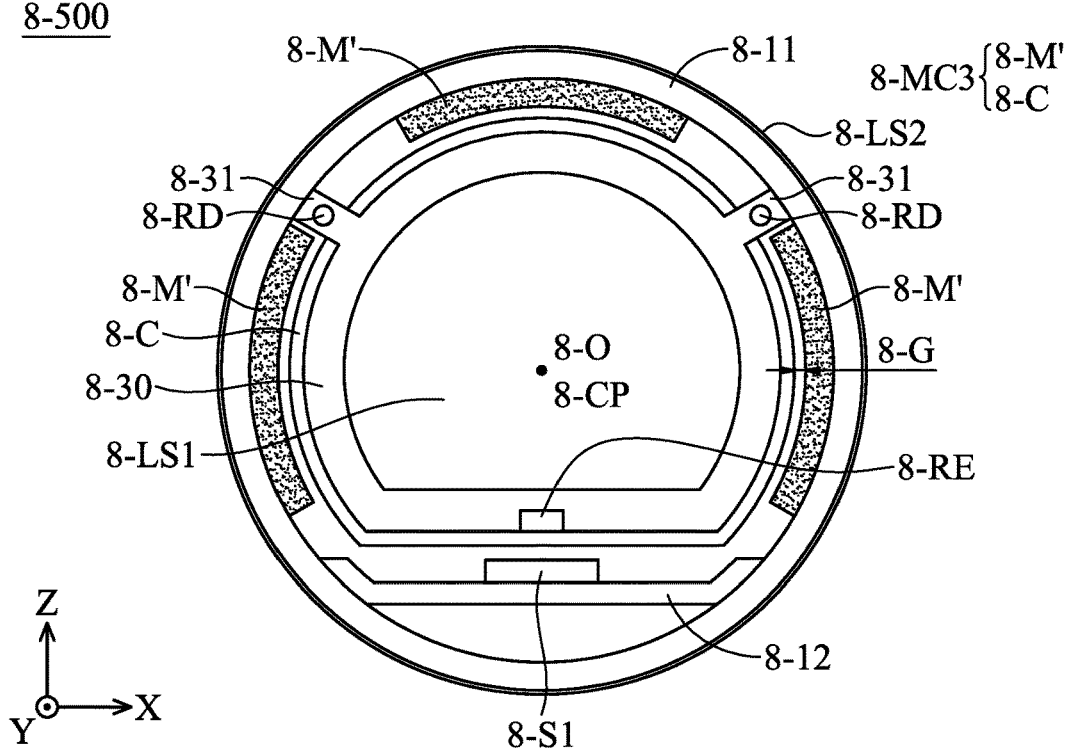
FIG. 108 is a schematic diagram of an optical driving mechanism according to another embodiment of the present invention.

FIG. 108 shows an optical driving mechanism 8-500 according to another embodiment of the present invention. In this embodiment, the main difference between the optical driving mechanism 8-500 and the optical driving mechanism 8-400 in FIG. 107 is that the drive assembly MC3 of the optical driving mechanism 8-400 has more (three) magnetic elements 8-M', including: two magnetic elements 8-M' provided on both sides of the movable portion 8-30, and another magnetic element 8-M' provided on the upper side of the movable portion 8-30.

In this embodiment, the three magnetic elements 8-M' are arranged around a center point 8-CP and surround the movable portion 8-30. In some embodiments, the central point 8-CP is overlapped with the optical axis O, so that the magnetic element 8-M' is disposed around the optical axis 8-0.

Figure 109:
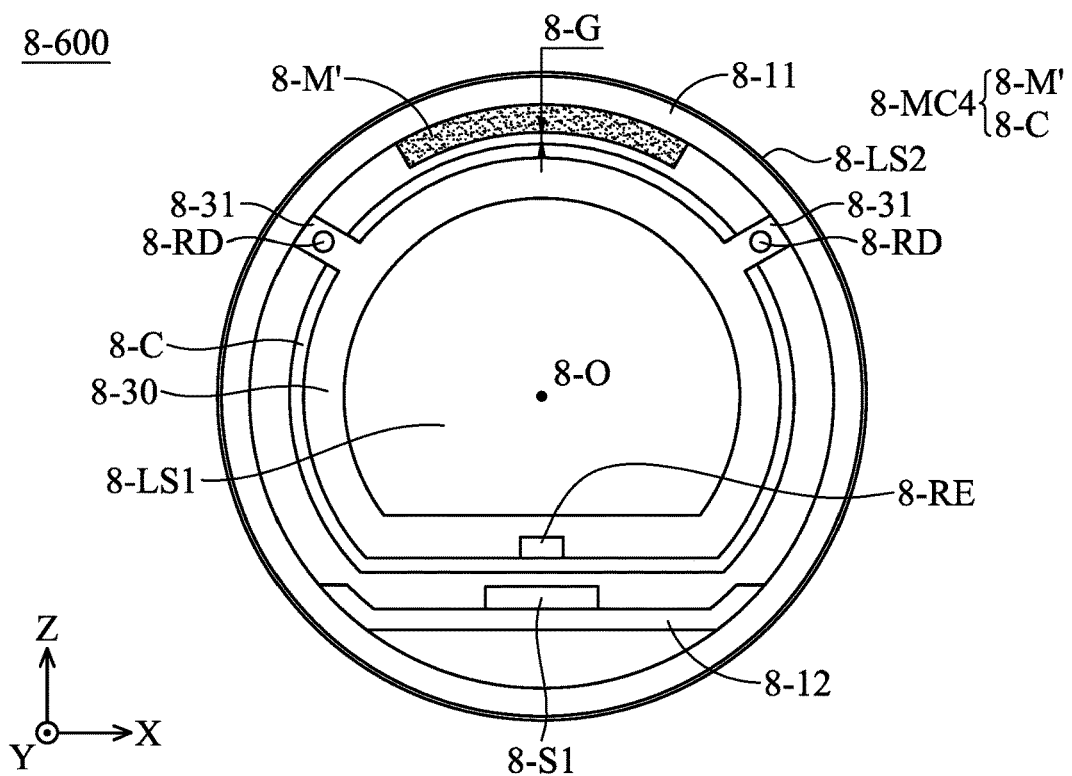
FIG. 109 is a schematic diagram of an optical driving mechanism according to another embodiment of the present invention.

FIG. 109 shows an optical driving mechanism 8-600 according to another embodiment of the present invention. In this embodiment, the main difference between the optical driving mechanism 8-600 and the optical driving mechanism 8-500 in FIG. 108 is that the drive assembly 8-MC4 of the optical driving mechanism 8-600 has one arc-shaped magnetic element 8-M', which is located on the upper part of the movable portion 8-30 and corresponds to the coil 8-C. In this configuration, the guiding structure 8-RD is located between the magnetic element 8-M' and the position sensing assembly 8-S when viewed from the second direction 8-D2 (Z axis). Compared to the magnetic element 8-M in FIG. 106, the magnetic element 8-M' in this embodiment is relatively small, which can reduce the amount of space taken up by the overall drive assembly 8-MC4, and it can also allow the drive assembly 8-MC4 to drive the movable portion 8-30 relative to the fixed portion 8-10.

It should be noted that in some embodiments, the optical driving mechanism 8-100 may not include the aforementioned second optical element 8-LS2. That is, the incident light passes through the first optical element 8-LS1 and then enters an image sensor to obtain images. In other embodiments, the optical driving mechanism 8-100 may include only one guiding member, which also can guide the movable portion 8-30 to move along the optical axis O or the first direction 8-D1 (or the reverse direction 8-D1').

In addition, in some embodiments, the position sensing assembly 8-S may include two, four, five, or another appropriate number of position sensing elements. The limited range may have two, four, five or any number of ranges, so long as they correspond to the number of sensing elements. One position sensing element corresponds to one range, and the position sensing element corresponds to the reference element 8-RE when the reference element 8-RE is in the range that corresponds to the position sensing element, in order to obtain the precise position of the movable portion 8-30 relative to the fixed portion 8-10.

In some embodiments, the reference element 8-RE of the position sensing assembly 8-S may be disposed in the coil 8-C (in a receiving portion, for example) that carries the reference element 8-RE. That is, the coil 8-C carries a part of the position sensing assembly 8-S. The reference element 8-RE faces the position sensing element 8-S1 (or 8-S2, or 8-S3).

In summary, an embodiment of the present invention provides an optical driving mechanism, including a fixed portion, a movable portion, a drive assembly, and a position sensing assembly. The movable portion is movably connected to the fixed portion and is configured to carry a first optical element. The drive assembly is configured to drive the movable portion relative to the fixed portion to move within a limited range that includes a first range and a second range. The position sensing assembly is configured to sense the movement of the movable portion relative to the fixed portion, and includes a reference element, a first position sensing element, and a second position sensing element. The first position sensing element corresponds to the reference element in the first range, and the second position sensing element corresponds to the reference element in the second range, wherein a first position sensing surface of the first position sensing element and a second position sensing surface of the second position sensing element are arranged in a first direction.

The embodiment of the present invention has at least one of the following advantages or effects, in that by the plurality of position sensing elements, the movable portion with the optical element can have a larger moving stroke, and the position of the movable portion can be accurately sensed. The adjustments between optical components, and image sensor modules, such as optical zooming, focusing and optical image stabilization, can be enhanced, more detailed and more accurate, greatly improving product quality.

The Ninth Embodiment Group

Figure 110:
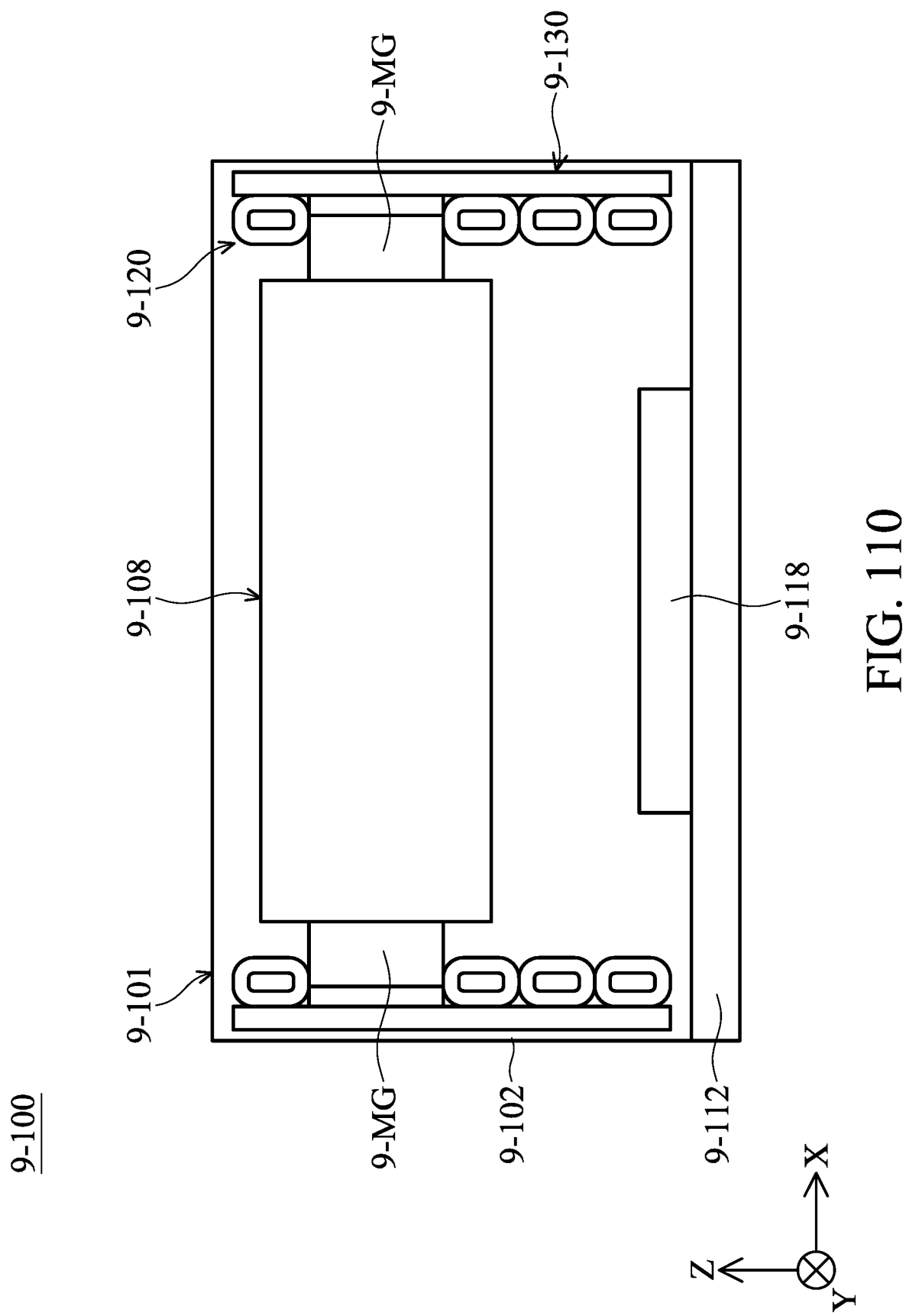
FIG. 110 is a schematic diagram of an optical element driving mechanism 9-100 according to an embodiment of the present disclosure.

Please refer to FIG. 110, which is a schematic diagram of an optical element driving mechanism 9-100 according to an embodiment of the present disclosure. In this embodiment, the optical element driving mechanism 9-100 can be an optical camera module, which can be installed in various electronic devices or portable electronic devices, such as a smart phone, for allowing users to perform image capture function. In this embodiment, the optical element driving mechanism 9-100 may be a voice coil motor (VCM) with an autofocus (AF) function, but this disclosure is not limited thereto. In other embodiments, the optical element driving mechanism 9-100 may also have functions of automatic focus (AF) and optical image stabilization (OIS). In addition, the optical element driving mechanism 9-100 can be a periscope camera module.

As shown in FIG. 110, the optical element driving mechanism 9-100 includes a fixed assembly 9-101, a movable assembly 9-108, a driving assembly 9-120, and a circuit assembly 9-130. The fixed assembly 9-101 may include a casing 9-102 and a base 9-112. The movable assembly 9-108 is disposed in the fixed assembly 9-101 and configured to hold and drive an optical element (not shown in the figures), for example a camera lens. The circuit assembly 9-130 can be fixed to the fixed assembly 9-101 and can be electrically connected to the driving assembly 9-120, and the driving assembly 9-120 is configured to drive the movable assembly 9-108 to move relative to the fixed assembly 9-101, such as moving along the Z-axis (the first direction). A photosensitive element 9-118 can be disposed on the base 9-112, and the external light may arrive at the photosensitive element 9-118 after traveling through the optical element held by the movable assembly 9-108 so as to generate a digital image. The driving assembly 9-120 and the circuit assembly 9-130 may constitute a linear motor, but they are not limited to this embodiment.

Figure 111:
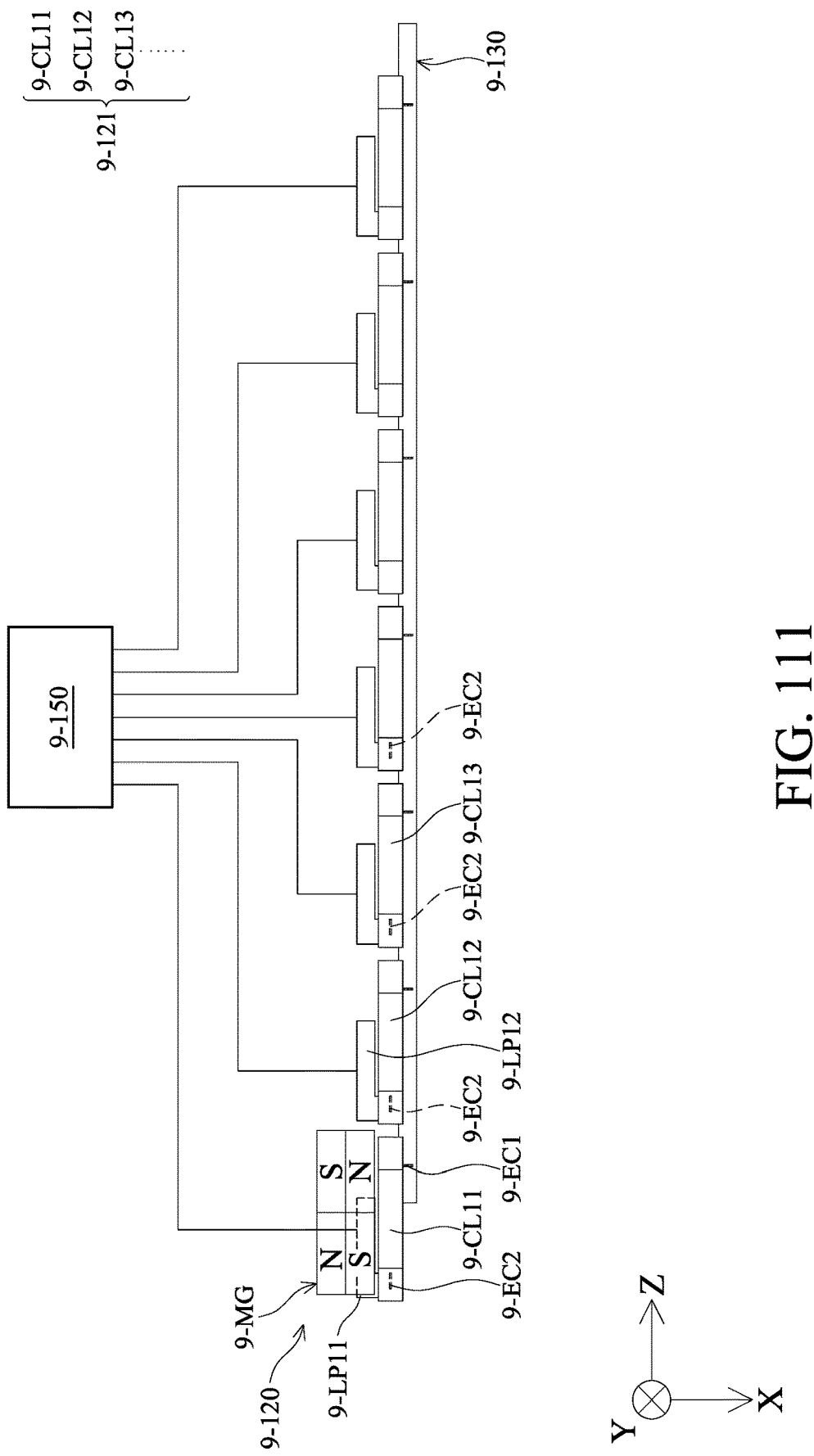
FIG. 111 is a top view of a driving assembly 9-120 and a circuit assembly 9-130 according to an embodiment of the present disclosure.

Please refer to FIG. 111, which is a top view of a driving assembly 9-120 and a circuit assembly 9-130 according to an embodiment of the present disclosure. As shown in FIG. 111, the circuit assembly 9-130 has a long-shaped structure and is configured to be electrically to the ground, and a plurality of L-shaped conductive plates are disposed on one side of the circuit assembly 9-130.

Furthermore, as shown in FIG. 111, the driving assembly 9-120 includes a first coil group 9-121 and a magnetic element 9-MG. The first coil group 9-121 has a plurality of first coils (the first coils 9-CL11, 9-CL12, 9-CL13, and so on), and the first coils are arranged along the Z-axis (the first direction).

As shown in FIG. 111, the plurality of first coils correspond to the L-shaped conductive plates, respectively. For example, the first coil 9-CL11 corresponds to the L-shaped conductive plate 9-LP11, and so on. For example, the L-shaped conductive plate 9-LP12 corresponds to the first coil 9-CL12.

It should be noted that each first coil has a first electrical connection portion 9-EC1 and a second electrical connection portion 9-EC2. The first electrical connection portion 9-EC1 is electrically connected to the circuit assembly 9-130, and the second electrical connection portion 9-EC2 is electrically connected to the corresponding L-shaped conductive plate and the control circuit 9-150. The control circuit 9-150 can control these first coils individually or collectively, which means that the second electrical connection portions 9-EC2 of the first coils are electrically independent from each other.

Figure 112A:
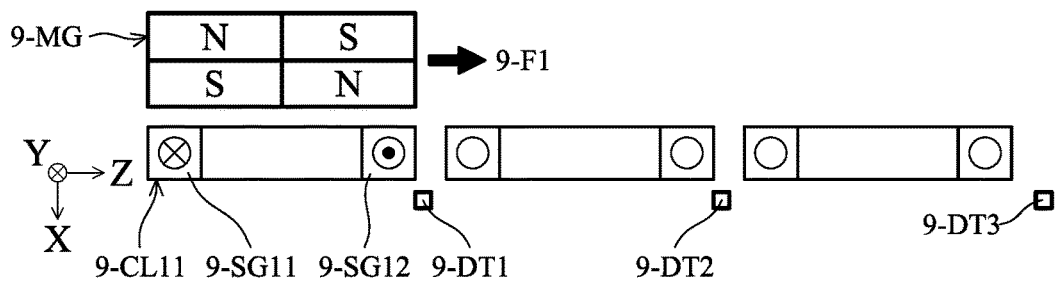
FIG. 112A is a partial structural diagram of the optical element driving mechanism 9-100 according to an embodiment of the present disclosure.

Next, please refer to FIG. 111, FIG. 112A to FIG. 112E. FIG. 112A is a partial structural diagram of the optical element driving mechanism 9-100 according to an embodiment of the present disclosure, and FIG. 112B to FIG. 112E are schematic diagrams illustrating that operation of the magnetic element 9-MG relative to the circuit assembly 9-130 (fixed on the fixed assembly 9-101) according to an embodiment of the present disclosure. For clarity, the circuit assembly 9-130 and the control circuit 9-150 in FIG. 111 are omitted herein.

As shown in FIG. 112A, each first coil may have a first segment 9-SG11 and a second segment 9-SG12, the first segment 9-SG11 and the second segment 9-SG12 extend along the Y-axis and are perpendicular to the first direction (the Z-axis), and the first segment 9-SG11 and the second segment 9-SG12 are parallel to each other. Furthermore, in this embodiment, as shown in FIG. 112A, in the first direction, the maximum size of the magnetic element 9-MG is greater than or equal to the shortest distance between the first segment 9-SG11 and the second segment 9-SG12.

Next, a driving method of the magnetic element 9-MG is described as follows. In this embodiment, the control circuit 9-150 can control at least one first coil of the first coil group 9-121 according to position information of the movable assembly 9-108 relative to the fixed assembly 9-101, and the movable assembly 9-108 is connected to the magnetic element 9-MG, so that the first coil acts with the magnetic element 9-MG to generate an electromagnetic driving force 9-F1, thereby driving the movable assembly 9-108 to move relative to the fixed assembly 9-101 in a first direction toward a target position. In this embodiment, the optical element driving mechanism 9-100 may further include a plurality of sensing elements (such as the sensing elements 9-DT1, 9-DT2, 9-DT3), which are respectively disposed on a side of the first coils for sensing the position of the magnetic element 9-MG and transmitting the position information to the control circuit 9-150.

Specifically, as shown in FIG. 112A, the magnetic element 9-MG is located in an initial position, and the control circuit 9-150 may output a first control current (for example, a positive current) to the first coil 9-CL11 at this time so as to generate the electromagnetic driving force 9-F1 to drive the magnetic element 9-MG to move toward the target position (for example, the position in FIG. 112D) in the first direction. It should be noted that when viewed in a second direction (the X-axis), the first coil 9-CL11 completely overlaps the magnetic element 9-MG in the initial position.

Figure 112B:
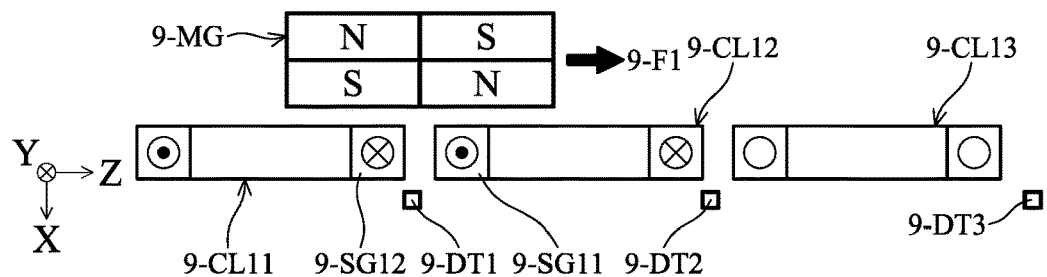
FIG. 112B to FIG. 112E are schematic diagrams illustrating that operation of the magnetic element 9-MG relative to the circuit assembly 9-130 according to an embodiment of the present disclosure.

Next, when the magnetic element 9-MG moves from the initial position in FIG. 112A to a first position in FIG. 112B, the second one of these first coils (the first coil 9-CL12) generates an induced current to the control circuit 9-150 due to the proximity of the magnetic element 9-MG, so that the control circuit 9-150 determines that the magnetic element 9-MG is close to the first coil 9-CL12. At this time, when viewed in the second direction, the first segment 9-SG11 of the first coil 9-CL12 overlaps the N-pole of the magnetic element 9-MG, and the control circuit 9-150 can output a second control current (such as a negative current) to the first coil 9-CL12 according to the induced current or the aforementioned position information so as to generate the electromagnetic driving force 9-F1. The first control current and the second control current may have the same amplitude, and their phase difference is 180 degrees.

Furthermore, when the magnetic element 9-MG is located in the first position, because the second segment 9-SG12 of the first coil 9-CL11 corresponds to the S-pole of the magnetic element 9-MG, the first control current supplied to the first coil 9-CL11 is switched to the second control current by the control circuit 9-150, so that the direction of the electromagnetic driving force 9-F1 generated by the magnetic element 9-MG and the first coil 9-CL11 does not change. It should be noted that the time interval of switching the current by the control circuit 9-150 is sufficiently small so that the magnetic element 9-MG can continue to move smoothly in the first direction.

However, in other embodiments, when the magnetic element 9-MG is located in the first position, the control circuit 9-150 may stop supplying the first control current to the first coil 9-CL11.

Figure 112C:
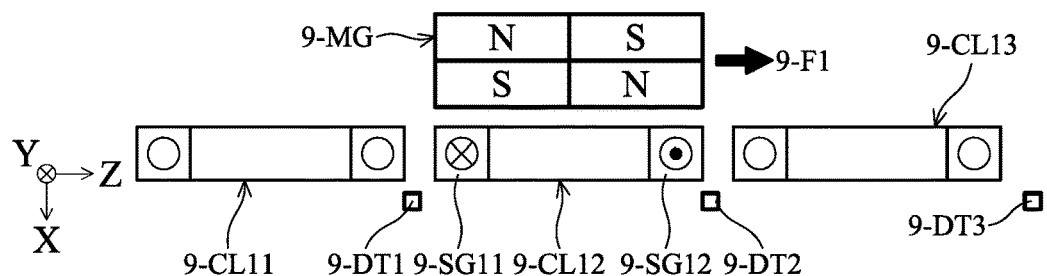

Next, when the magnetic element 9-MG moves from the first position to a second position in FIG. 112C, the control circuit 9-150 switches the second control current supplied to the first coil 9-CL12 to the first control current so that the direction of the generated electromagnetic driving force 9-F1 remains unchanged. As shown in FIG. 112C, when the magnetic element 9-MG is located in the second position, the second segment 9-SG12 of the first coil 9-CL12 overlaps the magnetic element 9-MG.

In addition, when the magnetic element 9-MG moves from the first position to the second position, because the first coil 9-CL11 does not overlap the magnetic element 9-MG, the control circuit 9-150 stops outputting the second control current to the first coil 9-CL11.

Figure 112D:
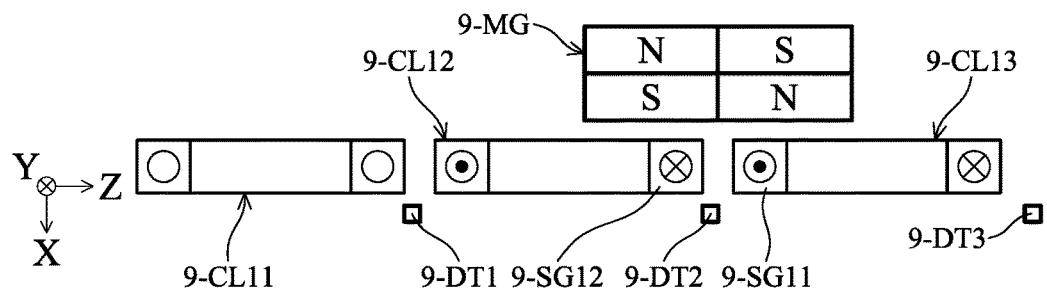
Figure 112E:
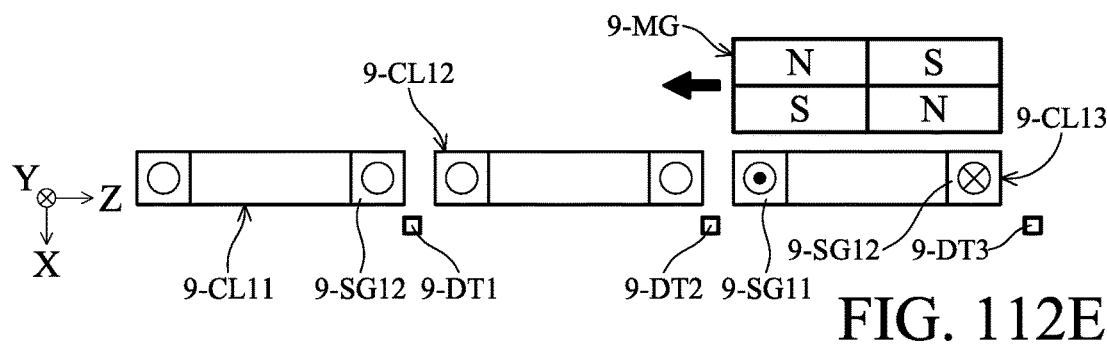

In some embodiments, when the magnetic element 9-MG moves from the initial position in the first direction but exceeds a third position (the target position) in FIG. 112D and reaches a fourth position in FIG. 112E, the control circuit 9-150 can determine that the magnetic element 9-MG exceeds the target position in the first direction according to the position information. At this time, the control circuit 9-150 outputs a reverse driving current to one or more of the first coils which are adjacent to the magnetic element 9-MG. For example, the second control current is outputted to the first coil 9-CL13 to drive the magnetic element 9-MG to move in a third direction (the −Z-axis). In this embodiment, the reverse driving current may include the aforementioned first control current and/or the second control current, and the third direction is opposite to the first direction.

When the magnetic element 9-MG approaches the position in FIG. 112D in the third direction, the control circuit 9-150 can determine that the magnetic element 9-MG is close to the target position according to the position information, and therefore the control circuit 9-150 outputs a third control current to at least one of the first coils adjacent to the magnetic element 9-MG (such as the first coil 9-CL12 and the first coil 9-CL13), so that the magnetic element 9-MG maintains a stable state. In this embodiment, the third control current may be an alternating current, and its frequency is high enough to make the magnetic element 9-MG oscillate or be still on the target position. In this embodiment, the amplitude of the magnetic element 9-MG oscillating at the target position is less than 5% of the maximum stroke of the magnetic element 9-MG.

After the magnetic element 9-MG reaches the target position, the control circuit 9-150 may output a correction current to the first coil group 9-121 so as to drive the magnetic element 9-MG to return to the initial position in the third direction, and the correction current may include the first control current and the second control current. Until the magnetic element 9-MG returns to the initial position, the control circuit 9-150 drives the magnetic element 9-MG to another target position.

In other embodiments of the present disclosure, the control circuit 9-150 may control at least one first coil in the first coil group 9-121 according to image data. The image data may be, for example, a digital image generated by the photosensitive element 9-118. The control circuit 9-150 can output the first, second or third control current according to the average brightness, maximum brightness, average contrast, maximum contrast and so on of the digital image.

Figure 113:
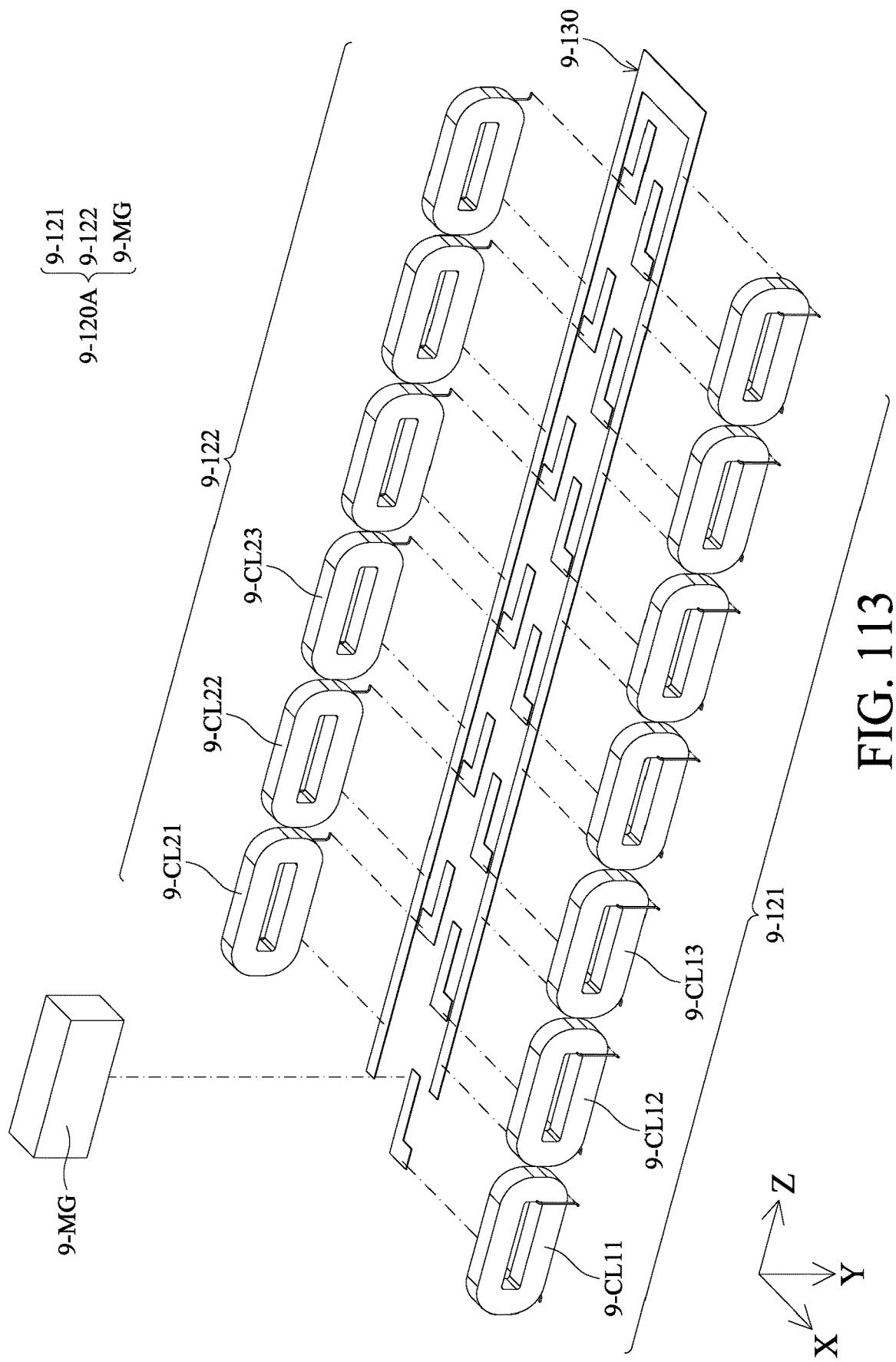
FIG. 113 is an exploded diagram of a driving assembly 9-120A and the circuit assembly 9-130 according to another embodiment of the present disclosure.
Figure 114:
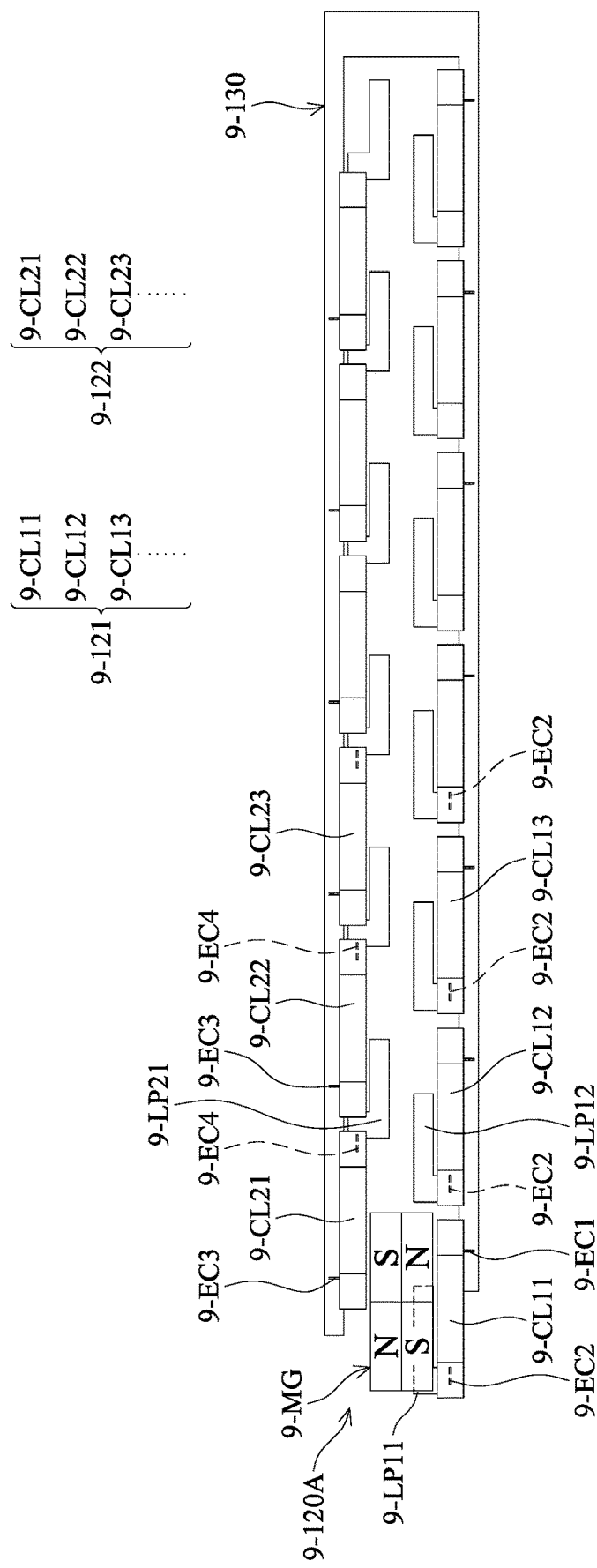
FIG. 114 is a top view of the driving assembly 9-120A and the circuit assembly 9-130 according to another embodiment of the present disclosure.

Please refer to FIG. 113 and FIG. 114. FIG. 113 is an exploded diagram of a driving assembly 9-120A and the circuit assembly 9-130 according to another embodiment of the present disclosure, and FIG. 114 is a top view of the driving assembly 9-120A and the circuit assembly 9-130 according to another embodiment of the present disclosure. Compared to the previous embodiment, as shown in FIG. 113, in addition to the first coil group 9-121, the driving assembly 9-120 of this embodiment further includes a second coil group 9-122. The second coil group 9-122 has a plurality of second coils (the second coils 9-CL21, 9-CL22, 9-CL23, and so on), which are arranged along the Z-axis (the first direction). Furthermore, in this embodiment, the circuit assembly 9-130 may have a U-shaped structure.

As shown in FIG. 114, the plurality of second coils respectively correspond to adjacent L-shaped conductive plates. For example, the second coil 9-CL21 corresponds to the L-shaped conductive plate 9-LP21, and so on. Furthermore, each second coil has a third electrical connection portion 9-EC3 and a fourth electrical connection portion 9-EC4. The third electrical connection portion 9-EC3 is an electrical connected to the circuit assembly 9-130, and the fourth electrical connection portion 9-EC4 is electrically connected to the corresponding L-shaped conductive plate and the control circuit 9-150. The control circuits 9-150 can control these second coils individually or collectively, which means that the fourth electrical connection portions 9-EC4 of the second coils are electrically independent from each other.

Figure 115A:
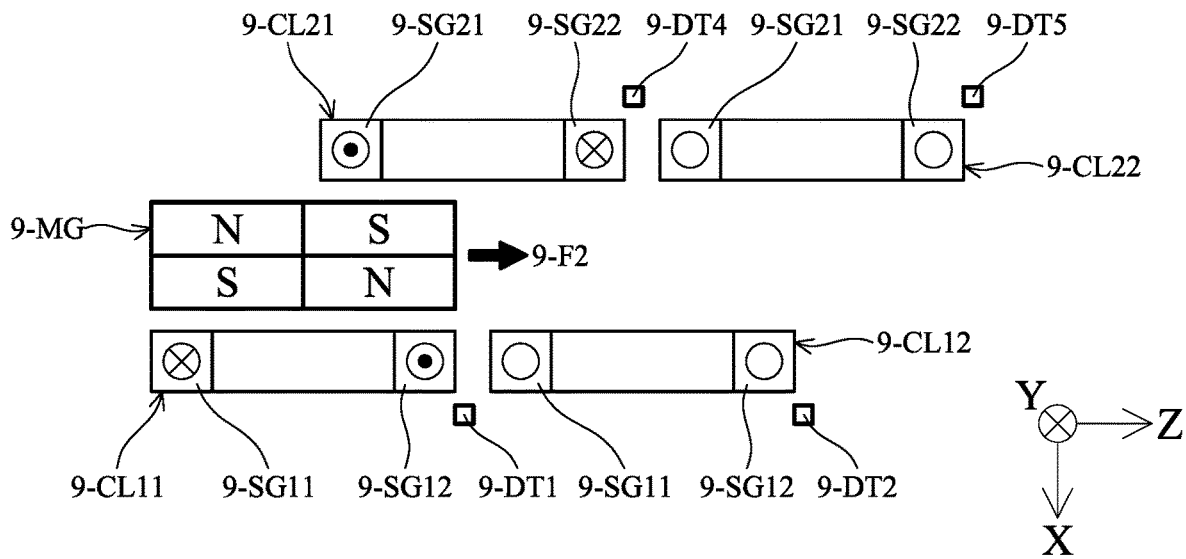

Next, please refer to FIG. 114 and FIG. 115A to FIG. 115D. FIG. 115A to FIG. 115D are schematic diagrams illustrating that operation of the magnetic element 9-MG relative to the fixed assembly 9-101 according to another embodiment of the present disclosure. As shown in FIG. 115A, similar to the foregoing embodiment, each second coil may have a first segment 9-SG21 and a second segment 9-SG22, and in the first direction, the maximum size of the magnetic element 9-MG is greater than or equal to the shortest distance between the first segment 9-SG21 and the second segment 9-SG22.

Figure 115B:
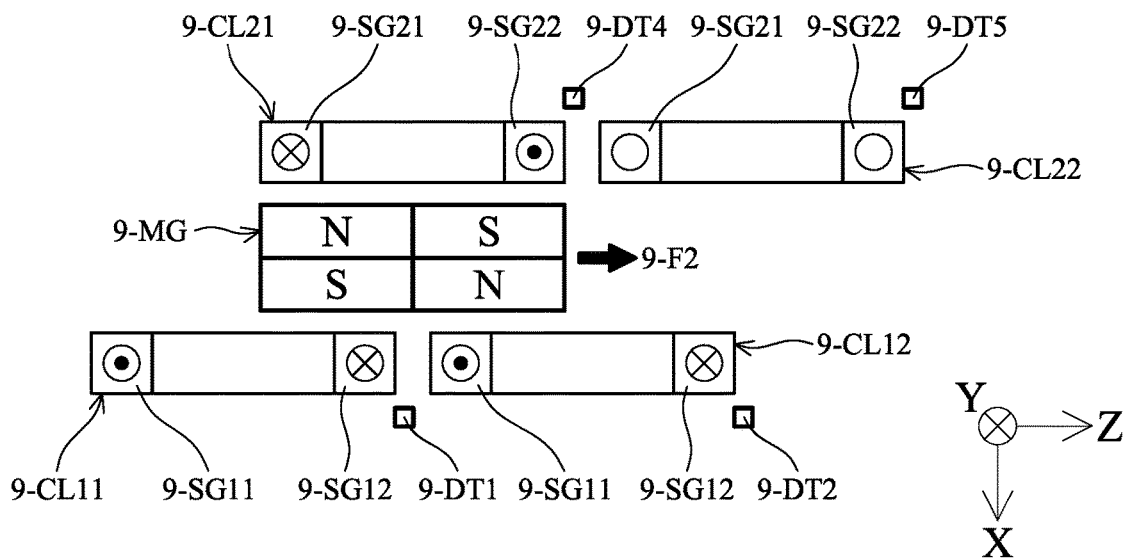
Figure 115C:
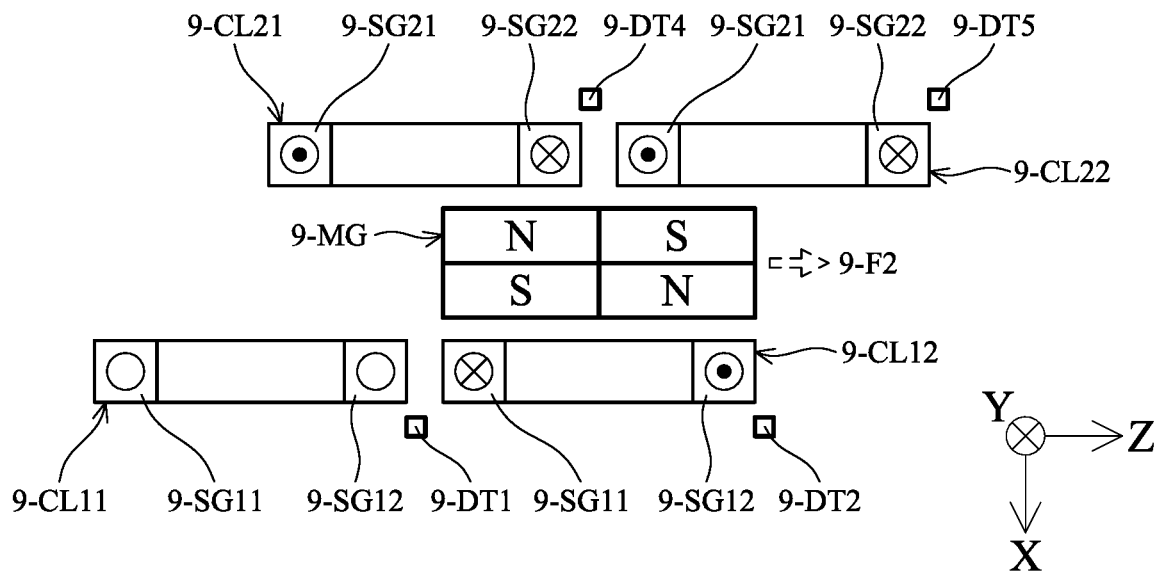

Similar to the driving assembly 9-120 of the previous embodiment, the control circuit 9-150 of this embodiment may control at least one first coil in the first coil group 9-121 and/or at least one second coil in the second coil group 9-122 according to the position information of the movable assembly 9-108 relative to the fixed assembly 9-101, and the movable assembly 9-108 connected to the magnetic element 9-MG, so that the first coil and/or the second coil act with the magnetic element 9-MG to generate an electromagnetic driving force 9-F2, thereby driving the movable assembly 9-108 to move in the first direction toward a target position (such as the position in FIG. 115C). In this embodiment, the optical element driving mechanism 9-100 may further include sensing elements 9-DT4, 9-DT5), which are disposed on a side of these second coils to obtain the position information of the magnetic element 9-MG.

Specifically, as shown in FIG. 115A, the magnetic element 9-MG is located in an initial position, and at this time, the control circuit 9-150 outputs the first control current (the positive current) to the first coil 9-CL11 to drive the magnetic element 9-MG to move in the first direction toward the target position (for example, the position in FIG. 115C). When viewed in the second direction, the first coil 9-CL11 completely overlaps the magnetic element 9-MG.

When the magnetic element 9-MG is located in the initial position, the second coil 9-CL21 generates a second induced current to the control circuit 9-150, and when viewed in the second direction, the first segment 9-SG21 of the second coil 9-CL21 overlaps the magnetic element 9-MG. Therefore, the control circuit 9-150 may output the second control current (the negative current) to the second coil 9-CL21 according to the second induced current so as to generate the electromagnetic driving force 9-F2.

When the magnetic element 9-MG moves from the initial position to the first position in FIG. 115B, the first segment 9-SG11 of the first coil 9-CL12 overlaps the magnetic element 9-MG, and the first coil 9-CL12 generates the first induced current to the control circuit 9-150. Therefore, the control circuit 9-150 can output the second control current to the first coil 9-CL12 according to the first induced current or the position information provided by the sensing elements 9-DT1, 9-DT4.

Furthermore, when the magnetic element 9-MG is located in the first position, the control circuit 9-150 switches the first control current provided to the first coil 9-CL11 to the second control current, so that the direction of the electromagnetic driving force 9-F2 generated by the magnetic element 9-MG and the first coil 9-CL11 remains unchanged. In other embodiments, when the magnetic element 9-MG is located in the first position in FIG. 115B, the control circuit 9-150 may stop supplying the first control current to the first coil 9-CL11. In addition, when the magnetic element 9-MG is located in the first position, the control circuit 9-150 may switch the second control current supplied to the second coil 9-CL21 to the first control current, so that the direction of the electromagnetic driving force 9-F2 generated by the magnetic element 9-MG and the second coil 9-CL21 remains unchanged.

Next, when the magnetic element 9-MG moves from the first position in FIG. 115B to the second position in FIG. 115C, the control circuit 9-150 switch the second control current supplied to the first coil 9-CL12 to the first control current. As shown in FIG. 115C, when the magnetic element 9-MG is located in the second position, the second segment 9-SG12 of the first coil 9-CL12 overlaps the magnetic element 9-MG.

In addition, when the magnetic element 9-MG moves to the second position in FIG. 115C, because the first coil 9-CL11 does not overlap the magnetic element 9-MG, the control circuit 9-150 stops outputting the second control current to the first coil 9-CL11.

Furthermore, when the magnetic element 9-MG moves to the second position, the first segment 9-SG21 of the second coil 9-CL22 overlaps the magnetic element 9-MG, and the control circuit 9-150 outputs the second control current to the second coil 9-CL22. In addition, when the magnetic element 9-MG is located in the second position, the control circuit 9-150 may stop supplying the first control current to the second coil 9-CL21 or switch the first control current provided to the second coil 9-CL21 to the second control current.

Figure 115D:
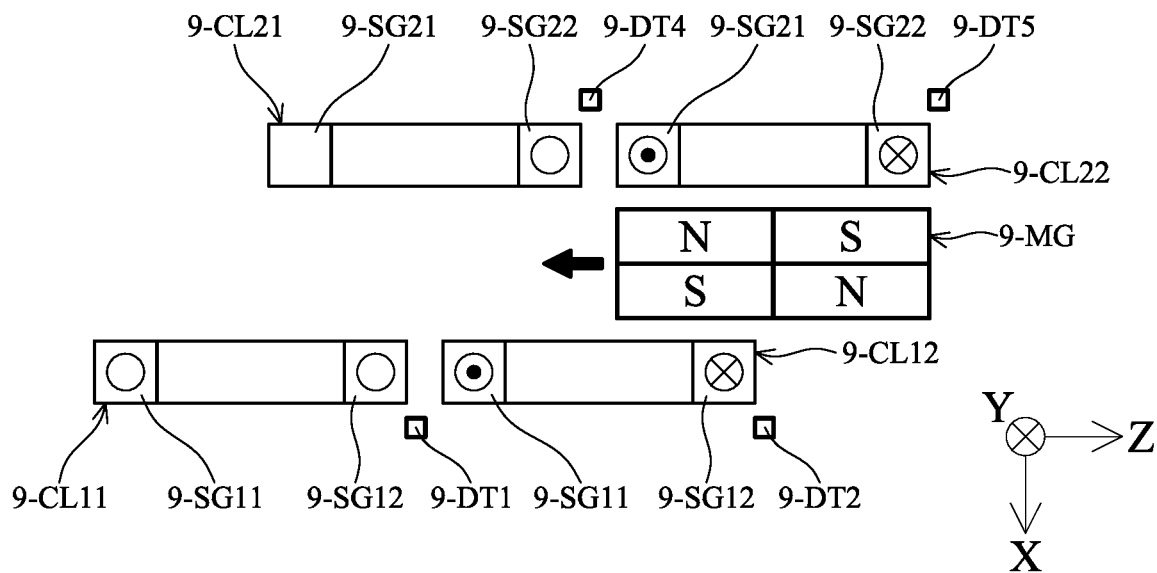

In some embodiments, when the magnetic element 9-MG moves from the initial position in the first direction but exceeds the target position in FIG. 115C and reaches, for example, the third position in FIG. 115D, the control circuit 9-150 can determine that the magnetic element 9-MG exceeds the target position according to the position information. At this time, the control circuit 9-150 outputs a reverse driving current to one of the first coils adjacent to the magnetic element 9-MG and/or one of the second coils adjacent to the magnetic element 9-MG to drive the magnetic element 9-MG to move in the third direction. For example, as shown in FIG. 115D, the control circuit 9-150 can provide the second control current to the second coil 9-CL22 and the first coil 9-CL12.

In addition, when the control circuit 9-150 determines that the magnetic element 9-MG is close to the target position in FIG. 115C according to the position information, the control circuit 9-150 may output the third control current to one of the first coils adjacent to the magnetic element 9-MG and/or one of the second coils adjacent to the magnetic element 9-MG, so that the magnetic element 9-MG maintains a stable state. In this embodiment, when the magnetic element 9-MG is adjacent to the first coil 9-CL12, the control circuit 9-150 outputs the third control current to the first coil 9-CL12.

Similar to the embodiment of FIG. 111, the control circuit 9-150 can output a correction current to the first coil group 9-121 and the second coil group 9-122 to drive the magnetic element 9-MG to return to the initial position. In addition, the control circuit 9-150 may control at least one first coil in the first coil group 9-121 and/or at least one second coil in the second coil group 9-122 according to the image data to drive the magnetic element 9-MG to move.

The present disclosure provides an optical element driving mechanism configured to drive the movable assembly 9-108 (for example, a camera lens) for performing the auto-focus function. In an embodiment of the present disclosure, the optical element driving mechanism 9-100 may include a first coil group 9-121, a second coil group 9-122, a magnetic element 9-MG, and a control circuit 9-150. The control circuit 9-150 can provide the positive current and/or the negative current to the coils in the first coil group 9-121 and the second coil group 9-122 according to the position information of the magnetic element 9-MG to generate the electromagnetic driving force to drive the magnetic element 9-MG to move. Because the coils in the first coil group 9-121 and the second coil group 9-122 are turned on in sequence according to the positive current or the negative current, it can ensure that the magnetic element 9-MG moves smoothly in the first direction, and the range of motion of the movable assembly 9-108 can be increased.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

What is claimed is:

1. An optical element driving mechanism, corresponding to an optical sensing element with an optical sensing surface, comprising:
    a fixed portion having an aperture corresponding to the optical sensing element, an optical axis perpendicular to the optical sensing surface passing through the aperture, wherein when viewed along the optical axis, the fixed portion has an elongated structure extending in a first direction, the aperture is located on an end of the fixed portion;
    a movable portion, movably disposed on the fixed portion, comprising an optical element;
    a first driving assembly at least partially disposed on the fixed portion, driving the optical element to move in the first direction; and
    a positioning assembly disposed on the fixed portion or the movable portion, wherein the positioning assembly limits the movable portion to a first terminal position or a second terminal position relative to the fixed portion,
    wherein when viewed along the optical axis, the optical element at least partially overlaps the aperture when the movable portion is in the first terminal position, and
    wherein when viewed along the optical axis, the aperture, the first driving assembly, and the positioning assembly are arranged in the first direction.

2. The optical element driving mechanism as claimed in claim 1, wherein the fixed portion comprises:
    a cap; and
    a base connected to the cap;
    wherein the movable portion, the first driving assembly, and the positioning assembly are located between the cap and the base.

3. The optical element driving mechanism as claimed in claim 2, wherein the cap is made of metal, the cap is electrically connected to the positioning assembly, and the cap has a surface and an insulated component disposed on the surface.

4. The optical element driving mechanism as claimed in claim 2, further comprising a metal wire embedded within the cap, wherein the metal wire is electrically connected to the positioning assembly.

5. The optical element driving mechanism as claimed in claim 1, wherein the fixed portion further comprises:
    a first stopper structure located on a side of the fixed portion closer to the positioning assembly; and
    a second stopper structure located on a side of the fixed portion further away from the positioning assembly;
    wherein when the movable portion comes into contact with the first stopper structure, the movable portion is located in the first terminal position relative to the fixed portion; and when the movable portion comes into contact with the second stopper structure, the movable portion is located in the second terminal position relative to the fixed portion.

6. The optical element driving mechanism as claimed in claim 1, wherein the movable portion comprises a sliding part, and the fixed portion comprises a rail corresponding to the sliding part.

7. The optical element driving mechanism as claimed in claim 1, wherein the first driving assembly comprises:
    a first driving coil disposed on the fixed portion;
    a positioning pin located in the first driving coil; and
    a first driving magnet connected to the movable portion, moving relative to the first driving coil in the first direction.

8. The optical element driving mechanism as claimed in claim 7, wherein a range of motion of the first driving magnet is greater than a length of the first driving coil.

9. The optical element driving mechanism as claimed in claim 1, further comprising an adhesive component, wherein the movable portion further comprises a holder with a through slot extending to the first driving assembly, the adhesive component is located between the through slot and the first driving assembly, and the holder is integrated with the first driving assembly by the adhesive component.

10. The optical element driving mechanism as claimed in claim 9, wherein the holder has a protrusion and the optical element has a hole, wherein the protrusion passes through the hole to connect the holder to the optical element.

11. The optical element driving mechanism as claimed in claim 1, wherein the positioning assembly comprises:
    a positioning element corresponding to the movable portion; and
    a second driving assembly driving the positioning element to move relative to the fixed portion in a second direction perpendicular to the first direction.

12. The optical element driving mechanism as claimed in claim 11, further comprising:
    a first electric conductive part electrically connected to the first driving assembly; and
    a second electric conductive part electrically connected to the second driving assembly;

wherein the first electric conductive part and the second electric conductive part are separate from each other.

13. The optical element driving mechanism as claimed in claim 11, wherein the second driving assembly comprises:
a second driving coil disposed on the fixed portion; and
a center pin at least partially located in the second driving coil;
wherein when the second driving coil is electrified, the positioning element is attracted by a magnetic force exerted by the center pin and thereby moves relative to the movable portion.

14. The optical element driving mechanism as claimed in claim 13, wherein the center pin comprises:
a coil winding shaft disposed in the second driving coil; and
a top surface connected to the coil winding shaft, wherein a diameter of the top surface is greater than a diameter of the coil winding shaft.

15. The optical element driving mechanism as claimed in claim 11, wherein the positioning element comprises:
a raised part; and
a bottom part connected to the raised part and closer to the second driving assembly than the raised part.

16. The optical element driving mechanism as claimed in claim 15, wherein the optical element has two perforations, and when the movable portion is located in the first terminal position, the raised part is inserted into one of the perforations, when the movable portion is located in the second terminal position, the raised part is inserted into another one of the perforations.

17. The optical element driving mechanism as claimed in claim 15, wherein when viewed in the second direction, a top of the raised part is circular or a rounded rectangular.

18. The optical element driving mechanism as claimed in claim 15, wherein the positioning assembly further comprises a resilient element contacting the bottom part of the positioning element, and the second driving assembly is at least partially disposed inside of the resilient element.

19. The optical element driving mechanism as claimed in claim 1, further comprising a controller controlling the positioning assembly to move into an unlocked position, then move the movable portion originally in the first terminal position into the second terminal position, and move the positioning assembly into a locked position.

20. The optical element driving mechanism as claimed in claim 1, further comprising a controller controlling the positioning assembly to move into an unlocked position, move the movable portion originally in the first terminal position into the second terminal position, then move the movable portion back into the first terminal position, and move the positioning assembly into a locked position.

* * * * *